US009638436B2

(12) United States Patent
Arensmeier et al.

(10) Patent No.: US 9,638,436 B2
(45) Date of Patent: May 2, 2017

(54) HVAC SYSTEM REMOTE MONITORING AND DIAGNOSIS

(71) Applicant: Emerson Electric Co., St. Louis, OH (US)

(72) Inventors: Jeffrey N. Arensmeier, Fenton, MO (US); Gregg M. Hemmelgarn, Saint Henry, OH (US); Fadi M. Alsaleem, Troy, OH (US); Priotomo Abiprojo, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 14/212,632

(22) Filed: Mar. 14, 2014

(65) Prior Publication Data

US 2014/0266755 A1 Sep. 18, 2014

Related U.S. Application Data

(60) Provisional application No. 61/809,222, filed on Apr. 5, 2013, provisional application No. 61/800,636, filed on Mar. 15, 2013.

(51) Int. Cl.
*G08B 21/00* (2006.01)
*F24F 11/00* (2006.01)
(Continued)

(52) U.S. Cl.
CPC ........ *F24F 11/0086* (2013.01); *F24F 11/006* (2013.01); *G05B 15/02* (2013.01);
(Continued)

(58) Field of Classification Search
CPC ... H04L 12/2825; G08B 21/187; G05B 15/02; F24F 11/006; F24F 2011/0067; F24F 2011/0091
(Continued)

(56) References Cited

U.S. PATENT DOCUMENTS 2,054,542 A 9/1936 Hoelle
2,296,822 A 9/1942 Wolfert
(Continued)

FOREIGN PATENT DOCUMENTS

CA 1147440 A1 5/1983
CA 2528778 A1 12/2004
(Continued)

OTHER PUBLICATIONS

Jeffus, Larry, "Refrigeration and Air Conditioning: An Introduction to HVAC/R," Appendix C, pp. 1060-1063, Copyright 2004.
(Continued)

*Primary Examiner* — Jack K Wang
(74) *Attorney, Agent, or Firm* — Harness, Dickey & Pierce, P.L.C.

(57) ABSTRACT

A monitoring system for a heating, ventilation, and air conditioning (HVAC) system of a building includes a monitoring device installed at the building, a monitoring server located remotely from the building, and a review server. The monitoring device measures an aggregate current supplied to components of the HVAC system and transmits current data based on the measured aggregate current. The monitoring server receives the transmitted current data and, based on the received current data, assesses whether failures have occurred in first and second components of the HVAC components. The monitoring server generates a first advisory in response to determining that the failure has occurred in the first component. The review server provides the first advisory to a technician for review and, in response to the technician verifying that the failure has occurred, transmits a first alert.

26 Claims, 39 Drawing Sheets

(51) Int. Cl.
*G05B 15/02* (2006.01)
*G05B 23/02* (2006.01)
*G05B 21/00* (2006.01)

(52) U.S. Cl.
CPC .. *G05B 23/0286* (2013.01); *F24F 2011/0052* (2013.01); *F24F 2011/0067* (2013.01); *F24F 2011/0071* (2013.01); *F24F 2011/0091* (2013.01); *G05B 2219/163* (2013.01); *G05B 2219/2614* (2013.01); *G05B 2219/2642* (2013.01)

(58) Field of Classification Search
USPC ............ 340/679; 700/276; 70/188; 705/305
See application file for complete search history.

(56) References Cited

U.S. PATENT DOCUMENTS

| | | |
|---|---|---|
| 2,631,050 A | 3/1953 | Haeberlein |
| 2,804,839 A | 9/1957 | Hallinan |
| 2,961,606 A | 11/1960 | Mead |
| 2,962,702 A | 11/1960 | Derr et al. |
| 2,978,879 A | 4/1961 | Heidorn |
| 3,027,865 A | 4/1962 | Kautz et al. |
| 3,047,696 A | 7/1962 | Heidorn |
| 3,082,951 A | 3/1963 | Kayan |
| 3,107,843 A | 10/1963 | Finn |
| 3,170,304 A | 2/1965 | Hale |
| 3,232,519 A | 2/1966 | Long |
| 3,278,111 A | 10/1966 | Parker |
| 3,327,197 A | 6/1967 | Marquis |
| 3,339,164 A | 8/1967 | Landis et al. |
| 3,400,374 A | 9/1968 | Schumann |
| 3,513,662 A | 5/1970 | Golber |
| 3,581,281 A | 5/1971 | Martin et al. |
| 3,585,451 A | 6/1971 | Day, III |
| 3,653,783 A | 4/1972 | Sauder |
| 3,660,718 A | 5/1972 | Pinckaers |
| 3,665,339 A | 5/1972 | Liu |
| 3,665,399 A | 5/1972 | Zehr et al. |
| 3,697,953 A | 10/1972 | Schoenwitz |
| 3,707,851 A | 1/1973 | McAshan, Jr. |
| 3,729,949 A | 5/1973 | Talbot |
| 3,735,377 A | 5/1973 | Kaufman |
| 3,742,302 A | 6/1973 | Neill |
| 3,742,303 A | 6/1973 | Dageford |
| 3,767,328 A | 10/1973 | Ladusaw |
| 3,777,240 A | 12/1973 | Neill |
| 3,783,681 A | 1/1974 | Hirt et al. |
| 3,820,074 A | 6/1974 | Toman |
| 3,882,305 A | 5/1975 | Johnstone |
| 3,924,972 A | 12/1975 | Szymaszek |
| 3,927,712 A | 12/1975 | Nakayama |
| 3,935,519 A | 1/1976 | Pfarrer et al. |
| 3,950,962 A | 4/1976 | Odashima |
| 3,960,011 A | 6/1976 | Renz et al. |
| 3,978,382 A | 8/1976 | Pfarrer et al. |
| 3,998,068 A | 12/1976 | Chirnside |
| 4,006,460 A | 2/1977 | Hewitt et al. |
| 4,014,182 A | 3/1977 | Granryd |
| 4,018,584 A | 4/1977 | Mullen |
| 4,019,172 A | 4/1977 | Srodes |
| 4,024,725 A | 5/1977 | Uchida et al. |
| 4,027,289 A | 5/1977 | Toman |
| 4,034,570 A | 7/1977 | Anderson et al. |
| 4,038,061 A | 7/1977 | Anderson et al. |
| 4,045,973 A | 9/1977 | Anderson et al. |
| 4,046,532 A | 9/1977 | Nelson |
| RE29,450 E | 10/1977 | Goldsby et al. |
| 4,060,716 A | 11/1977 | Pekrul et al. |
| 4,066,869 A | 1/1978 | Apaloo et al. |
| 4,090,248 A | 5/1978 | Swanson et al. |
| 4,102,150 A | 7/1978 | Kountz |
| 4,102,394 A | 7/1978 | Botts |
| 4,104,888 A | 8/1978 | Reedy et al. |
| 4,105,063 A | 8/1978 | Bergt |
| 4,112,703 A | 9/1978 | Kountz |
| 4,132,086 A | 1/1979 | Kountz |
| 4,136,730 A | 1/1979 | Kinsey |
| 4,137,057 A | 1/1979 | Piet et al. |
| 4,137,725 A | 2/1979 | Martin |
| 4,142,375 A | 3/1979 | Abe et al. |
| 4,143,707 A | 3/1979 | Lewis et al. |
| 4,146,085 A | 3/1979 | Wills |
| RE29,966 E | 4/1979 | Nussbaum |
| 4,151,725 A | 5/1979 | Kountz et al. |
| 4,153,003 A | 5/1979 | Willis |
| 4,156,350 A | 5/1979 | Elliott et al. |
| 4,161,106 A | 7/1979 | Savage et al. |
| 4,165,619 A | 8/1979 | Girard |
| 4,171,622 A | 10/1979 | Yamaguchi et al. |
| 4,173,871 A | 11/1979 | Brooks |
| 4,178,988 A | 12/1979 | Cann et al. |
| RE30,242 E | 4/1980 | del Toro et al. |
| 4,197,717 A | 4/1980 | Schumacher |
| 4,205,381 A | 5/1980 | Games et al. |
| 4,209,994 A | 7/1980 | Mueller et al. |
| 4,211,089 A | 7/1980 | Mueller et al. |
| 4,217,761 A | 8/1980 | Cornaire et al. |
| 4,220,010 A | 9/1980 | Mueller et al. |
| 4,227,862 A | 10/1980 | Andrew et al. |
| 4,232,530 A | 11/1980 | Mueller |
| 4,233,818 A | 11/1980 | Lastinger |
| 4,236,379 A | 12/1980 | Mueller |
| 4,244,182 A | 1/1981 | Behr |
| 4,246,763 A | 1/1981 | Mueller et al. |
| 4,248,051 A | 2/1981 | Darcy et al. |
| 4,251,988 A | 2/1981 | Allard et al. |
| 4,257,795 A | 3/1981 | Shaw |
| 4,259,847 A | 4/1981 | Pearse, Jr. |
| 4,267,702 A | 5/1981 | Houk |
| 4,270,174 A | 5/1981 | Karlin et al. |
| 4,271,898 A | 6/1981 | Freeman |
| 4,281,358 A | 7/1981 | Plouffe et al. |
| 4,284,849 A | 8/1981 | Anderson et al. |
| 4,286,438 A | 9/1981 | Clarke |
| 4,290,480 A | 9/1981 | Sulkowski |
| 4,296,727 A | 10/1981 | Bryan |
| 4,301,660 A | 11/1981 | Mueller et al. |
| 4,306,293 A | 12/1981 | Marathe |
| 4,307,775 A | 12/1981 | Saunders et al. |
| 4,308,725 A | 1/1982 | Chiyoda |
| 4,311,188 A | 1/1982 | Kojima et al. |
| 4,319,461 A | 3/1982 | Shaw |
| 4,321,529 A | 3/1982 | Simmonds et al. |
| 4,325,223 A | 4/1982 | Cantley |
| 4,328,678 A | 5/1982 | Kono et al. |
| 4,328,680 A | 5/1982 | Stamp, Jr. et al. |
| 4,333,316 A | 6/1982 | Stamp, Jr. et al. |
| 4,333,317 A | 6/1982 | Sawyer |
| 4,336,001 A | 6/1982 | Andrew et al. |
| 4,338,790 A | 7/1982 | Saunders et al. |
| 4,338,791 A | 7/1982 | Stamp, Jr. et al. |
| 4,345,162 A | 8/1982 | Hammer et al. |
| 4,346,755 A | 8/1982 | Alley et al. |
| 4,350,021 A | 9/1982 | Lundstrom |
| 4,350,023 A | 9/1982 | Kuwabara et al. |
| 4,351,163 A | 9/1982 | Johannsen |
| 4,356,703 A | 11/1982 | Vogel |
| 4,361,273 A | 11/1982 | Levine et al. |
| 4,365,983 A | 12/1982 | Abraham et al. |
| 4,370,098 A | 1/1983 | McClain et al. |
| 4,372,119 A | 2/1983 | Gillbrand et al. |
| 4,376,926 A | 3/1983 | Senor |
| 4,381,549 A | 4/1983 | Stamp, Jr. et al. |
| 4,382,367 A | 5/1983 | Roberts |
| 4,384,462 A | 5/1983 | Overman et al. |
| 4,387,368 A | 6/1983 | Day, III et al. |
| 4,387,578 A | 6/1983 | Paddock |
| 4,390,058 A | 6/1983 | Otake et al. |
| 4,390,321 A | 6/1983 | Langlois et al. |
| 4,390,922 A | 6/1983 | Pelliccia |
| 4,395,886 A | 8/1983 | Mayer |
| 4,395,887 A | 8/1983 | Sweetman |

(56) References Cited

U.S. PATENT DOCUMENTS

| | | |
|---|---|---|
| 4,399,548 A | 8/1983 | Castleberry |
| 4,402,054 A | 8/1983 | Osborne et al. |
| 4,406,133 A | 9/1983 | Saunders et al. |
| 4,407,138 A | 10/1983 | Mueller |
| 4,408,660 A | 10/1983 | Sutoh et al. |
| 4,412,788 A | 11/1983 | Shaw et al. |
| 4,415,896 A | 11/1983 | Allgood |
| 4,418,388 A | 11/1983 | Allgor et al. |
| 4,420,947 A | 12/1983 | Yoshino |
| 4,425,010 A | 1/1984 | Bryant et al. |
| 4,429,578 A | 2/1984 | Darrel et al. |
| 4,432,232 A | 2/1984 | Brantley et al. |
| 4,434,390 A | 2/1984 | Elms |
| 4,441,329 A | 4/1984 | Dawley |
| 4,448,038 A | 5/1984 | Barbier |
| 4,449,375 A | 5/1984 | Briccetti |
| 4,451,929 A | 5/1984 | Yoshida |
| 4,460,123 A | 7/1984 | Beverly |
| 4,463,571 A | 8/1984 | Wiggs |
| 4,463,574 A | 8/1984 | Spethmann et al. |
| 4,463,576 A | 8/1984 | Burnett et al. |
| 4,465,229 A | 8/1984 | Kompelien |
| 4,467,230 A | 8/1984 | Rovinsky |
| 4,467,385 A | 8/1984 | Bandoli et al. |
| 4,467,613 A | 8/1984 | Behr et al. |
| 4,470,092 A | 9/1984 | Lombardi |
| 4,470,266 A | 9/1984 | Briccetti et al. |
| 4,474,024 A | 10/1984 | Eplett et al. |
| 4,474,542 A | 10/1984 | Kato et al. |
| 4,479,389 A | 10/1984 | Anderson, III et al. |
| 4,484,452 A | 11/1984 | Houser, Jr. |
| 4,489,551 A | 12/1984 | Watanabe et al. |
| 4,490,986 A | 1/1985 | Paddock |
| 4,494,383 A | 1/1985 | Nagatomo et al. |
| 4,495,779 A | 1/1985 | Tanaka et al. |
| 4,496,296 A | 1/1985 | Arai et al. |
| 4,497,031 A | 1/1985 | Froehling et al. |
| 4,498,310 A | 2/1985 | Imanishi et al. |
| 4,499,739 A | 2/1985 | Matsuoka et al. |
| 4,502,084 A | 2/1985 | Hannett |
| 4,502,833 A | 3/1985 | Hibino et al. |
| 4,502,842 A | 3/1985 | Currier et al. |
| 4,502,843 A | 3/1985 | Martin |
| 4,505,125 A | 3/1985 | Baglione |
| 4,506,518 A | 3/1985 | Yoshikawa et al. |
| 4,507,934 A | 4/1985 | Tanaka et al. |
| 4,510,547 A | 4/1985 | Rudich, Jr. |
| 4,510,576 A | 4/1985 | MacArthur et al. |
| 4,512,161 A | 4/1985 | Logan et al. |
| 4,516,407 A | 5/1985 | Watabe |
| 4,517,468 A | 5/1985 | Kemper et al. |
| 4,520,674 A | 6/1985 | Canada et al. |
| 4,523,435 A | 6/1985 | Lord |
| 4,523,436 A | 6/1985 | Schedel et al. |
| 4,527,247 A | 7/1985 | Kaiser et al. |
| 4,527,399 A | 7/1985 | Lord |
| 4,535,607 A | 8/1985 | Mount |
| 4,538,420 A | 9/1985 | Nelson |
| 4,538,422 A | 9/1985 | Mount et al. |
| 4,539,820 A | 9/1985 | Zinsmeyer |
| 4,540,040 A | 9/1985 | Fukumoto et al. |
| 4,545,210 A | 10/1985 | Lord |
| 4,545,214 A | 10/1985 | Kinoshita |
| 4,548,549 A | 10/1985 | Murphy et al. |
| 4,549,403 A | 10/1985 | Lord et al. |
| 4,549,404 A | 10/1985 | Lord |
| 4,550,770 A | 11/1985 | Nussdorfer et al. |
| 4,553,400 A | 11/1985 | Branz |
| 4,555,057 A | 11/1985 | Foster |
| 4,555,910 A | 12/1985 | Sturges |
| 4,557,317 A | 12/1985 | Harmon, Jr. |
| 4,558,181 A | 12/1985 | Blanchard et al. |
| 4,561,260 A | 12/1985 | Nishi et al. |
| 4,563,624 A | 1/1986 | Yu |
| 4,563,877 A | 1/1986 | Harnish |
| 4,563,878 A | 1/1986 | Baglione |
| 4,567,733 A | 2/1986 | Mecozzi |
| 4,568,909 A | 2/1986 | Whynacht |
| 4,574,871 A | 3/1986 | Parkinson et al. |
| 4,575,318 A | 3/1986 | Blain |
| 4,577,977 A | 3/1986 | Pejsa |
| 4,580,947 A | 4/1986 | Shibata et al. |
| 4,583,373 A | 4/1986 | Shaw |
| 4,589,060 A | 5/1986 | Zinsmeyer |
| 4,593,367 A | 6/1986 | Slack et al. |
| 4,598,764 A | 7/1986 | Beckey |
| 4,602,484 A | 7/1986 | Bendikson |
| 4,603,556 A | 8/1986 | Suefuji et al. |
| 4,604,036 A | 8/1986 | Sutou et al. |
| 4,611,470 A | 9/1986 | Enstrom |
| 4,612,775 A | 9/1986 | Branz et al. |
| 4,614,089 A | 9/1986 | Dorsey |
| 4,617,804 A | 10/1986 | Fukushima et al. |
| 4,620,286 A | 10/1986 | Smith et al. |
| 4,620,424 A | 11/1986 | Tanaka et al. |
| 4,621,502 A | 11/1986 | Ibrahim et al. |
| 4,627,245 A | 12/1986 | Levine |
| 4,627,483 A | 12/1986 | Harshbarger, III et al. |
| 4,627,484 A | 12/1986 | Harshbarger, Jr. et al. |
| 4,630,572 A | 12/1986 | Evans |
| 4,630,670 A | 12/1986 | Wellman et al. |
| 4,642,034 A | 2/1987 | Terauchi |
| 4,642,782 A | 2/1987 | Kemper et al. |
| 4,644,479 A | 2/1987 | Kemper et al. |
| 4,646,532 A | 3/1987 | Nose |
| 4,648,044 A | 3/1987 | Hardy et al. |
| 4,649,515 A | 3/1987 | Thompson et al. |
| 4,649,710 A | 3/1987 | Inoue et al. |
| 4,653,280 A | 3/1987 | Hansen et al. |
| 4,653,285 A | 3/1987 | Pohl |
| 4,655,688 A | 4/1987 | Bohn et al. |
| 4,660,386 A | 4/1987 | Hansen et al. |
| 4,662,184 A | 5/1987 | Pohl et al. |
| 4,674,292 A | 6/1987 | Ohya et al. |
| 4,677,830 A | 7/1987 | Sumikawa et al. |
| 4,680,940 A | 7/1987 | Vaughn |
| 4,682,473 A | 7/1987 | Rogers, III |
| 4,684,060 A | 8/1987 | Adams et al. |
| 4,685,615 A | 8/1987 | Hart |
| 4,686,835 A | 8/1987 | Alsenz |
| 4,689,967 A | 9/1987 | Han et al. |
| 4,697,431 A | 10/1987 | Alsenz |
| 4,698,978 A | 10/1987 | Jones |
| 4,698,981 A | 10/1987 | Kaneko et al. |
| 4,701,824 A | 10/1987 | Beggs et al. |
| 4,703,325 A | 10/1987 | Chamberlin et al. |
| 4,706,152 A | 11/1987 | DeFilippis et al. |
| 4,706,469 A | 11/1987 | Oguni et al. |
| 4,712,648 A | 12/1987 | Mattes et al. |
| 4,713,717 A | 12/1987 | Pejouhy et al. |
| 4,715,190 A | 12/1987 | Han et al. |
| 4,715,792 A | 12/1987 | Nishizawa et al. |
| 4,716,582 A | 12/1987 | Blanchard et al. |
| 4,716,957 A | 1/1988 | Thompson et al. |
| 4,720,980 A | 1/1988 | Howland |
| 4,722,018 A | 1/1988 | Pohl |
| 4,722,019 A | 1/1988 | Pohl |
| 4,724,678 A | 2/1988 | Pohl |
| 4,735,054 A | 4/1988 | Beckey |
| 4,735,060 A | 4/1988 | Alsenz |
| 4,744,223 A | 5/1988 | Umezu |
| 4,745,765 A | 5/1988 | Pettitt |
| 4,745,766 A | 5/1988 | Bahr |
| 4,745,767 A | 5/1988 | Ohya et al. |
| 4,750,332 A | 6/1988 | Jenski et al. |
| 4,750,672 A | 6/1988 | Beckey et al. |
| 4,751,501 A | 6/1988 | Gut |
| 4,751,825 A | 6/1988 | Voorhis et al. |
| 4,754,410 A | 6/1988 | Leech et al. |
| 4,755,957 A | 7/1988 | White et al. |
| 4,765,150 A | 8/1988 | Persem |
| 4,768,346 A | 9/1988 | Mathur |
| 4,768,348 A | 9/1988 | Noguchi |
| 4,783,752 A | 11/1988 | Kaplan et al. |

(56) References Cited

U.S. PATENT DOCUMENTS

| | | |
|---|---|---|
| 4,787,213 A | 11/1988 | Gras et al. |
| 4,790,142 A | 12/1988 | Beckey |
| 4,796,142 A | 1/1989 | Libert |
| 4,796,466 A | 1/1989 | Farmer |
| 4,798,055 A | 1/1989 | Murray et al. |
| 4,805,118 A | 2/1989 | Rishel |
| 4,807,445 A | 2/1989 | Matsuoka et al. |
| 4,820,130 A | 4/1989 | Eber et al. |
| 4,829,779 A | 5/1989 | Munson et al. |
| 4,831,560 A | 5/1989 | Zaleski |
| 4,831,832 A | 5/1989 | Alsenz |
| 4,831,833 A | 5/1989 | Duenes et al. |
| 4,835,706 A | 5/1989 | Asahi |
| 4,835,980 A | 6/1989 | Oyanagi et al. |
| 4,838,037 A | 6/1989 | Wood |
| 4,841,734 A | 6/1989 | Torrence |
| 4,843,575 A | 6/1989 | Crane |
| 4,845,956 A | 7/1989 | Berntsen et al. |
| 4,848,099 A | 7/1989 | Beckey et al. |
| 4,848,100 A | 7/1989 | Barthel et al. |
| 4,850,198 A | 7/1989 | Helt et al. |
| 4,850,204 A | 7/1989 | Bos et al. |
| 4,852,363 A | 8/1989 | Kampf et al. |
| 4,853,693 A | 8/1989 | Eaton-Williams |
| 4,856,286 A | 8/1989 | Sulfstede et al. |
| 4,858,676 A | 8/1989 | Bolfik et al. |
| 4,866,635 A | 9/1989 | Kahn et al. |
| 4,866,944 A | 9/1989 | Yamazaki |
| 4,869,073 A | 9/1989 | Kawai et al. |
| 4,873,836 A | 10/1989 | Thompson |
| 4,875,589 A | 10/1989 | Lacey et al. |
| 4,877,382 A | 10/1989 | Caillat et al. |
| 4,878,355 A | 11/1989 | Beckey et al. |
| 4,881,184 A | 11/1989 | Abegg, III et al. |
| 4,882,747 A | 11/1989 | Williams |
| 4,882,908 A | 11/1989 | White |
| 4,884,412 A | 12/1989 | Sellers et al. |
| 4,885,707 A | 12/1989 | Nichol et al. |
| 4,885,914 A | 12/1989 | Pearman |
| 4,887,436 A | 12/1989 | Enomoto et al. |
| 4,887,857 A | 12/1989 | VanOmmeren |
| 4,889,280 A | 12/1989 | Grald et al. |
| 4,893,480 A | 1/1990 | Matsui et al. |
| 4,899,551 A | 2/1990 | Weintraub |
| 4,903,500 A | 2/1990 | Hanson |
| 4,903,759 A | 2/1990 | Lapeyrouse |
| 4,904,993 A | 2/1990 | Sato |
| 4,909,041 A | 3/1990 | Jones |
| 4,909,076 A | 3/1990 | Busch et al. |
| 4,910,966 A | 3/1990 | Levine et al. |
| 4,913,625 A | 4/1990 | Gerlowski |
| 4,916,633 A | 4/1990 | Tychonievich et al. |
| 4,916,909 A | 4/1990 | Mathur et al. |
| 4,916,912 A | 4/1990 | Levine et al. |
| 4,918,690 A | 4/1990 | Markkula, Jr. et al. |
| 4,918,932 A | 4/1990 | Gustafson et al. |
| 4,924,404 A | 5/1990 | Reinke, Jr. |
| 4,924,418 A | 5/1990 | Bachman et al. |
| 4,928,750 A | 5/1990 | Nurczyk |
| 4,932,588 A | 6/1990 | Fedter et al. |
| 4,939,909 A | 7/1990 | Tsuchiyama et al. |
| 4,943,003 A | 7/1990 | Shimizu et al. |
| 4,944,160 A | 7/1990 | Malone et al. |
| 4,945,491 A | 7/1990 | Rishel |
| 4,948,040 A | 8/1990 | Kobayashi et al. |
| 4,949,550 A | 8/1990 | Hanson |
| 4,953,784 A | 9/1990 | Yasufuku et al. |
| 4,959,970 A | 10/1990 | Meckler |
| 4,964,060 A | 10/1990 | Hartsog |
| 4,964,125 A | 10/1990 | Kim |
| 4,966,006 A | 10/1990 | Thuesen et al. |
| 4,967,567 A | 11/1990 | Proctor et al. |
| 4,970,496 A | 11/1990 | Kirkpatrick |
| 4,974,427 A | 12/1990 | Diab |
| 4,974,665 A | 12/1990 | Zillner, Jr. |
| 4,975,024 A | 12/1990 | Heckel |
| 4,977,751 A | 12/1990 | Hanson |
| 4,985,857 A | 1/1991 | Bajpai et al. |
| 4,987,748 A | 1/1991 | Meckler |
| 4,990,057 A | 2/1991 | Rollins |
| 4,990,893 A | 2/1991 | Kiluk |
| 4,991,770 A | 2/1991 | Bird et al. |
| 5,000,009 A | 3/1991 | Clanin |
| 5,005,365 A | 4/1991 | Lynch |
| 5,009,074 A | 4/1991 | Goubeaux et al. |
| 5,009,075 A | 4/1991 | Okoren |
| 5,009,076 A | 4/1991 | Winslow |
| 5,012,629 A | 5/1991 | Rehman et al. |
| 5,018,357 A | 5/1991 | Livingstone et al. |
| 5,018,665 A | 5/1991 | Sulmone |
| RE33,620 E | 6/1991 | Persem |
| 5,022,234 A | 6/1991 | Goubeaux et al. |
| 5,039,009 A | 8/1991 | Baldwin et al. |
| 5,042,264 A | 8/1991 | Dudley |
| 5,051,720 A | 9/1991 | Kittirutsunetorn |
| 5,056,036 A | 10/1991 | Van Bork |
| 5,056,329 A | 10/1991 | Wilkinson |
| 5,058,388 A | 10/1991 | Shaw et al. |
| 5,062,278 A | 11/1991 | Sugiyama |
| 5,065,593 A | 11/1991 | Dudley et al. |
| 5,067,099 A | 11/1991 | McCown et al. |
| RE33,775 E | 12/1991 | Behr et al. |
| 5,070,468 A | 12/1991 | Niinomi et al. |
| 5,071,065 A | 12/1991 | Aalto et al. |
| 5,073,091 A | 12/1991 | Burgess et al. |
| 5,073,862 A | 12/1991 | Carlson |
| 5,076,067 A | 12/1991 | Prenger et al. |
| 5,076,494 A | 12/1991 | Ripka |
| 5,077,983 A | 1/1992 | Dudley |
| 5,083,438 A | 1/1992 | McMullin |
| 5,086,385 A | 2/1992 | Launey et al. |
| 5,088,297 A | 2/1992 | Maruyama et al. |
| 5,094,086 A | 3/1992 | Shyu |
| 5,095,712 A | 3/1992 | Narreau |
| 5,095,715 A | 3/1992 | Dudley |
| 5,099,654 A | 3/1992 | Baruschke et al. |
| 5,102,316 A | 4/1992 | Caillat et al. |
| 5,103,391 A | 4/1992 | Barrett |
| 5,107,500 A | 4/1992 | Wakamoto et al. |
| 5,109,222 A | 4/1992 | Welty |
| 5,109,676 A | 5/1992 | Waters et al. |
| 5,109,700 A | 5/1992 | Hicho |
| 5,109,916 A | 5/1992 | Thompson |
| 5,115,406 A | 5/1992 | Zatezalo et al. |
| 5,115,643 A | 5/1992 | Hayata et al. |
| 5,115,644 A | 5/1992 | Alsenz |
| 5,115,967 A | 5/1992 | Wedekind |
| 5,118,260 A | 6/1992 | Fraser, Jr. |
| 5,119,466 A | 6/1992 | Suzuki |
| 5,119,637 A | 6/1992 | Bard et al. |
| 5,121,610 A | 6/1992 | Atkinson et al. |
| 5,123,017 A | 6/1992 | Simpkins et al. |
| 5,123,252 A | 6/1992 | Hanson |
| 5,123,253 A | 6/1992 | Hanson et al. |
| 5,123,255 A | 6/1992 | Ohizumi |
| 5,125,067 A | 6/1992 | Erdman |
| RE34,001 E | 7/1992 | Wrobel |
| 5,127,232 A | 7/1992 | Paige et al. |
| 5,131,237 A | 7/1992 | Valbjorn |
| 5,136,855 A | 8/1992 | Lenarduzzi |
| 5,140,394 A | 8/1992 | Cobb, III et al. |
| 5,141,407 A | 8/1992 | Ramsey et al. |
| 5,142,877 A | 9/1992 | Shimizu |
| 5,150,584 A | 9/1992 | Tomasov et al. |
| 5,156,539 A | 10/1992 | Anderson et al. |
| 5,167,494 A | 12/1992 | Inagaki et al. |
| 5,170,935 A | 12/1992 | Federspiel et al. |
| 5,170,936 A | 12/1992 | Kubo et al. |
| 5,181,389 A | 1/1993 | Hanson et al. |
| 5,186,014 A | 2/1993 | Runk |
| 5,197,666 A | 3/1993 | Wedekind |
| 5,199,855 A | 4/1993 | Nakajima et al. |
| 5,200,872 A | 4/1993 | D'Entremont et al. |
| 5,200,987 A | 4/1993 | Gray |

(56) References Cited

U.S. PATENT DOCUMENTS

| | | |
|---|---|---|
| 5,201,862 A | 4/1993 | Pettitt |
| 5,203,178 A | 4/1993 | Shyu |
| 5,203,179 A | 4/1993 | Powell |
| 5,209,076 A | 5/1993 | Kauffman et al. |
| 5,209,400 A | 5/1993 | Winslow et al. |
| 5,219,041 A | 6/1993 | Greve |
| 5,224,354 A | 7/1993 | Ito et al. |
| 5,224,835 A | 7/1993 | Oltman |
| 5,226,472 A | 7/1993 | Benevelli et al. |
| 5,228,300 A | 7/1993 | Shim |
| 5,228,304 A | 7/1993 | Ryan |
| 5,228,307 A | 7/1993 | Koce |
| 5,230,223 A | 7/1993 | Hullar et al. |
| 5,231,844 A | 8/1993 | Park |
| 5,233,841 A | 8/1993 | Jyrek |
| 5,235,526 A | 8/1993 | Saffell |
| 5,237,830 A | 8/1993 | Grant |
| 5,241,664 A | 8/1993 | Ohba et al. |
| 5,241,833 A | 9/1993 | Ohkoshi |
| 5,243,827 A | 9/1993 | Hagita et al. |
| 5,243,829 A | 9/1993 | Bessler |
| 5,245,833 A | 9/1993 | Mei et al. |
| 5,248,244 A | 9/1993 | Ho et al. |
| 5,251,453 A | 10/1993 | Stanke et al. |
| 5,251,454 A | 10/1993 | Yoon |
| 5,255,977 A | 10/1993 | Eimer et al. |
| 5,257,506 A | 11/1993 | DeWolf et al. |
| 5,262,704 A | 11/1993 | Farr |
| 5,265,434 A | 11/1993 | Alsenz |
| 5,269,458 A | 12/1993 | Sol |
| 5,271,556 A | 12/1993 | Helt et al. |
| 5,274,571 A | 12/1993 | Hesse et al. |
| 5,276,630 A | 1/1994 | Baldwin et al. |
| 5,279,458 A | 1/1994 | DeWolf et al. |
| 5,282,728 A | 2/1994 | Swain |
| 5,284,026 A | 2/1994 | Powell |
| 5,289,362 A | 2/1994 | Liebl et al. |
| 5,290,154 A | 3/1994 | Kotlarek et al. |
| 5,291,752 A | 3/1994 | Alvarez et al. |
| 5,299,504 A | 4/1994 | Abele |
| 5,303,112 A | 4/1994 | Zulaski et al. |
| 5,303,560 A | 4/1994 | Hanson et al. |
| 5,311,451 A | 5/1994 | Barrett |
| 5,311,562 A | 5/1994 | Palusamy et al. |
| 5,316,448 A | 5/1994 | Ziegler et al. |
| 5,320,506 A | 6/1994 | Fogt |
| 5,333,460 A | 8/1994 | Lewis et al. |
| 5,335,507 A | 8/1994 | Powell |
| 5,336,058 A | 8/1994 | Yokoyama |
| 5,337,576 A | 8/1994 | Dorfman et al. |
| 5,347,476 A | 9/1994 | McBean, Sr. |
| 5,351,037 A | 9/1994 | Martell et al. |
| 5,362,206 A | 11/1994 | Westerman et al. |
| 5,362,211 A | 11/1994 | Iizuka et al. |
| 5,368,446 A | 11/1994 | Rode |
| 5,369,958 A | 12/1994 | Kasai et al. |
| 5,381,669 A | 1/1995 | Bahel et al. |
| 5,381,692 A | 1/1995 | Winslow et al. |
| 5,388,176 A | 2/1995 | Dykstra et al. |
| 5,395,042 A | 3/1995 | Riley et al. |
| 5,410,230 A | 4/1995 | Bessler et al. |
| 5,414,792 A | 5/1995 | Shorey |
| 5,415,008 A | 5/1995 | Bessler |
| 5,416,781 A | 5/1995 | Ruiz |
| 5,423,190 A | 6/1995 | Friedland |
| 5,423,192 A | 6/1995 | Young et al. |
| 5,426,952 A | 6/1995 | Bessler |
| 5,431,026 A | 7/1995 | Jaster |
| 5,432,500 A | 7/1995 | Scripps |
| 5,435,145 A | 7/1995 | Jaster |
| 5,435,148 A | 7/1995 | Sandofsky et al. |
| 5,440,890 A | 8/1995 | Bahel et al. |
| 5,440,891 A | 8/1995 | Hindmon, Jr. et al. |
| 5,440,895 A | 8/1995 | Bahel et al. |
| 5,446,677 A | 8/1995 | Jensen et al. |
| 5,450,359 A | 9/1995 | Sharma et al. |
| 5,452,291 A | 9/1995 | Eisenhandler et al. |
| 5,454,229 A | 10/1995 | Hanson et al. |
| 5,457,965 A | 10/1995 | Blair et al. |
| 5,460,006 A | 10/1995 | Torimitsu |
| 5,467,011 A | 11/1995 | Hunt |
| 5,467,264 A | 11/1995 | Rauch et al. |
| 5,469,045 A | 11/1995 | Dove et al. |
| 5,475,986 A | 12/1995 | Bahel et al. |
| 5,478,212 A | 12/1995 | Sakai et al. |
| 5,481,481 A | 1/1996 | Frey et al. |
| 5,481,884 A | 1/1996 | Scoccia |
| 5,483,141 A | 1/1996 | Uesugi |
| 5,491,978 A | 2/1996 | Young et al. |
| 5,495,722 A | 3/1996 | Manson et al. |
| 5,499,512 A | 3/1996 | Jurewicz et al. |
| 5,509,786 A | 4/1996 | Mizutani et al. |
| 5,511,387 A | 4/1996 | Tinsler |
| 5,512,883 A | 4/1996 | Lane, Jr. |
| 5,515,267 A | 5/1996 | Alsenz |
| 5,515,692 A | 5/1996 | Sterber et al. |
| 5,519,301 A | 5/1996 | Yoshida et al. |
| 5,519,337 A | 5/1996 | Casada |
| 5,528,908 A | 6/1996 | Bahel et al. |
| 5,532,534 A | 7/1996 | Baker et al. |
| 5,533,347 A | 7/1996 | Ott et al. |
| 5,535,136 A | 7/1996 | Standifer |
| 5,535,597 A | 7/1996 | An |
| 5,546,015 A | 8/1996 | Okabe |
| 5,546,073 A | 8/1996 | Duff et al. |
| 5,546,756 A | 8/1996 | Ali |
| 5,546,757 A | 8/1996 | Whipple, III |
| 5,548,966 A | 8/1996 | Tinsler |
| 5,555,195 A | 9/1996 | Jensen et al. |
| 5,562,426 A | 10/1996 | Watanabe et al. |
| 5,563,490 A | 10/1996 | Kawaguchi et al. |
| 5,564,280 A | 10/1996 | Schilling et al. |
| 5,566,084 A | 10/1996 | Cmar |
| 5,570,085 A | 10/1996 | Bertsch |
| 5,570,258 A | 10/1996 | Manning |
| 5,572,643 A | 11/1996 | Judson |
| 5,577,905 A | 11/1996 | Momber et al. |
| 5,579,648 A | 12/1996 | Hanson et al. |
| 5,581,229 A | 12/1996 | Hunt |
| 5,586,445 A | 12/1996 | Bessler |
| 5,586,446 A | 12/1996 | Torimitsu |
| 5,590,830 A | 1/1997 | Kettler et al. |
| 5,592,058 A | 1/1997 | Archer et al. |
| 5,592,824 A | 1/1997 | Sogabe et al. |
| 5,596,507 A | 1/1997 | Jones et al. |
| 5,600,960 A | 2/1997 | Schwedler et al. |
| 5,602,749 A | 2/1997 | Vosburgh |
| 5,602,757 A | 2/1997 | Haseley et al. |
| 5,602,761 A | 2/1997 | Spoerre et al. |
| 5,610,339 A | 3/1997 | Haseley et al. |
| 5,611,674 A | 3/1997 | Bass et al. |
| 5,613,841 A | 3/1997 | Bass et al. |
| 5,615,071 A | 3/1997 | Higashikata et al. |
| 5,616,829 A | 4/1997 | Balaschak et al. |
| 5,623,834 A | 4/1997 | Bahel et al. |
| 5,628,201 A | 5/1997 | Bahel et al. |
| 5,630,325 A | 5/1997 | Bahel et al. |
| 5,635,896 A | 6/1997 | Tinsley et al. |
| 5,641,270 A | 6/1997 | Sgourakes et al. |
| 5,643,482 A | 7/1997 | Sandelman et al. |
| 5,650,936 A | 7/1997 | Loucks et al. |
| 5,651,263 A | 7/1997 | Nonaka et al. |
| 5,655,379 A | 8/1997 | Jaster et al. |
| 5,655,380 A | 8/1997 | Calton |
| 5,656,765 A | 8/1997 | Gray |
| 5,656,767 A | 8/1997 | Garvey, III et al. |
| 5,666,815 A | 9/1997 | Aloise |
| 5,682,949 A | 11/1997 | Ratcliffe et al. |
| 5,684,463 A | 11/1997 | Diercks et al. |
| 5,689,963 A | 11/1997 | Bahel et al. |
| 5,691,692 A | 11/1997 | Herbstritt |
| 5,694,010 A | 12/1997 | Oomura et al. |
| 5,696,501 A | 12/1997 | Ouellette et al. |
| 5,699,670 A | 12/1997 | Jurewicz et al. |

(56) References Cited

U.S. PATENT DOCUMENTS

| | | |
|---|---|---|
| 5,706,007 A | 1/1998 | Fragnito et al. |
| 5,707,210 A | 1/1998 | Ramsey et al. |
| 5,711,785 A | 1/1998 | Maxwell |
| 5,713,724 A | 2/1998 | Centers et al. |
| 5,714,931 A | 2/1998 | Petite et al. |
| 5,715,704 A | 2/1998 | Cholkeri et al. |
| 5,718,822 A | 2/1998 | Richter |
| 5,724,571 A | 3/1998 | Woods |
| 5,729,474 A | 3/1998 | Hildebrand et al. |
| 5,737,931 A | 4/1998 | Ueno et al. |
| 5,741,120 A | 4/1998 | Bass et al. |
| 5,743,109 A | 4/1998 | Schulak |
| 5,745,114 A | 4/1998 | King et al. |
| 5,749,238 A | 5/1998 | Schmidt |
| 5,751,916 A | 5/1998 | Kon et al. |
| 5,752,385 A | 5/1998 | Nelson |
| 5,754,450 A * | 5/1998 | Solomon et al. ............... 702/35 |
| 5,754,732 A | 5/1998 | Vlahu |
| 5,757,664 A | 5/1998 | Rogers et al. |
| 5,757,892 A | 5/1998 | Blanchard et al. |
| 5,761,083 A | 6/1998 | Brown, Jr. et al. |
| 5,764,509 A | 6/1998 | Gross et al. |
| 5,772,214 A | 6/1998 | Stark |
| 5,772,403 A | 6/1998 | Allison et al. |
| 5,782,101 A | 7/1998 | Dennis |
| 5,784,232 A | 7/1998 | Farr |
| 5,790,898 A | 8/1998 | Kishima et al. |
| 5,795,381 A | 8/1998 | Holder |
| 5,798,941 A | 8/1998 | McLeister |
| 5,802,860 A | 9/1998 | Barrows |
| 5,805,856 A | 9/1998 | Hanson |
| 5,807,336 A | 9/1998 | Russo et al. |
| 5,808,441 A | 9/1998 | Nehring |
| 5,810,908 A | 9/1998 | Gray et al. |
| 5,812,061 A | 9/1998 | Simons |
| 5,825,597 A | 10/1998 | Young |
| 5,827,963 A | 10/1998 | Selegatto et al. |
| 5,839,094 A | 11/1998 | French |
| 5,839,291 A | 11/1998 | Chang |
| 5,841,654 A | 11/1998 | Verissimo et al. |
| 5,857,348 A | 1/1999 | Conry |
| 5,860,286 A | 1/1999 | Tulpule |
| 5,861,807 A | 1/1999 | Leyden et al. |
| 5,867,998 A | 2/1999 | Guertin |
| 5,869,960 A | 2/1999 | Brand |
| 5,873,257 A | 2/1999 | Peterson |
| 5,875,430 A | 2/1999 | Koether |
| 5,875,638 A | 3/1999 | Tinsler |
| 5,884,494 A | 3/1999 | Okoren et al. |
| 5,887,786 A | 3/1999 | Sandelman |
| 5,900,801 A | 5/1999 | Heagle et al. |
| 5,904,049 A | 5/1999 | Jaster et al. |
| 5,918,200 A | 6/1999 | Tsutsui et al. |
| 5,924,295 A | 7/1999 | Park |
| 5,924,486 A | 7/1999 | Ehlers et al. |
| 5,926,103 A | 7/1999 | Petite |
| 5,926,531 A | 7/1999 | Petite |
| 5,930,773 A | 7/1999 | Crooks et al. |
| 5,934,087 A | 8/1999 | Watanabe et al. |
| 5,939,974 A | 8/1999 | Heagle et al. |
| 5,946,922 A | 9/1999 | Viard et al. |
| 5,947,693 A | 9/1999 | Yang |
| 5,947,701 A | 9/1999 | Hugenroth |
| 5,949,677 A | 9/1999 | Ho |
| 5,950,443 A | 9/1999 | Meyer et al. |
| 5,953,490 A | 9/1999 | Wiklund et al. |
| 5,956,658 A | 9/1999 | McMahon |
| 5,971,712 A | 10/1999 | Kann |
| 5,975,854 A | 11/1999 | Culp, III et al. |
| 5,984,645 A | 11/1999 | Cummings |
| 5,986,571 A | 11/1999 | Flick |
| 5,987,903 A | 11/1999 | Bathla |
| 5,988,986 A | 11/1999 | Brinken et al. |
| 5,995,347 A | 11/1999 | Rudd et al. |
| 5,995,351 A | 11/1999 | Katsumata et al. |
| 6,006,142 A | 12/1999 | Seem et al. |
| 6,006,171 A | 12/1999 | Vines et al. |
| 6,011,368 A | 1/2000 | Kalpathi et al. |
| 6,013,108 A | 1/2000 | Karolys et al. |
| 6,017,192 A | 1/2000 | Clack et al. |
| 6,020,702 A | 2/2000 | Farr |
| 6,023,420 A | 2/2000 | McCormick et al. |
| 6,026,651 A | 2/2000 | Sandelman |
| 6,028,522 A | 2/2000 | Petite |
| 6,035,653 A | 3/2000 | Itoh et al. |
| 6,035,661 A | 3/2000 | Sunaga et al. |
| 6,038,871 A | 3/2000 | Gutierrez et al. |
| 6,041,605 A | 3/2000 | Heinrichs |
| 6,041,609 A | 3/2000 | Hornsleth et al. |
| 6,041,856 A | 3/2000 | Thrasher et al. |
| 6,042,344 A | 3/2000 | Lifson |
| 6,044,062 A | 3/2000 | Brownrigg et al. |
| 6,047,557 A | 4/2000 | Pham et al. |
| 6,050,098 A | 4/2000 | Meyer et al. |
| 6,050,780 A | 4/2000 | Hasegawa et al. |
| 6,052,731 A | 4/2000 | Holdsworth et al. |
| 6,057,771 A | 5/2000 | Lakra |
| 6,065,946 A | 5/2000 | Lathrop |
| 6,068,447 A | 5/2000 | Foege |
| 6,070,110 A | 5/2000 | Shah et al. |
| 6,075,530 A | 6/2000 | Lucas et al. |
| 6,077,051 A | 6/2000 | Centers et al. |
| 6,081,750 A | 6/2000 | Hoffberg et al. |
| 6,082,495 A | 7/2000 | Steinbarger et al. |
| 6,082,971 A | 7/2000 | Gunn et al. |
| 6,085,530 A | 7/2000 | Barito |
| 6,088,659 A | 7/2000 | Kelley et al. |
| 6,088,688 A | 7/2000 | Crooks et al. |
| 6,092,370 A | 7/2000 | Tremoulet, Jr. et al. |
| 6,092,378 A | 7/2000 | Das et al. |
| 6,092,992 A | 7/2000 | Imblum et al. |
| 6,095,674 A | 8/2000 | Verissimo et al. |
| 6,098,893 A | 8/2000 | Berglund et al. |
| 6,102,665 A | 8/2000 | Centers et al. |
| 6,110,260 A | 8/2000 | Kubokawa |
| 6,119,949 A | 9/2000 | Lindstrom |
| 6,122,603 A | 9/2000 | Budike, Jr. |
| 6,125,642 A | 10/2000 | Seener et al. |
| 6,128,583 A | 10/2000 | Dowling |
| 6,128,953 A | 10/2000 | Mizukoshi |
| 6,129,527 A | 10/2000 | Donahoe et al. |
| 6,138,461 A | 10/2000 | Park et al. |
| 6,142,741 A | 11/2000 | Nishihata et al. |
| 6,144,888 A | 11/2000 | Lucas et al. |
| 6,145,328 A | 11/2000 | Choi |
| 6,147,601 A | 11/2000 | Sandelman et al. |
| 6,152,375 A | 11/2000 | Robison |
| 6,152,376 A | 11/2000 | Sandelman et al. |
| 6,153,942 A | 11/2000 | Roseman et al. |
| 6,153,993 A | 11/2000 | Oomura et al. |
| 6,154,488 A | 11/2000 | Hunt |
| 6,157,310 A | 12/2000 | Milne et al. |
| 6,158,230 A | 12/2000 | Katsuki |
| 6,160,477 A | 12/2000 | Sandelman et al. |
| 6,169,979 B1 | 1/2001 | Johnson |
| 6,172,476 B1 | 1/2001 | Tolbert, Jr. et al. |
| 6,174,136 B1 | 1/2001 | Kilayko et al. |
| 6,176,686 B1 | 1/2001 | Wallis et al. |
| 6,177,884 B1 | 1/2001 | Hunt et al. |
| 6,178,362 B1 | 1/2001 | Woolard et al. |
| 6,179,214 B1 | 1/2001 | Key et al. |
| 6,181,033 B1 | 1/2001 | Wright |
| 6,190,442 B1 | 2/2001 | Redner |
| 6,191,545 B1 | 2/2001 | Kawabata et al. |
| 6,192,282 B1 | 2/2001 | Smith et al. |
| 6,199,018 B1 | 3/2001 | Quist et al. |
| 6,211,782 B1 | 4/2001 | Sandelman et al. |
| 6,213,731 B1 | 4/2001 | Doepker et al. |
| 6,215,405 B1 | 4/2001 | Handley et al. |
| 6,216,956 B1 | 4/2001 | Ehlers et al. |
| 6,218,953 B1 | 4/2001 | Petite |
| 6,223,543 B1 | 5/2001 | Sandelman |
| 6,223,544 B1 | 5/2001 | Seem |
| 6,228,155 B1 | 5/2001 | Tai |

(56) References Cited

U.S. PATENT DOCUMENTS

| | | |
|---|---|---|
| 6,230,501 B1 | 5/2001 | Bailey, Sr. et al. |
| 6,233,327 B1 | 5/2001 | Petite |
| 6,234,019 B1 | 5/2001 | Caldeira |
| 6,240,733 B1 | 6/2001 | Brandon et al. |
| 6,240,736 B1 | 6/2001 | Fujita et al. |
| 6,244,061 B1 | 6/2001 | Takagi et al. |
| 6,249,516 B1 | 6/2001 | Brownrigg et al. |
| 6,260,004 B1 | 7/2001 | Hays et al. |
| 6,266,968 B1 | 7/2001 | Redlich |
| 6,268,664 B1 | 7/2001 | Rolls et al. |
| 6,272,868 B1 | 8/2001 | Grabon et al. |
| 6,276,901 B1 | 8/2001 | Farr et al. |
| 6,279,332 B1 | 8/2001 | Yeo et al. |
| 6,290,043 B1 | 9/2001 | Ginder et al. |
| 6,293,114 B1 | 9/2001 | Kamemoto |
| 6,293,767 B1 | 9/2001 | Bass |
| 6,302,654 B1 | 10/2001 | Millet et al. |
| 6,304,934 B1 | 10/2001 | Pimenta et al. |
| 6,320,275 B1 | 11/2001 | Okamoto et al. |
| 6,324,854 B1 | 12/2001 | Jayanth |
| 6,327,541 B1 | 12/2001 | Pitchford et al. |
| 6,332,327 B1 | 12/2001 | Street et al. |
| 6,334,093 B1 | 12/2001 | More |
| 6,349,883 B1 | 2/2002 | Simmons et al. |
| 6,359,410 B1 | 3/2002 | Randolph |
| 6,360,551 B1 | 3/2002 | Renders |
| 6,366,889 B1 | 4/2002 | Zaloom |
| 6,375,439 B1 | 4/2002 | Missio |
| 6,378,315 B1 | 4/2002 | Gelber et al. |
| 6,381,971 B2 | 5/2002 | Honda |
| 6,385,510 B1 | 5/2002 | Hoog et al. |
| 6,389,823 B1 | 5/2002 | Loprete et al. |
| 6,390,779 B1 | 5/2002 | Cunkelman |
| 6,391,102 B1 | 5/2002 | Bodden et al. |
| 6,393,848 B2 | 5/2002 | Roh et al. |
| 6,397,606 B1 | 6/2002 | Roh et al. |
| 6,397,612 B1 | 6/2002 | Kernkamp et al. |
| 6,406,265 B1 | 6/2002 | Hahn et al. |
| 6,406,266 B1 | 6/2002 | Hugenroth et al. |
| 6,408,228 B1 | 6/2002 | Seem et al. |
| 6,408,258 B1 | 6/2002 | Richer |
| 6,412,293 B1 | 7/2002 | Pham et al. |
| 6,414,594 B1 | 7/2002 | Guerlain |
| 6,430,268 B1 | 8/2002 | Petite |
| 6,433,791 B2 | 8/2002 | Selli et al. |
| 6,437,691 B1 | 8/2002 | Sandelman et al. |
| 6,437,692 B1 | 8/2002 | Petite et al. |
| 6,438,981 B1 | 8/2002 | Whiteside |
| 6,442,953 B1 | 9/2002 | Trigiani et al. |
| 6,449,972 B2 | 9/2002 | Pham et al. |
| 6,450,771 B1 | 9/2002 | Centers et al. |
| 6,451,210 B1 | 9/2002 | Sivavec et al. |
| 6,453,687 B2 | 9/2002 | Sharood et al. |
| 6,454,177 B1 | 9/2002 | Sasao et al. |
| 6,454,538 B1 | 9/2002 | Witham et al. |
| 6,456,928 B1 | 9/2002 | Johnson |
| 6,457,319 B1 | 10/2002 | Ota et al. |
| 6,457,948 B1 | 10/2002 | Pham |
| 6,460,731 B2 | 10/2002 | Estelle et al. |
| 6,462,654 B1 | 10/2002 | Sandelman et al. |
| 6,463,747 B1 | 10/2002 | Temple |
| 6,466,971 B1 | 10/2002 | Humpleman et al. |
| 6,467,280 B2 | 10/2002 | Pham et al. |
| 6,471,486 B1 | 10/2002 | Centers et al. |
| 6,474,084 B2 | 11/2002 | Gauthier et al. |
| 6,484,520 B2 | 11/2002 | Kawaguchi et al. |
| 6,487,457 B1 | 11/2002 | Hull et al. |
| 6,490,506 B1 | 12/2002 | March |
| 6,492,923 B1 | 12/2002 | Inoue et al. |
| 6,497,554 B2 | 12/2002 | Yang et al. |
| 6,501,240 B2 | 12/2002 | Ueda et al. |
| 6,501,629 B1 | 12/2002 | Marriott |
| 6,502,409 B1 | 1/2003 | Gatling et al. |
| 6,505,087 B1 | 1/2003 | Lucas et al. |
| 6,505,475 B1 | 1/2003 | Zugibe et al. |
| 6,510,350 B1 | 1/2003 | Steen, III et al. |
| 6,522,974 B2 | 2/2003 | Sitton |
| 6,523,130 B1 | 2/2003 | Hickman et al. |
| 6,526,766 B1 | 3/2003 | Hiraoka et al. |
| 6,529,590 B1 | 3/2003 | Centers |
| 6,529,839 B1 | 3/2003 | Ness et al. |
| 6,533,552 B2 | 3/2003 | Centers et al. |
| 6,535,123 B2 | 3/2003 | Sandelman et al. |
| 6,535,270 B1 | 3/2003 | Murayama |
| 6,535,859 B1 | 3/2003 | Yablonowski et al. |
| 6,537,034 B2 | 3/2003 | Kim et al. |
| 6,542,062 B1 | 4/2003 | Herrick |
| 6,549,135 B2 | 4/2003 | Singh et al. |
| 6,551,069 B2 | 4/2003 | Narney, II et al. |
| 6,553,774 B1 | 4/2003 | Ishio et al. |
| 6,558,126 B1 | 5/2003 | Hahn et al. |
| 6,560,976 B2 | 5/2003 | Jayanth |
| 6,571,280 B1 | 5/2003 | Hubacher |
| 6,571,566 B1 | 6/2003 | Temple et al. |
| 6,571,586 B1 | 6/2003 | Ritson et al. |
| 6,574,561 B2 | 6/2003 | Alexander et al. |
| 6,577,959 B1 | 6/2003 | Chajec et al. |
| 6,577,962 B1 | 6/2003 | Afshari |
| 6,578,373 B1 | 6/2003 | Barbier |
| 6,583,720 B1 | 6/2003 | Quigley |
| 6,589,029 B1 | 7/2003 | Heller |
| 6,591,620 B2 | 7/2003 | Kikuchi et al. |
| 6,595,475 B2 | 7/2003 | Svabek et al. |
| 6,595,757 B2 | 7/2003 | Shen |
| 6,598,056 B1 | 7/2003 | Hull et al. |
| 6,601,397 B2 | 8/2003 | Pham et al. |
| 6,604,093 B1 | 8/2003 | Etzion et al. |
| 6,609,070 B1 | 8/2003 | Lueck |
| 6,609,078 B2 | 8/2003 | Starling et al. |
| 6,615,594 B2 | 9/2003 | Jayanth et al. |
| 6,616,415 B1 | 9/2003 | Renken et al. |
| 6,618,578 B1 | 9/2003 | Petite |
| 6,618,709 B1 | 9/2003 | Sneeringer |
| 6,621,443 B1 | 9/2003 | Selli et al. |
| 6,622,925 B2 | 9/2003 | Carner et al. |
| 6,622,926 B1 | 9/2003 | Sartain et al. |
| 6,628,764 B1 | 9/2003 | Petite |
| 6,629,420 B2 | 10/2003 | Renders |
| 6,630,749 B1 | 10/2003 | Takagi et al. |
| 6,631,298 B1 | 10/2003 | Pagnano et al. |
| 6,636,893 B1 | 10/2003 | Fong |
| 6,643,567 B2 | 11/2003 | Kolk et al. |
| 6,644,848 B1 | 11/2003 | Clayton et al. |
| 6,647,735 B2 | 11/2003 | Street et al. |
| 6,658,373 B2 | 12/2003 | Rossi et al. |
| 6,662,584 B1 | 12/2003 | Whiteside |
| 6,662,653 B1 | 12/2003 | Scaliante et al. |
| 6,671,586 B2 | 12/2003 | Davis et al. |
| 6,672,846 B2 | 1/2004 | Rajendran et al. |
| 6,675,591 B2 | 1/2004 | Singh et al. |
| 6,679,072 B2 | 1/2004 | Pham et al. |
| 6,684,349 B2 | 1/2004 | Gullo et al. |
| 6,685,438 B2 | 2/2004 | Yoo et al. |
| 6,698,218 B2 | 3/2004 | Goth et al. |
| 6,701,725 B2 | 3/2004 | Rossi et al. |
| 6,708,083 B2 | 3/2004 | Orthlieb et al. |
| 6,708,508 B2 | 3/2004 | Demuth et al. |
| 6,709,244 B2 | 3/2004 | Pham |
| 6,711,470 B1 | 3/2004 | Hartenstein et al. |
| 6,711,911 B1 | 3/2004 | Grabon et al. |
| 6,717,513 B1 | 4/2004 | Shprecher et al. |
| 6,721,770 B1 | 4/2004 | Morton et al. |
| 6,725,182 B2 | 4/2004 | Pagnano et al. |
| 6,732,538 B2 | 5/2004 | Trigiani et al. |
| 6,745,107 B1 | 6/2004 | Miller |
| 6,747,557 B1 | 6/2004 | Petite et al. |
| 6,757,665 B1 * | 6/2004 | Unsworth et al. ............. 706/15 |
| 6,758,050 B2 | 7/2004 | Jayanth et al. |
| 6,758,051 B2 | 7/2004 | Jayanth et al. |
| 6,760,207 B2 | 7/2004 | Wyatt et al. |
| 6,772,096 B2 | 8/2004 | Murakami et al. |
| 6,772,598 B1 | 8/2004 | Rinehart |
| 6,775,995 B1 | 8/2004 | Bahel et al. |
| 6,784,807 B2 | 8/2004 | Petite et al. |

(56) References Cited

U.S. PATENT DOCUMENTS

| | | |
|---|---|---|
| 6,785,592 B1 | 8/2004 | Smith et al. |
| 6,786,473 B1 | 9/2004 | Alles |
| 6,799,951 B2 | 10/2004 | Lifson et al. |
| 6,804,993 B2 | 10/2004 | Selli |
| 6,811,380 B2 | 11/2004 | Kim |
| 6,813,897 B1 | 11/2004 | Bash et al. |
| 6,816,811 B2 | 11/2004 | Seem |
| 6,823,680 B2 | 11/2004 | Jayanth |
| 6,829,542 B1 | 12/2004 | Reynolds et al. |
| 6,832,120 B1 | 12/2004 | Frank et al. |
| 6,832,898 B2 | 12/2004 | Yoshida et al. |
| 6,836,737 B2 | 12/2004 | Petite et al. |
| 6,837,922 B2 | 1/2005 | Gorin |
| 6,839,790 B2 | 1/2005 | Barros De Almeida et al. |
| 6,847,854 B2 * | 1/2005 | Discenzo ......... 700/99 |
| 6,854,345 B2 | 2/2005 | Alves et al. |
| 6,862,498 B2 | 3/2005 | Davis et al. |
| 6,868,678 B2 | 3/2005 | Mei et al. |
| 6,868,686 B2 | 3/2005 | Ueda et al. |
| 6,869,272 B2 | 3/2005 | Odachi et al. |
| 6,870,486 B2 | 3/2005 | Souza et al. |
| 6,885,949 B2 | 4/2005 | Selli |
| 6,889,173 B2 | 5/2005 | Singh |
| 6,891,838 B1 | 5/2005 | Petite et al. |
| 6,892,546 B2 | 5/2005 | Singh et al. |
| 6,897,772 B1 | 5/2005 | Scheffler et al. |
| 6,900,738 B2 | 5/2005 | Crichlow |
| 6,901,066 B1 | 5/2005 | Helgeson |
| 6,904,385 B1 | 6/2005 | Budike, Jr. |
| 6,914,533 B2 | 7/2005 | Petite |
| 6,914,893 B2 | 7/2005 | Petite |
| 6,922,155 B1 | 7/2005 | Evans et al. |
| 6,931,445 B2 | 8/2005 | Davis |
| 6,934,862 B2 | 8/2005 | Sharood et al. |
| 6,952,658 B2 | 10/2005 | Greulich et al. |
| 6,956,344 B2 | 10/2005 | Robertson et al. |
| 6,964,558 B2 | 11/2005 | Hahn et al. |
| 6,966,759 B2 | 11/2005 | Hahn et al. |
| 6,968,295 B1 | 11/2005 | Carr |
| 6,973,410 B2 | 12/2005 | Seigel |
| 6,973,793 B2 | 12/2005 | Douglas et al. |
| 6,973,794 B2 | 12/2005 | Street et al. |
| 6,976,366 B2 | 12/2005 | Starling et al. |
| 6,978,225 B2 | 12/2005 | Retlich et al. |
| 6,981,384 B2 | 1/2006 | Dobmeier et al. |
| 6,983,321 B2 | 1/2006 | Trinon et al. |
| 6,983,889 B2 | 1/2006 | Alles |
| 6,986,469 B2 | 1/2006 | Gauthier et al. |
| 6,987,450 B2 | 1/2006 | Marino et al. |
| 6,990,821 B2 | 1/2006 | Singh et al. |
| 6,992,452 B1 | 1/2006 | Sachs et al. |
| 6,996,441 B1 | 2/2006 | Tobias |
| 6,997,390 B2 | 2/2006 | Alles |
| 6,998,807 B2 | 2/2006 | Phillips et al. |
| 6,998,963 B2 | 2/2006 | Flen et al. |
| 6,999,996 B2 | 2/2006 | Sunderland |
| 7,000,422 B2 | 2/2006 | Street et al. |
| 7,003,378 B2 | 2/2006 | Poth |
| 7,009,510 B1 | 3/2006 | Douglass et al. |
| 7,010,925 B2 | 3/2006 | Sienel et al. |
| 7,019,667 B2 | 3/2006 | Petite et al. |
| 7,024,665 B2 | 4/2006 | Ferraz et al. |
| 7,024,870 B2 | 4/2006 | Singh et al. |
| 7,030,752 B2 | 4/2006 | Tyroler |
| 7,031,880 B1 | 4/2006 | Seem et al. |
| 7,035,693 B2 | 4/2006 | Cassiolato et al. |
| 7,039,532 B2 | 5/2006 | Hunter |
| 7,042,180 B2 | 5/2006 | Terry et al. |
| 7,042,350 B2 | 5/2006 | Patrick et al. |
| 7,043,339 B2 | 5/2006 | Maeda et al. |
| 7,043,459 B2 | 5/2006 | Peevey |
| 7,047,753 B2 | 5/2006 | Street et al. |
| 7,053,766 B2 | 5/2006 | Fisler et al. |
| 7,053,767 B2 | 5/2006 | Petite et al. |
| 7,054,271 B2 | 5/2006 | Brownrigg et al. |
| 7,062,580 B2 | 6/2006 | Donaires |
| 7,062,830 B2 | 6/2006 | Alles |
| 7,063,537 B2 | 6/2006 | Selli et al. |
| 7,072,797 B2 | 7/2006 | Gorinevsky |
| 7,075,327 B2 | 7/2006 | Dimino et al. |
| 7,079,810 B2 | 7/2006 | Petite et al. |
| 7,079,967 B2 | 7/2006 | Rossi et al. |
| 7,082,380 B2 | 7/2006 | Wiebe et al. |
| 7,089,125 B2 | 8/2006 | Sonderegger |
| 7,091,847 B2 | 8/2006 | Capowski et al. |
| 7,092,767 B2 | 8/2006 | Pagnano et al. |
| 7,092,794 B1 | 8/2006 | Hill et al. |
| 7,096,153 B2 | 8/2006 | Guralnik et al. |
| 7,102,490 B2 | 9/2006 | Flen et al. |
| 7,103,511 B2 | 9/2006 | Petite |
| 7,110,843 B2 | 9/2006 | Pagnano et al. |
| 7,110,898 B2 | 9/2006 | Montijo et al. |
| 7,113,376 B2 | 9/2006 | Nomura et al. |
| 7,114,343 B2 | 10/2006 | Kates |
| 7,123,020 B2 | 10/2006 | Hill et al. |
| 7,123,458 B2 | 10/2006 | Mohr et al. |
| 7,124,728 B2 | 10/2006 | Carey et al. |
| 7,126,465 B2 | 10/2006 | Faltesek |
| 7,130,170 B2 | 10/2006 | Wakefield et al. |
| 7,130,832 B2 | 10/2006 | Bannai et al. |
| 7,134,295 B2 | 11/2006 | Maekawa |
| 7,137,550 B1 | 11/2006 | Petite |
| 7,142,125 B2 | 11/2006 | Larson et al. |
| 7,145,438 B2 | 12/2006 | Flen et al. |
| 7,145,462 B2 | 12/2006 | Dewing et al. |
| 7,159,408 B2 | 1/2007 | Sadegh et al. |
| 7,162,884 B2 | 1/2007 | Alles |
| 7,163,158 B2 | 1/2007 | Rossi et al. |
| 7,171,372 B2 | 1/2007 | Daniel et al. |
| 7,174,728 B2 | 2/2007 | Jayanth |
| 7,180,412 B2 | 2/2007 | Bonicatto et al. |
| 7,184,861 B2 | 2/2007 | Petite |
| 7,188,482 B2 | 3/2007 | Sadegh et al. |
| 7,188,779 B2 | 3/2007 | Alles |
| 7,201,006 B2 | 4/2007 | Kates |
| 7,207,496 B2 | 4/2007 | Alles |
| 7,209,840 B2 | 4/2007 | Petite et al. |
| 7,212,887 B2 | 5/2007 | Shah et al |
| 7,222,493 B2 | 5/2007 | Jayanth et al. |
| 7,224,740 B2 | 5/2007 | Hunt |
| 7,225,193 B2 | 5/2007 | Mets et al. |
| 7,227,450 B2 | 6/2007 | Garvy et al. |
| 7,228,691 B2 | 6/2007 | Street et al. |
| 7,230,528 B2 | 6/2007 | Kates |
| 7,234,313 B2 | 6/2007 | Bell et al. |
| 7,236,765 B2 | 6/2007 | Bonicatto et al. |
| 7,244,294 B2 | 7/2007 | Kates |
| 7,246,014 B2 | 7/2007 | Forth et al. |
| 7,255,285 B2 | 8/2007 | Troost et al. |
| 7,257,501 B2 | 8/2007 | Zhan et al. |
| 7,260,505 B2 | 8/2007 | Felke et al. |
| 7,261,762 B2 | 8/2007 | Kang et al. |
| 7,263,073 B2 | 8/2007 | Petite et al. |
| 7,263,446 B2 | 8/2007 | Morin et al. |
| 7,266,812 B2 | 9/2007 | Pagnano |
| 7,270,278 B2 | 9/2007 | Street et al. |
| 7,274,995 B2 | 9/2007 | Zhan et al. |
| 7,275,377 B2 | 10/2007 | Kates |
| 7,286,945 B2 | 10/2007 | Zhan et al. |
| 7,290,398 B2 | 11/2007 | Wallace et al. |
| 7,290,989 B2 | 11/2007 | Jayanth |
| 7,295,128 B2 | 11/2007 | Petite |
| 7,295,896 B2 | 11/2007 | Norbeck |
| 7,317,952 B2 | 1/2008 | Bhandiwad et al. |
| 7,328,192 B1 | 2/2008 | Stengard et al. |
| 7,330,886 B2 | 2/2008 | Childers et al. |
| 7,331,187 B2 | 2/2008 | Kates |
| 7,336,168 B2 | 2/2008 | Kates |
| 7,337,191 B2 | 2/2008 | Haeberle et al. |
| 7,343,750 B2 | 3/2008 | Lifson et al. |
| 7,343,751 B2 | 3/2008 | Kates |
| 7,346,463 B2 | 3/2008 | Petite et al. |
| 7,346,472 B1 | 3/2008 | Moskowitz et al. |
| 7,349,824 B2 | 3/2008 | Seigel |

(56) References Cited

U.S. PATENT DOCUMENTS

| | | |
|---|---|---|
| 7,350,112 B2 | 3/2008 | Fox et al. |
| 7,351,274 B2 | 4/2008 | Helt et al. |
| 7,352,545 B2 | 4/2008 | Wyatt et al. |
| 7,363,200 B2 | 4/2008 | Lu |
| 7,369,968 B2 * | 5/2008 | Johnson et al. ............... 702/188 |
| 7,376,712 B1 | 5/2008 | Granatelli et al. |
| 7,377,118 B2 | 5/2008 | Esslinger |
| 7,383,030 B2 | 6/2008 | Brown et al. |
| 7,383,158 B2 | 6/2008 | Krocker et al. |
| 7,392,661 B2 | 7/2008 | Alles |
| 7,397,907 B2 | 7/2008 | Petite |
| 7,400,240 B2 | 7/2008 | Shrode et al. |
| 7,412,842 B2 | 8/2008 | Pham |
| 7,414,525 B2 | 8/2008 | Costea et al. |
| 7,421,351 B2 | 9/2008 | Navratil |
| 7,421,374 B2 | 9/2008 | Zhan et al. |
| 7,421,850 B2 | 9/2008 | Street et al. |
| 7,424,343 B2 | 9/2008 | Kates |
| 7,424,345 B2 | 9/2008 | Norbeck |
| 7,424,527 B2 | 9/2008 | Petite |
| 7,432,824 B2 | 10/2008 | Flen et al. |
| 7,433,854 B2 | 10/2008 | Joseph et al. |
| 7,434,742 B2 | 10/2008 | Mueller et al. |
| 7,437,150 B1 | 10/2008 | Morelli et al. |
| 7,440,560 B1 | 10/2008 | Barry |
| 7,440,767 B2 | 10/2008 | Ballay et al. |
| 7,443,313 B2 | 10/2008 | Davis et al. |
| 7,444,251 B2 | 10/2008 | Nikovski et al. |
| 7,445,665 B2 | 11/2008 | Hsieh et al. |
| 7,447,603 B2 | 11/2008 | Bruno |
| 7,447,609 B2 | 11/2008 | Guralnik et al. |
| 7,451,606 B2 | 11/2008 | Harrod |
| 7,454,439 B1 | 11/2008 | Gansner et al. |
| 7,458,223 B2 | 12/2008 | Pham |
| 7,468,661 B2 | 12/2008 | Petite et al. |
| 7,469,546 B2 | 12/2008 | Kates |
| 7,474,992 B2 | 1/2009 | Ariyur |
| 7,480,501 B2 | 1/2009 | Petite |
| 7,483,810 B2 | 1/2009 | Jackson et al. |
| 7,484,376 B2 | 2/2009 | Pham |
| 7,490,477 B2 | 2/2009 | Singh et al. |
| 7,491,034 B2 | 2/2009 | Jayanth |
| 7,503,182 B2 | 3/2009 | Bahel et al. |
| 7,510,126 B2 | 3/2009 | Rossi et al. |
| 7,523,619 B2 | 4/2009 | Kojima et al. |
| 7,528,711 B2 | 5/2009 | Kates |
| 7,533,070 B2 | 5/2009 | Guralnik et al. |
| 7,537,172 B2 | 5/2009 | Rossi et al. |
| 7,552,030 B2 | 6/2009 | Guralnik et al. |
| 7,552,596 B2 | 6/2009 | Galante et al. |
| 7,555,364 B2 | 6/2009 | Poth et al. |
| 7,574,333 B2 | 8/2009 | Lu |
| 7,580,812 B2 | 8/2009 | Ariyur et al. |
| 7,594,407 B2 | 9/2009 | Singh et al. |
| 7,596,959 B2 | 10/2009 | Singh et al. |
| 7,606,683 B2 | 10/2009 | Bahel et al. |
| 7,631,508 B2 | 12/2009 | Braun et al. |
| 7,636,901 B2 | 12/2009 | Munson et al. |
| 7,644,591 B2 | 1/2010 | Singh et al. |
| 7,648,077 B2 | 1/2010 | Rossi et al. |
| 7,648,342 B2 | 1/2010 | Jayanth |
| 7,650,425 B2 | 1/2010 | Davis et al. |
| 7,660,700 B2 | 2/2010 | Moskowitz et al. |
| 7,660,774 B2 | 2/2010 | Mukherjee et al. |
| 7,664,613 B2 | 2/2010 | Hansen |
| 7,665,315 B2 | 2/2010 | Singh et al. |
| 7,686,872 B2 | 3/2010 | Kang |
| 7,693,809 B2 | 4/2010 | Gray |
| 7,697,492 B2 | 4/2010 | Petite |
| 7,703,694 B2 | 4/2010 | Mueller et al. |
| 7,704,052 B2 | 4/2010 | Iimura et al. |
| 7,706,320 B2 | 4/2010 | Davis et al. |
| 7,724,131 B2 | 5/2010 | Chen |
| 7,726,583 B2 | 6/2010 | Maekawa |
| 7,734,451 B2 | 6/2010 | MacArthur et al. |
| 7,738,999 B2 | 6/2010 | Petite |
| 7,739,378 B2 | 6/2010 | Petite |
| 7,742,393 B2 | 6/2010 | Bonicatto et al. |
| 7,752,853 B2 | 7/2010 | Singh et al. |
| 7,752,854 B2 | 7/2010 | Singh et al. |
| 7,756,086 B2 | 7/2010 | Petite et al. |
| 7,791,468 B2 | 9/2010 | Bonicatto et al. |
| 7,844,366 B2 | 11/2010 | Singh |
| 7,845,179 B2 | 12/2010 | Singh et al. |
| 7,848,827 B2 | 12/2010 | Chen |
| 7,848,900 B2 | 12/2010 | Steinberg et al. |
| 7,877,218 B2 | 1/2011 | Bonicatto et al. |
| 7,885,959 B2 | 2/2011 | Horowitz et al. |
| 7,885,961 B2 | 2/2011 | Horowitz et al. |
| 7,905,098 B2 | 3/2011 | Pham |
| 7,908,116 B2 | 3/2011 | Steinberg et al. |
| 7,908,117 B2 | 3/2011 | Steinberg et al. |
| 7,922,914 B1 | 4/2011 | Verdegan et al. |
| 7,937,623 B2 | 5/2011 | Ramacher et al. |
| 7,941,294 B2 | 5/2011 | Shahi et al. |
| 7,949,494 B2 | 5/2011 | Moskowitz et al. |
| 7,949,615 B2 | 5/2011 | Ehlers et al. |
| 7,963,454 B2 | 6/2011 | Sullivan et al. |
| 7,966,152 B2 | 6/2011 | Stluka et al. |
| 7,967,218 B2 | 6/2011 | Alles |
| 7,978,059 B2 | 7/2011 | Petite et al. |
| 7,987,679 B2 | 8/2011 | Tanaka et al. |
| 7,996,045 B1 | 8/2011 | Bauer et al. |
| 7,999,668 B2 | 8/2011 | Cawthorne et al. |
| 8,000,314 B2 | 8/2011 | Brownrigg et al. |
| 8,002,199 B2 | 8/2011 | Habegger |
| 8,005,640 B2 | 8/2011 | Chiefetz et al. |
| 8,010,237 B2 | 8/2011 | Cheung et al. |
| 8,013,732 B2 | 9/2011 | Petite et al. |
| 8,018,182 B2 | 9/2011 | Roehm et al. |
| 8,019,567 B2 | 9/2011 | Steinberg et al. |
| 8,029,608 B1 | 10/2011 | Breslin |
| 8,031,455 B2 | 10/2011 | Paik et al. |
| 8,031,650 B2 | 10/2011 | Petite et al. |
| 8,034,170 B2 | 10/2011 | Kates |
| 8,036,844 B2 | 10/2011 | Ling et al. |
| 8,040,231 B2 | 10/2011 | Kuruvila et al. |
| 8,041,539 B2 | 10/2011 | Guralnik et al. |
| 8,046,107 B2 | 10/2011 | Zugibe et al. |
| 8,061,417 B2 | 11/2011 | Gray |
| 8,064,412 B2 | 11/2011 | Petite |
| 8,065,886 B2 | 11/2011 | Singh et al. |
| 8,068,997 B2 | 11/2011 | Ling et al. |
| 8,090,477 B1 | 1/2012 | Steinberg |
| 8,090,559 B2 | 1/2012 | Parthasarathy et al. |
| 8,090,824 B2 | 1/2012 | Tran et al. |
| 8,095,337 B2 | 1/2012 | Kolbet et al. |
| 8,108,200 B2 | 1/2012 | Anne et al. |
| 8,125,230 B2 | 2/2012 | Bharadwaj et al. |
| 8,131,497 B2 | 3/2012 | Steinberg et al. |
| 8,131,506 B2 | 3/2012 | Steinberg et al. |
| 8,134,330 B2 | 3/2012 | Alles |
| 8,150,720 B2 | 4/2012 | Singh et al. |
| 8,156,208 B2 | 4/2012 | Bornhoevd et al. |
| 8,170,968 B2 | 5/2012 | Colclough et al. |
| 8,171,136 B2 | 5/2012 | Petite |
| 8,175,846 B2 | 5/2012 | Khalak et al. |
| 8,180,492 B2 | 5/2012 | Steinberg |
| 8,182,579 B2 | 5/2012 | Woo et al. |
| 8,214,175 B2 | 7/2012 | Moskowitz et al. |
| 8,228,648 B2 | 7/2012 | Jayanth et al. |
| 8,239,922 B2 | 8/2012 | Sullivan et al. |
| 8,258,763 B2 | 9/2012 | Nakamura et al. |
| 8,279,565 B2 | 10/2012 | Hall et al. |
| 8,280,536 B1 | 10/2012 | Fadell et al. |
| 8,328,524 B2 | 12/2012 | Iimura et al. |
| 8,380,556 B2 | 2/2013 | Singh et al. |
| 8,393,169 B2 | 3/2013 | Pham |
| 8,625,244 B2 | 1/2014 | Paik et al. |
| 9,168,315 B1 | 10/2015 | Scaringe et al. |
| 9,310,439 B2 | 4/2016 | Pham et al. |
| 2001/0005320 A1 | 6/2001 | Ueda et al. |
| 2001/0025349 A1 | 9/2001 | Sharood et al. |
| 2001/0054291 A1 | 12/2001 | Roh et al. |

(56) References Cited

U.S. PATENT DOCUMENTS

| | | |
|---|---|---|
| 2001/0054293 A1 | 12/2001 | Gustafson et al. |
| 2001/0054294 A1 | 12/2001 | Tsuboi |
| 2002/0000092 A1 | 1/2002 | Sharood et al. |
| 2002/0013679 A1 | 1/2002 | Petite |
| 2002/0016639 A1 | 2/2002 | Smith et al. |
| 2002/0017057 A1 | 2/2002 | Weder |
| 2002/0018724 A1 | 2/2002 | Millet et al. |
| 2002/0020175 A1 | 2/2002 | Street et al. |
| 2002/0029575 A1 | 3/2002 | Okamoto |
| 2002/0031101 A1 | 3/2002 | Petite et al. |
| 2002/0035495 A1 | 3/2002 | Spira et al. |
| 2002/0040280 A1 | 4/2002 | Morgan |
| 2002/0064463 A1 | 5/2002 | Park et al. |
| 2002/0067999 A1 | 6/2002 | Suitou et al. |
| 2002/0082747 A1 | 6/2002 | Kramer |
| 2002/0082924 A1 | 6/2002 | Koether |
| 2002/0093259 A1 | 7/2002 | Sunaga et al. |
| 2002/0095269 A1 | 7/2002 | Natalini et al. |
| 2002/0103655 A1 | 8/2002 | Boies et al. |
| 2002/0113877 A1 | 8/2002 | Welch |
| 2002/0117992 A1 | 8/2002 | Hirono et al. |
| 2002/0118106 A1 | 8/2002 | Brenn |
| 2002/0127120 A1 | 9/2002 | Hahn et al. |
| 2002/0138217 A1 | 9/2002 | Shen et al. |
| 2002/0139128 A1 | 10/2002 | Suzuki et al. |
| 2002/0143482 A1 | 10/2002 | Karanam et al. |
| 2002/0152298 A1 | 10/2002 | Kikta et al. |
| 2002/0157408 A1 | 10/2002 | Egawa et al. |
| 2002/0157409 A1 | 10/2002 | Pham et al. |
| 2002/0159890 A1 | 10/2002 | Kajiwara et al. |
| 2002/0161545 A1 | 10/2002 | Starling et al. |
| 2002/0163436 A1 | 11/2002 | Singh et al. |
| 2002/0163447 A1* | 11/2002 | Runyon et al. ............... 340/947 |
| 2002/0170299 A1 | 11/2002 | Jayanth et al. |
| 2002/0173929 A1 | 11/2002 | Seigel |
| 2002/0187057 A1 | 12/2002 | Loprete et al. |
| 2002/0189267 A1 | 12/2002 | Singh et al. |
| 2002/0193890 A1 | 12/2002 | Pouchak |
| 2002/0198629 A1 | 12/2002 | Ellis |
| 2003/0004660 A1 | 1/2003 | Hunter |
| 2003/0004765 A1 | 1/2003 | Wiegand |
| 2003/0005710 A1 | 1/2003 | Singh et al. |
| 2003/0006884 A1 | 1/2003 | Hunt |
| 2003/0014218 A1 | 1/2003 | Trigiani et al. |
| 2003/0019221 A1 | 1/2003 | Rossi et al. |
| 2003/0036810 A1 | 2/2003 | Petite |
| 2003/0037555 A1 | 2/2003 | Street et al. |
| 2003/0050737 A1 | 3/2003 | Osann |
| 2003/0050824 A1 | 3/2003 | Suermondt et al. |
| 2003/0051490 A1 | 3/2003 | Jayanth |
| 2003/0055603 A1 | 3/2003 | Rossi et al. |
| 2003/0055663 A1 | 3/2003 | Struble |
| 2003/0063983 A1 | 4/2003 | Ancel et al. |
| 2003/0070438 A1 | 4/2003 | Kikuchi et al. |
| 2003/0070544 A1 | 4/2003 | Mulvaney et al. |
| 2003/0074285 A1 | 4/2003 | Hoffman et al. |
| 2003/0077179 A1 | 4/2003 | Collins et al. |
| 2003/0078677 A1 | 4/2003 | Hull et al. |
| 2003/0078742 A1 | 4/2003 | VanderZee et al. |
| 2003/0089493 A1 | 5/2003 | Takano et al. |
| 2003/0094004 A1 | 5/2003 | Pham et al. |
| 2003/0108430 A1 | 6/2003 | Yoshida et al. |
| 2003/0115890 A1 | 6/2003 | Jayanth et al. |
| 2003/0135786 A1 | 7/2003 | Vollmar et al. |
| 2003/0137396 A1 | 7/2003 | Durej et al. |
| 2003/0150924 A1 | 8/2003 | Peter |
| 2003/0150926 A1 | 8/2003 | Rosen |
| 2003/0150927 A1 | 8/2003 | Rosen |
| 2003/0171851 A1 | 9/2003 | Brickfield et al. |
| 2003/0183085 A1 | 10/2003 | Alexander |
| 2003/0191606 A1 | 10/2003 | Fujiyama et al. |
| 2003/0199247 A1 | 10/2003 | Striemer |
| 2003/0205143 A1 | 11/2003 | Cheng |
| 2003/0213851 A1 | 11/2003 | Burd et al. |
| 2003/0216837 A1 | 11/2003 | Reich et al. |
| 2003/0216888 A1 | 11/2003 | Ridolfo |
| 2003/0233172 A1 | 12/2003 | Granqvist et al. |
| 2004/0016241 A1 | 1/2004 | Street et al. |
| 2004/0016244 A1 | 1/2004 | Street et al. |
| 2004/0016251 A1 | 1/2004 | Street et al. |
| 2004/0016253 A1 | 1/2004 | Street et al. |
| 2004/0019584 A1 | 1/2004 | Greening et al. |
| 2004/0024495 A1 | 2/2004 | Sunderland |
| 2004/0026522 A1 | 2/2004 | Keen et al. |
| 2004/0037706 A1 | 2/2004 | Hahn et al. |
| 2004/0042904 A1 | 3/2004 | Kim |
| 2004/0047406 A1 | 3/2004 | Hunt |
| 2004/0049715 A1 | 3/2004 | Jaw |
| 2004/0059691 A1 | 3/2004 | Higgins |
| 2004/0068390 A1 | 4/2004 | Saunders |
| 2004/0078695 A1 | 4/2004 | Bowers et al. |
| 2004/0079093 A1 | 4/2004 | Gauthier et al. |
| 2004/0093879 A1 | 5/2004 | Street et al. |
| 2004/0095237 A1 | 5/2004 | Chen et al. |
| 2004/0111186 A1 | 6/2004 | Rossi et al. |
| 2004/0117166 A1 | 6/2004 | Cassiolato |
| 2004/0133314 A1 | 7/2004 | Ehlers et al. |
| 2004/0133367 A1 | 7/2004 | Hart |
| 2004/0140772 A1 | 7/2004 | Gullo et al. |
| 2004/0140812 A1 | 7/2004 | Scallante et al. |
| 2004/0144106 A1 | 7/2004 | Douglas et al. |
| 2004/0153437 A1 | 8/2004 | Buchan |
| 2004/0159113 A1 | 8/2004 | Singh et al. |
| 2004/0159114 A1 | 8/2004 | Demuth et al. |
| 2004/0183687 A1 | 9/2004 | Petite et al. |
| 2004/0184627 A1 | 9/2004 | Kost et al. |
| 2004/0184928 A1 | 9/2004 | Millet et al. |
| 2004/0184929 A1 | 9/2004 | Millet et al. |
| 2004/0184930 A1 | 9/2004 | Millet et al. |
| 2004/0184931 A1 | 9/2004 | Millet et al. |
| 2004/0187502 A1 | 9/2004 | Jayanth et al. |
| 2004/0191073 A1 | 9/2004 | Iimura et al. |
| 2004/0193517 A1* | 9/2004 | Abrams ........................ 705/34 |
| 2004/0199480 A1 | 10/2004 | Unsworth et al. |
| 2004/0210419 A1 | 10/2004 | Wiebe et al. |
| 2004/0213384 A1 | 10/2004 | Alles et al. |
| 2004/0230582 A1 | 11/2004 | Pagnano et al. |
| 2004/0230899 A1 | 11/2004 | Pagnano et al. |
| 2004/0239266 A1 | 12/2004 | Lee et al. |
| 2004/0258542 A1 | 12/2004 | Wiertz et al. |
| 2004/0261431 A1 | 12/2004 | Singh et al. |
| 2005/0021710 A1* | 1/2005 | Johnson et al. ............... 709/223 |
| 2005/0040249 A1 | 2/2005 | Wacker et al. |
| 2005/0043923 A1 | 2/2005 | Forster et al. |
| 2005/0053471 A1 | 3/2005 | Hong et al. |
| 2005/0056031 A1 | 3/2005 | Jeong |
| 2005/0066675 A1 | 3/2005 | Manole et al. |
| 2005/0073532 A1 | 4/2005 | Scott et al. |
| 2005/0086341 A1 | 4/2005 | Enga et al. |
| 2005/0100449 A1 | 5/2005 | Hahn et al. |
| 2005/0103036 A1 | 5/2005 | Maekawa |
| 2005/0125439 A1 | 6/2005 | Nourbakhsh et al. |
| 2005/0126190 A1 | 6/2005 | Lifson et al. |
| 2005/0131624 A1 | 6/2005 | Gaessler et al. |
| 2005/0149570 A1 | 7/2005 | Sasaki et al. |
| 2005/0154495 A1 | 7/2005 | Shah |
| 2005/0155365 A1* | 7/2005 | Shah et al. ........................ 62/186 |
| 2005/0159924 A1 | 7/2005 | Shah et al. |
| 2005/0166610 A1 | 8/2005 | Jayanth |
| 2005/0169636 A1 | 8/2005 | Aronson et al. |
| 2005/0172647 A1 | 8/2005 | Thybo et al. |
| 2005/0195775 A1 | 9/2005 | Petite et al. |
| 2005/0198063 A1 | 9/2005 | Thomas et al. |
| 2005/0201397 A1 | 9/2005 | Petite |
| 2005/0204756 A1 | 9/2005 | Dobmeier et al. |
| 2005/0207741 A1 | 9/2005 | Shah et al. |
| 2005/0214148 A1 | 9/2005 | Ogawa et al. |
| 2005/0222715 A1 | 10/2005 | Ruhnke et al. |
| 2005/0228607 A1 | 10/2005 | Simons |
| 2005/0229612 A1 | 10/2005 | Hrejsa et al. |
| 2005/0229777 A1 | 10/2005 | Brown et al. |
| 2005/0232781 A1 | 10/2005 | Herbert et al. |
| 2005/0235660 A1 | 10/2005 | Pham |
| 2005/0235661 A1 | 10/2005 | Pham |

(56) References Cited

U.S. PATENT DOCUMENTS

| | | |
|---|---|---|
| 2005/0235662 A1 | 10/2005 | Pham |
| 2005/0235663 A1 | 10/2005 | Pham |
| 2005/0235664 A1 | 10/2005 | Pham |
| 2005/0247194 A1 | 11/2005 | Kang et al. |
| 2005/0251293 A1 | 11/2005 | Seigel |
| 2005/0252220 A1 | 11/2005 | Street et al. |
| 2005/0262856 A1 | 12/2005 | Street et al. |
| 2005/0262923 A1 | 12/2005 | Kates |
| 2006/0010898 A1 | 1/2006 | Suharno et al. |
| 2006/0015777 A1 | 1/2006 | Loda |
| 2006/0020426 A1 | 1/2006 | Singh |
| 2006/0021362 A1 | 2/2006 | Sadegh et al. |
| 2006/0032245 A1 | 2/2006 | Kates |
| 2006/0032246 A1 | 2/2006 | Kates |
| 2006/0032247 A1 | 2/2006 | Kates |
| 2006/0032248 A1 | 2/2006 | Kates |
| 2006/0032379 A1 | 2/2006 | Kates |
| 2006/0036349 A1 | 2/2006 | Kates |
| 2006/0041335 A9 | 2/2006 | Rossi et al. |
| 2006/0042276 A1 | 3/2006 | Doll et al. |
| 2006/0071089 A1 | 4/2006 | Kates |
| 2006/0071666 A1 | 4/2006 | Unsworth et al. |
| 2006/0074917 A1 | 4/2006 | Chand et al. |
| 2006/0097063 A1 | 5/2006 | Zeevi |
| 2006/0098576 A1 | 5/2006 | Brownrigg et al. |
| 2006/0117773 A1 | 6/2006 | Street et al. |
| 2006/0123807 A1 | 6/2006 | Sullivan et al. |
| 2006/0129339 A1 | 6/2006 | Bruno |
| 2006/0130500 A1 | 6/2006 | Gauthier et al. |
| 2006/0137364 A1 | 6/2006 | Braun et al. |
| 2006/0137368 A1 | 6/2006 | Kang et al. |
| 2006/0138866 A1 | 6/2006 | Bergmann et al. |
| 2006/0140209 A1 | 6/2006 | Cassiolato et al. |
| 2006/0151037 A1 | 7/2006 | Lepola et al. |
| 2006/0179854 A1 | 8/2006 | Esslinger |
| 2006/0182635 A1 | 8/2006 | Jayanth |
| 2006/0185373 A1* | 8/2006 | Butler et al. ............... 62/181 |
| 2006/0196196 A1 | 9/2006 | Kates |
| 2006/0196197 A1 | 9/2006 | Kates |
| 2006/0201168 A1 | 9/2006 | Kates |
| 2006/0222507 A1 | 10/2006 | Jayanth |
| 2006/0229739 A1 | 10/2006 | Morikawa |
| 2006/0235650 A1 | 10/2006 | Vinberg et al. |
| 2006/0238388 A1 | 10/2006 | Jayanth |
| 2006/0242200 A1 | 10/2006 | Horowitz et al. |
| 2006/0244641 A1 | 11/2006 | Jayanth et al. |
| 2006/0256488 A1 | 11/2006 | Benzing et al. |
| 2006/0259276 A1 | 11/2006 | Rossi et al. |
| 2006/0271589 A1 | 11/2006 | Horowitz et al. |
| 2006/0271623 A1 | 11/2006 | Horowitz et al. |
| 2006/0280627 A1 | 12/2006 | Jayanth |
| 2007/0002505 A1 | 1/2007 | Watanabe et al. |
| 2007/0006124 A1 | 1/2007 | Ahmed et al. |
| 2007/0027735 A1 | 2/2007 | Rokos |
| 2007/0067512 A1 | 3/2007 | Donaires et al. |
| 2007/0089434 A1 | 4/2007 | Singh et al. |
| 2007/0089435 A1 | 4/2007 | Singh et al. |
| 2007/0089438 A1 | 4/2007 | Singh et al. |
| 2007/0089439 A1 | 4/2007 | Singh et al. |
| 2007/0089440 A1 | 4/2007 | Singh et al. |
| 2007/0101750 A1 | 5/2007 | Pham et al. |
| 2007/0159978 A1 | 7/2007 | Anglin et al. |
| 2007/0174438 A9* | 7/2007 | Johnson et al. ............... 709/223 |
| 2007/0186569 A1 | 8/2007 | Street et al. |
| 2007/0204635 A1 | 9/2007 | Tanaka et al. |
| 2007/0204921 A1 | 9/2007 | Alles |
| 2007/0205296 A1 | 9/2007 | Bell et al. |
| 2007/0229305 A1 | 10/2007 | Bonicatto et al. |
| 2007/0239894 A1 | 10/2007 | Thind et al. |
| 2008/0000241 A1 | 1/2008 | Larsen et al. |
| 2008/0015797 A1 | 1/2008 | Kates |
| 2008/0016888 A1 | 1/2008 | Kates |
| 2008/0051945 A1 | 2/2008 | Kates |
| 2008/0058970 A1 | 3/2008 | Perumalsamy et al. |
| 2008/0078289 A1 | 4/2008 | Sergi et al. |
| 2008/0109185 A1 | 5/2008 | Cheung et al. |
| 2008/0114569 A1 | 5/2008 | Seigel |
| 2008/0121729 A1 | 5/2008 | Gray |
| 2008/0183424 A1 | 7/2008 | Seem |
| 2008/0186898 A1 | 8/2008 | Petite |
| 2008/0209925 A1 | 9/2008 | Pham |
| 2008/0216494 A1 | 9/2008 | Pham et al. |
| 2008/0216495 A1 | 9/2008 | Kates |
| 2008/0223051 A1 | 9/2008 | Kates |
| 2008/0234869 A1 | 9/2008 | Yonezawa et al. |
| 2008/0315000 A1 | 12/2008 | Gorthala et al. |
| 2008/0319688 A1 | 12/2008 | Kim |
| 2009/0007777 A1 | 1/2009 | Cohen et al. |
| 2009/0030555 A1 | 1/2009 | Gray |
| 2009/0037142 A1 | 2/2009 | Kates |
| 2009/0038010 A1 | 2/2009 | Ma et al. |
| 2009/0055465 A1 | 2/2009 | DePue et al. |
| 2009/0057424 A1 | 3/2009 | Sullivan et al. |
| 2009/0057428 A1 | 3/2009 | Geadelmann et al. |
| 2009/0068947 A1 | 3/2009 | Petite |
| 2009/0071175 A1 | 3/2009 | Pham |
| 2009/0072985 A1* | 3/2009 | Patel et al. ............... 340/657 |
| 2009/0093916 A1 | 4/2009 | Parsonnet et al. |
| 2009/0094998 A1 | 4/2009 | McSweeney et al. |
| 2009/0096605 A1 | 4/2009 | Petite et al. |
| 2009/0099699 A1 | 4/2009 | Steinberg et al. |
| 2009/0106601 A1 | 4/2009 | Ngai et al. |
| 2009/0112672 A1 | 4/2009 | Flamig et al. |
| 2009/0119036 A1 | 5/2009 | Jayanth et al. |
| 2009/0125151 A1 | 5/2009 | Steinberg et al. |
| 2009/0140880 A1 | 6/2009 | Flen et al. |
| 2009/0151374 A1 | 6/2009 | Kasahara |
| 2009/0187281 A1 | 7/2009 | Kates |
| 2009/0215424 A1 | 8/2009 | Petite |
| 2009/0229469 A1 | 9/2009 | Campbell et al. |
| 2009/0241570 A1 | 10/2009 | Kuribayashi et al. |
| 2009/0296832 A1 | 12/2009 | Hunt |
| 2009/0324428 A1 | 12/2009 | Tolbert, Jr. et al. |
| 2010/0006042 A1 | 1/2010 | Pitonyak et al. |
| 2010/0011962 A1 | 1/2010 | Totsugi |
| 2010/0017465 A1 | 1/2010 | Brownrigg et al. |
| 2010/0039984 A1 | 2/2010 | Brownrigg |
| 2010/0044449 A1 | 2/2010 | Tessier |
| 2010/0070084 A1 | 3/2010 | Steinberg et al. |
| 2010/0070234 A1 | 3/2010 | Steinberg et al. |
| 2010/0070666 A1 | 3/2010 | Brindle |
| 2010/0078493 A1 | 4/2010 | Alles |
| 2010/0081357 A1 | 4/2010 | Alles |
| 2010/0081372 A1 | 4/2010 | Alles |
| 2010/0089076 A1 | 4/2010 | Schuster et al. |
| 2010/0102136 A1 | 4/2010 | Hadzidedic et al. |
| 2010/0121727 A1* | 5/2010 | Butler ............... 705/26 |
| 2010/0168924 A1 | 7/2010 | Tessier et al. |
| 2010/0169030 A1* | 7/2010 | Parlos ............... 702/58 |
| 2010/0179703 A1 | 7/2010 | Singh et al. |
| 2010/0191487 A1* | 7/2010 | Rada et al. ............... 702/60 |
| 2010/0194582 A1 | 8/2010 | Petite |
| 2010/0214709 A1 | 8/2010 | Hall et al. |
| 2010/0217550 A1 | 8/2010 | Crabtree et al. |
| 2010/0250054 A1 | 9/2010 | Petite |
| 2010/0257410 A1 | 10/2010 | Cottrell et al. |
| 2010/0262299 A1 | 10/2010 | Cheung et al. |
| 2010/0265909 A1 | 10/2010 | Petite et al. |
| 2010/0280667 A1 | 11/2010 | Steinberg |
| 2010/0282857 A1 | 11/2010 | Steinberg |
| 2010/0287489 A1 | 11/2010 | Alles |
| 2010/0305718 A1 | 12/2010 | Clark et al. |
| 2010/0308119 A1 | 12/2010 | Steinberg et al. |
| 2010/0312881 A1 | 12/2010 | Davis et al. |
| 2010/0318227 A1 | 12/2010 | Steinberg et al. |
| 2010/0330985 A1 | 12/2010 | Addy |
| 2011/0004350 A1 | 1/2011 | Cheifetz et al. |
| 2011/0022429 A1 | 1/2011 | Yates et al. |
| 2011/0023045 A1 | 1/2011 | Yates et al. |
| 2011/0023945 A1 | 2/2011 | Hayashi et al. |
| 2011/0040785 A1 | 2/2011 | Steenberg et al. |
| 2011/0042541 A1 | 2/2011 | Spencer et al. |
| 2011/0045454 A1 | 2/2011 | McManus et al. |
| 2011/0054842 A1 | 3/2011 | Kates |

(56) References Cited

U.S. PATENT DOCUMENTS

| | | |
|---|---|---|
| 2011/0071960 A1 | 3/2011 | Singh |
| 2011/0077896 A1 | 3/2011 | Steinberg et al. |
| 2011/0083450 A1 | 4/2011 | Turner et al. |
| 2011/0102159 A1 | 5/2011 | Olson et al. |
| 2011/0103460 A1 | 5/2011 | Bonicatto |
| 2011/0106471 A1 | 5/2011 | Curtis et al. |
| 2011/0118905 A1 | 5/2011 | Mylaraswamy et al. |
| 2011/0121952 A1 | 5/2011 | Bonicatto et al. |
| 2011/0144932 A1 | 6/2011 | Alles |
| 2011/0166828 A1 | 7/2011 | Steinberg et al. |
| 2011/0181438 A1 | 7/2011 | Millstein et al. |
| 2011/0184563 A1 | 7/2011 | Foslien et al. |
| 2011/0185895 A1 | 8/2011 | Freen |
| 2011/0190910 A1 | 8/2011 | Lombard et al. |
| 2011/0212700 A1 | 9/2011 | Petite |
| 2011/0218957 A1 | 9/2011 | Coon et al. |
| 2011/0264324 A1 | 10/2011 | Petite et al. |
| 2011/0264409 A1 | 10/2011 | Jayanth et al. |
| 2011/0290893 A1 | 12/2011 | Steinberg |
| 2011/0307103 A1 | 12/2011 | Cheung et al. |
| 2011/0309953 A1 | 12/2011 | Petite et al. |
| 2011/0310929 A1 | 12/2011 | Petite et al. |
| 2011/0315019 A1 | 12/2011 | Lyon et al. |
| 2011/0320050 A1 | 12/2011 | Petite et al. |
| 2012/0005590 A1 | 1/2012 | Lombard et al. |
| 2012/0054242 A1* | 3/2012 | Ferrara et al. ............... 707/783 |
| 2012/0065783 A1* | 3/2012 | Fadell et al. ........... F24F 11/006 700/276 |
| 2012/0065935 A1 | 3/2012 | Steinberg et al. |
| 2012/0066168 A1 | 3/2012 | Fadell et al. |
| 2012/0075092 A1 | 3/2012 | Petite et al. |
| 2012/0092154 A1 | 4/2012 | Petite |
| 2012/0125559 A1 | 5/2012 | Fadell et al. |
| 2012/0125592 A1 | 5/2012 | Fadell et al. |
| 2012/0126019 A1 | 5/2012 | Warren et al. |
| 2012/0126020 A1 | 5/2012 | Filson et al. |
| 2012/0126021 A1 | 5/2012 | Warren et al. |
| 2012/0128025 A1 | 5/2012 | Huppi et al. |
| 2012/0130546 A1 | 5/2012 | Matas et al. |
| 2012/0130547 A1 | 5/2012 | Fadell et al. |
| 2012/0130548 A1 | 5/2012 | Fadell et al. |
| 2012/0130679 A1 | 5/2012 | Fadell et al. |
| 2012/0131504 A1 | 5/2012 | Fadell et al. |
| 2012/0143528 A1 | 6/2012 | Kates |
| 2012/0179300 A1 | 7/2012 | Warren et al. |
| 2012/0186774 A1 | 7/2012 | Matsuoka et al. |
| 2012/0191257 A1 | 7/2012 | Corcoran et al. |
| 2012/0199660 A1 | 8/2012 | Warren et al. |
| 2012/0203379 A1 | 8/2012 | Sloo et al. |
| 2012/0221150 A1* | 8/2012 | Arensmeier ....... G05B 23/0224 700/276 |
| 2012/0229521 A1 | 9/2012 | Hales, IV et al. |
| 2012/0232969 A1 | 9/2012 | Fadell et al. |
| 2012/0233478 A1 | 9/2012 | Mucignat et al. |
| 2012/0239207 A1 | 9/2012 | Fadell et al. |
| 2012/0239221 A1 | 9/2012 | Mighdoll et al. |
| 2012/0245968 A1 | 9/2012 | Beaulieu et al. |
| 2012/0248210 A1 | 10/2012 | Warren et al. |
| 2012/0248211 A1 | 10/2012 | Warren et al. |
| 2012/0260804 A1 | 10/2012 | Kates |
| 2012/0265491 A1 | 10/2012 | Drummy |
| 2012/0265586 A1* | 10/2012 | Mammone ................ 705/14.1 |
| 2012/0271673 A1* | 10/2012 | Riley ......................... 705/7.12 |
| 2012/0291629 A1 | 11/2012 | Tylutki et al. |
| 2012/0318135 A1 | 12/2012 | Hoglund et al. |
| 2012/0318137 A1 | 12/2012 | Ragland et al. |
| 2013/0066479 A1* | 3/2013 | Shetty et al. ................ 700/295 |
| 2013/0182285 A1 | 7/2013 | Matsuhara et al. |
| 2013/0287063 A1 | 10/2013 | Kates |
| 2014/0000290 A1 | 1/2014 | Kates |
| 2014/0000291 A1 | 1/2014 | Kates |
| 2014/0000292 A1 | 1/2014 | Kates |
| 2014/0000293 A1 | 1/2014 | Kates |
| 2014/0000294 A1 | 1/2014 | Kates |
| 2014/0012422 A1 | 1/2014 | Kates |
| 2014/0074730 A1* | 3/2014 | Arensmeier et al. ..... F24F 11/0086 705/305 |
| 2014/0262134 A1 | 9/2014 | Arensmeier et al. |
| 2014/0266755 A1 | 9/2014 | Arensmeier et al. |

FOREIGN PATENT DOCUMENTS

| | | |
|---|---|---|
| CA | 2567264 A1 | 7/2007 |
| CH | 173493 A | 11/1934 |
| CN | 1133425 A | 10/1996 |
| CN | 1169619 A | 1/1998 |
| CN | 1297522 A | 5/2001 |
| CN | 1356472 A | 7/2002 |
| CN | 1742427 A | 3/2006 |
| CN | 1922445 A | 2/2007 |
| CN | 101048713 A | 10/2007 |
| CN | 101156033 A | 4/2008 |
| CN | 101270908 A | 9/2008 |
| CN | 101361244 A | 2/2009 |
| CN | 101466193 A | 6/2009 |
| CN | 101506600 A | 8/2009 |
| CN | 101802521 A | 8/2010 |
| CN | 101821693 A | 9/2010 |
| DE | 842351 C | 6/1952 |
| DE | 764179 C | 4/1953 |
| DE | 1144461 B | 2/1963 |
| DE | 1403516 A1 | 10/1968 |
| DE | 1403467 A1 | 10/1969 |
| DE | 3118638 A1 | 5/1982 |
| DE | 3133502 A1 | 6/1982 |
| DE | 3508353 A1 | 9/1985 |
| DE | 3422398 A1 | 12/1985 |
| DE | 29723145 U1 | 4/1998 |
| EP | 0060172 A1 | 9/1982 |
| EP | 0085246 A1 | 8/1983 |
| EP | 0124603 A1 | 11/1984 |
| EP | 0254253 A2 | 1/1988 |
| EP | 0346152 A2 | 12/1989 |
| EP | 0351272 A1 | 1/1990 |
| EP | 0351833 A2 | 1/1990 |
| EP | 0355255 A2 | 2/1990 |
| EP | 0361394 A2 | 4/1990 |
| EP | 0398436 A1 | 11/1990 |
| EP | 0410330 A2 | 1/1991 |
| EP | 0419857 A2 | 4/1991 |
| EP | 0432085 A2 | 6/1991 |
| EP | 0453302 A1 | 10/1991 |
| EP | 0479421 A1 | 4/1992 |
| EP | 0557023 A1 | 8/1993 |
| EP | 0579374 A1 | 1/1994 |
| EP | 0660213 A2 | 6/1995 |
| EP | 0747598 A2 | 12/1996 |
| EP | 0877462 A2 | 11/1998 |
| EP | 0982497 A1 | 3/2000 |
| EP | 1008816 A2 | 6/2000 |
| EP | 1087142 A2 | 3/2001 |
| EP | 1087184 A2 | 3/2001 |
| EP | 1138949 A2 | 10/2001 |
| EP | 1139037 A1 | 10/2001 |
| EP | 1187021 A2 | 3/2002 |
| EP | 1209427 A1 | 5/2002 |
| EP | 1241417 A1 | 9/2002 |
| EP | 1245912 A2 | 10/2002 |
| EP | 1245913 A1 | 10/2002 |
| EP | 1393034 A1 | 3/2004 |
| EP | 1435002 A1 | 7/2004 |
| EP | 1487077 A2 | 12/2004 |
| EP | 2180270 A1 | 4/2010 |
| FR | 2472862 A1 | 7/1981 |
| FR | 2582430 A1 | 11/1986 |
| FR | 2589561 A1 | 5/1987 |
| FR | 2628558 A1 | 9/1989 |
| FR | 2660739 A1 | 10/1991 |
| GB | 2062919 A | 5/1981 |
| GB | 2064818 A | 6/1981 |
| GB | 2075774 A | 11/1981 |
| GB | 2116635 A | 9/1983 |
| GB | 2229295 A | 9/1990 |

(56) References Cited

FOREIGN PATENT DOCUMENTS

| | | |
|---|---|---|
| GB | 2347217 A | 8/2000 |
| JP | 56010639 A | 2/1981 |
| JP | 59145392 A | 8/1984 |
| JP | 61046485 A | 3/1986 |
| JP | 62116844 A | 5/1987 |
| JP | 63061783 A | 3/1988 |
| JP | 63302238 A | 12/1988 |
| JP | 01014554 A | 1/1989 |
| JP | 02110242 A | 4/1990 |
| JP | 02294580 A | 12/1990 |
| JP | 04080578 A | 3/1992 |
| JP | 06058273 A | 3/1994 |
| JP | 08021675 A | 1/1996 |
| JP | 08087229 A | 4/1996 |
| JP | 08284842 A | 10/1996 |
| JP | H08261541 A | 10/1996 |
| JP | 2000350490 A | 12/2000 |
| JP | 2002155868 A | 5/2002 |
| JP | 2003018883 A | 1/2003 |
| JP | 2003176788 A | 6/2003 |
| JP | 2004316504 A | 11/2004 |
| JP | 2005188790 A | 7/2005 |
| JP | 2005241089 A | 9/2005 |
| JP | 2005345096 A | 12/2005 |
| JP | 2006046219 A | 2/2006 |
| JP | 2006046519 A | 2/2006 |
| JP | 2006274807 A | 10/2006 |
| JP | 2009002651 A | 1/2009 |
| JP | 2009229184 A | 10/2009 |
| JP | 2010048433 A | 3/2010 |
| KR | 10-1998-0036844 A | 8/1998 |
| KR | 1020000000261 | 1/2000 |
| KR | 1020000025265 | 5/2000 |
| KR | 1020020041977 | 6/2002 |
| KR | 20030042857 A | 6/2003 |
| KR | 20040021281 A | 3/2004 |
| KR | 1020040021281 | 3/2004 |
| KR | 1020060020353 | 3/2006 |
| RU | 30009 U1 | 6/2003 |
| RU | 55218 U1 | 7/2006 |
| WO | 8601262 A1 | 2/1986 |
| WO | 8703988 A1 | 7/1987 |
| WO | 8705097 A1 | 8/1987 |
| WO | 8802527 A1 | 4/1988 |
| WO | 8806703 A1 | 9/1988 |
| WO | 9718636 A2 | 5/1997 |
| WO | 9748161 A1 | 12/1997 |
| WO | 9917066 A1 | 4/1999 |
| WO | 9961847 A1 | 12/1999 |
| WO | 9965681 A1 | 12/1999 |
| WO | 0021047 A1 | 4/2000 |
| WO | 0051223 A1 | 8/2000 |
| WO | 0169147 A1 | 9/2001 |
| WO | 0214968 A1 | 2/2002 |
| WO | 0249178 A2 | 6/2002 |
| WO | 02075227 A1 | 9/2002 |
| WO | 02/090840 A2 | 11/2002 |
| WO | 02/090913 A1 | 11/2002 |
| WO | 02090914 A1 | 11/2002 |
| WO | WO-03031996 A1 | 4/2003 |
| WO | 03030000 A1 | 10/2003 |
| WO | 2004049088 A1 | 6/2004 |
| WO | 2005022049 A2 | 3/2005 |
| WO | 2005065355 A2 | 7/2005 |
| WO | 2005073686 A1 | 8/2005 |
| WO | 2005108882 A2 | 11/2005 |
| WO | 2006023075 A2 | 3/2006 |
| WO | 2006025880 A1 | 3/2006 |
| WO | 2006091521 A2 | 8/2006 |
| WO | WO-2008010988 A1 | 1/2008 |
| WO | WO-2008079108 A1 | 7/2008 |
| WO | 2008144864 A1 | 12/2008 |
| WO | 2009058356 A1 | 5/2009 |
| WO | 2009061370 A1 | 5/2009 |
| WO | 2010138831 A2 | 12/2010 |
| WO | 2011069170 A1 | 6/2011 |
| WO | 2012092625 A2 | 7/2012 |
| WO | 2012118550 A1 | 9/2012 |

OTHER PUBLICATIONS

Jeffus, Larry, "Refrigeration and Air Conditioning: An Introduction to HVAC/R," Section II, Chapter 5, pp. 239-245, Copyright 2004.
Jeffus, Larry, "Refrigeration and Air Conditioning: An Introduction to HVAC/R," Section II, Chapter 6, p. 322, Copyright 2004.
Jeffus, Larry, "Refrigeration and Air Conditioning: An Introduction to HVAC/R," Section IV, Chapter 9, pp. 494-504, Copyright 2004.
K. A. Manske et al.; Evaporative Condenser Control in Industrial Refrigeration Systems; University of Wisconsin—Madison, Mechanical Engineering Department; International Journal of Refrigeration, vol. 24, No. 7; pp. 676-691; 2001, 21 pages.
Liao et al., A Correlation of Optimal Heat Rejection Pressures in Transcritical Carbon Dioxide Cycles, Applied Thermal Engineering 20 (2000), Jul. 25, 1999, 831-841.
Pin, C. et al., "Predictive Models as Means to Quantify the Interactions of Spoilage Organisms," International Journal of Food Microbiology, vol. 41, No. 1, 1998, pp. 59-72, XP-002285119.
European Search Report for EP 82306809.3; Apr. 28, 1983; 1 Page.
European Search Report for EP 94 30 3484; Apr. 3, 1997; 1 Page.
International Search Report, International Application No. PCT/US04/13384; Dated Aug. 1, 2004; 1 Page.
Notice of Allowance regarding U.S. Appl. No. 13/835,742, mailed Apr. 17, 2015.
Notice of Allowance regarding U.S. Appl. No. 13/836,453, mailed Apr. 15, 2015.
Advisory Action regarding U.S. Appl. No. 13/269,188, dated Apr. 13, 2015.
U.S. Office Action regarding U.S. Appl. No. 13/269,188, dated May 8, 2015.
First Chinese Office Action regarding Application No. 201380005300.2, dated Apr. 30, 2015. Translation provided by Unitalen Attorneys at Law.
Advisory Action and Interview Summary regarding U.S. Appl. No. 13/407,180, dated May 27, 2015.
Interview Summary regarding U.S. Appl. No. 13/407,180, dated Jun. 11, 2015.
Interview Summary regarding U.S. Appl. No. 13/770,479, dated Jun. 16, 2015.
Extended European Search Report regarding European Application No. 08845689.2-1608/2207964, dated Jun. 19, 2015.
Extended European Search Report regarding European Application No. 08848538.8-1608 / 2220372, dated Jun. 19, 2015.
Notice of Allowance regarding U.S. Appl. No. 13/932,611, dated Jul. 6, 2015.
Restriction Requirement regarding U.S. Appl. No. 14/244,967, dated Jul. 14, 2015.
Interview Summary regarding U.S. Appl. No. 13/369,067, dated Jul. 16, 2015.
Applicant-Initiated Interview Summary and Advisory Action regarding U.S. Appl. No. 13/369,067, dated Jul. 23, 2015.
Faramarzi et al., "Performance Evaluation of Rooftop Air Conditioning Units at High Ambient Temperatures," 2004 ACEEE Summer Study on Energy Efficiency in Buildings—http://aceee.org/files/proceedings/2004/data/papers/SSO4_Panel3_Paper05.pdf.
Notice of Allowance regarding U.S. Appl. No. 12/261,643, mailed Jul. 29, 2015.
Notice of Allowance regarding U.S. Appl. No. 13/770,123, dated Aug. 13, 2015.
Notice of Allowance and Interview Summary regarding U.S. Appl. No. 13/269,188, dated Aug. 26, 2015.
Office Action regarding Indian Patent Application No. 733/KOLNP/2009, dated Aug. 12, 2015.
Notice of Allowance regarding U.S. Appl. No. 13/369,067, dated Sep. 2, 2015.
Notice of Allowance regarding U.S. Appl. No. 13/407,180, dated Sep. 4, 2015.

(56) References Cited

OTHER PUBLICATIONS

Final Office Action regarding U.S. Appl. No. 13/770,479, dated Sep. 4, 2015.
Office Action regarding U.S. Appl. No. 14/209,415, dated Sep. 10, 2015.
Search Report regarding European Patent Application No. 13736303.2-1806, dated Sep. 17, 2015.
First Office Action regarding Chinese Patent Application No. 201280010796.8, dated Sep. 14, 2015. Translation provided by Unitalen Attorneys At Law.
Notice of Allowance regarding U.S. Appl. No. 13/770,123, dated Oct. 1, 2015.
Office Action regarding Australian Patent Application No. 2013323760, dated Sep. 25, 2015.
Office Action and Interview Summary regarding U.S. Appl. No. 14/244,967, dated Oct. 7, 2015.
Office Action regarding U.S. Appl. No. 14/255,519, dated Nov. 9, 2015.
Interview Summary regarding U.S. Appl. No. 13/770,479, dated Nov. 25, 2015.
Office Action regarding Chinese Patent Application No. 201380049458.X, dated Nov. 13, 2015. Translation provided by Unitalen Attorneys at Law.
Search Report regarding European Patent Application No. 08251185.8-1605 / 2040016, dated Dec. 4, 2015.
Interview Summary regarding U.S. Appl. No. 12/054,011, dated Jan. 30, 2013.
Office Action regarding U.S. Appl. No. 14/193,568, dated Nov. 3, 2015.
Office Action regarding Chinese Patent Application No. 201380005300.2, dated Jan. 4, 2016. Translation provided by Unitalen Attorneys at Law.
Office Action regarding Australian Patent Application No. 2015207920, dated Dec. 4, 2015.
Office Action regarding U.S. Appl. No. 14/244,967, dated Feb. 12, 2016.
Office Action regarding European Patent Application No. 08848538.8-1608, dated Feb. 3, 2016.
Office Action regarding U.S. Appl. No. 14/209,415, dated Mar. 10, 2016.
Office Action regarding U.S. Appl. No. 12/943,626, dated May 4, 2016.
Office Action regarding Australian Patent Application No. 2014229103, dated Apr. 28, 2016.
Office Action regarding U.S. Appl. No. 14/617,451, dated Jun. 2, 2016.
Office Action regarding U.S. Appl. No. 14/193,568, dated Jun. 1, 2016.
Office Action regarding U.S. Appl. No. 14/080,473, dated Jun. 6, 2016.
Interview Summary regarding U.S. Appl. No. 14/209,415, dated Jun. 20, 2016.
Search Report regarding European Patent Application No. 13841699.5, dated Jun. 30, 2016.
Honeywell, Alerts and Delta T Diagnostics with Prestige® 2.0 IAQ Thermostat, 69-2678-02, Sep. 2011.
Honeywell, RedLINK™ Wireless Comfort Systems brochure, 50-1194, Sep. 2011.
Honeywell, Prestige System Installation Guide, THX9321/9421 Prestige® IAQ and RF EIM, 64-2490-03, Jul. 2011.
"Manual for Freezing and Air Conditioning Technology," Fan Jili, Liaoning Science and Technology Press, Sep. 1995 (cited in First Office Action issued by the Chinese Patent Office regarding Application No. 200780030810.X dated Dec. 25, 2009).
"Small-type Freezing and Air Conditioning Operation," Chinese State Economy and Trading Committee, China Meteorological Press, Mar. 2003 (cited in First Office Action issued by the Chinese Patent Office regarding Application No. 200780030810.X dated Dec. 25, 2009).
Home Comfort Zones, Save Energy with MyTemp™ Zone Control, Dec. 2009.
Home Comfort Zones, MyTemp Room-by-Room Zone Control, Nov. 2009.
Li et al., "Development, Evaluation, and Demonstration of a Virtual Refrigerant Charge Sensor," Jan. 2009, HVAC&R Research, Oct. 27, 2008, 21 pages.
Home Comfort Zones, MyTemp User Manual v4.3, May 2008.
Home Comfort Zones, Smart Controller™ MyTemp™ Room by Room Temperature Control and Energy Management, User Manual, Aug. 2007.
"A Practical Example of a Building's Automatic Control," cited in First Office Action from the Patent Office of the People's Republic of China dated Jun. 29, 2007, regarding Application No. 200510005907.8, including translation by CCPIT Patent and Trademark Law Office.
"Product Performance Introduction of York Company," cited in First Office Action from the Patent Office of the People's Republic of China dated Jun. 29, 2007 regarding Application No. 200510005907.8, including translation by CCPIT Patent and Trademark Law Office.
Torcellini, P., et al., "Evaluation of the Energy Performance and Design Process of the Thermal Test Facility at the National Renewable Energy Laboratory", dated Feb. 2005.
Cost Cutting Techniques Used by the Unscrupulous, http://www.kellyshvac.com/howto.html, Oct. 7, 2004, 3 pages.
About CABA: CABA eBulletin, http://www.caba.org/aboutus/ebulletin/issue17/domosys.html, 2 pages.
The LS2000 Energy Management System, User Guide, http://www.surfnetworks.com/htmlmanuals/lonWorksEnergyManagement-LS2000-Load-Shed-System-by-Surf-Networks,Inc.html, Sep. 2004, 20 pages.
Case Studies: Automated Meter Reading and Load Shed System, http://groupalpha.com/CaseStudies2.html, Aug. 23, 2004, 1 page.
Nickles, Donald, "Broadband Communications Over Power Transmission Lines," A Guest Lecture From the Dr. Shreekanth Mandaynam Engineering Frontiers Lecture Series, May 5, 2004, 21 pages.
Jeffus, Larry, "Refrigeration and Air Conditioning: An Introduction to HVAC/R," Section II, Chapter 4, pp. 176-201, Copyright 2004.
HVAC Service Assistant, ACRx Efficiency and Capacity Estimating Technology, Field Diagnostics, 2004.
Reh, F. John, "Cost Benefit Analysis", http://management.about.com/cs/money/a/CostBenefit.htm, Dec. 8, 2003.
Udelhoven, Darrell, "Air Conditioning System Sizing for Optimal Efficiency," http://www.udarrell.com/airconditioning-sizing.html, Oct. 6, 2003, 7 pages.
Texas Instruments, Inc., Product catalog for "TRF690 1 Single-Chip RF Transceiver," Copyright 2001-2003, Revised Oct. 2003, 27 pages.
Advanced Utility Metering: Period of Performance, Subcontractor Report, National Renewable Energy Laboratory, Sep. 2003, 59 pages.
Honeywell, Advanced Portable A/C Diagnostics, The HVAC Service Assistant, 2003.
Vandenbrink et al.,"Design of a Refrigeration Cycle Evaporator Unit," Apr. 18, 2003.
Udelhoven, Darrell, "Air Conditioner EER, SEER Ratings, BTUH Capacity Ratings, & Evaporator Heat Load," http://www.udarrell.com/air-conditioner-capacity-seer.html, Apr. 3, 2003, 15 pages.
The Honeywell HVAC Service Assistant, A Tool for Reducing Electrical Power Demand and Energy Consumption, Field Diagnostics, 2003.
Honeywell, HVAC Service Assistant, TRGpro PalmTM OS Interface and HVAC Service Assistant A7075A1000, 2002.
"Air Conditioning Equipment and Diagnostic Primer," Field Diagnostic Services, Inc., Sep. 9, 2002.
Udelhoven, Darrell, "Optimizing Air Conditioning Efficiency TuneUp Optimizing the Condensor Output, Seer, Air, HVAC Industry," http://www.udarrell.com/air-conditioning-efficiency.html, Jul. 19, 2003, 13 pages.
Honeywell, A7075A1000 HVAC Service Assistant, 2001.

(56) References Cited

OTHER PUBLICATIONS

LIPA Launches Free, First-in-Nation Internet-Based Air Conditioner Control Program to Help LIPA and Its Customers Conserve Electricity & Save Money, Apr. 19, 2001, http://www.lipower.org/newscmter/pr/2001/april19_01.html, 3 pages.
Flow & Level Measurement: Mass Flowmeters, http://www.omega.com/literature/transactions/volume4/T9904-10-MASS.html, 2001, 19 pages.
Frequently Asked Questions, http://www.lipaedge.com/faq.asp, Copyright © 2001, 5 pages.
Translation of claims and Abstract of KR Patent Laying-Open No. 2000-0000261.
BChydro, "Power Factor". Guides to Energy Management: The GEM Series, Oct. 1999.
Ultrasite 32 User's Guide, Computer Process Controls, Sep. 28, 1999.
Refrigeration Monitor and Case Control Installation and Operation Manual, Computer Process Controls, Aug. 12, 1999.
Einstein RX-300 Refrigeration Controller Installation and Operation Manual, Computer Process Controls, Apr. 1, 1998, 329 pages.
Building Control Unit (BCU) Installation and Operation Manual, Computer Process Controls, Jan. 28, 1998, 141 pages.
Low-Cost Multi-Service Home Gateway Creates New Business Opportunities, Coactive Networks, Copyright 1998-1999, 7 pages.
Watt, James; Development of Empirical Temperature and Humidity-Based Degraded-Condition Indicators for Low-Tonnage Air Conditioners; ESL-TH-97/12-03; Dec. 1997.
Ultrasite User's Guide BEC Supplement, Computer Process Controls, Oct. 6, 1997.
Ultrasite User's Guide BCU Supplement, Computer Process Controls, Sep. 4, 1997.
Ultrasite User's Guide RMCC Supplement, Computer Process Controls, Jun. 9, 1997.
Texas Instruments, Inc. Mechanical Data for "PT (S-PQFP-G48) Plastic Quad Flatpack," Revised Dec. 1996, 2 pages.
Honeywell, Excel 5000® System, Excel Building Supervisor, 74-2033-1, Copyright © 1996, Rev. 6-96, 12 pages.
UltraSite User's Guide, Computer Process Controls, Apr. 1, 1996.
Honeywell, Excel 5000® System, Excel Building Supervisor—Integrated, 74-2034, Copyright © 1994, Rev. 11-94, 12 pages.
Tamarkin, Tom D., "Automatic Meter Reading," Public Power magazine, vol. 50, No. 5, Sep.-Oct. 1992, http://www.energycite.com/news/amr.html, 6 pages.
Palani, M. et al, The Effect of Reducted Evaporator Air Flow on the Performance of a Residential Central Air Conditioner, ESL-HH-92-05-04, Energy Systems Laboratory, Mechanical Engineering Department, Texas A&M University, Eighth Symposium on Improving Building System in Hot and Humid Climates, May 13-14, 1992.
Palani, M. et al, Monitoring the Performance of a Residential Central Air Conditioner under Degraded Conditions on a Test Bench, ESL-TR-92/05-05, May 1992.
European Search Report for EP 91 30 3518; Jul. 22, 2007; 1 Page.
European Search Report for EP 93 30 4470; Oct. 26, 1993; 1 Page.
European Search Report for EP 96 30 4219; Dec. 1, 1998; 2 Pages.
International Search Report; International Application No. PCT/US98/18710; Jan. 26, 1999; 1 Page.
European Search Report for EP 98 30 3525; May 28, 1999; 2 Pages.
European Search Report for EP 99 30 6052; Dec. 28, 1999; 3 Pages.
European Search Report for EP 01 30 7547; Feb. 20, 2002; 1 Page.
European Search Report for Application No. EP 01 30 1752, dated Mar. 26, 2002.
European Search Report for EP 02 25 0266; May 17, 2002; 3 Pages.
International Search Report, International Application No. PCT/US02/13456, dated Aug. 22, 2002, 2 Pages.
International Search Report for PCT/US02/13459; ISA/US; date mailed Sep. 19, 2002.
European Search Report for Application No. EP 02 25 1531, dated Sep. 30, 2002.
Office Action regarding U.S. Appl. No. 09/977,552, dated Jan. 14, 2003.
Written Opinion regarding PCT/US02/13459, dated Apr. 23, 2003.
Final Office Action regarding U.S. Appl. No. 09/977,552, dated Jun. 18, 2003.
International Preliminary Examination Report regarding PCT/US02/13456, dated Sep. 15, 2003.
Office Action regarding U.S. Appl. No. 10/061,964, dated Oct. 3, 2003.
Response to Rule 312 Communication regarding U.S. Appl. No. 09/977,552, dated Oct. 31, 2003.
Office Action regarding U.S. Appl. No. 09/977,552, dated Dec. 3, 2003.
Final Office Action regarding U.S. Appl. No. 10/061,964, dated Mar. 8, 2004.
Final Office Action regarding U.S. Appl. No. 09/977,552, dated Apr. 26, 2004.
Office Action regarding U.S. Appl. No. 10/286,419, dated Jun. 10, 2004.
European Search Report for EP 02 72 9050, Jun. 17, 2004, 2 pages.
Supplementary European Search Report for EP 02 73 1544, Jun. 18, 2004, 2 Pages.
Notice of Allowance regarding U.S. Appl. No. 10/061,964, dated Jul. 19, 2004.
International Search Report, International Application No. PCT/US2004/027654, dated Aug. 25, 2004, 4 Pages.
Office Action regarding U.S. Appl. No. 10/675,137, dated Sep. 7, 2004.
Office Action regarding U.S. Appl. No. 09/977,552, dated Oct. 18, 2004.
Notice of Allowance and Notice of Allowability regarding U.S. Appl. No. 10/286,419, dated Dec. 2, 2004.
Office Action regarding U.S. Appl. No. 10/675,137, dated Feb. 4, 2005.
European Search Report regarding Application No. EP02729051, dated Feb. 17, 2005.
Office Action regarding U.S. Appl. No. 10/698,048, dated Mar. 21, 2005.
Office Action dated May 4, 2005 from Related U.S. Appl. No. 10/916,223 (Kates.003A).
Final Office Action regarding U.S. Appl. No. 09/977,552, dated May 13, 2005.
Office Action regarding U.S. Appl. No. 10/675,137, dated Jun. 29, 2005.
Restriction Requirement regarding U.S. Appl. No. 10/940,877, dated Jul. 25, 2005.
Notice of Allowance for US Appl. No. 10/698,048, dated Sep. 1, 2005.
International Search Report for International Application No. PCT/US2005/11154, dated Oct. 19, 2005.
Office Action dated Oct. 27, 2005 from Related U.S. Appl. No. 10/916,223 (Kates.003A).
Office Action dated Nov. 8, 2005 from Related U.S. Appl. No. 10/916,222.
Office Action dated Nov. 9, 2005 from Related U.S. Appl. No. 11/130,562 (Kates.021A).
Office Action dated Nov. 9, 2005 from Related U.S. Appl. No. 11/130,601 (Kates.020A).
Office Action dated Nov. 9, 2005 from Related U.S. Appl. No. 11/130,871 (Kates.002A).
Advisory Action Before the Filing of an Appeal Brief regarding U.S. Appl. No. 09/977,552, dated Nov. 10, 2005.
Office Action regarding U.S. Appl. No. 10/940,877, dated Nov. 14, 2005.
Notice of Allowance and Notice of Allowability regarding U.S. Appl. No. 10/675,137, dated Dec. 16, 2005.
First Examination Communication regarding European Application No. EP02729051.9, dated Dec. 23, 2005.
Office Action dated Jan. 6, 2006 from Related U.S. Appl. No. 11/130,562 (Kates.021A).
Office Action dated Jan. 6, 2006 from Related U.S. Appl. No. 10/916,222.

(56) References Cited

OTHER PUBLICATIONS

Office Action dated Jan. 18, 2006 from Related U.S. Appl. No. 11/130,601 (Kates.020A).
Examiner's First Report on Australian Patent Application No. 2002259066, dated Mar. 1, 2006.
International Search Report for International Application No. PCT/US04/43859, dated Mar. 2, 2006.
Office Action dated Mar. 30, 2006 from Related U.S. Appl. No. 11/130,569 (Kates.022A).
Office Action dated Apr. 19, 2006 from Related U.S. Appl. No. 10/916,223 (Kates.003A).
Final Office Action regarding U.S. Appl. No. 10/940,877, dated May 2, 2006.
Office Action dated Jun. 22, 2009 from Related U.S. Appl. No. 12/050,821.
Second Examination Communication regarding European Application No. EP02729051.9, dated Jul. 3, 2006.
Office Action dated Jul. 11, 2006 from Related U.S. Appl. No. 11/130,562 (Kates.021A).
Office Action dated Jul. 11, 2006 from Related U.S. Appl. No. 10/916,222.
Office Action regarding U.S. Appl. No. 09/977,552, dated Jul. 12, 2006.
Notice of Allowance dated Jul. 13, 2006 from Related U.S. Appl. No. 11/130,601 (Kates.020A).
Office Action dated Jul. 27, 2006 from Related U.S. Appl. No. 11/130,871 (Kates.002A).
Office Action regarding U.S. Appl. No. 11/120,166, dated Oct. 2, 2006.
Office Action regarding U.S. Appl. No. 10/940,877, dated Oct. 27, 2006.
Office Action dated Nov. 14, 2006 from Related U.S. Appl. No. 11/130,569 (Kates.022A).
Office Action dated Nov. 16, 2006 from Related U.S. Appl. No. 10/916,223 (Kates.003A).
Office Action dated Jan. 23, 2007 from Related U.S. Appl. No. 10/916,222.
Election/Restriction Requirement regarding U.S. Appl. No. 09/977,552, dated Jan. 25, 2007.
Office Action dated Feb. 1, 2007 from Related U.S. Appl. No. 11/130,562 (Kates.021A).
First Office Action received from the Chinese Patent Office dated Feb. 2, 2007 regarding Application No. 200480011463.2, translated by CCPIT Patent and Trademark Law Office.
Notice of Allowance dated Feb. 12, 2007 from Related U.S. Appl. No. 11/130,871 (Kates.002A).
International Search Report, International Application No. PCT/US2006/040964, dated Feb. 15, 2007, 2 Pages.
Examiner Interview Summary regarding U.S. Appl. No. 10/940,877, dated Mar. 2, 2007.
Office Action regarding U.S. Appl. No. 11/120,166, dated Apr. 12, 2007.
Office Action Communication regarding U.S. Appl. No. 09/977,552, dated Apr. 18, 2007.
Office Action regarding U.S. Appl. No. 10/940,877, dated May 21, 2007.
Notice of Allowance dated May 29, 2007 from Related U.S. Appl. No. 11/130,569 (Kates.022A).
First Office Action from the Patent Office of the People's Republic of China dated Jun. 8, 2007, Application No. 200480027753.6 and Translation provided by CCPIT.
Notice of Allowance dated Jun. 11, 2007 from Related U.S. Appl. No. 10/916,222.
Office Action dated Jun. 27, 2007 from Related U.S. Appl. No. 11/417,557 (Kates.012DV1).
First Office Action from the Patent Office of the People's Republic of China regarding Application No. 200510005907.8, dated Jun. 29, 2007.
Office Action dated Jul. 11, 2007 from Related U.S. Appl. No. 11/417,609 (Kates.021 DV1).
Office Action dated Jul. 11, 2007 from Related U.S. Appl. No. 11/417,701 (Kates.020DV1).
Final Office Action regarding U.S. Appl. No. 09/977,552, dated Jul. 23, 2007.
Notice of Allowance dated Jul. 25, 2007 from Related U.S. Appl. No. 10/916,223 (Kates.003A).
Office Action dated Aug. 17, 2007 from Related U.S. Appl. No. 11/417,609.
Office Action dated Aug. 17, 2007 from Related U.S. Appl. No. 11/417,701.
Office Action dated Aug. 21, 2007 from Related U.S. Appl. No. 11/417,557.
Office Action dated Sep. 18, 2007 from Related U.S. Appl. No. 11/130,562.
Office Action regarding U.S. Appl. No. 11/098,582, dated Sep. 21, 2007.
International Search Report and Written Opinion of the International Searching Authority regarding International Application No. PCT/US06/33702, dated Sep. 26, 2007.
International Search Report, Int'l. App. No. PCT/US 06/05917, dated Sep. 26, 2007.
Written Opinion of the International Searching Authority, Int'l. App. No. PCT/US 06/05917, dated Sep. 26, 2007.
Office Action regarding U.S. Appl. No. 11/120,166, dated Oct. 2, 2007.
International Search Report for International Application No. PCT/US2007/016135 dated Oct. 22, 2007.
Notice of Allowance dated Oct. 26, 2007 from Related U.S. Appl. No. 10/916,223.
Final Office Action regarding U.S. Appl. No. 10/940,877, dated Nov. 13, 2007.
Notice of Allowance dated Dec. 3, 2007 from Related U.S. Appl. No. 11/130,562.
Notice of Allowance dated Dec. 21, 2007 from Related U.S. Appl. No. 11/417,609.
Office Action regarding U.S. Appl. No. 09/977,552, dated Jan. 11, 2008.
International Search Report for International Application No. PCT/US07/019563, dated Jan. 15, 2008, 3 Pages.
Written Opinion of the International Searching Authority regarding International Application No. PCT/US2007/019563, dated Jan. 15, 2008.
Office Action dated Feb. 15, 2008 from Related U.S. Appl. No. 11/417,557.
Examiner Interview Summary regarding U.S. Appl. No. 10/940,877, dated Mar. 25, 2008.
Office Action regarding U.S. Appl. No. 11/337,918, dated Mar. 25, 2008.
Office Action regarding U.S. Appl. No. 11/098,575, dated Mar. 26, 2008.
Office Action regarding U.S. Appl. No. 11/256,641, dated Apr. 29, 2008.
Office Action regarding U.S. Appl. No. 11/120,166, dated Jun. 5, 2008.
Office Action regarding U.S. Appl. No. 10/940,877, dated Jun. 5, 2008.
Office Action dated Jul. 1, 2008 from Related U.S. Appl. No. 11/927,425.
Office Action regarding U.S. Appl. No. 11/098,582, dated Jul. 7, 2008.
Office Action dated Jul. 16, 2008 from Related U.S. Appl. No. 11/417,701.
Office Action dated Jul. 24, 2008 from Related U.S. Appl. No. 11/417,557.
International Search Report from PCT /US2008/060900, Aug. 4, 2008, 6 pages.
First Office Action issued by the Chinese Patent Office for Application No. 200480015875.3, dated Sep. 5, 2008.
Office Action regarding U.S. Appl. No. 11/098,575, dated Sep. 9, 2008.
Examiner Interview regarding U.S. Appl. No. 11/256,641, dated Sep. 16, 2008.

(56) References Cited

OTHER PUBLICATIONS

Final Office Action regarding U.S. Appl. No. 09/977,552, dated Oct. 22, 2008.
Office Action regarding U.S. Appl. No. 11/337,918, dated Oct. 28, 2008.
Notice of Allowance dated Nov. 3, 2008 from Related U.S. Appl. No. 11/417,701.
Non-Final Office Action regarding U.S. Appl. No. 11/214,179, dated Nov. 5, 2008.
Examiner Interview Summary regarding U.S. Appl. No. 10/940,877, dated Dec. 8, 2008.
International Search Report for International Application No. PCT/US2008/009618, dated Dec. 8, 2008.
Office Action regarding U.S. Appl. No. 10/940,877, dated Dec. 8, 2008.
Written Opinion of International Searching Authority for International Application No. PCT/US2008/009618, dated Dec. 8, 2008.
First Official Report regarding Australian Patent Application No. 2007214381, dated Dec. 12, 2008.
Office Action regarding U.S. Appl. No. 11/120,166, dated Dec. 15, 2008.
Office Action for U.S. Appl. No. 11/497,644, dated Dec. 19, 2008.
Office Action for U.S. Appl. No. 11/394,380, dated Jan. 6, 2009.
Office Action dated Jan. 18, 2006 from Related U.S. Appl. No. 11/130,871 (Kates.002A).
Office Action regarding U.S. Appl. No. 11/098,575, dated Jan. 29, 2009.
Interview Summary regarding U.S. Appl. No. 11/214,179, dated Jan. 30, 2009.
Final Office Action regarding U.S. Appl. No. 11/256,641, dated Feb. 2, 2009.
Office Action dated Feb. 3, 2009 from Related U.S. Appl. No. 11/866,295.
International Search Report for International Application No. PCT/US2008/012362, dated Feb. 12, 2009.
Office Action dated Feb. 13, 2009 from Related U.S. Appl. No. 12/033,765.
Office Action dated Feb. 13, 2009 from Related U.S. Appl. No. 12/050,821.
Notice of Allowance and Fees Due and Notice of Allowability regarding U.S. Appl. No. 11/098,582, dated Feb. 24, 2009.
Second Office Action issued by the Chinese Patent Office for Application No. 200480015875.3, dated Feb. 27, 2009.
International Preliminary Report on Patentability regarding International Application No. PCT/US2007/019563 dated Mar. 10, 2009.
Written Opinion of the International Searching Authority for International Application No. PCT/US2008/012364 dated Mar. 12, 2009.
International Search Report for International Application No. PCT/US2008/012364 dated Mar. 13, 2009.
Final Office Action regarding U.S. Appl. No. 10/940,877, dated Apr. 27, 2009.
Office Action dated May 6, 2009 from Related U.S. Appl. No. 11/830,729.
Notice of Allowance and Fees Due and Notice of Allowability regarding U.S. Appl. No. 11/256,641, dated May 19, 2009.
Final Office Action regarding U.S. Appl. No. 11/214,179, dated May 29, 2009.
Office Action dated Jun. 17, 2009 from Related U.S. Appl. No. 12/033,765.
Office Action dated Jun. 19, 2009 from Related U.S. Appl. No. 11/866,295.
Second Office action issued by the Chinese Patent Office dated Jun. 19, 2009 regarding Application No. 200510005907.8, translation provided by CCPIT Patent and Trademark Law Office.
Third Office Action issued by the Chinese Patent Office on Jun. 19, 2009 regarding Application No. 200580013451.8, translated by CCPIT Patent and Trademark Law Office.
Second Office Action received from the Chinese Patent Office dated Jun. 26, 2009 regarding Application No. 200480011463.2, translated by CCPIT Patent and Trademark Law Office.
Office Action for U.S. Appl. No. 11/497,644, dated Jul. 10, 2009.
Office Action regarding U.S. Appl. No. 11/098,575, dated Jul. 13, 2009.
Office Action regarding U.S. Appl. No. 11/120,166, dated Jul. 20, 2009.
Notice of Panel Decision from Pre-Appeal Brief Review regarding U.S. Appl. No. 09/977,552, dated Aug. 4, 2009.
Office Action regarding U.S. Appl. No. 11/098,582, dated Aug. 4, 2009.
Office Action regarding U.S. Appl. No. 11/337,918, dated Aug. 17, 2009.
Advisory Action regarding U.S. Appl. No. 11/214,179, dated Aug. 28, 2009.
Notice of Allowance regarding U.S. Appl. No. 10/940,877, dated Sep. 4, 2009.
Office Action regarding U.S. Appl. No. 11/394,380, dated Sep. 25, 2009.
Advisory Action Before the Filing of an Appeal Brief regarding U.S. Appl. No. 11/098,575, dated Sep. 28, 2009.
Office Action for U.S. Appl. No. 11/497,579, dated Oct. 27, 2009.
Examination Report received from Australian Government IP Australia dated Oct. 29, 2009 regarding patent application No. 2008202088.
Second Official Report regarding Australian Patent Application No. 2007214381, dated Oct. 30, 2009.
Advisory Action Before the Filing of an Appeal Brief regarding U.S. Appl. No. 11/098,575, dated Nov. 16, 2009.
Supplementary European Search Report regarding Application No. PCT/US2006/005917, dated Nov. 23, 2009.
Examiner-Initiated Interview Summary regarding U.S. Appl. No. 11/214,179, dated Dec. 11, 2009.
Examiner's Answer regarding U.S. Appl. No. 09/977,552, dated Dec. 17, 2009.
First Office Action issued by the Chinese Patent Office regarding Application No. 200780030810.X dated Dec. 25, 2009.
Non-Final Office Action for U.S. Appl. No. 11/098,575 dated Jan. 27, 2010.
Office Action regarding U.S. Appl. No. 11/497,644, dated Jan. 29, 2010.
Restriction Requirement regarding U.S. Appl. No. 11/214,179, dated Feb. 2, 2010.
Final Office action regarding U.S. Appl. No. 11/337,918, dated Feb. 4, 2010.
Office Action regarding U.S. Appl. No. 11/120,166, dated Feb. 17, 2010.
Office Action regarding U.S. Appl. No. 11/098,582 dated Mar. 3, 2010.
International Preliminary Report on Patentability for International Application No. PCT/US2008/009618, dated Mar. 24, 2010.
Interview Summary regarding U.S. Appl. No. 11/098,582, dated Apr. 27, 2010.
International Preliminary Report on Patentability for International Application No. PCT/US2008/012362, dated May 4, 2010.
International Preliminary Report on Patentability for International Application No. PCT/US2008/012364, dated May 4, 2010.
Interview Summary regarding U.S. Appl. No. 11/497,644, dated May 4, 2010.
Final Office Action regarding U.S. Appl. No. 11/497,579, dated May 14, 2010.
Non-Final Office Action regarding U.S. Appl. No. 11/214,179, dated Jun. 8, 2010.
Office Action regarding U.S. Appl. No. 11/497,644, dated Jun. 14, 2010.
Supplementary European Search Report regarding European Application No. EP06790063, dated Jun. 15, 2010.
First Office Action from The State Intellectual Property Office of the People's Republic of China regarding Chinese Patent Application No. 200890100287.3, issued Oct. 25, 2010. Translation provided by Unitalen Attorneys at Law.
Interview Summary regarding U.S. Appl. No. 11/497,579, dated Jul. 15, 2010.
Examiner Interview Summary regarding U.S. Appl. No. 11/394,380, dated Jul. 29, 2010.

(56) References Cited

OTHER PUBLICATIONS

Second Office Action regarding Chinese Patent Application No. 200780030810X, dated Aug. 4, 2010. English translation provided by Unitalen Attorneys at Law.
Non-Final Office Action mailed Aug. 13, 2010 for U.S. Appl. No. 12/054,011.
Office Action regarding U.S. Appl. No. 11/850,846, dated Aug. 13, 2010.
Office Action regarding U.S. Appl. No. 11/776,879, dated Sep. 17, 2010.
Notice of Allowance and Fees Due and Notice of Allowability regarding U.S. Appl. No. 11/098,582, dated Sep. 24, 2010.
First Office Action regarding Chinese Patent Application No. 200780032977.X, dated Sep. 27, 2010. English translation provided by Unitalen Attorneys at Law.
Final Office Action mailed Dec. 7, 2010 for U.S. Appl. No. 12/054,011.
Final Office Action regarding U.S. Appl. No. 11/497,644, dated Dec. 22, 2010.
First Office Action regarding Chinese Patent Application No. 201010117657.8, dated Dec. 29, 2010. English translation provided by Unitalen Attorneys at Law.
International Search Report regarding Application No. PCT/US2010/036601, mailed Dec. 29, 2010.
Written Opinion of the International Searching Authority regarding Application No. PCT/US2010/036601, mailed Dec. 29, 2010.
Official Action regarding Australian Patent Application No. 2008325240, dated Jan. 19, 2011.
Non-Final Office Action regarding U.S. Appl. No. 11/214,179, dated Jan. 24, 2011.
Non-Final Office Action regarding U.S. Appl. No. 12/261,643, dated Jan. 27, 2011.
Second Office Action regarding Chinese Patent Application No. 200890100287.3, dated Jan. 27, 2011. English translation provided by Unitalen Attorneys at Law.
Examiner's First Report on Australian Patent Application No. 2008319275, dated Jan. 31, 2011.
Final Office Action regarding U.S. Appl. No. 11/337,918, dated Feb. 17, 2011.
Non-Final Office Action mailed Mar. 3, 2011 for U.S. Appl. No. 12/054,011.
Notice of Allowance regarding U.S. Appl. No. 12/685,424, dated Apr. 25, 2011.
First Office Action regarding Chinese Application No. 200880106319.5, dated May 25, 2011. English translation provided by Unitalen Attorneys at Law.
Communication from European Patent Office concerning Substantive Examination regarding European Patent Application No. 06790063.9, dated Jun. 6, 2011.
International Search Report regarding Application No. PCT/US2010/056315, mailed Jun. 28, 2011.
Final Office Action for U.S. Appl. No. 12/054,011, dated Jun. 30, 2011.
Final Office Action regarding U.S. Appl. No. 12/261,643, dated Jul. 7, 2011.
Final Office Action regarding U.S. Appl. 11/214,179, dated Jul. 21, 2011.
Office Action regarding U.S. Appl. No. 12/261,677, dated Aug. 4, 2011.
Third Office Action regarding Chinese Application No. 2005100059078 from the State Intellectual Property Office of People's Republic of China, dated Aug. 24, 2011. Translation provided by Unitalen Attorneys at Law.
Non-Final Office Action for U.S. Appl. No. 12/054,011, dated Oct. 20, 2011.
Office Action regarding U.S. Appl. No. 12/261,643, dated Nov. 2, 2011.
Notice of Allowance and Fees Due, Interview Summary and Notice of Allowability regarding U.S. Appl. No. 11/214,179, dated Nov. 23, 2011.
Notice of Allowance regarding U.S. Appl. No. 12/261,677, dated Dec. 15, 2011.
Examiner's First Report on Australian Patent Application No. 2007292917 dated Jan. 10. 2012.
Non-Final Office Action in U.S. Appl. No. 12/685,375, mailed Jan. 19, 2012.
Office Action regarding U.S. Appl. No. 12/261,643, dated Feb. 15, 2012.
Examiner's Report No. 2 regarding Australian Patent Application No. 2008325240, dated Mar. 5, 2012.
Issue Notification regarding U.S. Appl. No. 11/214,179, dated Mar. 14, 2012.
Non-Final Office Action for U.S. Appl. No. 11/776,879, dated Mar. 16, 2012.
Office Action regarding U.S. Appl. No. 13/303,286, dated Mar. 26, 2012.
Non-Final Office Action for U.S. Appl. No. 12/054,011, dated Apr. 10, 2012.
Non-Final office Action regarding U.S. Appl. No. 11/850,846, dated Apr. 24, 2012.
First Office Action regarding Chinese Patent Application No. 200910211779.0, dated May 3, 2012. English translation provided by Unitalen Attorneys at Law.
International Preliminary Report on Patentability regarding Application No. PCT/US2010/056315, mailed May 24, 2012.
Non-Final Office Action regarding U.S. Appl. No. 13/176,021, dated May 8, 2012.
Non-Final Office Action regarding U.S. Appl. No. 13/435,543, dated Jun. 21, 2012.
Final Office Action regarding U.S. Appl. No. 12/261,643, dated Jun. 27, 2012.
Notice of Allowance regarding U.S. Appl. No. 11/776,879, dated Jul. 9, 2012.
Notice of Allowance regarding U.S. Appl. No. 13/303,286, dated Jul. 19, 2012.
Patent Examination Report No. 3 regarding Australian Patent Application No. 2008325240, dated Jul. 19, 2012.
Non-Final Office Action for U.S. Appl. No. 12/685,375, mailed Aug. 6, 2012.
Final Office Action for U.S. Appl. No. 11/850,846, mailed Aug. 13, 2012.
Non-Final Office Action regarding U.S. Appl. No. 12/955,355, dated Sep. 11, 2012.
Notice of Allowance and Fee(s) Due regarding U.S. Appl. No. 12/789,562, dated Oct. 26, 2012.
European Search Report for Application No. EP 12 182 243.1, dated Oct. 29, 2012.
Extended European Search Report regarding Application No. 12182243.1-2311, dated Oct. 29, 2012.
Non-Final Office Action for U.S. Appl. No. 13/030,549, dated Nov. 5, 2012.
Notification of First Office Action from the State Intellectual Property Office of People's Republic of China regarding Chinese Patent Application No. 200880122964.6, dated Nov. 5, 2012. Translation provided by Unitalen Attorneys at Law.
Record of Oral Hearing regarding U.S. Appl. No. 09/977,552, dated Nov. 29, 2012.
Non-Final Office Action regarding U.S. Appl. No. 12/943,626, dated Dec. 20, 2012.
First Examination Report regarding Australian Patent Application No. 2010319488, dated Jan. 10, 2013.
Second Office Action regarding Chinese Patent Application No. 200910211779.0, dated Feb. 4, 2013. English translation provided by Unitalen Attorneys at Law.
Non-Final Office Action regarding U.S. Appl. No. 12/261,643, dated Mar. 12, 2013.
International Search Report regarding Application No. PCT/US2013/021161, mailed May 8, 2013.
Written Opinion of the International Searching Authority regarding Application No. PCT/US2013/021161, mailed May 8, 2013.
Non-Final Office Action in U.S. Appl. No. 11/850,846, mailed May 24, 2013.

(56) References Cited

OTHER PUBLICATIONS

Non-Final Office Action in U.S. Appl. No. 13/784,890, mailed Jun. 11, 2013.
Non-Final Office Action regarding U.S. Appl. No. 13/770,123, dated Jul. 3, 2013.
First Office Action regarding Canadian Patent Application No. 2,777,349, dated Jul. 19, 2013.
Third Office Action regarding Chinese Patent Application No. 200910211779.0, dated Sep. 4, 2013. English translation provided by Unitalen Attorneys at Law.
Final Office Action regarding U.S. Appl. No. 12/261,643, dated Sep. 16, 2013.
First Examination Report regarding Australian Patent Application No. 2012241185, dated Sep. 27, 2013.
Notice of Grounds for Refusal regarding Korean Patent Application No. 10-2009-7000850, mailed Oct. 4, 2013. English translation provided by Y.S. Chang & Associates.
Final Office Action regarding U.S. Appl. No. 13/770,123, dated Nov. 15, 2013.
First Office Action regarding Chinese Patent Application No. 201110349785.X, dated Nov. 21, 2013, and Search Report. English translation provided by Unitalen Attorneys at Law.
Advisory Action regarding U.S. Appl. No. 12/261,643, dated Nov. 22, 2013.
Non-Final Office Action regarding U.S. Appl. No. 13/932,611, mailed Nov. 25, 2013.
Office Action regarding U.S. Appl. No. 13/737,566, dated Dec. 20, 2013.
Final Office Action regarding U.S. Appl. No. 13/784,890, mailed Dec. 30, 2013.
Fourth Office Action regarding Chinese Patent Application No. 200910211779.0, dated Jan. 6, 2014. English translation provided by Unitalen Attorneys at Law.
European Search Report regarding Application No. 07811712.4-1608/2069638 PCT/US2007019563, dated Jan. 7, 2014.
Non-Final Office Action regarding U.S. Appl. No. 13/770,479, dated Jan. 16, 2014.
Final Office Action regarding U.S. Appl. No. 11/850,846, mailed Jan. 17, 2014.
International Search Report for PCT/US2012/026973, Sep. 3, 2012, 5 pages.
International Search Report for PCT/US2013/061389, Jan. 22, 2014, 7 pages.
Non Final Office Action from related U.S. Appl. No. 13/269,188 dated Oct. 4, 2013; 11 pages.
Restriction from related U.S. Appl. No. 13/269,188 dated Apr. 9, 2013; 5 pages.
Non Final Office Action from related U.S. Appl. No. 13/269,188 dated Aug. 14, 2012; 9 pages.
Non Final Office Action from related U.S. Appl. No. 13/269,188 dated Jul. 17, 2014; 10 pages.
Non Final Office Action from related U.S. Appl. No. 13/269,188 dated Feb. 20, 2014; 9 pages.
Final Office Action from related U.S. Appl. No. 13/269,188 dated May 23, 2012; 11 pages.
Non Final Office Action from related U.S. Appl. No. 13/767,479 dated Oct. 24, 2013; 8 pages.
Final Office Action from related U.S. Appl. No. 13/767,479 dated Mar. 14, 2014; 6 pages.
Non Final Office Action from related U.S. Appl. No. 13/835,742 dated Oct. 7, 2013; 9 pages.
Notice of Allowance from related U.S. Appl. No. 13/835,742 dated Jan. 31, 2014; 7 pages.
Notice of Allowance from related U.S. Appl. No. 13/835,742 dated Jun. 2, 2014; 8 pages.
Non Final Office Action from related U.S. Appl. No. 13/835,810 dated Nov. 15, 2013; 9 pages.
Notice of Allowance from related U.S. Appl. No. 13/835,810 dated Mar. 20, 2014; 9 pages.
Non Final Office Action from related U.S. Appl. No. 13/835,621 dated Oct. 30, 2013; 8 pages.
Non Final Office Action from related U.S. Appl. No. 13/835,621 dated Apr. 2, 2014; 11 pages.
Non Final Office Action from related U.S. Appl. No. 13/836,043 dated Oct. 23, 2013; 8 pages.
Final Office Action from related U.S. Appl. No. 13/836,043 dated Mar. 12, 2014; 5 pages.
Non Final Office Action from related U.S. Appl. No. 13/836,043 dated Jul. 11, 2014; 5 pages.
Non Final Office Action from related U.S. Appl. No. 13/836,244 dated Oct. 15, 2013; 11 pages.
Non Final Office Action from related U.S. Appl. No. 13/836,244 dated Feb. 20, 2014; 10 pages.
Notice of Allowance from related U.S. Appl. No. 13/836,244 dated Jul. 2, 2014; 8 pages.
Non Final Office Action from related U.S. Appl. No. 13/836,453 dated Aug. 20, 2013; 8 pages.
Notice of Allowance from related U.S. Appl. No. 13/836,453 dated Jan. 14, 2014; 8 pages.
Notice of Allowance from related U.S. Appl. No. 13/836,453 dated Apr. 21, 2014; 8 pages.
Non Final Office Action from related U.S. Appl. No. 13/369,067 dated Jan. 16, 2014; 16 pages.
Final Office Action from related U.S. Appl. No. 13/369,067 dated May 1, 2014; 19 pages.
Non Final Office Action from related U.S. Appl. No. 13/767,479 dated Jul. 23, 2014; 9 pages.
Final Office Action regarding U.S. Appl. No. 13/932,611, mailed May 28, 2014.
Supplementary European Search Report regarding Application No. EP 07 81 1712, dated Jan. 7, 2014.
Notice of Allowance and Fees Due regarding U.S. Appl. No. 12/261,643, dated Jun. 23, 2014.
Extended European Search Report regarding Application No. 07796879.0-1602/2041501 PCT/US2007016135, dated Jul. 14, 2014.
Interview Summary from related U.S. Appl. No. 12/054,011 dated Jan. 30, 2012.
Written Opinion from related PCT Application No. PCT/US2014/028074 mailed Jun. 19, 2014.
Advisory Action from related U.S. Appl. No. 13/784,890 dated Mar. 14, 2014.
International Search Report from related PCT Application No. PCT/US2014/028074 mailed Jun. 19, 2014.
Examiner's Answer from related U.S. Appl. No. 13/784,890 dated Jul. 3, 2014.
Notice of Allowance for related U.S. Appl. No. 13/835,810 dated Aug. 5, 2014.
Non Final Office Action for related U.S. Appl. No. 13/369,067 dated Aug. 12, 2014.
Notice of Allowance from related U.S. Appl. No. 13/836,453 dated Aug. 4, 2014.
Non Final Office Action for related U.S. Appl. No. 13/835,621 dated Aug. 8, 2014.
Trane EarthWise™ CenTra Vac™ Water-Cooled Liquid Chillers 165-3950 Tons 50 and 60 Hz; CTV PRC007-En; Oct. 2002; 56 pages.
Final Office Action regarding U.S. Appl. No. 11/098,575, dated Jun. 17, 2010.
Building Environmental Control (BEC) Installation and Operation Manual, Computer Process Controls, Jan. 5, 1998.
European Search Report for Application No. EP 04 81 5853, dated Jul. 17, 2007, 2 Pages.
European Search Report for Application No. EP 06 02 6263, dated Jul. 17, 2007, 4 Pages.
Second Office Action issued by the Chinese Patent Office on Mar. 6, 2009 regarding Application No. 200580013451.8, 7 Pages.
International Search Report and Written Opinion of the ISA regarding International Application No. PCT/US2014/032927, ISA/KR dated Aug. 21, 2014.
Notice of Allowance and Fees Due regarding U.S. Appl. No. 12/943,626, dated Jun. 19, 2014.

(56) References Cited

OTHER PUBLICATIONS

Fourth Office Action from the State Intellectual Property Office of People's Republic of China regarding Chinese Patent Application No. 200510005907.8, dated Dec. 8, 2011. Translation provided by Unitalen Attorneys at Law.
European Search Report regarding Application No. 04022784.5-2315/1500821, dated Aug. 14, 2012.
Notice of Allowance and Fees Due regarding U.S. Appl. No. 13/737,566, dated Jun. 18, 2014.
Non-Final Office Action regarding U.S. Appl. No. 13/770,123, dated Jun. 11, 2014.
Notice of Allowance for related U.S. Appl. No. 13/836,043, dated Oct. 9, 2014.
Notice of Allowance for related U.S. Appl. No. 13/836,244, dated Oct. 30, 2014.
Office Action for related U.S. Appl. No. 13/269,188, dated Oct. 6, 2014.
Office Action for related U.S. Appl. No. 13/767,479, dated Oct. 21, 2014.
International Search Report and Written Opinion for related PCT Application No. PCT/US2014/028859, dated Aug. 22, 2014.
Non Final Office Action for U.S. Appl. No. 13/407,180, dated Dec. 2, 2014.
Notice of Allowance and Fees Due regarding U.S. Appl. No. 13/737,566, dated Sep. 24, 2014.
Second Office Action from the State Intellectual Property Office of People's Republic of China regarding Chinese Patent Application No. 201110349785.X, dated Jul. 25, 2014. Translation provided by Unitalen Attorneys at Law.
Examiner's Report No. 1 regarding Australian Patent Application No. 2013202431, dated Nov. 25, 2014.
Patent Examination Report for Australian Application No. 2012223466 dated Jan. 6, 2015.
Notice of Allowance for U.S Appl. No. 13/835,742 dated Dec. 24, 2014.
Notice of Allowance for U.S Appl. No. 13/835,810 date Jan. 2, 2015.
Notice of Allowance for U.S Appl. No. 13/836,453 dated Dec. 24, 2014.
Office Action for U.S Appl. No. 13/835,621 dated Dec. 29, 2014.
Final Office Action for U.S. Appl. No. 13/770,123 dated Dec. 22, 2014.
Notice of Allowance for U.S. Appl. No. 13/836,043 dated Feb. 4, 2015.
Office Action for U.S. Appl. No. 13/767,479 dated Feb. 6, 2015.
Office Action for U.S. Appl. No. 13/269,188 dated Feb. 10, 2015.
Office Action for Canadian Application No. 2,828,740 dated Jan. 12, 2015.
Third Chinese Office Action regarding Application No. 201110349785.X, dated Jan. 30, 2015. Translation provided by Unitalen Attorneys at Law.
Non-Final Office Action regarding U.S. Appl. No. 13/932,611, dated Jan. 30, 2015.
Notice of Allowance regarding U.S. Appl. No. 13/835,621, dated Mar. 10, 2015.
Interview Summary regarding U.S. Appl. No. 13/269,188, mailed Mar. 18, 2015.
Final Office Action and Interview Summary regarding U.S. Appl. No. 13/407,180, mailed Mar. 13, 2015.
Office Action regarding U.S. Appl. No. 13/770,479, mailed Mar. 16, 2015.
Office Action regarding U.S. Appl. No. 13/770,123, mailed Apr. 2, 2015.
Notice of Allowance regarding U.S. Appl. No. 13/767,479, dated Mar. 31, 2015.
Office Action from U.S. Appl. No. 13/369,067 dated Apr. 3, 2015.
Haiad et al., "EER & SEER As Predictors of Seasonal Energy Performance ", Oct. 2004, Southern California Edison, http://www.doe2.com/download/Deer/Seer%2BProgThermostats/EER-SEER_CASE_ProjectSummary_Oct2004_V6a.pdf.
First Office Action issued by the Chinese Patent Office on May 30, 2008 regarding Application No. 200580013451.8, 8 Pages. Translation provided by CCPIT Patent and Trademark Law Office.
Office Action regarding Chinese Patent Application No. 201480016023.X, dated Jun. 22, 2016. Translation provided by Unitalen Attorneys at Law.
Interview Summary regarding U.S. Patent Application No. 14/617,451, dated Jul. 28, 2016.
Office Action regarding U.S. Appl. No. 14/208,636, dated Aug. 4, 2016.
Advisory Action regarding U.S. Appl. No. 14/193,568, dated Aug. 10, 2016.
Office Action regarding U.S. Appl. No. 14/727,756, dated Aug. 22, 2016.
Office Action regarding U.S. Appl. No. 14/244,967, dated Aug. 29, 2016.
Office Action regarding U.S. Appl. No. 13/770,479, dated Sep. 7, 2016.
Office Action regarding U.S. Appl. No. 15/096,196, dated Sep. 13, 2016.
Office Action regarding Canadian Patent Application No. 2,904,734, dated Sep. 13, 2016.
Office Action regarding U.S. Appl. No. 14/300,782, dated Sep. 30, 2016.
Office Action regarding U.S. Appl. No. 14/255,519, dated Oct. 5, 2016.
Office Action regarding Australian Patent Application No. 2015255255, dated Sep. 8, 2016.
Office Action regarding Canadian Patent Application No. 2,908,362, dated Sep. 21, 2016.
Search Report regarding European Patent Application No. 14764311.8, dated Oct. 27, 2016.
Search Report regarding European Patent Application No. 14763232.7, dated Oct. 27, 2016.
Office Action regarding U.S. Appl. No. 12/943,626, dated Nov. 4, 2016.
Louis Goodman et al. "Vertical Motion of Neutrally Buoyant Floats." Journal of Atmospheric and Oceanic Technology. vol. 7. Feb. 1990.
Search Report regarding European Patent Application No. 14780284.7, dated Nov. 2, 2016.
Office Action regarding U.S. Appl. No. 14/080,473, dated Nov. 16, 2016.

\* cited by examiner

FIG. 12A

| Fault | Description | Indoor Current (A) | Indoor Current FFT | Indoor Voltage (V) | Indoor Power Factor | Indoor Power (kW) | Inside Module Temp (°F) | Outdoor Current (A) | Outdoor Voltage (V) | Outdoor Power Factor | Outdoor Power (kW) | Outdoor Current FFT | Supply Air Temp (°F) | Return Air Temp (°F) | Supply - Liquid (°F) | Suction Line Temp (°F) | Supply-Return Pressure (in H2O) | Outside Module Temp (°F) | Call for Cool (Y) Status | Call for Heat (W) Status | Call for Fan (G/G2) Status | Reversing Valve O/B Status | Call for Stage 2 Cool (Y2) Status | Call for Stage 2 Heat (W2) Status | Outside Air Temp (°F) | Mass Flow (lb/s) | Humidity (% Rel) | Tstat Temp (°F) | Tstat Command States | General Purpose Sensor Input |
|---|---|---|---|---|---|---|---|---|---|---|---|---|---|---|---|---|---|---|---|---|---|---|---|---|---|---|---|---|---|---|
| Electric Heater Start Fault - Electrical | Variation from baseline too high | x | x | | | | | | | | | | | | | | | | | x | | | | x | | | | | | |
| | For a given W/W2 pattern, the indoor current measurements indicate that the electric heater fails to timely track the established baseline current signature. | | | | | | | | | | | | | | | | | | | | | | | | | | | | | |
| | Predict fault based on increasing frequency of delayed staging. | | | | | | | | | | | | | | | | | | | | | | | | | | | | | |
| Electric Heater Tripping - Electrical | Differential values exceed high limit over time | x | x | | | | | | | | | | | | | | | | | x | | | | x | | | | | | |
| | For a given W/W2 pattern, the indoor current measurements indicate that the electric heater fails to sustain the achieved current amplitude level through its stages. | | | | | | | | | | | | | | | | | | | | | | | | | | | | | |
| | Predict fault based on increasing frequency of delayed staging. | | | | | | | | | | | | | | | | | | | | | | | | | | | | | |
| Heating Fault | Value does not exceed low limit | | | y | | | | | | | | | x | x | | | | | | x | | | | x | | | | | | |
| | For a given W/W2 pattern, the split indoor temperature measurements lack an indication of heating. | | | y | | | | | | | | | x | x | | | | | | x | | | | x | | | | | | |
| Heating Shutdown | Value falls below differential limit during run | | | y | | | | | | | | | x | | | | | | | x | | | | x | | | | | | |
| | For a given W/W2 pattern, the split indoor temperature measurements indicates that furnace fails to sustain the achieved temperature. | | | y | | | | | | | | | x | | | | | | | x | | | | | | | | | | |
| | Predict fault based on increasing frequency shutdowns. | | | | | | | | | | | | | x | | | | | | | | | | x | | | | | | |

FIG. 12B

| | Indoor Current (A) | Indoor Current FFT | Indoor Voltage (V) | Indoor Power Factor | Indoor Power (kW) | Inside Module Temp (°F) | Outdoor Current (A) | Outdoor Voltage (V) | Outdoor Power Factor | Outdoor Power (kW) | Outdoor Current FFT | Supply Air Temp (°F) | Return Air Temp (°F) | Supply - Liquid (°F) | Suction Line Temp (°F) | Supply-Return Pressure (in H2O) | Outside Module Temp (°F) | Call for Cool (Y) Status | Call for Heat (W) Status | Call for Fan (G/G2) Status | Reversing Valve O/B Status | Call for Stage 2 Cool (Y2) Status | Call for Stage 2 Heat (W2) Status | Outside Air Temp (°F) | Mass Flow (lb/s) | Humidity (% Rel) | Tstat Temp (°F) | Tstat Command States | General Purpose Sensor Input |
|---|---|---|---|---|---|---|---|---|---|---|---|---|---|---|---|---|---|---|---|---|---|---|---|---|---|---|---|---|---|
| Furnace Restart | | | | | | | | | | | | | | | | | | | | | | | | | | | | | |
| Variation from baseline too high | x | x | y | | | | | | | | | | | | | | | | x | | | | x | | | | | | |
| For a given W/W2 pattern, the indoor current measurements provides estimates of the sequence of the operational states from which a furnace restart condition is inferred. | | | | | | | | | | | | | | | | | | | x | | | | | | | | | | |
| Predict fault based on increasing frequency shutdowns. | x | | | | | | | | | | | | | | | | | | | | | | | | | | | | |
| Overheating | | | | | | | | | | | | | | | | | | | | | | | | | | | | | |
| Variation from baseline too high | | | | | | | | | | | | x | x | | | | | | x | | | | x | | | | | | |
| For a given W/W2 pattern, the split indoor temperature measurements indicate upward deviation from baseline. | | | | | | | | | | | | x | x | | | | | | x | | | | | | | | | | |
| Flame Roll Out Switch | | | | | | | | | | | | | | | | | | | | | | | | | | | | | |
| Loss of heating | x | | y | | | | | | | | | | | | | | | | x | x | | | | | | | | | |
| Specific timing of heat cycle interruption indicates trip of FRS. | x | | y | | | | | | | | | | | | | | | | x | x | | | | | | | | | |
| Blower Fault | | | | | | | | | | | | | | | | | | | | | | | | | | | | | |
| Variation from baseline too high | x | x | y | | | | | | | | | x | | | | x | | | x | x | | | x | | x | | | | |
| Differential values exceed limits over time | | | | x | | | | | | | | x | x | | | x | | | | | | | | | x | | | | |
| For a given pattern of G, W, W2, current measurement indicates deviation from the baseline current signature. Differential pressure measurement also indicates reduction from baseline. | | | | x | | | | | | | | | | | | | | | x | x | | | | | x | | | | |
| Predict fault based on increasing deviation. | x | x | y | | | | | | | | | | | | | x | | | | | | | | | x | | | | |

FIG. 12C

| | Indoor Current (A) | Indoor Current FFT | Indoor Voltage (V) | Indoor Power Factor | Indoor Power (kW) | Inside Module Temp (°F) | Outdoor Current (A) | Outdoor Voltage (V) | Outdoor Power Factor | Outdoor Power (kW) | Outdoor Current FFT | Supply Air Temp (°F) | Return Air Temp (°F) | Supply-Liquid (°F) | Suction Line Temp (°F) | Supply-Return Pressure (in H₂O) | Outside Module Temp (°F) | Call for Cool (Y) Status | Call for Heat (W) Status | Call for Fan (G/G2) Status | Reversing Valve O/B Status | Call for Stage 2 Cool (Y2) Status | Call for Stage 2 Heat (W2) Status | Outside Air Temp (°F) | Mass Flow (lb/s) | Humidity (% Rel) | Tstat Temp (°F) | Tstat Command States | General Purpose Sensor Input |
|---|---|---|---|---|---|---|---|---|---|---|---|---|---|---|---|---|---|---|---|---|---|---|---|---|---|---|---|---|---|
| Permanent-Split Capacitor Motor Fault | | | | | | | | | | | | | | | | | | | | | | | | | | | | | |
| Variation from baseline too high | x | x | | | x | | | | | | | | | | | x | | | x | x | | | x | | x | | | | |
| Differential values exceed high limit | x | | | | x | | | | | | | | | | | x | | | | | | | | | x | | | | |
| For a given pattern of G, W, W2, blower current steady state measurements reach toward the level of blower transient overshoot. Differential pressure measurements show reduction from baseline. | | | | | | | | | | | | | | | | | | | | | | | | | | | | | |
| Predict fault based on increasing deviation. | x | | | x | | | | | | | | x | x | | | | | | x | | | | x | | | | | | |
| Spark Ignition Fault | | | | | | | | | | | | | | | | | | | | | | | | | | | | | |
| Variation from baseline too high | x | x | y | | x | | | | | | | | | | | x | | | | | | | | | x | | | | |
| Upon the start of a heating cycle, the presence of sparker is detected by classifying the indoor current spectral pattern at the sparker center frequency along the time segment between the occurrences of inducer fan and blower. The classification is performed against the baseline sparker spectral signature. The start of a heating cycle is identified based on the control lines W or W2, or by the occurrence of a furnace restart. Absence or retry can be detected. Temperatures may be used to verify that ignition did not occur. | | | | | | | | | | | | | | | | | | | | | | | | | | | | | |

FIG. 12D

| Fault / Description | Indoor Current (A) | Indoor Current FFT | Indoor Voltage (V) | Indoor Power Factor | Indoor Power (kW) | Inside Module Temp (°F) | Outdoor Current (A) | Outdoor Voltage (V) | Outdoor Power Factor | Outdoor Power (kW) | Outdoor Current FFT | Supply Air Temp (°F) | Return Air Temp (°F) | Supply - Liquid (°F) | Suction Line Temp (°F) | Supply-Return Pressure (in H2O) | Outside Module Temp (°F) | Call for Cool (Y) Status | Call for Heat (W) Status | Call for Fan (G/G2) Status | Reversing Valve O/B Status | Call for Stage 2 Cool (Y2) Status | Call for Stage 2 Heat (W2) Status | Outside Air Temp (°F) | Mass Flow (lb/s) | Humidity (% Rel) | Tstat Temp (°F) | Tstat Command States | General Purpose Sensor Input |
|---|---|---|---|---|---|---|---|---|---|---|---|---|---|---|---|---|---|---|---|---|---|---|---|---|---|---|---|---|---|
| Hot Surface Ignition Fault | | | | | | | | | | | | | | | | | | | | | | | | | | | | | |
| Variation from baseline too high | × | × | | | | | | | | | | | | | | | | | | | | | | | | | | | |
| Upon the start of a heating cycle indicated by the control lines W and W2, the presence of ignitor is detected by identifying the states sequence of the heating cycle from the indoor current measurements. The heating state sequence identification is employed to also detect the presence of ignition retries. If the presence of ignitor is detected, the ignitor anomaly is further analyzed by classifying the indoor current pattern against the baseline ignitor current signature. | × | | | | | | | | | | | × | × | | | | | | × | | | | × | | | | | | |
| Predict ignitor fault by detecting increase in drive level as indicated in the current level or FFT, increase in resistance or frequency domain indication of internal arcing. Also react to increasing missed ignitions. | | × | | | | | | | | | | × | × | | | | | | | | | | | | | | | | |
| Inducer Fan Fault | | | | | | | | | | | | | | | | | | | | | | | | | | | | | |
| Variation from baseline too high | × | × | | | | | | | | | | | | | | | | | × | | | | × | | | | | | |
| Upon the start of a heating cycle, inducer fan faults are detected by classifying the indoor current pattern against the baseline current signature. The start of a heating cycle is identified based on the control lines W or W2, or by the occurrence of a furnace restart. | | | | | | | | | | | | | | | | | | | × | | | | × | | | | | | |
| Analysis of FFT to predict faults due to fan strike, water in the housing, bearing issues, etc. | × | | | | | | | | | | | | | | | | | | | | | | | | | | | | |

FIG. 12E

| | Indoor Current (A) | Indoor Current FFT | Indoor Voltage (V) | Indoor Power Factor | Indoor Power (kW) | Inside Module Temp (°F) | Outdoor Current (A) | Outdoor Voltage (V) | Outdoor Power Factor | Outdoor Power (kW) | Outdoor Current FFT | Supply Air Temp (°F) | Return Air Temp (°F) | Supply - Liquid (°F) | Suction Line Temp (°F) | Supply-Return Pressure (in H₂O) | Outside Module Temp (°F) | Call for Cool (Y) Status | Call for Heat (W) Status | Call for Fan (G/G2) Status | Reversing Valve O/B Status | Call for Stage 2 Cool (Y2) Status | Call for Stage 2 Heat (W2) Status | Outside Air Temp (°F) | Mass Flow (lb/s) | Humidity (% Rel) | Tstat Temp (°F) | Tstat Command States | General Purpose Sensor Input |
|---|---|---|---|---|---|---|---|---|---|---|---|---|---|---|---|---|---|---|---|---|---|---|---|---|---|---|---|---|---|
| Fan Pressure Switch Fault | | | | | | | | | | | | | | | | | | | | | | | | | | | | | |
| Variation from baseline too high | x | x | | | | | | | | | | | | | | x | | | x | | | | x | | | | | | |
| No variation | | | | | | | | | | | | | | | | | | | | | | | | | | | | | |
| On a heating cycle indicated by the control lines W and W2, FPS fault is identified based on the indoor current measurements that indicate the occurrence of a furnace start fault or furnace restart without the presences of blower fault and ignition retries. Indoor current FFT measurements provide additional indication of water in the fan housing. | | | | | | | | | | | | | | | | | | | | | | | | | | | | | |
| Increasing frequency of intermittent faults predicts permanent fault. | | | | | | | | | | | | | | | | | | | | | | | | | | | | | |
| Flame Probe Fault | | | | | | | | | | | | | | | | | | | | | | | | | | | | | |
| Variation from baseline too high | x | x | | | | | | | | | | x | x | | | x | | | x | | | | x | | | | | | |
| Differential values exceed high limit over time | x | | | | | | | | | | | x | x | | | x | | | | | | | | | | | | | |
| On a heating cycle indicated by the control lines W and W2, flame probe fault is identified by the occurrence of ignition retries or, a heating shutdown and a furnace restart followed by ignition retries based on the indoor current and split temperature measurements without the indication of blower fault. Indoor current FFT measurements provide differentiation from ignitor or gas valve faults. | | | | | | | | | | | | | | | | | | | | | | | | | | | | | |
| Increasing frequency of intermittent faults predicts final fault. | | | | | | | | | | | | | | | | | | | | | | | | | | | | | |

FIG. 12F

| | Indoor Current (A) | Indoor Current FFT | Indoor Voltage (V) | Indoor Power Factor | Indoor Power (kW) | Inside Module Temp (°F) | Outdoor Current (A) | Outdoor Voltage (V) | Outdoor Power Factor | Outdoor Power (kW) | Outdoor Current FFT | Supply Air Temp (°F) | Return Air Temp (°F) | Supply-Liquid (°F) | Suction Line Temp (°F) | Supply-Return Pressure (in H2O) | Outside Module Temp (°F) | Call for Cool (Y) Status | Call for Heat (W) Status | Call for Fan (G/G2) Status | Reversing Valve O/B Status | Call for Stage 2 Cool (Y2) Status | Call for Stage 2 Heat (W2) Status | Outside Air Temp (°F) | Mass Flow (lb/s) | Humidity (% Rel) | Tstat Temp (°F) | Tstat Command States | General Purpose Sensor Input |
|---|---|---|---|---|---|---|---|---|---|---|---|---|---|---|---|---|---|---|---|---|---|---|---|---|---|---|---|---|---|
| Gas Valve Fault  Call for heating (W/W2), but fault to heat, examine the FFT for the signature of the gas valve. Sequence depends on ignition type. Pressure used to verify fan did not run. | x | x | x | | | | | | | | | | | | | x | | | x | | | | x | | | | | | |
| Frozen Coil  Variation from baseline too high.  Differential values exceed high limit over time.  Voltage, current, FFT and power measurements provide indication of compressor and fan faults.  Directional shifts in temperatures, voltage, current, FFT, PF, and power measurements provide indication of conditions consistent with coil freezing. | x | x | x | x | x | | x | x | x | x | x | x | x | x | x | x | | x | x | | | | | x | | | | | |
| Dirty Filter  Variation from baseline too high.  Changes in power, current, PF dependent on motor type coupled with a decrease in TS and reduced pressure indicate a dirty filter. Mass flow sensor directly indicates flow restriction for PSC motor. | x | | y | x | x | | | | | | | x | x | | | x | | | | | | | | | x | | | | |
| Compressor capacitors  Variation from baseline too high.  Differential values exceed high limit over time.  Rapid change in power factor indicates fault while gradual changes to FFT or power factor indicate a more gradual decline. Outside air temperature factors apply.  FFT analysis of start transition over time predicts capacitor fault | | | | | | | x | x | x | x | x | | | | | | | | | | | | | x | | | | | |

FIG. 12G

| Fault / Condition | Indoor Current (A) | Indoor Current FFT | Indoor Voltage (V) | Indoor Power Factor | Indoor Power (kW) | Inside Module Temp (°F) | Outdoor Current (A) | Outdoor Voltage (V) | Outdoor Power Factor | Outdoor Power (kW) | Outdoor Current FFT | Supply Air Temp (°F) | Return Air Temp (°F) | Supply -Liquid (°F) | Suction Line Temp (°F) | Supply-Return Pressure (in H2O) | Outside Module Temp (°F) | Call for Cool (Y) Status | Call for Heat (W) Status | Call for Fan (G/G2) Status | Reversing Valve O/B Status | Call for Stage 2 Cool (Y2) Status | Call for Stage 2 Heat (W2) Status | Outside Air Temp (°F) | Mass Flow (lb/s) | Humidity (% Rel) | Tstat Temp (°F) | Tstat Command States | General Purpose Sensor Input |
|---|---|---|---|---|---|---|---|---|---|---|---|---|---|---|---|---|---|---|---|---|---|---|---|---|---|---|---|---|---|
| Fan imbalanced bearing or housing strike (circulator or inducer) | | | | | | | | | | | | | | | | | | | | | | | | | | | | | |
| Variation from baseline too high | | × | | | | | | | | | | | | | | | | | | | | | | | | | | | |
| FFT indicates a fan motor shaft, blade, or bearing fault. | | × | | | | | | | | | | | | | | | | | | | | | | | | | | | |
| Fail to cool - 15 minutes | | | | | | | | | | | | | | | | | | | | | | | | | | | | | |
| Differential values exceed limit over time | | | | | | | | | | | | × | × | | | | | | | | | | | | | | | | |
| With a call for cooling (Y), duct supply and return air temperature measurements lack an indication of cooling for more than 15 min. | | | | | | | | | | × | | × | × | | | | | × | | | | × | | | | | | | |
| Fail to cool - 30 minutes | | | | | | | | | | | | | | | | | | | | | | | | | | | | | |
| Differential values exceed limit over time | | | | | | | | | | | | × | × | × | × | | | | | | | | | | | | | | |
| With a call for cooling (Y), duct supply and return air temperature measurements lack an indication of cooling for more than 30 minutes. | | | | | | | | | | × | | × | × | × | × | | | × | | | | × | | | | | | | |
| Low Charge | | | | | | | | | | | | | | | | | | | | | | | | × | | | | | |
| Variation from baseline too high | | | | | | | | | | | | | | | | | | | | | | | | × | | | | | |
| With a call for cooling (Y), duct supply and return air temperature measurements lack enough cooling and suction line/ differential of liquid and outside temperature is high/ low compared to baseline or a limit. Also Outside power may go low. | | | | | | | | | | | | | | × | × | | | × | | | | × | | × | | | | | |

FIG. 12H

| Fault / Description | Indoor Current (A) | Indoor Current FFT | Indoor Voltage (V) | Indoor Power Factor | Indoor Power (kW) | Inside Module Temp (°F) | Outdoor Current (A) | Outdoor Voltage (V) | Outdoor Power Factor | Outdoor Power (kW) | Outdoor Current FFT | Supply Air Temp (°F) | Return Air Temp (°F) | Supply - Liquid (°F) | Suction Line Temp (°F) | Supply-Return Pressure (in H2O) | Outside Module Temp (°F) | Call for Cool (Y) Status | Call for Heat (W) Status | Call for Fan (G/G2) Status | Reversing Valve O/B Status | Call for Stage 2 Cool (Y2) Status | Call for Stage 2 Heat (W2) Status | Outside Air Temp (°F) | Mass Flow (lb/s) | Humidity (% Rel) | Tstat Temp (°F) | Tstat Command States | General Purpose Sensor Input |
|---|---|---|---|---|---|---|---|---|---|---|---|---|---|---|---|---|---|---|---|---|---|---|---|---|---|---|---|---|---|
| High Charge | | | | | | | | | | | | | | | | | | | | | | | | | | | | | |
| Differential values exceed limit over time | | | | | | | | | | x | | | | x | | | | x | | | | x | | x | | | | | |
| Variation from baseline too high | | | | | | | | | | x | | | | x | | | | | | | | | | x | | | | | |
| With a call for cooling (Y), liquid line temperature compared to outside air temperature is small. Differential indoor air temperatures are normal and increase on outdoor power. Differential of liquid and outside temperature is low compared to baseline or a limit. | | | | | | | | | | | | | | | | | | | | | | | | | | | | | |
| Low Indoor Airflow | | | | | | | | | | | | | | | | | | | | | | | | | | | | | |
| Differential values exceed limit over time | | | | | | | | | | x | | x | x | x | x | x | | x | | | | x | | | | | | | |
| Variation from baseline too high | x | | | | | | | | | x | | x | x | x | x | x | | x | | x | | | | | | | | | |
| With a call for cooling (Y) and fan (G), return and supply air differential increases from baseline. Suction line decreases from baseline. Pressure increases. Indoor current deviates from baseline depending upon the motor type. | | | | | | | | | | | | | | | | | | | | | | | | | | | | | |
| Low Outdoor Airflow | | | | | | | | | | | | | | | | | | | | | | | | | | | | | |
| Differential values exceed limit over time | | | | | | | | | | x | | | | x | | | x | x | | | | x | | x | | | | | |
| Variation from baseline too high | | | | | | | | | | x | | | | x | | | x | | | | | | | x | | | | | |
| With a call for cooling (Y), differential of liquid and outside temperature and outdoor current increases from baseline. | | | | | | | | | | | | | | | | | | | | | | | | | | | | | |
| Flow Restriction | | | | | | | | | | | | | | | | | | | | | | | | | | | | | |
| Differential values exceed limit over time | | | | | | | | | | | | x | x | x | | | x | x | | | | x | | x | | | | | |
| Variation from baseline too high | | | | | | | | | | | | x | x | x | | | x | | | | | | | x | | | | | |
| With a call for cooling (Y), return and supply air differentials and liquid line temperature is low. | | | | | | | | | | | | | | | | | | | | | | | | | | | | | |

FIG. 12I

| Fault / Description | General Purpose Sensor Input | Tstat Command States | Tstat Temp (°F) | Humidity (% Rel) | Mass Flow (lb/s) | Outside Air Temp (°F) | Call for Stage 2 Heat (W2) Status | Call for Stage 2 Cool (Y2) Status | Reversing Valve O/B Status | Call for Fan (G/G2) Status | Call for Heat (W) Status | Call for Cool (Y) Status | Outside Module Temp (°F) | Supply-Return Pressure (in H2O) | Suction Line Temp (°F) | Supply - Liquid (°F) | Return Air Temp (°F) | Supply Air Temp (°F) | Outdoor Current FFT | Outdoor Power (kW) | Outdoor Power Factor | Outdoor Voltage (V) | Outdoor Current (A) | Inside Module Temp (°F) | Indoor Power (kW) | Indoor Power Factor | Indoor Voltage (V) | Indoor Current FFT | Indoor Current (A) |
|---|---|---|---|---|---|---|---|---|---|---|---|---|---|---|---|---|---|---|---|---|---|---|---|---|---|---|---|---|---|
| Run Capacitor Fault - Outdoor | | | | | | | | | | | | | | | | | | | | | | | | | | | | | |
| Differential values exceed limit over time | | | | | | | | x | | | | | | | | | | | | | x | | | | | | | | |
| Variation from baseline too high | | | | | | | | | | | | | | | | | | | | | x | | | | | | | | |
| With a call for cooling (Y), power factor decreases rapidly. | | | | | | | | | | | | x | | | | | | | | | x | | | | | | | | |
| General Increase in power | | | | | | | | | | | | | | | | | | | | | | | | | | | | | |
| Differential values exceed limit over time | | | | | | | | x | | | | | | | | | | | | x | | | | | x | | | | |
| Variation from baseline too high | | | | | | x | | | | | | | x | | | | | | | | | | | | x | | | | |
| With a call for cooling (Y), power increases from baseline or from manufacturer as a function of outside air temperature. | | | | | | x | | | | | | x | x | | | | | | | x | | | | | | | | | |
| General Decrease in Capacity | | | | | | | | | | | | | | | | | | | | | | | | | | | | | |
| Differential values exceed limit over time | | | | | | | | x | | | | | | x | | | x | x | | x | | | | | | | | | |
| Variation from baseline too high | | | | | | | | | | | | | x | x | | | x | x | | | | | | | | | | | |
| With a call for cooling (Y), return and supply air temperature differentials, air pressure, and indoor current indicate a decrease in capacity. | | | | | | | | | | | | x | | | | | x | x | | | | | | | | | | | |
| Heat Pump Heat Fault - 15 minutes | | | | | | | | | | | | | | | | | | | | | | | | | | | | | |
| Differential values exceed limit over time | | | | | | | | x | x | | | | | | | | x | x | | | | | | | | | | | |
| With a call for heating (Y and O/B), duct supply and return air temperature measurements lack an indication of heating for more than 15 min. | | | | | | x | | | x | | | x | | | | | x | | | | | | | | | | | | |
| Heat Pump Heat Fault - 30 minutes | | | | | | | | | | | | | | | | | | | | | | | | | | | | | |
| Differential values exceed limit over time | | | | | | | | x | x | | | | | | | | x | x | | | | | | | | | | | |
| With a call for heating (Y and O/B), duct supply and return air temperature measurements lack an indication of heating for more than a half hour. | | | | | | x | | | x | | | x | | | | | x | | | | | | | | | | | | |

FIG. 12J

| | Indoor Current (A) | Indoor Current FFT | Indoor Voltage (V) | Indoor Power Factor | Indoor Power (kW) | Inside Module Temp (°F) | Outdoor Current (A) | Outdoor Voltage (V) | Outdoor Power Factor | Outdoor Power (kW) | Outdoor Current FFT | Supply Air Temp (°F) | Return Air Temp (°F) | Supply-Liquid (°F) | Suction Line Temp (°F) | Supply-Return Pressure (in H2O) | Outside Module Temp (°F) | Call for Cool (Y) Status | Call for Heat (W) Status | Call for Fan (G/G2) Status | Reversing Valve O/B Status | Call for Stage 2 Cool (Y2) Status | Call for Stage 2 Heat (W2) Status | Outside Air Temp (°F) | Mass Flow (lb/s) | Humidity (% Rel) | Tstat Temp (°F) | Tstat Command States | General Purpose Sensor Input |
|---|---|---|---|---|---|---|---|---|---|---|---|---|---|---|---|---|---|---|---|---|---|---|---|---|---|---|---|---|---|
| Heat Pump Low Charge | | | | | | | | | | | | | | | | | | | | | | | | | | | | | |
| Differential values exceed limit over time | | | | | X | | | | | | | X | X | X | | | X | X | | | X | X | | X | | | | | |
| Variation from baseline too high | | | | | | | | | | X | | X | X | X | | | X | | | | | | | X | | | | | |
| With a call for heating (Y, O/B), duct supply and return air temperature measurements lack an indication of heating, differential supply air and liquid line is less than baseline, and differential return air temperature and liquid line is less than baseline. | | | | | | | | | | | | | | | | | | | | | | | | | | | | | |
| Heat Pump High Charge | | | | | | | | | | | | | | | | | | | | | | | | | | | | | |
| Differential values exceed limit over time | | | | | | | | | | X | | X | X | X | | X | X | X | | | X | X | | X | | | | | |
| Variation from baseline too high | | | | | | | | | | X | | | | X | | X | X | | | | | | | X | | | | | |
| With a call for Heating (Y, O/B), supply-liquid is high, liquid and return air differential is low, and outdoor power increases. | | | | | | | | | | | | | | | | | | | | | | | | | | | | | |
| Heat Pump Low Indoor Airflow | | | | | | | | | | | | | | | | | | | | | | | | | | | | | |
| Differential values exceed limit over time | X | | | | | | | | | X | | X | X | | | X | X | X | | X | X | X | | X | | | | | |
| Variation from baseline too high | X | | | | | | | | | | | | | | | | | | | | | | | | | | | | |
| With a call for heating (Y, O/B) and fan (G), duct supply and return air temperature measurements are high. Pressure increases and indoor current departs from baseline depending on the motor type. | | | | | | | | | | | | | | | | | | | | | | | | | | | | | |
| Heat Pump Low Outdoor Airflow | | | | | | | | | | | | | | | | | | | | | | | | | | | | | |
| Differential values exceed limit over time | | | | | | | | | | X | | X | X | | | | X | X | | | X | X | | X | | | | | |
| Variation from baseline too high | | | | | | | | | | X | | X | X | | | | X | | | | | | | X | | | | | |
| With a call for heating (Y, O/B), duct supply and return air temperature measurements lack an indication of heating as a function of outside air temperature. Outdoor power decreases. | | | | | | | | | | | | | | | | | | | | | | | | | | | | | |

FIG. 12K

| Fault / Description | General Purpose Sensor Input | Tstat Command States | Tstat Temp (°F) | Humidity (% Rel) | Mass Flow (lb/s) | Outside Air Temp (°F) | Call for Stage 2 Heat (W2) Status | Call for Stage 2 Cool (Y2) Status | Reversing Valve O/B Status | Call for Fan (G/G2) Status | Call for Heat (W) Status | Call for Cool (Y) Status | Outside Module Temp (°F) | Supply-Return Pressure (in H2O) | Suction Line Temp (°F) | Supply - Liquid (°F) | Return Air Temp (°F) | Supply Air Temp (°F) | Outdoor Current FFT | Outdoor Power (kW) | Outdoor Power Factor | Outdoor Voltage (V) | Outdoor Current (A) | Inside Module Temp (°F) | Indoor Power (kW) | Indoor Power Factor | Indoor Voltage (V) | Indoor Current FFT | Indoor Current (A) |
|---|---|---|---|---|---|---|---|---|---|---|---|---|---|---|---|---|---|---|---|---|---|---|---|---|---|---|---|---|---|
| Heat Pump Flow Restriction | | | | | | | | | | | | | | | | | | | | | | | | | | | | | |
| Differential values exceed limit over time | | | | | | x | | | | | | x | x | | | x | x | x | | | | | | | | | | | |
| Variation from baseline too high | | | | | | x | | | | | | | | | | x | x | x | | | | | | | | | | | |
| With a call for heating (Y, O/B), duct supply and return air temperature measurements lack an indication of heating. Supply air and liquid line temperature differential is high. Increased runtime. | | | | | | | | | | | | | | | | x | | | | | | | | | | | | | |
| Heat Pump Increase in Power Consumption (loss of efficiency) | | | | | | | | | | | | | | | | | | | | | | | | | | | | | |
| Differential values exceed limit over time | | | | | | x | | | | | | x | x | | | | x | x | | x | | | | | x | | | | |
| Variation from baseline too high | | | | | | x | | | | | | | x | x | | | x | x | | x | | | | | x | | | | |
| With a call for Heating (Y, O/B), power increases from baseline or from manufacturer's specification as a function of outside air temperature. | | | | | | | | | | | | | | | | | | | | x | | | | | | | | | |
| Heat Pump Capacity Decrease | | | | | | | | | | | | | | | | | | | | | | | | | | | | | |
| Variation from baseline too high | | | | | | | | | | | | x | x | x | | | x | x | | | | | | | | | | | x |
| With a call for heating (Y, O/B), duct supply and return air temperature measurements lack an indication of heating. Pressure and indoor current indicates a decrease in capacity. Outside air temperature is used to compensate for capacity. | | | | | | | | x | x | | | x | x | x | | | x | x | | | | | | | | | | | x |
| Reversing Valve Fault on Heat | | | | | | | | | | | | | | | | | | | | | | | | | | | | | |
| Differential values exceed limit over time | | | | | | x | | | x | | | x | x | | | | x | x | | | | | | | | | | | |
| Call for heat (Y, O/B), but duct supply and return air temperature measurements indicate cooling. | | | | | | | x | | x | | x | | | | | | | | | | | | | | | | | | |
| Reversing Valve Fault on Cool | | | | | | | | | | | | | | | | | | | | | | | | | | | | | |
| Differential values exceed limit over time | | | | | | x | | | x | | | x | x | | | | x | x | | | | | | | | | | | |
| Call for cool (Y, O/B), but duct supply and return air temperature measurements indicate heating. | | | | | | x | | | x | | | x | | | | | x | x | | | | | | | | | | | |

FIG. 12L

| Fault / Description | Indoor Current (A) | Indoor Current FFT | Indoor Voltage (V) | Indoor Power Factor | Indoor Power (kW) | Inside Module Temp (°F) | Outdoor Current (A) | Outdoor Voltage (V) | Outdoor Power Factor | Outdoor Power (kW) | Outdoor Current FFT | Supply Air Temp (°F) | Return Air Temp (°F) | Supply - Liquid (°F) | Suction Line Temp (°F) | Supply-Return Pressure (in H₂O) | Outside Module Temp (°F) | Call for Cool (Y) Status | Call for Heat (W) Status | Call for Fan (G/G2) Status | Reversing Valve O/B Status | Call for Stage 2 Cool (Y2) Status | Call for Stage 2 Heat (W2) Status | Outside Air Temp (°F) | Mass Flow (lb/s) | Humidity (% Rel) | Tstat Temp (°F) | Tstat Command States | General Purpose Sensor Input |
|---|---|---|---|---|---|---|---|---|---|---|---|---|---|---|---|---|---|---|---|---|---|---|---|---|---|---|---|---|---|
| Defrost Fault | | | | | | | | | | | | | | | | | | | | | | | | | | | | | |
| Evaluate performance for changes indicative of failure to defrost due to RV fault | | | | | | | x | | x | x | | x | x | x | x | | | x | | | x | | | x | | | | | |
| Evaluate performance for changes indicative of frost and observed failure to activate defrost | | | | | | | x | | x | x | | x | x | x | x | | | x | | | x | | | x | | | | | |
| Excessive Compressor Tripping | | | | | | | | | | | | | | | | | | | | | | | | | | | | | |
| Differential values exceed limit over time | | | | | | | x | | | | | x | x | | | | | | | | | | | | | | | | |
| Call for cooling or heating (Y, Y2, O/B), duct supply and return air temperature measurements lack an indication of cooling/heating with a rapid decrease in outdoor fan motor current. | | | | | | | | | | | | x | x | | | | | x | | | | x | | | | | | | |
| Compressor Short Cycling - Pressure Limits | | | | | | | | | | | | | | | | | | | | | | | | | | | | | |
| Differential values exceed limit over time | | | | | | | x | | | | | | | | | | | | | | | | | | | | | | |
| Call for cooling (Y), duct supply and return air temperature measurements lack an indication of cooling with a rapid decrease in outdoor current and short run time. | | | | | | | x | | | | | x | x | | | | | x | | | | x | | | | | | | |
| Compressor Bearing Fault | | | | | | | | | | | | | | | | | | | | | | | | | | | | | |
| Value exceeds limit | | | | | | | x | | | | | | | | | | | | | | | | | | | | | | |
| Primarily FFT based looks for changes in motor loading, support with PF verification of nominal voltage | | | | x | x | | x | v | x | x | x | | | | | | | | | | | | | | | | | | |
| Locked Rotor | | | | | | | | | | | | | | | | | | | | | | | | | | | | | |
| Value exceeds limit | x | | | | | | | | | | | | | | | | | | | | | | | | | | | | |
| Look for excessive current at compressor start. Support with power and PF. | x | | | | | | x | | x | x | | | | | | | | | | | | | | | | | | | |

FIG. 12M

| | Indoor Current (A) | Indoor Current FFT | Indoor Voltage (V) | Indoor Power Factor | Indoor Power (kW) | Inside Module Temp (°F) | Outdoor Current (A) | Outdoor Voltage (V) | Outdoor Power Factor | Outdoor Power (kW) | Outdoor Current FFT | Supply Air Temp (°F) | Return Air Temp (°F) | Supply - Liquid (°F) | Suction Line Temp (°F) | Supply-Return Pressure (in H₂O) | Outside Module Temp (°F) | Call for Cool (Y) Status | Call for Heat (W) Status | Call for Fan (G/G2) Status | Reversing Valve O/B Status | Call for Stage 2 Cool (Y2) Status | Call for Stage 2 Heat (W2) Status | Outside Air Temp (°F) | Mass Flow (lb/s) | Humidity (% Rel) | Tstat Temp (°F) | Tstat Command States | General Purpose Sensor Input |
|---|---|---|---|---|---|---|---|---|---|---|---|---|---|---|---|---|---|---|---|---|---|---|---|---|---|---|---|---|---|
| Thermostat Short Cycling | | | | | | | | | | | | | | | | | | | | | | | | | | | | | |
| Differential values exceed limit over time | × | | | | | | × | | | | | | | | | | | × | | | | | | | | | | | |
| Call for cooling (Y) removed prior to full cooling sequence being completed. Home does not reach desired temperature. | × | | | | | | × | | | | | | | | | | | | | | | | | | | | | | |
| Simultaneous Heat and Cool | | | | | | | | | | | | | | | | | | | | | | | | | | | | | |
| Conflicting status line indications | | | | | | | | | | | | | | | | | | × | × | | × | × | | | | | | | |
| Simultaneous call for heat and cool | | | | | | | | | | | | | | | | | | × | × | | × | × | × | | | | | | |
| Command Line on w/o Thermostat Call | | | | | | | | | | | | | | | | | | | | | | | | | | | | | |
| Unintended signal at the control lines | | | | | × | | | | | × | | × | × | × | × | × | | × | × | × | × | × | × | | | | | × | |
| With internet-enabled thermostat, compare commands with signals observed at the equipment | | | | | × | | | | | × | | × | × | × | × | × | | × | × | × | × | × | × | | | | | × | |
| True Efficiency or True SEER | | | | | | | | | | | | | | | | | | | | | | | | | | | | | |
| Evaluation of Operational Parameters | | | | | × | | | | | × | | × | × | | | | | | | | | | | × | × | × | | | |
| Calculate actual SEER using the energy inputs and thermal output, mass flow allows true measurement of the output. | | | | | × | | | | | × | | × | × | | | | | | | | | | | × | × | × | | | |
| Envelope Efficiency | | | | | | | | | | | | | | | | | | | | | | | | | | | | | |
| Thermal Calculation | | | | | | | | | | | | | | | | | | | | | | | | × | × | | | | |
| Compare heat transfer during off cycles against thermal input to measure envelope performance. | | | | | | | | | | | | | | | | | | | | | | | | × | × | | | | |

FIG. 12N

| | Indoor Current (A) | Indoor Current FFT | Indoor Voltage (V) | Indoor Power Factor | Indoor Power (kW) | Inside Module Temp (°F) | Outdoor Current (A) | Outdoor Voltage (V) | Outdoor Power Factor | Outdoor Power (kW) | Outdoor Current FFT | Supply Air Temp (°F) | Return Air Temp (°F) | Supply - Liquid (°F) | Suction Line Temp (°F) | Supply-Return Pressure (in H₂O) | Outside Module Temp (°F) | Call for Cool (Y) Status | Call for Heat (W) Status | Call for Fan (G/G2) Status | Reversing Valve O/B Status | Call for Stage 2 Cool (Y2) Status | Call for Stage 2 Heat (W2) Status | Outside Air Temp (°F) | Mass Flow (lb/s) | Humidity (% Rel) | Tstat Temp (°F) | Tstat Command States | General Purpose Sensor Input |
|---|---|---|---|---|---|---|---|---|---|---|---|---|---|---|---|---|---|---|---|---|---|---|---|---|---|---|---|---|---|
| Board over-temperature | | | | | | × | | | | | | | | | | | × | | | | | | | | | | | | |
| Value exceeds limit | | | | | | × | | | | | | | | | | | × | | | | | | | | | | | | |
| Onboard temperature sensor reading exceed board design parameters | | | | | | | | | | | | | | | | | | | | | | | | | | | | | |
| Current Sensor Disconnected | × | | | | | | × | | | | | | | | | | | | | | | | | | | | | | |
| Value exceeds limit | × | | | | | | × | | | | | | | | | | | | | | | | | | | | | | |
| The current sensor does not measure the load of the system transformer or power supply or the transformer is not clamped on the incoming power wire. | | | | | | | | | | | | | | | | | | | | | | | | | | | | | |
| Current Sensor Reading Out-of-Range | × | | | | | | × | | | | | | | | | | | | | | | | | | | | | | |
| Value exceeds limit | × | | | | | | × | | | | | | | | | | | | | | | | | | | | | | |
| Current transformer reading exceed design range indicating a board fault or wiring problem. | | | | | | | | | | | | | | | | | | | | | | | | | | | | | |
| Temperature Sensor Opened or Shorted | | | | | | | | | | | | × | × | × | × | | | | | | | | | | | | | | |
| Value exceeds limit | | | | | | | | | | | | × | × | × | × | | | | | | | | | | | | | | |
| A sensor measurement indicates open or shorted | | | | | | | | | | | | | | | | | | | | | | | | | | | | | |
| Sensor Fault | | | | | | × | | | | | | × | × | × | × | | × | | | | | | | | | | | | |
| Value exceeds limit | | | | | | × | | | | | | × | × | × | × | | × | | | | | | | | | | | | |
| Statistical comparison of the temperature sensor reading in the idle file, board sensor offset by known rise, fault if coefficient of variance exceeds limit. | | | | | | | | | | | | | | | | | | | | | | | | | | | | | |

FIG. 12O

| | Indoor Current (A) | Indoor Current FFT | Indoor Voltage (V) | Indoor Power Factor | Indoor Power (kW) | Inside Module Temp (°F) | Outdoor Current (A) | Outdoor Voltage (V) | Outdoor Power Factor | Outdoor Power (kW) | Outdoor Current FFT | Supply Air Temp (°F) | Return Air Temp (°F) | Supply - Liquid (°F) | Suction Line Temp (°F) | Supply-Return Pressure (in H2O) | Outside Module Temp (°F) | Call for Cool (Y) Status | Call for Heat (W) Status | Call for Fan (G/G2) Status | Reversing Valve O/B Status | Call for Stage 2 Cool (Y2) Status | Call for Stage 2 Heat (W2) Status | Outside Air Temp (°F) | Mass Flow (lb/s) | Humidity (% Rel) | Tstat Temp (°F) | Tstat Command States | General Purpose Sensor Input |
|---|---|---|---|---|---|---|---|---|---|---|---|---|---|---|---|---|---|---|---|---|---|---|---|---|---|---|---|---|---|
| Voltage alerts | | | | | | | | | | | | | | | | | | | | | | | | | | | | | |
| Value exceeds limit | | | X | | | | | X | | | | | | | | | | | | | | | | | | | | | |
| Compares average voltage against thresholds for indoor and outdoor measurements. High and low limits apply. | | | X | | | | | X | | | | | | | | | | | | | | | | | | | | | |
| Condensate Sensor | | | | | | | | | | | | | | | | | | | | | | | | | | | | | |
| Value exceeds limit | | | | | | | | | | | | | | | | | | X | | | | | | | | | | | |
| Various levels of alert based on duration of condensate senor trip, warning would be based on values indication high water, but not submersed indicating a clean out is needed. | | | | | | | | | | | | | | | | | | | | | | | | | | | | | |
| Current Detected - No Call for Heat, Cool, or Fan | X | X | | | | | | | | | | | | | | | | | | | | | | | | | | | |
| Value exceeds limit | | | | | | X | X | | | | | | | | | | | | | | | | | | | | | | |
| Indoor or outdoor current above idle value without any control line calling (Y, W, G). | | | | | | | | | | | | | | | | | | | | | | | | | | | | | |
| Home Temperature Limits | | | | | | | | | | | | | | | | | | | | | | | | | | | | | |
| Value exceeds limit | | | | | | X | | | | | | X | X | X | X | | | | | | | | | X | | | | | |
| Average of sensors exceeded temperature thresholds, module temperature is offset by known rise value. Supporting routine determines if the module is in the conditioned space if so always active, if not active only is there is a call. | | | | | | | | | | | | | | | | | | | | | | | | X | | | | | |

FIG. 12P

| | Indoor Current (A) | Indoor Current FFT | Indoor Voltage (V) | Indoor Power Factor | Indoor Power (kW) | Inside Module Temp (°F) | Outdoor Current (A) | Outdoor Voltage (V) | Outdoor Power Factor | Outdoor Power (kW) | Outdoor Current FFT | Supply Air Temp (°F) | Return Air Temp (°F) | Supply - Liquid (°F) | Suction Line Temp (°F) | Supply-Return Pressure (in H2O) | Outside Module Temp (°F) | Call for Cool (Y) Status | Call for Heat (W) Status | Call for Fan (G/G2) Status | Reversing Valve O/B Status | Call for Stage 2 Cool (Y2) Status | Call for Stage 2 Heat (W2) Status | Outside Air Temp (°F) | Mass Flow (lb/s) | Humidity (% Rel) | Tstat Temp (°F) | Tstat Command States | General Purpose Sensor Input |
|---|---|---|---|---|---|---|---|---|---|---|---|---|---|---|---|---|---|---|---|---|---|---|---|---|---|---|---|---|---|
| Compressor Fault — Value exceeds limit | | | | | | | x | | | | | | | | | | | x | | | | | | | | | | | |
| Call of cool (Y), current indicative of fan, but less than compressor current. | | | | | | | x | | | | | | | | | | | | | | | | | | | | | | |
| Contactor Fault — Value exceeds limit | | | | | | | x | | | | | | | | | | | x | | | | | | | | | | | |
| Call for cool (Y), but no current increase, blocked if open current transformer fault is indicated | | | | | | | x | | | | | | | | | | | | | | | | | | | | | | |
| Contactor Closed Fault — Value exceeds limit | | | | | | | x | | | | | | | | | | | x | | | | | | | | | | | |
| Current continues at compressor level after call for cooling (Y) is removed. | | | | | | | x | | | | | | | | | | | | | | | | | | | | | | |
| General Purpose Sensor Changed — Value does not match expectation | | | | | | | | | | | | | | | | | | | | | | | | | | | | x | x |
| Identity of the general purpose sensor connected to a general purpose port changes. | | | | | | | | | | | | | | | | | | | | | | | | | | | | | |
| General Purpose Sensor Disconnected — Value does not match expectation | | | | | | | | | | | | | | | | | | | | | | | | | | | | x | x |
| General purpose input no longer indicates a sensor where one once was. | | | | | | | | | | | | | | | | | | | | | | | | | | | | | |
| UV light General Purpose Sensor module — Value exceeds limit | | | | | | | | | | | | | | | | | | | | | | | | | | | | x | x |
| UV light output has fallen from the initial value or has gone out, may add additional levels | | | | | | | | | | | | | | | | | | | | | | | | | | | | | |

FIG. 12Q

| | Indoor Current (A) | Indoor Current FFT | Indoor Voltage (V) | Indoor Power Factor | Indoor Power (kW) | Inside Module Temp (°F) | Outdoor Current (A) | Outdoor Voltage (V) | Outdoor Power Factor | Outdoor Power (kW) | Outdoor Current FFT | Supply Air Temp (°F) | Return Air Temp (°F) | Supply - Liquid (°F) | Suction Line Temp (°F) | Supply-Return Pressure (in H2O) | Outside Module Temp (°F) | Call for Cool (Y) Status | Call for Heat (W) Status | Call for Fan (G/G2) Status | Reversing Valve O/B Status | Call for Stage 2 Cool (Y2) Status | Call for Stage 2 Heat (W2) Status | Outside Air Temp (°F) | Mass Flow (lb/s) | Humidity (% Rel) | Tstat Temp (°F) | Tstat Command States | General Purpose Sensor Input |
|---|---|---|---|---|---|---|---|---|---|---|---|---|---|---|---|---|---|---|---|---|---|---|---|---|---|---|---|---|---|
| Wet Floor General Purpose Sensor | | | | | | | | | | | | | | | | | | | | | | | | | | | | | x |
| Wet floor sensor on a indicates a wet floor — Value exceeds limit | | | | | | | | | | | | | | | | | | | | | | | | | | | | | x |
| Wet Tray General Purpose Sensor | | | | | | | | | | | | | | | | | | | | | | | | | | | | | x |
| Wet tray sensor indicates a wet tray (tray being the tray an attic HVAC unit sets in) — Value exceeds limit | | | | | | | | | | | | | | | | | | | | | | | | | | | | | x |
| Condensate Pump Overflow Sensor | | | | | | | | | | | | | | | | | | | | | | | | | | | | | x |
| Sump overflow sensor indicates a high sump level (many attic mount systems have condensate pumps) — Value exceeds limit | | | | | | | | | | | | | | | | | | | | | | | | | | | | | x |
| Sump Pump Overflow Sensor | | | | | | | | | | | | | | | | | | | | | | | | | | | | | x |
| Sump pump overflow sensor indicates a high sump level (e.g., sump pump in the basement) — Value exceeds limit | | | | | | | | | | | | | | | | | | | | | | | | | | | | | x |

HVAC SYSTEM REMOTE MONITORING AND DIAGNOSIS

CROSS-REFERENCE TO RELATED APPLICATIONS

This application claims the benefit of U.S. Provisional Application No. 61/800,636 filed on Mar. 15, 2013 and U.S. Provisional Application No. 61/809,222 filed on Apr. 5, 2013. The entire disclosures of the above applications are incorporated herein by reference.

FIELD

The present disclosure relates to environmental comfort systems and more particularly to remote monitoring and diagnosis of residential and light commercial environmental comfort systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A residential or light commercial HVAC (heating, ventilation, or air conditioning) system controls environmental parameters, such as temperature and humidity, of a residence. The HVAC system may include, but is not limited to, components that provide heating, cooling, humidification, and dehumidification. The target values for the environmental parameters, such as a temperature set point, may be specified by a homeowner.

In FIG. 1, a block diagram of an example HVAC system is presented. In this particular example, a forced air system with a gas furnace is shown. Return air is pulled from the residence through a filter 110 by a circulator blower 114. The circulator blower 114, also referred to as a fan, is controlled by a control module 118. The control module 118 receives signals from a thermostat 122. For example only, the thermostat 122 may include one or more temperature set points specified by the homeowner.

The thermostat 122 may direct that the circulator blower 114 be turned on at all times or only when a heat request or cool request is present. The circulator blower 114 may also be turned on at a scheduled time or on demand. In various implementations, the circulator blower 114 can operate at multiple speeds or at any speed within a predetermined range. One or more switching relays (not shown) may be used to control the circulator blower 114 and/or to select a speed of the circulator blower 114.

The thermostat 122 also provides the heat and/or cool requests to the control module 118. When a heat request is made, the control module 118 causes a burner 126 to ignite. Heat from combustion is introduced to the return air provided by the circulator blower 114 in a heat exchanger 130. The heated air is supplied to the residence and is referred to as supply air.

The burner 126 may include a pilot light, which is a small constant flame for igniting the primary flame in the burner 126. Alternatively, an intermittent pilot may be used in which a small flame is first lit prior to igniting the primary flame in the burner 126. A sparker may be used for an intermittent pilot implementation or for direct burner ignition. Another ignition option includes a hot surface igniter, which heats a surface to a high enough temperature that when gas is introduced, the heated surface causes combustion to begin. Fuel for combustion, such as natural gas, may be provided by a gas valve 128.

The products of combustion are exhausted outside of the residence, and an inducer blower 134 may be turned on prior to ignition of the burner 126. The inducer blower 134 provides a draft to remove the products of combustion from the burner 126. The inducer blower 134 may remain running while the burner 126 is operating. In addition, the inducer blower 134 may continue running for a set period of time after the burner 126 turns off. In a high efficiency furnace, the products of combustion may not be hot enough to have sufficient buoyancy to exhaust via conduction. Therefore, the inducer blower 134 creates a draft to exhaust the products of combustion.

A single enclosure, which will be referred to as an air handler unit 208, may include the filter 110, the circulator blower 114, the control module 118, the burner 126, the heat exchanger 130, the inducer blower 134, an expansion valve 188, an evaporator 192, and a condensate pan 196.

In the HVAC system of FIG. 1, a split air conditioning system is also shown. Refrigerant is circulated through a compressor 180, a condenser 184, the expansion valve 188, and the evaporator 192. The evaporator 192 is placed in series with the supply air so that when cooling is desired, the evaporator removes heat from the supply air, thereby cooling the supply air. During cooling, the evaporator 192 is cold, which causes water vapor to condense. This water vapor is collected in the condensate pan 196, which drains or is pumped out.

A control module 200 receives a cool request from the control module 118 and controls the compressor 180 accordingly. The control module 200 also controls a condenser fan 204, which increases heat exchange between the condenser 184 and outside air. In such a split system, the compressor 180, the condenser 184, the control module 200, and the condenser fan 204 are located outside of the residence, often in a single condensing unit 212.

In various implementations, the control module 200 may simply include a run capacitor, a start capacitor, and a contactor or relay. In fact, in certain implementations, the start capacitor may be omitted, such as when a scroll compressor instead of a reciprocating compressor is being used. The compressor 180 may be a variable capacity compressor and may respond to a multiple-level cool request. For example, the cool request may indicate a mid-capacity call for cool or a high-capacity call for cool.

The electrical lines provided to the condensing unit 212 may include a 240 volt mains power line and a 24 volt switched control line. The 24 volt control line may correspond to the cool request shown in FIG. 1. The 24 volt control line controls operation of the contactor. When the control line indicates that the compressor should be on, the contactor contacts close, connecting the 240 volt power supply to the compressor 180. In addition, the contactor may connect the 240 volt power supply to the condenser fan 204. In various implementations, such as when the condensing unit 212 is located in the ground as part of a geothermal system, the condenser fan 204 may be omitted. When the 240 volt mains power supply arrives in two legs, as is common in the U.S., the contactor may have two sets of contacts, and is referred to as a double-pole single-throw switch.

Monitoring of operation of components in the condensing unit 212 and the air handler unit 208 has traditionally been performed by multiple discrete sensors, measuring current individually to each component. For example, a sensor may sense the current drawn by a motor, another sensor measures resistance or current flow of an igniter, and yet another sensor monitors a state of a gas valve. However, the cost of these sensors and the time required for installation has made monitoring cost prohibitive.

SUMMARY

A monitoring system for a heating, ventilation, and air conditioning (HVAC) system of a building includes a monitoring device installed at the building, a monitoring server located remotely from the building, and a review server. The monitoring device measures an aggregate current supplied to a plurality of components of the HVAC system and transmits current data based on the measured aggregate current. The monitoring server receives the transmitted current data and, based on the received current data, assesses whether a failure has occurred in a first component of the plurality of components of the HVAC system and assesses whether a failure has occurred in a second component of the plurality of components of the HVAC system. The monitoring server generates a first advisory in response to determining that the failure has occurred in the first component. The review server provides the first advisory to a technician for review. In response to the technician verifying that the failure has occurred in the first component, the review server transmits a first alert.

In other features, the monitoring server (i) selectively predicts an impending failure of the first component based on the received current data and (ii) generates a second advisory in response to the prediction of impending failure of the first component. The monitoring server (i) selectively predicts an impending failure of the second component based on the received current data and (ii) generates a third advisory in response to the prediction of impending failure of the second component.

In other features, the review server transmits the first alert to at least one of a customer and a contractor. The review server transmits the first alert to the contractor regardless of a first piece of data, and only selectively transmits the first alert to the customer based on the first piece of data. Aa second advisory is generated in response to the monitoring server determining that the failure has occurred in the second component.

The review server provides the second advisory to one of a plurality of technicians for review. The plurality of technicians includes the technician. The review server, in response to the technician verifying that the failure has occurred in the second component, transmits a second alert.

In other features, the monitoring device samples the aggregate current over a time period, performs a frequency domain analysis on the samples over the time period, and transmits frequency domain data to the monitoring server. The monitoring server identifies transition points in the current data and analyzes the frequency domain data around the identified transition points. The monitoring server determines whether the failure has occurred in the first component by comparing the frequency domain data to baseline data. The monitoring device records control signals from a thermostat and transmits information based on the control signals to the monitoring server.

In other features, a second monitoring device is located in close proximity to a second enclosure of the HVAC system. The second enclosure includes at least one of a compressor and a heat pump heat exchanger. The second monitoring device (i) measures an aggregate current supplied to a plurality of components of the second enclosure and (ii) transmits second current data based on the measured aggregate current to the monitoring device. The monitoring device transmits the second current data to the monitoring server.

In other features, the plurality of components of the HVAC system includes at least two components selected from: a flame sensor, a solenoid-operated gas valve, a hot surface igniter, a circulator blower motor, an inducer blower motor, a compressor, a pressure switch, a capacitor, an air filter, a condensing coil, an evaporating coil, and a contactor.

A method of monitoring a heating, ventilation, and air conditioning (HVAC) system of a building includes, using a monitoring device installed at the building, measuring an aggregate current supplied to a plurality of components of the HVAC system. The method further includes transmitting current data based on the measured aggregate current to a monitoring server located remotely from the building. The method further includes, at the monitoring server, assessing whether a failure has occurred in a first component of the plurality of components of the HVAC system based on current data received from the monitoring device. The method further includes, at the monitoring server, assessing whether a failure has occurred in a second component of the plurality of components of the HVAC system. The method further includes generating a first advisory in response to determining that the failure has occurred in the first component. The method further includes providing the first advisory to a technician for review. The method further includes, in response to the technician verifying that the failure has occurred in the first component, transmitting a first alert.

In other features, the method further includes selectively predicting an impending failure of the first component based on the received current data, and generating a second advisory in response to the prediction of impending failure of the first component. The method further includes selectively predicting an impending failure of the second component based on the received current data, and generating a third advisory in response to the prediction of impending failure of the second component.

In other features, the first alert is transmitted to at least one of a customer and a contractor. The first alert is transmitted to the contractor regardless of a first piece of data, and only selectively transmitted to the customer based on the first piece of data. The method further includes generating a second advisory in response to determining that the failure has occurred in the second component, providing the second advisory to one of a plurality of technicians for review, wherein the plurality of technicians includes the technician, and in response to the technician verifying that the failure has occurred in the second component, transmitting a second alert.

In other features, the method further includes sampling the aggregate current over a time period, performing a frequency domain analysis on the samples over the time period, and transmitting frequency domain data to the monitoring server. The method further includes identifying transition points in the current data, and analyzing the frequency domain data around the identified transition points. The method further includes determining whether the failure has occurred in the first component by comparing the frequency domain data to baseline data. The method further includes recording control signals from a thermostat, and transmitting information based on the control signals to the monitoring server.

In other features, the method further includes, at a second monitoring device located in close proximity to a second enclosure of the HVAC system, measuring an aggregate current supplied to a plurality of components of the second enclosure, wherein the second enclosure includes at least one of a compressor and a heat pump heat exchanger. The method further includes transmitting second current data based on the measured aggregate current from the second monitoring device to the monitoring device. The method further includes transmitting the second current data to the monitoring server. The plurality of components of the HVAC system includes at least two components selected from: a flame sensor, a solenoid-operated gas valve, a hot surface igniter, a circulator blower motor, an inducer blower motor, a compressor, a pressure switch, a capacitor, an air filter, a condensing coil, an evaporating coil, and a contactor.

BRIEF DESCRIPTION OF THE DRAWINGS

The present disclosure will become more fully understood from the detailed description and the accompanying drawings, wherein:

FIGS. 12A-12Q are tables of inputs used in detecting and/or predicting faults according to the principles of the present disclosure.

In the drawings, reference numbers may be reused to identify similar and/or identical elements.

DETAILED DESCRIPTION

Figure 1:
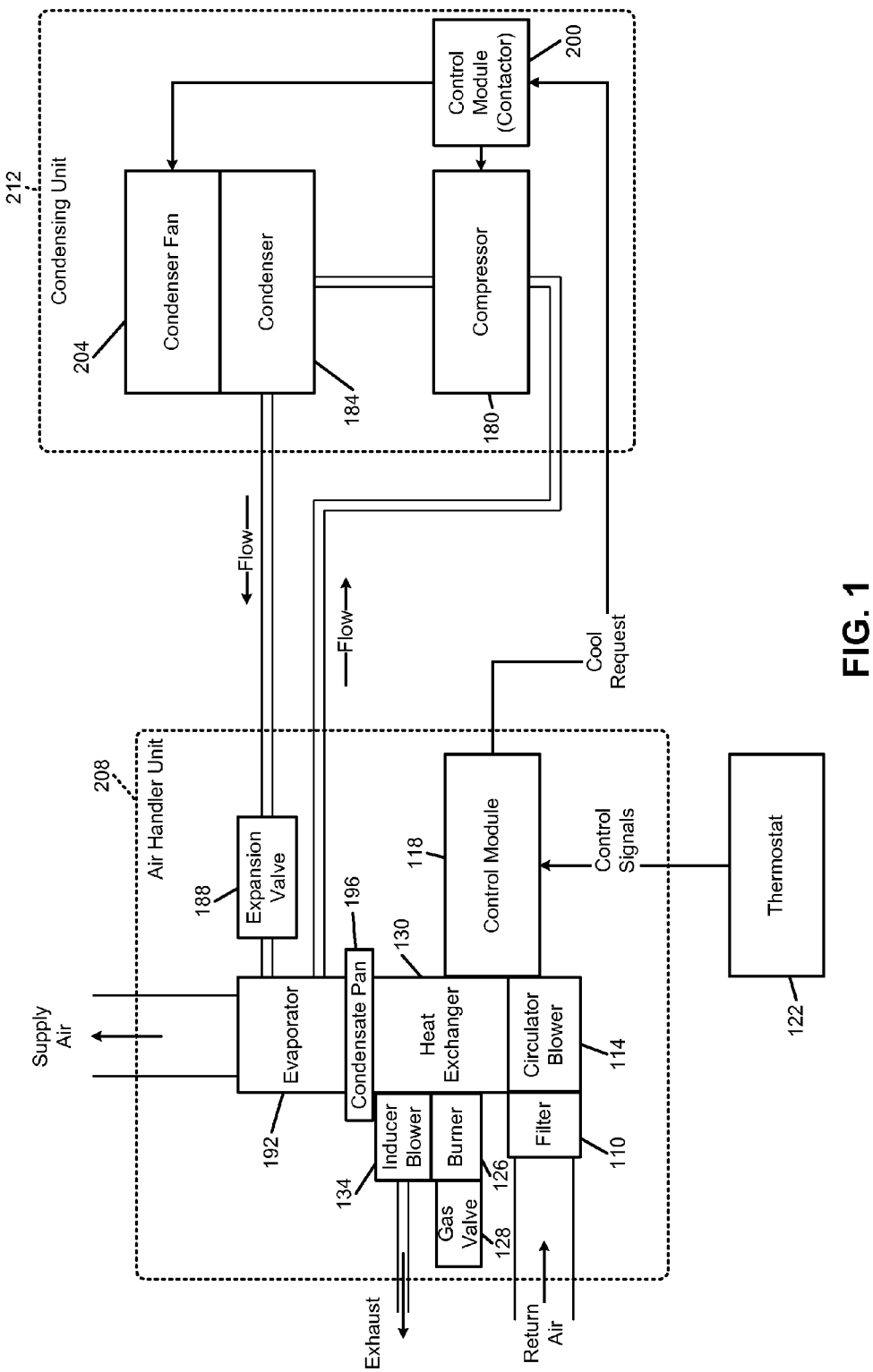
FIG. 1 is a block diagram of an example HVAC system according to the prior art.

According to the present disclosure, sensing/monitoring modules can be integrated with a residential or light commercial HVAC (heating, ventilation, or air conditioning) system. As used in this application, the term HVAC can encompass all environmental comfort systems in a building, including heating, cooling, humidifying, and dehumidifying, and covers devices such as furnaces, heat pumps, humidifiers, dehumidifiers, and air conditioners. The term HVAC is a broad term, in that an HVAC system according to this application does not necessarily include both heating and air conditioning, and may instead have only one or the other.

In split HVAC systems with an air handler unit (often, indoors) and a condensing unit (often, outdoors), an air handler monitor module and a condensing monitor module, respectively, can be used. The air handler monitor module and the condensing monitor module may be integrated by the manufacturer of the HVAC system, may be added at the time of the installation of the HVAC system, and/or may be retrofitted to an existing system.

The air handler monitor and condensing monitor modules monitor operating parameters of associated components of the HVAC system. For example, the operating parameters may include power supply current, power supply voltage, operating and ambient temperatures, fault signals, and control signals. The air handler monitor and condensing monitor modules may communicate data between each other, while one or both of the air handler monitor and condensing monitor modules uploads data to a remote location. The remote location may be accessible via any suitable network, including the Internet.

The remote location includes one or more computers, which will be referred to as servers. The servers execute a monitoring system on behalf of a monitoring company. The monitoring system receives and processes the data from the air handler monitor and condensing monitor modules of customers who have such systems installed. The monitoring system can provide performance information, diagnostic alerts, and error messages to a customer and/or third parties, such as a designated HVAC contractor.

The air handler monitor and condensing monitor modules may each sense an aggregate current for the respective unit without measuring individual currents of individual components. The aggregate current data may be processed using frequency domain analysis, statistical analysis, and state machine analysis to determine operation of individual components based on the aggregate current data. This processing may happen partially or entirely in a server environment, remote from the customer's building or residence.

Based on measurements from the air handler monitor and condensing monitor modules, the monitoring company can determine whether HVAC components are operating at their peak performance and can advise the customer and the contractor when performance is reduced. This performance reduction may be measured for the system as a whole, such as in terms of efficiency, and/or may be monitored for one or more individual components.

In addition, the monitoring system may detect and/or predict failures of one or more components of the system. When a failure is detected, the customer can be notified and potential remediation steps can be taken immediately. For example, components of the HVAC system may be shut down to prevent or minimize damage, such as water damage, to HVAC components. The contractor can also be notified that a service call will be required. Depending on the contractual relationship between the customer and the contractor, the contractor may immediately schedule a service call to the building.

The monitoring system may provide specific information to the contractor, including identifying information of the customer's HVAC system, including make and model numbers, as well as indications of the specific part numbers that appear to be failing. Based on this information, the contractor can allocate the correct repair personnel that have experience with the specific HVAC system and/or component. In addition, the service technician is able to bring replacement parts, avoiding return trips after diagnosis.

Depending on the severity of the failure, the customer and/or contractor may be advised of relevant factors in determining whether to repair the HVAC system or replace some or all of the components of the HVAC system. For example only, these factors may include relative costs of repair versus replacement, and may include quantitative or qualitative information about advantages of replacement equipment. For example, expected increases in efficiency and/or comfort with new equipment may be provided. Based on historical usage data and/or electricity or other commodity prices, the comparison may also estimate annual savings resulting from the efficiency improvement.

As mentioned above, the monitoring system may also predict impending failures. This allows for preventative maintenance and repair prior to an actual failure. Alerts regarding detected or impending failures reduce the time when the HVAC system is out of operation and allows for more flexible scheduling for both the customer and contractor. If the customer is out of town, these alerts may prevent damage from occurring when the customer is not present to detect the failure of the HVAC system. For example, failure of heat in winter may lead to pipes freezing and bursting.

Alerts regarding potential or impending failures may specify statistical timeframes before the failure is expected. For example only, if a sensor is intermittently providing bad data, the monitoring system may specify an expected amount of time before it is likely that the sensor effectively stops working due to the prevalence of bad data. Further, the monitoring system may explain, in quantitative or qualitative terms, how the current operation and/or the potential failure will affect operation of the HVAC system. This enables the customer to prioritize and budget for repairs.

For the monitoring service, the monitoring company may charge a periodic rate, such as a monthly rate. This charge may be billed directly to the customer and/or may be billed to the contractor. The contractor may pass along these charges to the customer and/or may make other arrangements, such as by requiring an up-front payment upon installation and/or applying surcharges to repairs and service visits.

For the air handler monitor and condensing monitor modules, the monitoring company or contractor may charge the customer the equipment cost, including the installation cost, at the time of installation and/or may recoup these costs as part of the monthly fee. Alternatively, rental fees may be charged for the air handler monitor and condensing monitor modules, and once the monitoring service is stopped, the air handler monitor and condensing monitor modules may be returned.

The monitoring service may allow the customer and/or contractor to remotely monitor and/or control HVAC components, such as setting temperature, enabling or disabling heating and/or cooling, etc. In addition, the customer may be able to track energy usage, cycling times of the HVAC system, and/or historical data. Efficiency and/or operating costs of the customer's HVAC system may be compared against HVAC systems of neighbors, whose buildings will be subject to the same or similar environmental conditions. This allows for direct comparison of HVAC system and overall building efficiency because environmental variables, such as temperature and wind, are controlled.

The monitoring system can be used by the contractor during and after installation and during and after repair (i) to verify operation of the air handler monitor and condensing monitor modules, as well as (ii) to verify correct installation of the components of the HVAC system. In addition, the customer may review this data in the monitoring system for assurance that the contractor correctly installed and configured the HVAC system. In addition to being uploaded to the remote monitoring service (also referred to as the cloud), monitored data may be transmitted to a local device in the building. For example, a smartphone, laptop, or proprietary portable device may receive monitoring information to diagnose problems and receive real-time performance data. Alternatively, data may be uploaded to the cloud and then downloaded onto a local computing device, such as via the Internet from an interactive web site.

The historical data collected by the monitoring system may allow the contractor to properly specify new HVAC components and to better tune configuration, including dampers and set points of the HVAC system.

The information collected may be helpful in product development and assessing failure modes. The information may be relevant to warranty concerns, such as determining whether a particular problem is covered by a warranty. Further, the information may help to identify conditions, such as unauthorized system modifications, that could potentially void warranty coverage.

Original equipment manufacturers may subsidize partially or fully the cost of the monitoring system and air handler and condensing monitor modules in return for access to this information. Installation and service contractors may also subsidize some or all of these costs in return for access to this information, and for example, in exchange for being recommended by the monitoring system. Based on historical service data and customer feedback, the monitoring system may provide contractor recommendations to customers.

Figure 2:
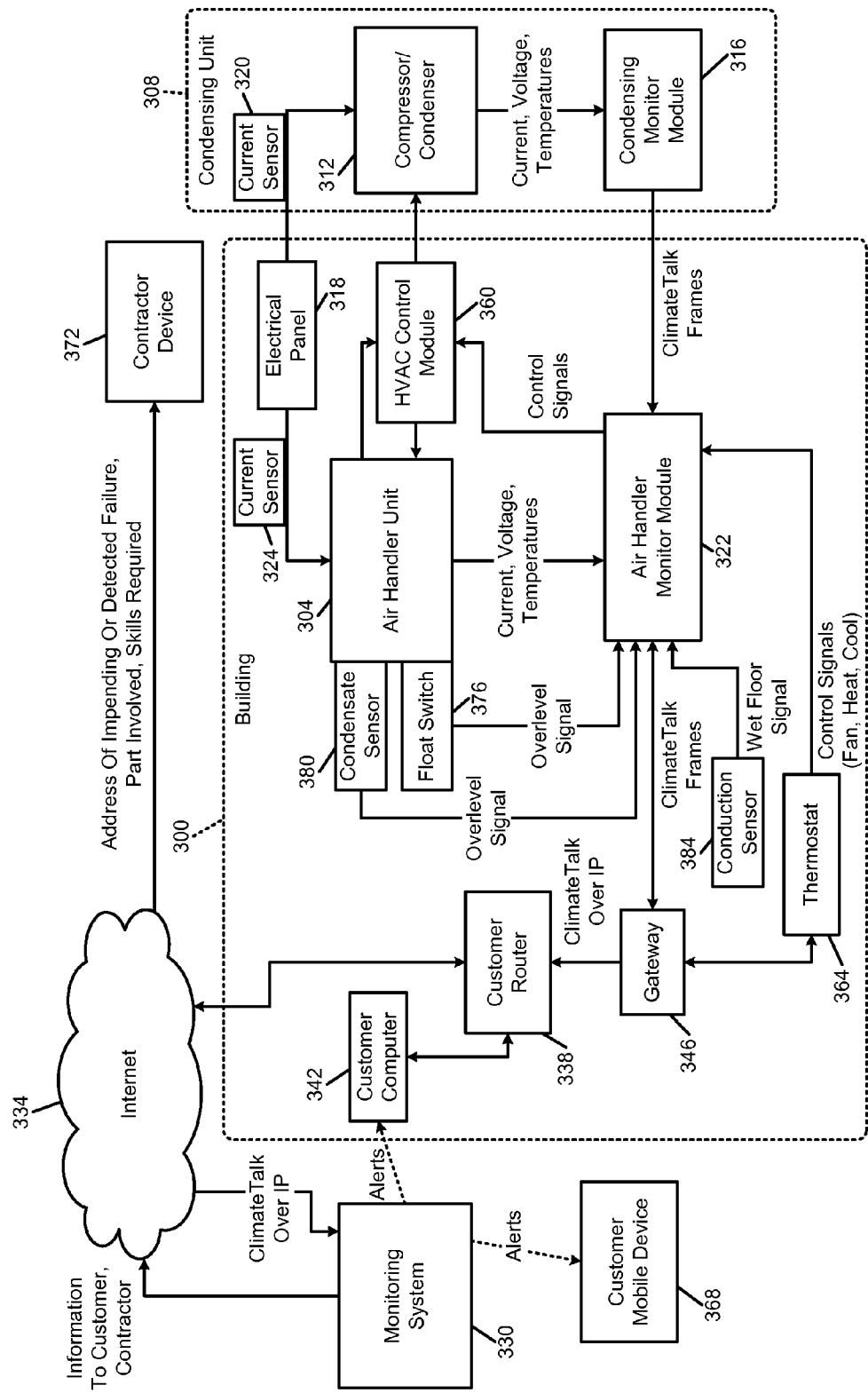
FIG. 2 is a functional block diagram of an example monitoring system showing an HVAC system of a single building.

In FIG. 2, a functional block diagram of an example system installed in a building 300 is presented. In various implementations, the building may be a single-family residence, and the customer is the homeowner, or a lessee or renter. The building 300 includes, for example only, a split system with an air handler unit 304 and a condensing unit 308. The condensing unit 308 includes a compressor, a condenser, a condenser fan, and associated electronics, represented collectively in FIG. 2 as compressor/condenser 312. In many systems, the air handler unit 304 is located inside the building 300, while the condensing unit 308 is located outside the building 300.

The present disclosure is not limited, and applies to other systems including, as examples only, systems where the components of the air handler unit 304 and the condensing unit 308 are located in close proximity to each other or even in a single enclosure. The single enclosure may be located inside or outside of the building 300. In various implementations, the air handler unit 304 may be located in a basement, garage, or attic. In ground source systems, where heat is exchanged with the earth, the air handler unit 304 and the condensing unit 308 may be located near the earth, such as in a basement, crawlspace, garage, or on the first floor, such as when the first floor is separated from the earth by only a concrete slab.

According to the principles of the present disclosure, a condensing monitor module 316 is located within or in close proximity to the condensing unit 308. The condensing monitor module 316 monitors parameters of the condensing unit 308 including current, voltage, and temperatures.

In one implementation, the current measured is a single power supply current that represents the aggregate current draw of the entire condensing unit 308 from an electrical panel 318. A current sensor 320 measures the current supplied to the condensing unit 308 and provides measured data to the condensing monitor module 316. For example only, the condensing unit 308 may receive an AC line voltage of approximately 240 volts. The current sensor 320 may sense current of one of the legs of the 240 volt power supply. A voltage sensor (not shown) may sense the voltage of one or both of the legs of the AC voltage supply. The current sensor 320 may include a current transformer, a current shunt, and/or a hall effect device. In various implementations, a power sensor may be used in addition to or in place of the current sensor 320. Current may be calculated based on the measured power, or profiles of the power itself may be used to evaluate operation of components of the condensing unit 308.

An air handler monitor module 322 monitors the air handler unit 304. For example, the air handler monitor module 322 may monitor current, voltage, and various temperatures. In one implementation, the air handler monitor module 322 monitors an aggregate current drawn by the entire air handler unit 304. When the air handler unit 304 provides power to an HVAC control module 360, the aggregate current includes current drawn by the HVAC control module 360. A current sensor 324 measures current delivered to the air handler unit 304 by the electrical panel 318. The current sensor 324 may be similar to the current sensor 320. Voltage sensors (not shown) may be located near the current sensors 324 and 320. The voltage sensors provide voltage data to the air handler unit 304 and the condensing unit 308.

The air handler monitor module 322 and the condensing monitor module 316 may evaluate the voltage to determine various parameters. For example, frequency, amplitude, RMS voltage, and DC offset may be calculated based on the measured voltage. In situations where 3-phase power is used, the order of the phases may be determined. Information about when the voltage crosses zero may be used to synchronize various measurements and to determine frequency based on counting the number of zero crossings within a predetermine time period.

The air handler unit 304 includes a blower, a burner, and an evaporator. In various implementations, the air handler unit 304 includes an electrical heating device instead of or in addition to the burner. The electrical heating device may provide backup or secondary heat. The condensing monitor module 316 and the air handler monitor module 322 share collected data with each other. When the current measured is the aggregate current draw, in either the air handler monitor module 322 or the condensing monitor module 316, contributions to the current profile are made by each component. It may be difficult, therefore, to easily determine in the time domain how the measured current corresponds to individual components. However, when additional processing is available, such as in a monitoring system, which may include server and other computing resources, additional analysis, such as frequency domain analysis, can be performed.

The frequency domain analysis may allow individual contributions of HVAC system components to be determined. Some of the advantages of using an aggregate current measurement may include reducing the number of current sensors that would otherwise be necessary to monitor each of the HVAC system components. This reduces bill of materials costs, as well as installation costs and potential installation problems. Further, providing a single time domain current stream may reduce the amount of bandwidth necessary to upload the current data. Nevertheless, the present disclosure could also be used with additional current sensors.

Further, although not shown in the figures, additional sensors, such as pressure sensors, may be included and connected to the air handler monitor module 322 and/or the condensing monitor module 316. The pressure sensors may be associated with return air pressure or supply air pressure, and/or with pressures at locations within the refrigerant loop. Air flow sensors may measure mass air flow of the supply air and/or the return air. Humidity sensors may measure relative humidity of the supply air and/or the return air, and may also measure ambient humidity inside or outside the building 300.

In various implementations, the principles of the present disclosure may be applied to monitoring other systems, such as a hot water heater, a boiler heating system, a refrigerator, a refrigeration case, a pool heater, a pool pump/filter, etc. As an example, the hot water heater may include an igniter, a gas valve (which may be operated by a solenoid), an igniter, an inducer blower, and a pump. Aggregate current readings can be analyzed by the monitoring company to assess operation of the individual components of the hot water heater. Aggregate loads, such as the hot water heater or the air handler unit 304, may be connected to an AC power source via a smart outlet, a smart plug, or a high amp load control switch, each of which may provide an indication when a connected device is activated.

In one implementation, which is shown in FIG. 2, the condensing monitor module 316 provides data to the air handler monitor module 322, and the air handler monitor module 322 provides data from both the air handler monitor module 322 and the condensing monitor module 316 to a remote monitoring system 330. The monitoring system 330 is reachable via a distributed network such as the Internet 334. Alternatively, any other suitable network, such as a wireless mesh network or a proprietary network, may be used.

In various other implementations, the condensing monitor module 316 may transmit data from the air handler monitor module 322 and the condensing monitor module 316 to an external wireless receiver. The external wireless receiver may be a proprietary receiver for a neighborhood in which the building 300 is located, or may be an infrastructure receiver, such as a metropolitan area network (such as WiMAX), a Wi-Fi access point, or a mobile phone base station.

In the implementation of FIG. 2, the air handler monitor module 322 relays data between the condensing monitor module 316 and the monitoring system 330. For example, the air handler monitor module 322 may access the Internet 334 using a router 338 of the customer. The customer router 338 may already be present to provide Internet access to other devices within the building 300, such as a customer computer 342 and/or various other devices having Internet connectivity, such as a DVR (digital video recorder) or a video gaming system.

The air handler monitor module 322 may communicate with the customer router 338 via a gateway 346. The gateway 346 translates information received from the air handler monitor module 322 into TCP/IP (Transmission Control Protocol/Internet Protocol) packets and vice versa. The gateway 346 then forwards those packets to the customer router 338. The gateway 346 may connect to the customer router 338 using a wired or wireless connection. The air handler monitor module 322 may communicate with the gateway 346 using a wired or wireless connection. For example, the interface between the gateway 346 and the customer router 338 may be Ethernet (IEEE 802.3) or Wi-Fi (IEEE 802.11).

The interface between the air handler monitor module 322 and the gateway 346 may include a wireless protocol, such as Bluetooth, ZigBee (IEEE 802.15.4), 900 Megahertz, 2.4 Gigahertz, Wi-Fi (IEEE 802.11), and other proprietary or standardized protocols. The air handler monitor module 322 may communicate with the condensing monitor module 316 using wired or wireless protocols. For example only, the air handler monitor module 322 and the condensing monitor module 316 may communicate using power line communications, which may be sent over a line voltage (such as 240 volts) or a stepped-down voltage, such as 24 volts, or a dedicated communications line.

The air handler monitor module 322 and the condensing monitor module 316 may transmit data within frames conforming to the ClimateTalk™ standard, which may include the ClimateTalk Alliance HVAC Application Profile v1.1, released Jun. 23, 2011, the ClimateTalk Alliance Generic Application Profile, v1.1, released Jun. 23, 2011, and the ClimateTalk Alliance Application Specification, v1.1, released Jun. 23, 2011, the entire disclosures of which are hereby incorporated by reference. In various implementations, the gateway 346 may encapsulate ClimateTalk™ frames into IP packets, which are transmitted to the monitoring system 330. The monitoring system 330 then extracts the ClimateTalk™ frames and parses the data contained within the ClimateTalk™ frames. The monitoring system 330 may send return information, including monitoring control signals and/or HVAC control signals, using ClimateTalk™.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11 ac, draft IEEE standard 802.11ad, and/or draft IEEE standard 802.11ah. In addition, other proprietary or standardized wireless or wired protocol may be used between monitor modules, gateways, routers, and/or access points.

For example, the interface between the gateway 346 and the customer router 338 may be Ethernet (IEEE 802.3) or Wi-Fi (IEEE 802.11). The interface between the air handler monitor module 322 and the gateway 346 may include a wireless protocol, such as Bluetooth, ZigBee (IEEE 802.15.4), 900 Megahertz, 2.4 Gigahertz, Wi-Fi (IEEE 802.11), and other proprietary or standardized protocols.

The HVAC control module 360 controls operation of the air handler unit 304 and the condensing unit 308. The HVAC control module 360 may operate based on control signals from a thermostat 364. The thermostat 364 may transmit requests for fan, heat, and cool to the HVAC control module 360. One or more of the control signals may be intercepted by the air handler monitor module 322. Various implementations of interaction between the control signals and the air handler monitor module 322 are shown below in FIGS. 3A-3C.

Additional control signals may be present in various HVAC systems. For example only, a heat pump may include additional control signals, such as a control signal for a reversing valve (not shown). The reversing valve selectively reverses the flow of refrigerant from what is shown in the figures depending on whether the system is heating the building or cooling the building. Further, when the flow of refrigerant is reversed, the roles of the evaporator and condenser are reversed—i.e., refrigerant evaporation occurs in what is labeled the condenser while refrigerant condensation occurs in what is labeled as the evaporator.

The thermostat 364 and/or the HVAC control module 360 may include control signals for secondary heating and/or secondary cooling, which may be activated when the primary heating or primary cooling is insufficient. In dual fuel systems, such as systems operating from either electricity or natural gas, control signals related to the selection of the fuel may be monitored. Further, additional status and error signals may be monitored, such as a defrost status signal, which may be asserted when the compressor is shut off and a defrost heater operates to melt frost from an evaporator.

In various implementations, the thermostat 364 may use the gateway 346 to communicate with the Internet 334. In one implementation, the thermostat 364 does not communicate directly with the air handler monitor module 322 or the condensing monitor module 316. Instead, the thermostat 364 communicates with the monitoring system 330, which may then provide information or control signals to the air handler monitor module 322 and/or the condensing monitor module 316 based on information from the thermostat 364. Using the monitoring system 330, the customer or contractor may send signals to the thermostat 364 to manually enable heating or cooling (regardless of current temperature settings), or to change set points, such as desired instant temperature and temperature schedules. In addition, information from the thermostat 364, such as current temperature and historical temperature trends, may be viewed.

The monitoring system 330 may provide alerts for situations such as detected or predicted failures to the customer computer 342 and/or to any other electronic device of the customer. For example, the monitoring system 330 may provide an alert to a mobile device 368 of the customer, such as a mobile phone or a tablet. The alerts are shown in FIG. 2 with dashed lines indicating that the alerts may not travel directly to the customer computer 342 or the customer mobile device 368 but may traverse, for example, the Internet 334 and/or a mobile provider network (not shown). The alerts may take any suitable form, including text messages, emails, social networking messages, voicemails, phone calls, etc.

The monitoring system 330 also interacts with a contractor device 372. The contractor device 372 may then interface with mobile devices carried by individual contractors. Alternatively, the monitoring system 330 may directly provide alerts to predetermined mobile devices of the contractor. In the event of an impending or detected failure, the monitoring system 330 may provide information regarding identification of the customer, identification of the HVAC system, the part or parts related to the failure, and/or the skills required to perform the maintenance.

In various implementations, the monitoring system 330 may transmit a unique identifier of the customer or the building to the contractor device 372. The contractor device 372 may include a database indexed by the unique identifier, which stores information about the customer including the customer's address, contractual information such as service agreements, and detailed information about the installed HVAC equipment.

The air handler monitor module 322 and the condensing monitor module 316 may receive respective sensor signals, such as water sensor signals. For example, the air handler monitor module 322 may receive signals from a float switch 376, a condensate sensor 380, and a conduction sensor 384. The condensate sensor 380 may include a device as described in commonly assigned patent application Ser. No. 13/162,798, filed Jun. 17, 2011, titled Condensate Liquid Level Sensor and Drain Fitting, the entire disclosure of which is hereby incorporated by reference.

Where the air handler unit 304 is performing air conditioning, condensation occurs and is captured in a condensate pan. The condensate pan drains, often via a hose, into a floor drain or a condensate pump, which pumps the condensate to a suitable drain. The condensate sensor 380 detects whether the drain hose has been plugged, a condition which will eventually cause the condensate pan to overflow, potentially causing damage to the HVAC system and to surrounding portions of the building 300.

The air handler unit 304 may be located on a catch pan, especially in situations where the air handler unit 304 is located above living space of the building 300. The catch pan may include the float switch 376. When enough liquid accumulates in the catch pan, the float switch 376 provides an over-level signal to the air handler monitor module 322.

The conduction sensor 384 may be located on the floor or other surface where the air handler unit 304 is located. The conduction sensor 384 may sense water leaks that are for one reason or another not detected by the float switch 376 or the condensate sensor 380, including leaks from other systems such as a hot water heater.

Figure 3C:
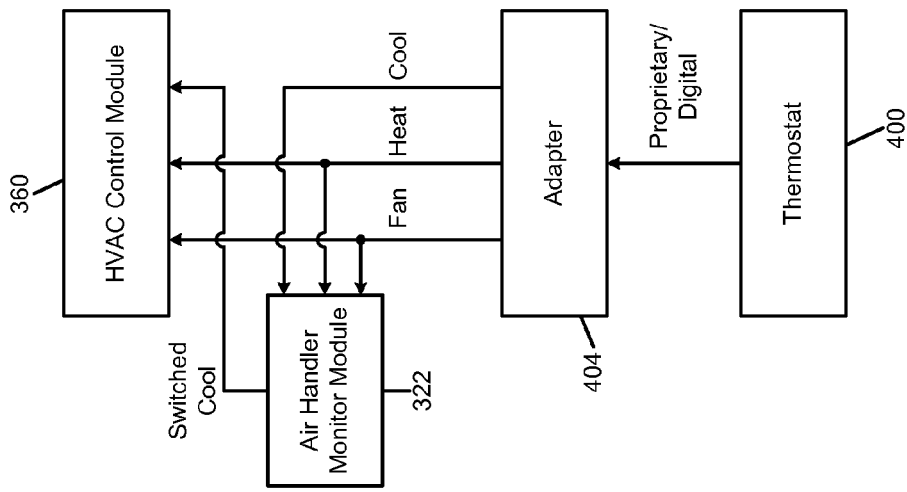
FIGS. 3A-3C are functional block diagrams of control signal interaction with an air handler monitor module.
Figure 3B:
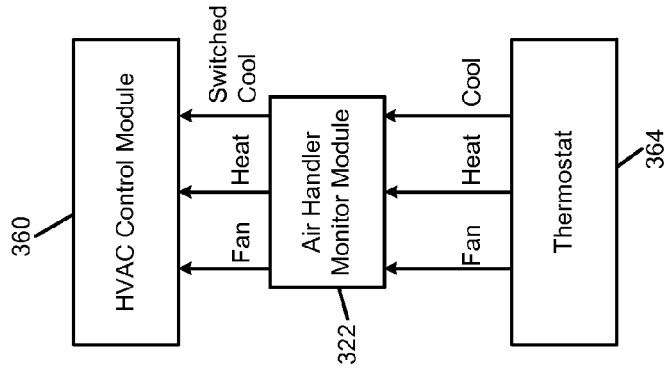
Figure 3A:
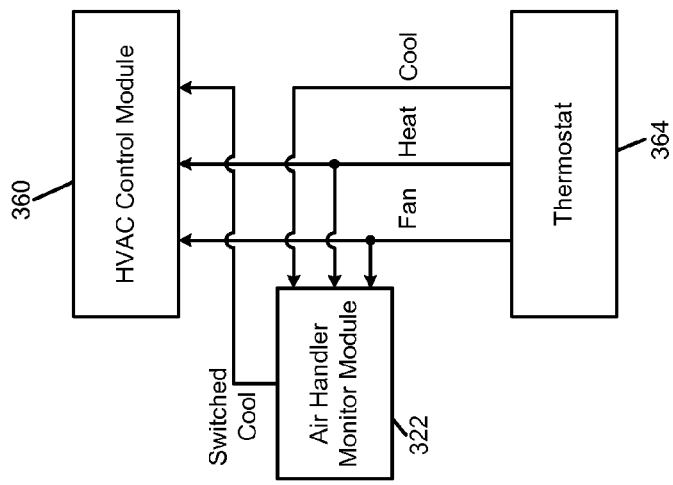

In FIG. 3A, an example of control signal interaction with the air handler monitor module 322 is presented. In this example, the air handler monitor module 322 taps into the fan and heat request signals. For example only, the HVAC control module 360 may include terminal blocks where the fan and heat signals are received. These terminal blocks may include additional connections where leads can be attached between these additional connections and the air handler monitor module 322.

Alternatively, leads from the air handler monitor module 322 may be attached to the same location as the fan and heat signals, such as by putting multiple spade lugs underneath a signal screw head. The cool signal from the thermostat 364 may be disconnected from the HVAC control module 360 and attached to the air handler monitor module 322. The air handler monitor module 322 then provides a switched cool signal to the HVAC control module 360. This allows the air handler monitor module 322 to interrupt operation of the air conditioning system, such as upon detection of water by one of the water sensors. The air handler monitor module 322 may also interrupt operation of the air conditioning system based on information from the condensing monitor module 316, such as detection of a locked rotor condition in the compressor.

In FIG. 3B, the fan, heat, and cool signals are connected to the air handler monitor module 322 instead of to the HVAC control module 360. The air handler monitor module 322 then provides fan, heat, and switched cool signals to the HVAC control module 360. In various other implementations, the air handler monitor module 322 may also switch the fan and/or heat signals.

In FIG. 3C, a thermostat 400 may use a proprietary or digital form of communication instead of discrete request lines such as those used by the thermostat 364. Especially in installations where the thermostat 400 is added after the HVAC control module 360 has been installed, an adapter 404 may translate the proprietary signals into individual fan, heat, and cool request signals. The air handler monitor module 322 can then be connected similarly to FIG. 3A (as shown) or FIG. 3B.

Figure 4A:
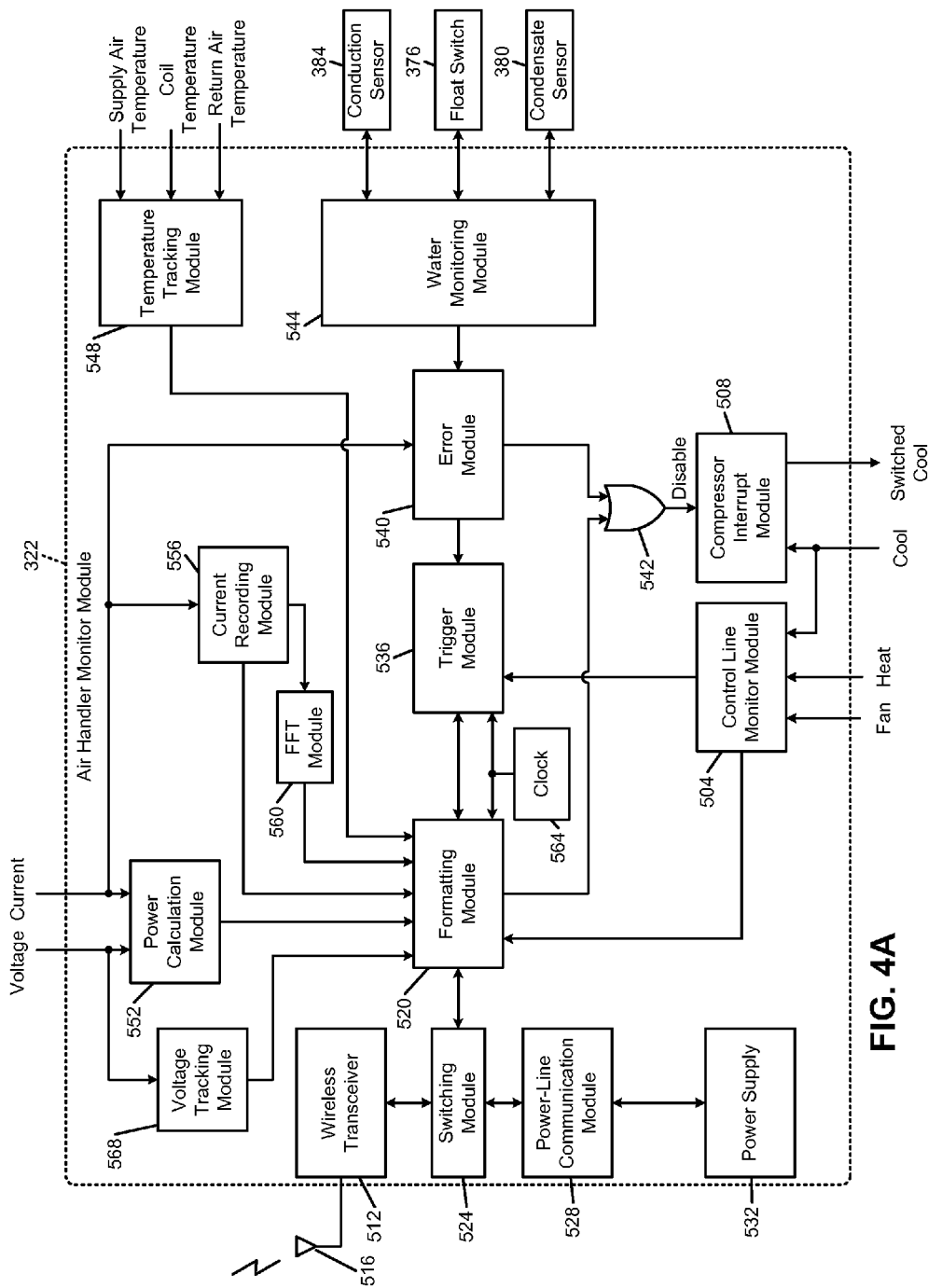
FIG. 4A is a functional block diagram of an example implementation of an air handler monitor module.

In FIG. 4A, a functional block diagram of an example implementation of the air handler monitor module 322 is presented. A control line monitor module 504 receives the fan, heat, and cool request signals. A compressor interrupt module 508 also receives the cool request signal. Based on a disable signal, the compressor interrupt module 508 deactivates the switched cool signal. Otherwise, the compressor interrupt module 508 may pass the cool signal through as the switched cool signal.

The control line monitor module 504 may also receive additional control signals, depending on application, including second stage heat, second stage cool, reversing valve direction, defrost status signal, and dual fuel selection.

A wireless transceiver 512 communicates using an antenna 516 with a wireless host, such as a gateway 346, a mobile phone base station, or a Wi-Fi (IEEE 802.11) or WiMax (IEEE 802.16) base station. A formatting module 520 forms data frames, such as ClimateTalk™ frames, including data acquired by the air handler monitor module 322. The formatting module 520 provides the data frames to the wireless transceiver 512 via a switching module 524.

The switching module 524 receives data frames from the monitoring system 330 via the wireless transceiver 512. Additionally or alternatively, the data frames may include control signals. The switching module 524 provides the data frames received from the wireless transceiver 512 to the formatting module 520. However, if the data frames are destined for the condensing monitor module 316, the switching module 524 may instead transmit those frames to a power-line communication module 528 for transmission to the condensing monitor module 316.

A power supply 532 provides power to some or all of the components of the air handler monitor module 322. The power supply 532 may be connected to line voltage, which may be single phase 120 volt AC power. Alternatively, the power supply 532 may be connected to a stepped-down voltage, such as a 24 volt power supply already present in the HVAC system. When the power received by the power supply 532 is also provided to the condensing monitor module 316, the power-line communication module 528 can communicate with the condensing monitor module 316 via the power supply 532. In other implementations, the power supply 532 may be distinct from the power-line communication module 528. The power-line communication module 528 may instead communicate with the condensing monitor module 316 using another connection, such as the switched cool signal (which may be a switched 24 volt line) provided to the condensing monitor module 316, another control line, a dedicated communications line, etc.

In various implementations, power to some components of the air handler monitor module 322 may be provided by 24 volt power from the thermostat 364. For example only, the cool request from the thermostat 364 may provide power to the compressor interrupt module 508. This may be possible when the compressor interrupt module 508 does not need to operate (and therefore does not need to be powered) unless the cool request is present, thereby powering the compressor interrupt module 508.

Data frames from the condensing monitor module 316 are provided to the switching module 524, which forwards those frames to the wireless transceiver 512 for transmission to the gateway 346. In various implementations, data frames from the condensing monitor module 316 are not processed by the air handler monitor module 322 other than to forward the frames to the gateway 346. In other implementations, the air handler monitor module 322 may combine data gathered by the air handler monitor module 322 with data gathered by the condensing monitor module 316 and transmit combined data frames.

In addition, the air handler monitor module 322 may perform data gathering or remedial operations based on the information from the condensing monitor module 316. For example only, the condensing monitor module 316 may transmit a data frame to the air handler monitor module 322 indicating that the air handler monitor module 322 should monitor various inputs. For example only, the condensing monitor module 316 may signal that the compressor is about to start running or has started running. The air handler monitor module 322 may then monitor related information.

Therefore, the formatting module 520 may provide such a monitoring indication from the condensing monitor module 316 to a trigger module 536. The trigger module 536 determines when to capture data, or if data is being continuously captured, which data to store, process, and/or forward. The trigger module 536 may also receive a signal from an error module 540. The error module 540 may monitor an incoming current and generate an error signal when the current is greater than a predetermined threshold for greater than a predetermined amount of time.

The condensing monitor module 316 may be configured similarly to the air handler monitor module 322. In the condensing monitor module 316, a corresponding error module may determine that a high current level indicates a locked rotor condition of the compressor. For example only, a baseline run current may be stored, and a current threshold calculated by multiplying the baseline run current by a predetermined factor. The locked rotor condition may then be determined when a measurement of current exceeds the current threshold. This processing may occur locally because a quick response time to a locked rotor is beneficial.

The error module 540 may instruct the trigger module 536 to capture information to help diagnose this error and/or may send a signal to the compressor interrupt module 508 to disable the compressor. The disable signal received by the compressor interrupt module 508 may cause disabling of the compressor interrupt module 508 when either the error module 540 or the formatting module 520 indicates that the interruption is required. This logical operation is illustrated with an OR gate 542.

The formatting module 520 may disable the compressor based on an instruction from the monitoring system 330 and/or the condensing monitor module 316. For example, the monitoring system 330 may instruct the formatting module 520 to disable the compressor, or reduce the capacity or output (therefore power draw) of the compressor, based on a request by a utility company. For example, during peak load times, the utility company may request air conditioning to be turned off in return for a discount on electricity prices. This shut off can be implemented via the monitoring system 330.

A water monitoring module 544 may monitor the conduction sensor 384, the float switch 376, and the condensate sensor 380. For example, when a resistivity of the conduction sensor 384 decreases below a certain value, which would happen in the presence of water, the water monitoring module 544 may signal to the error module 540 that water is present.

The water monitoring module 544 may also detect when the float switch 376 detects excessive water, which may be indicated by a closing or an opening of the float switch 376. The water monitoring module 544 may also detect when resistivity of the condensate sensor 380 changes. In various implementations, detection of the condensate sensor 380 may not be armed until a baseline current reading is made, such as at the time when the air handler monitor module 322 is powered on. Once the condensate sensor 380 is armed, a change in current may be interpreted as an indication that a blockage has occurred. Based on any of these water signals, the water monitoring module 544 may signal to the error module 540 that the compressor should be disabled.

A temperature tracking module 548 tracks temperatures of one or more HVAC components. For example, the temperature tracking module 548 may monitor the temperature of supply air and of return air. The temperature tracking module 548 may provide average values of temperature to the formatting module 520. For example only, the averages may be running averages. The filter coefficients of the running averages may be predetermined and may be modified by the monitoring system 330.

The temperature tracking module 548 may monitor one or more temperatures related to the air conditioning system. For example, a liquid line provides refrigerant to an expansion valve of the air handler unit 304 from a condenser of the condensing unit 308. A temperature may be measured along the refrigerant line before and/or after the expansion valve. The expansion valve may include, for example, a thermostatic expansion valve, a capillary tube, or an automatic expansion valve.

The temperature tracking module 548 may additionally or alternatively monitor one or more temperatures of an evaporator coil of the air handler unit 304. The temperatures may be measured along the refrigerant line at or near the beginning of the evaporator coil, at or near an end of the evaporator coil, or at one or more midpoints. In various implementations, the placement of the temperature sensor may be dictated by physical accessibility of the evaporator coil. The temperature tracking module 548 may be informed of the location of the temperature sensor. Alternatively, data about temperature location may be stored as part of installation data, which may be available to the formatting module 520 and/or to the monitoring system 330, which can use this information to accurately interpret the received temperature data.

A power calculation module 552 monitors voltage and current. In one implementation, these are the aggregate power supply voltage and the aggregate power supply current, which represents the total current consumed by all of the components of the air handler unit 304. The power calculation module 552 may perform a point-by-point power calculation by multiplying the voltage and current. Point-by-point power values and/or an average value of the point-by-point power is provided to the formatting module 520.

A current recording module 556 records values of the aggregate current over a period of time. The aggregate current may be sensed by a current sensor that is installed within the air handler unit 304 or along the electrical cable providing power to the air handler unit 304 (see current sensor 324 in FIG. 2). For example only, the current sensor may be located at a master switch that selectively supplies the incoming power to the air handler unit 304. Alternatively, the current sensor may be located closer to, or inside of, an electrical distribution panel. The current sensor may be installed in line with one or more of the electrical wires feeding current from the electrical distribution panel to the air handler unit 304.

The aggregate current includes current drawn by all energy-consuming components of the air handler unit 304. For example only, the energy-consuming components can include a gas valve solenoid, an igniter, a circulator blower motor, an inducer blower motor, a secondary heat source, an expansion valve controller, a furnace control panel, a condensate pump, and a transformer, which may provide power to a thermostat. The energy-consuming components may also include the air handler monitor module 322 itself and the condensing monitor module 316.

It may be difficult to isolate the current drawn by any individual energy-consuming component. Further, it may be difficult to quantify or remove distortion in the aggregate current, such as distortion that may be caused by fluctuations of the voltage level of incoming AC power. As a result, processing is applied to the current, which includes, for example only, filtering, statistical processing, and frequency domain processing.

In the implementation of FIG. 4A, the time domain series of currents from the current recording module 556 is provided to a fast Fourier transform (FFT) module 560, which generates a frequency spectrum from the time domain current values. The length of time and the frequency bins used by the FFT module 560 may be configurable by the monitoring system 330. The FFT module 560 may include, or be implemented by, a digital signal processor (DSP). In various implementations, the FFT module 560 may perform a discrete Fourier transform (DFT). The current recording module 556 may also provide raw current values, an average current value (such as an average of absolute values of the current), or an RMS current value to the formatting module 520.

A clock 564 allows the formatting module 520 to apply a time stamp to each data frame that is generated. In addition, the clock 564 may allow the trigger module 536 to periodically generate a trigger signal. The trigger signal may initiate collection and/or storage and processing of received data. Periodic generation of the trigger signal may allow the monitoring system 330 to receive data from the air handler monitor module 322 frequently enough to recognize that the air handler monitor module 322 is still functioning.

A voltage tracking module 568 measures the AC line voltage, and may provide raw voltage values or an average voltage value (such as an average of absolute values of the voltage) to the formatting module 520. Instead of average values, other statistical parameters may be calculated, such as RMS (root mean squared) or mean squared.

Based on the trigger signal, a series of frames may be generated and sent. For example only, the frames may be generated contiguously for 105 seconds and then intermittently for every 15 seconds until 15 minutes has elapsed. Each frame may include a time stamp, RMS voltage, RMS current, real power, average temperature, conditions of status signals, status of liquid sensors, FFT current data, and a flag indicating the source of the trigger signal. Each of these values may correspond to a predetermined window of time, or, frame length.

The voltage and current signals may be sampled by an analog-to-digital converter at a certain rate, such as 1920 samples per second. The frame length may be measured in terms of samples. When a frame is 256 samples long, at a sample rate of 1920 samples per second, there are 7.5 frames every second (or, 0.1333 seconds per frame). Generation of the trigger signal is described in more detail below in FIG. 7. The sampling rate of 1920 Hz has a Nyquist frequency of 960 Hz and therefore allows an FFT bandwidth of up to approximately 960 Hz. An FFT limited to the time span of a single frame may be calculated by the FFT module 560 for each of the frames.

The formatting module 520 may receive a request for a single frame from the monitoring system 330. The formatting module 520 therefore provides a single frame in response to the request. For example only, the monitoring system 330 may request a frame every 30 seconds or some other periodic interval, and the corresponding data may be provided to a contractor monitoring the HVAC system in real time.

Figure 4B:
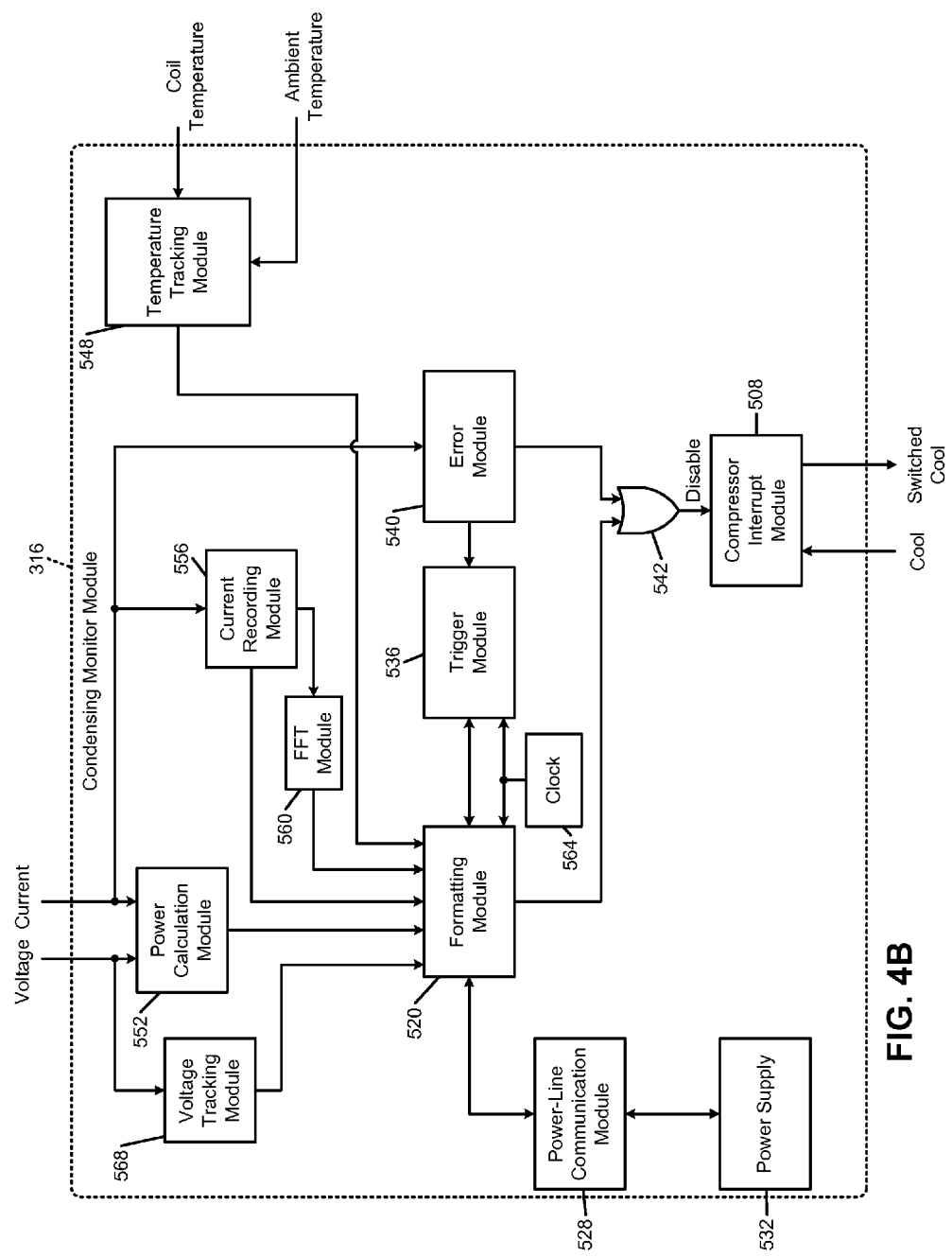
FIG. 4B is a functional block diagram of an example implementation of a condensing monitor module.

In FIG. 4B, an example implementation of the condensing monitor module 316 is shown. Components of the condensing monitor module 316 may be similar to components of the air handler monitor module 322 of FIG. 4A. For example only, the condensing monitor module 316 may include the same hardware components as the air handler monitor module 322, where unused components, such as the wireless transceiver 512, are simply disabled or deactivated. In various other implementations, a circuit board layout may be shared between the air handler monitor module 322 and the condensing monitor module 316, with various locations on the printed circuit board being depopulated (corresponding to components present in the air handler monitor module 322 but not implemented in the condensing monitor module 316).

The current recording module 556 of FIG. 4B receives an aggregate current value (such as from current sensor 320 of FIG. 2) that represents the current to multiple energy-consuming components of the condensing unit 308. The energy-consuming components may include start windings, run windings, capacitors, and contactors/relays for a condenser fan motor and a compressor motor. The energy-consuming components may also include a reversing valve solenoid, a control board, and in some implementations the condensing monitor module 316 itself.

In the condensing monitoring module 316, the temperature tracking module 548 may track an ambient temperature. When the condensing monitor module 316 is located outdoors, the ambient temperature represents an outside temperature. As discussed above, the temperature sensor supplying the ambient temperature may be located outside of an enclosure housing a compressor or condenser. Alternatively, the temperature sensor may be located within the enclosure, but exposed to circulating air. In various implementations the temperature sensor may be shielded from direct sunlight and may be exposed to an air cavity that is not directly heated by sunlight. In various implementations, online (including Internet-based) weather data based on geographical location of the building may be used to determine sun load, ambient air temperature, precipitation, and humidity.

The temperature tracking module 548 may monitor temperatures of the refrigerant line at various points, such as before the compressor (referred to as a suction line temperature), after the compressor (referred to as a compressor discharge temperature), after the condenser (referred to as a liquid line out temperature), and/or at one or more points along the condenser coil. The location of temperature sensors may be dictated by a physical arrangement of the condenser coils. Additionally or alternatively to the liquid line out temperature sensor, a liquid line in temperature sensor may be used. During installation, the location of the temperature sensors may be recorded.

Additionally or alternatively, a database may be available that specifies where temperature sensors are placed. This database may be referenced by installers and may allow for accurate cloud processing of the temperature data. The database may be used for both air handler sensors and compressor/condenser sensors. The database may be prepopulated by the monitoring company or may be developed by trusted installers, and then shared with other installation contractors. The temperature tracking module 548 and/or a cloud processing function may determine an approach temperature, which is a measurement of how close the condenser has been able to make the liquid line out temperature to the ambient air temperature.

Figure 5A:
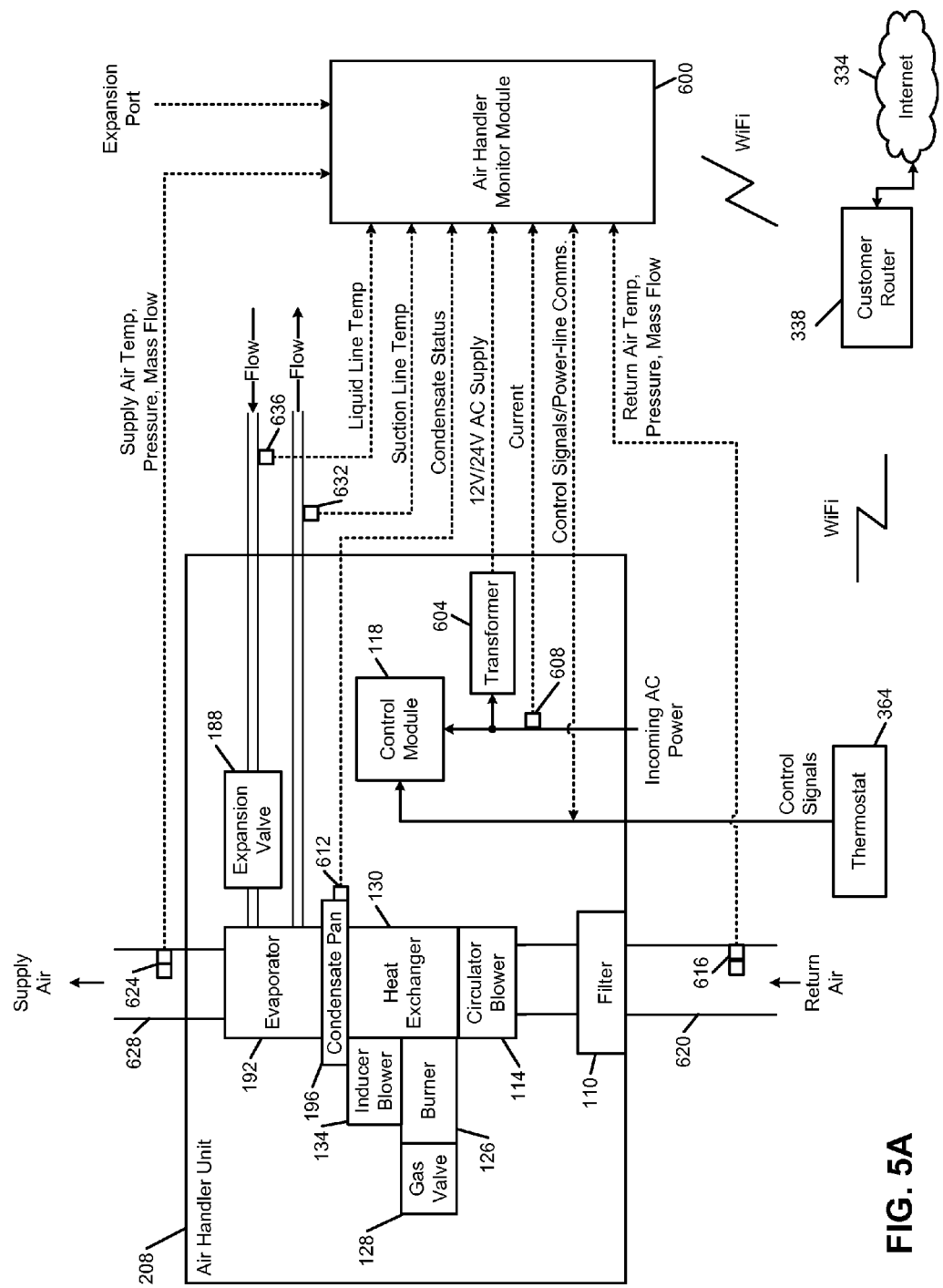
FIG. 5A is a functional block diagram of an example system including an implementation of an air handler monitor module.

In FIG. 5A, the air handler unit 208 of FIG. 1 is shown for reference. Because the systems of the present disclosure can be used in retrofit applications, elements of the air handler unit 208 can remain unmodified. The air handler monitor module 600 and the condensing monitor module 640 can be installed in an existing system without needing to replace the original thermostat 122 shown in FIG. 1. However, to enable certain additional functionality, such as Wi-Fi communication and/or display of alert messages, the thermostat 122 of FIG. 1 may be replaced with the thermostat 364, as shown.

When installing an air handler monitor module 600 in the air handler unit 208, power is provided to the air handler monitor module 600. For example, a transformer 604 can be connected to an AC line in order to provide AC power to the air handler monitor module 600. The air handler monitor module 600 may measure voltage of the incoming line based on this transformed power supply. For example, the transformer 604 may be a 10-to-1 transformer and therefore provide either a 12V or 24V AC supply to the air handler monitor module 600 depending on whether the air handler unit 208 is operating on nominal 120V or nominal 240V power.

A current sensor 608 measures incoming current to the air handler unit 208. The current sensor 608 may include a current transformer that snaps around one power lead of the incoming AC power. In various other implementations, electrical parameters (such as voltage, current, and power factor) may be measured at a different location, such as at an electrical panel providing power to the building from the electrical utility, as shown in FIG. 2 at 318.

For simplicity of illustration, the control module 118 is not shown to be connected to the various components and sensors of the air handler unit 208. In addition, routing of the AC power to various powered components of the air handler unit 208, such as the circulator blower 114, the gas valve 128, and the inducer blower 134, are also not shown for simplicity. The current sensor 608 measures the entire current entering the air handler unit 208 and therefore represents an aggregate current of voltage of each of the current-consuming components of the air handler unit 208.

A condensate sensor 612 measures condensate levels in the condensate pan 196. If a level of condensate gets too high, this may indicate a plug or clog in the condensate pan 196 or a problem with hoses or pumps used for drainage from the condensate pan 196. Although shown in FIG. 5A as being internal to the air handler unit 208, access to the condensate pan 196 and therefore the location of the condensate sensor 612, may be external to the air handler unit 208.

A return air sensor 616 is located in a return air plenum 620. The return air sensor 616 may measure temperature, pressure, and/or mass airflow. In various implementations, a thermistor may be multiplexed as both a temperature sensor and a hot wire mass airflow sensor. In various implementations, the return air sensor 616 is upstream of the filter 110 but downstream of any bends in the return air plenum 620.

A supply air sensor 624 is located in a supply air plenum 628. The supply air sensor 624 may measure air temperature, air pressure, and/or mass air flow. The supply air sensor 624 may include a thermistor that is multiplexed to measure both temperature and, as a hot wire sensor, mass airflow. In various implementations, such as is shown in FIG. 5A, the supply air sensor 624 may be located downstream of the evaporator 192 but upstream of any bends in the supply air plenum 628.

The air handler monitor module 600 also receives a suction line temperature from a suction line temperature sensor 632. The suction line temperature sensor 632 measures refrigerant temperature in the refrigerant line between the evaporator 192 and the compressor 180 (shown in FIG. 5B). A liquid line temperature sensor 636 measures refrigerant temperature of refrigerant in a liquid line traveling from the condenser 184 (shown in FIG. 5B) to the expansion valve 188. The air handler monitor module 600 may include one or more expansion ports to allow for connection of additional sensors and/or to allow connection to other devices, such as a home security system, a proprietary handheld device for use by contractors, or a portable computer.

The air handler monitor module 600 also monitors control signals from the thermostat 364. Because one or more of these control signals is also transmitted to the condensing until is also transmitted to the condensing unit 212 (shown in FIG. 5B), these control signals can be used for communication between the air handler monitor module 600 and a condensing monitor module 640 (shown in FIG. 5B). The air handler monitor module 600 communicates with the customer router 338, such as using IEEE 802.11, also known as Wi-Fi. As discussed above although Wi-Fi is discussed in this example, communication according to the present disclosure can be performed over a variety of wired and wireless communication protocols.

The thermostat 364 may also communicate with the customer router 338 using Wi-Fi. In various implementations, the air handler monitor module 600 and the thermostat 364 do not communicate directly; however, because they are both connected through the customer router 338 to a remote monitoring system, the remote monitoring system may allow for control of one based on inputs from the other. Specifically, various faults identified based on information from the air handler monitor module 600 may cause the remote monitoring system to adjust temperature set points of the thermostat 364 and/or display warning or alert messages on the thermostat 364.

Figure 5B:
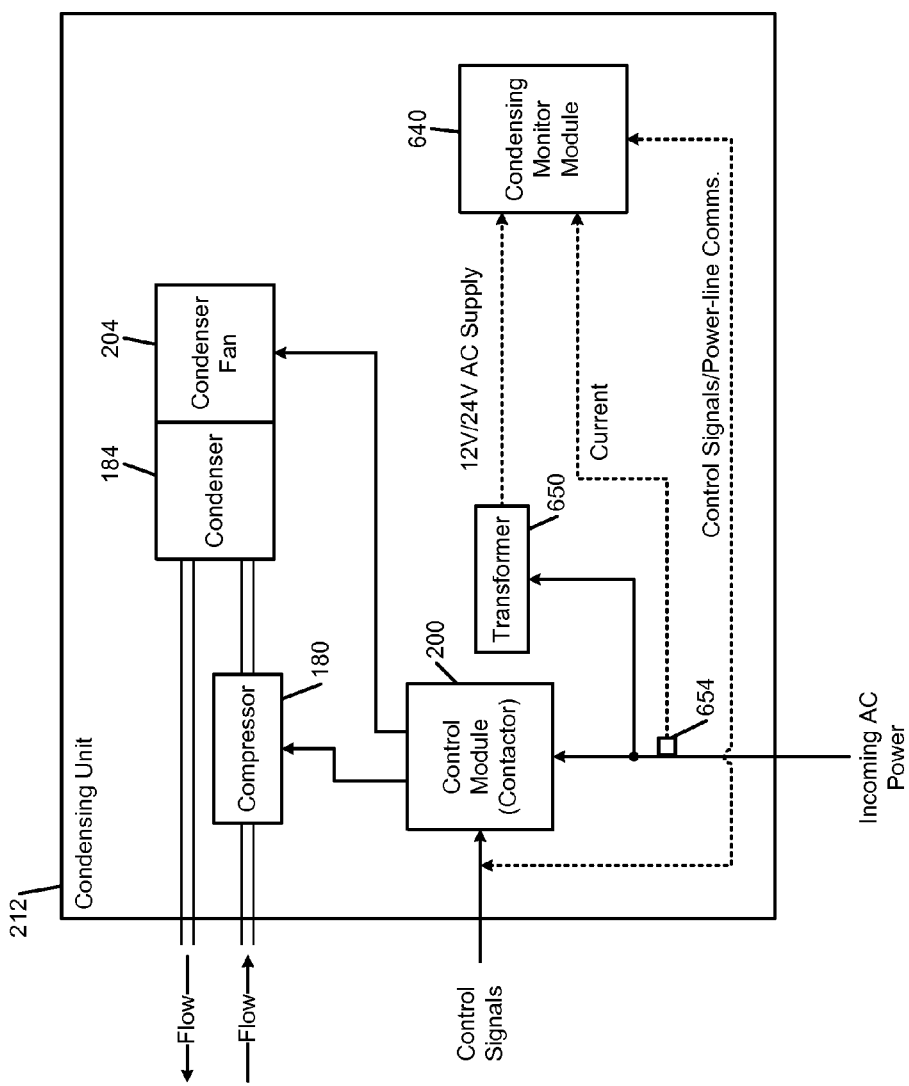
FIG. 5B is a functional block diagram of an example system including an implementation of a condensing monitor module.

In FIG. 5B, the condensing monitor module 640 is installed in the condensing unit 212. A transformer 650 converts incoming AC voltage into a stepped-down voltage for powering the condensing monitor module 640. In various implementations, the transformer 650 may be a 10-to-1 transformer. A current sensor 654 measures current entering the condensing unit 212. The condensing monitor module 640 may also measure voltage from the supply provided by the transformer 650. Based on measurements of the voltage and current, the condensing monitor module 640 may calculate power and/or may determine power factor. As described above, the condensing monitor module 640 communicates with the air handler monitor module 600 using one or more control signals from the thermostat 364. In these implementations, data from the condensing monitor module 640 is transmitted to the air handler monitor module 600, which in turn uploads the data by the customer router 338.

Figure 5C:
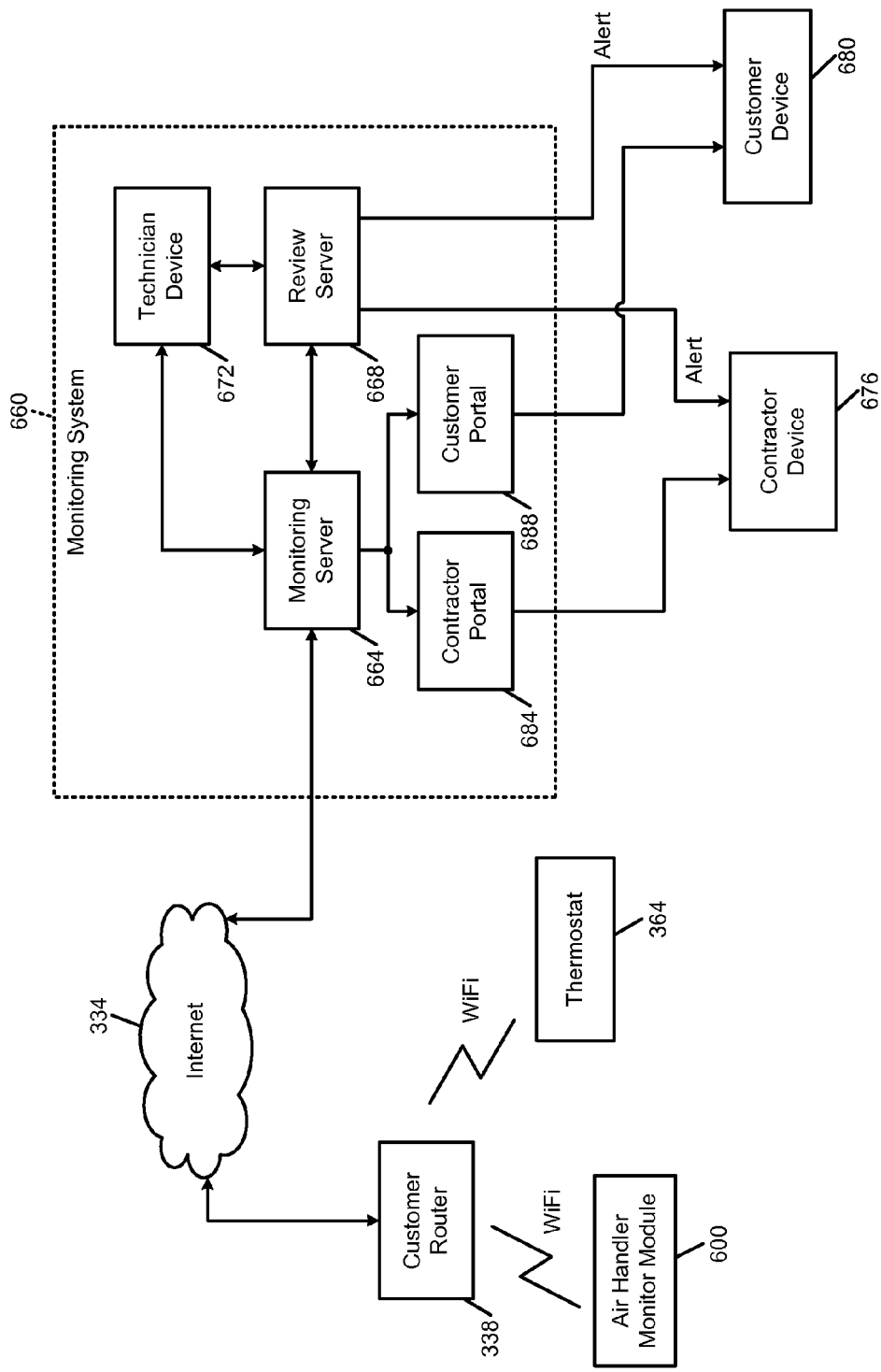
FIG. 5C is a high level functional block diagram of an example system including an implementation of a remote monitoring system.

In FIG. 5C, the air handler monitor module 600 and the thermostat 364 are shown communicating, using the customer router 338, with a monitoring system 660 via the Internet 334. The monitoring system 660 includes a monitoring server 664 which receives data from the air handler monitor module 600 and the thermostat 364 and maintains and verifies network continuity with the air handler monitor module 600. The monitoring server 664 executes various algorithms to identify problems, such as failures or decreased efficiency, and to predict impending faults.

The monitoring server 664 may notify a review server 668 when a problem is identified or a fault is predicted. This programmatic assessment may be referred to as an advisory. Some or all advisories may be triaged by a technician to reduce false positives and potentially supplement or modify data corresponding to the advisory. For example, a technician device 672 operated by a technician is used to review the advisory and to monitor data (in various implementations, in real-time) from the air handler monitor module 600 via the monitoring server 664.

The technician using the technician device 672 reviews the advisory. If the technician determines that the problem or fault is either already present or impending, the technician instructs the review server 668 to send an alert to either or both of a contractor device 676 or a customer device 680. The technician may determine that, although a problem or fault is present, the cause is more likely to be something different than specified by the automated advisory. The technician can therefore issue a different alert or modify the advisory before issuing an alert based on the advisory. The technician may also annotate the alert sent to the contractor device 676 and/or the customer device 680 with additional information that may be helpful in identifying the urgency of addressing the alert and presenting data that may be useful for diagnosis or troubleshooting.

In various implementations, minor problems may be reported to the contractor device 676 only so as not to alarm the customer or inundate the customer with alerts. Whether the problem is considered to be minor may be based on a threshold. For example, an efficiency decrease greater than a predetermined threshold may be reported to both the contractor and the customer, while an efficiency decrease less than the predetermined threshold is reported to only the contractor.

In some circumstances, the technician may determine that an alert is not warranted based on the advisory. The advisory may be stored for future use, for reporting purposes, and/or for adaptive learning of advisory algorithms and thresholds. In various implementations, a majority of generated advisories may be closed by the technician without sending an alert.

Based on data collected from advisories and alerts, certain alerts may be automated. For example, analyzing data over time may indicate that whether a certain alert is sent by a technician in response to a certain advisory depends on whether a data value is on one side of a threshold or another. A heuristic can then be developed that allows those advisories to be handled automatically without technician review. Based on other data, it may be determined that certain automatic alerts had a false positive rate over a threshold. These alerts may be put back under the control of a technician.

In various implementations, the technician device 672 may be remote from the monitoring system 660 but connected via a wide area network. For example only, the technician device may include a computing device such as a laptop, desktop, or tablet.

With the contractor device 676, the contractor can access a contractor portal 684, which provides historical and real-time data from the air handler monitor module 600. The contractor using the contractor device 676 may also contact the technician using the technician device 672. The customer using the customer device 680 may access a customer portal 688 in which a graphical view of the system status as well as alert information is shown. The contractor portal 684 and the customer portal 688 may be implemented in a variety of ways according to the present disclosure, including as an interactive web page, a computer application, and/or an app for a smartphone or tablet.

In various implementations, data shown by the customer portal may be more limited and/or more delayed when compared to data visible in the contractor portal 684. In various implementation, the contractor device 676 can be used to request data from the air handler monitor module 600, such as when commissioning a new installation.

Figure 5D:
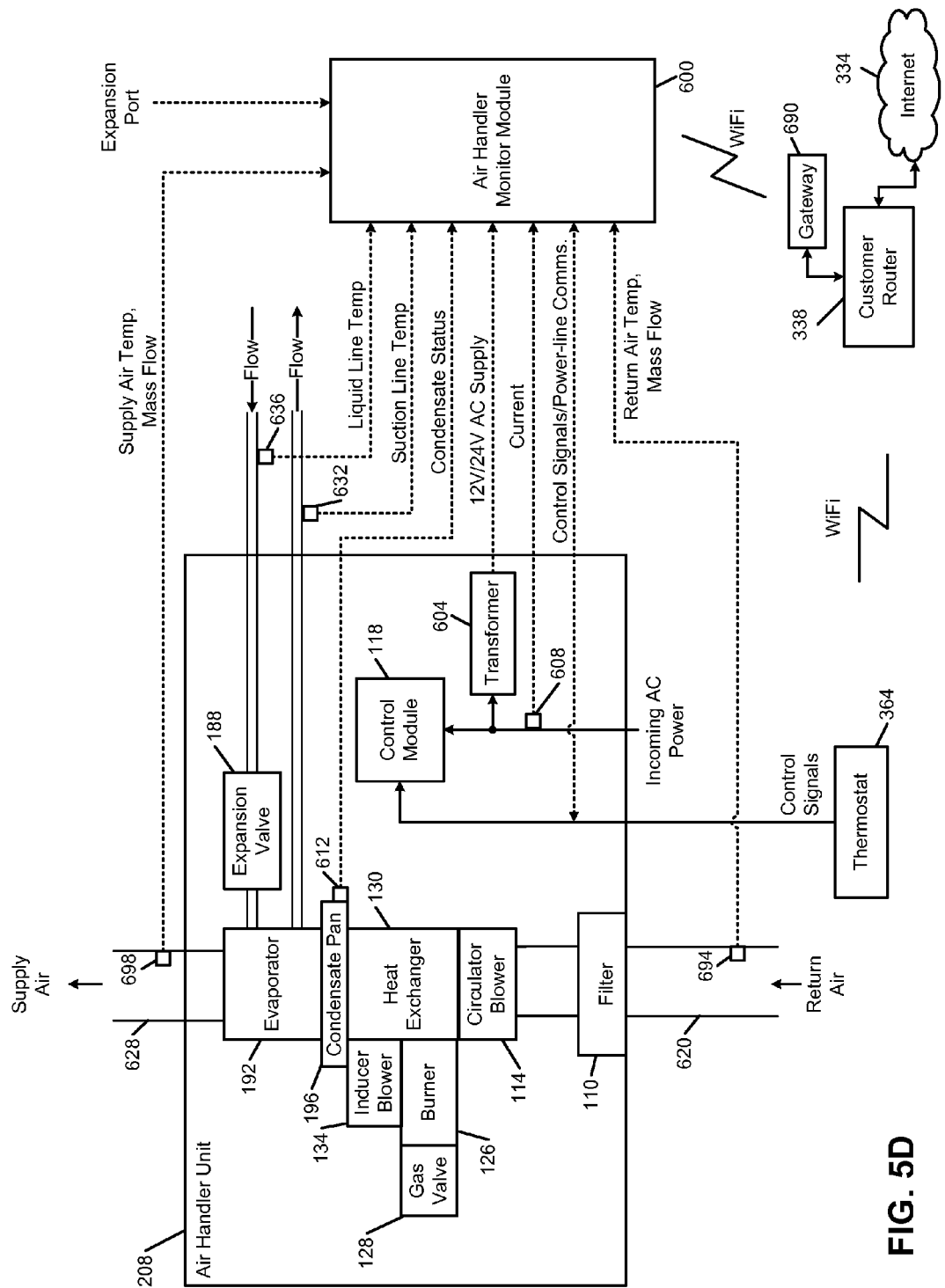
FIG. 5D is a functional block diagram of another example system including an implementation of an air handler monitor module.

In FIG. 5D, a system similar to that of FIG. 5A is shown. A gateway 690 is added, which creates a wireless network with the air handler monitor module 600. The gateway 690 may interface with the customer router 338 using a wired or wireless protocol, such as Ethernet. The wireless network created by the gateway 690 may be compliant with wireless networks described above, such as IEEE 802.11. The wireless network created by the gateway 690 may overlap in coverage with a wireless network created by the customer router 338.

In various implementations, the gateway 690 may be configured, automatically or by an installer, to choose a frequency band and/or channel within a band to minimize interference with any wireless network established by the customer router 338. In addition, the gateway 690 may be configured to choose a frequency band and channel that are not subject to excessive interference from other devices or outside transmissions. The gateway 690 may create a protected wireless network and may authenticate the air handler monitor module 600 using Wi-Fi Protected Setup (WPS). In other implementations, the gateway 690 and the air handler monitor module 600 may use a preshared key (PSK).

Using the gateway 690 provides a known wireless network for the air handler monitor module 600 to communicate over. During installation, the technician may not be able to ascertain a password (including a passphrase or a passkey) used by the customer router 338. Further, when the customer router 338 is upgraded or when the password is changed, the wireless connectivity of the air handler monitor module 600 may be compromised. Further, any existing signal strength, configuration, or other problems with the customer router 338 can be avoided while setting up the air handler monitor module 600.

In the implementation of FIG. 5D, measurement of a differential air pressure between return air and supply air is omitted. The return air sensor 616 of FIG. 5A is therefore represented as a single box at 694. The return air sensor 694 may also be configurable to measure mass airflow, such as when the return air sensor 694 is a thermistor multiplexed as both a temperature sensor and a hot wire mass airflow sensor. Similarly, the supply air sensor 624 of FIG. 5A is represented as a single box at 698 to measure temperature. The return air sensor 694 may also be configurable to measure mass airflow.

Figure 6A:
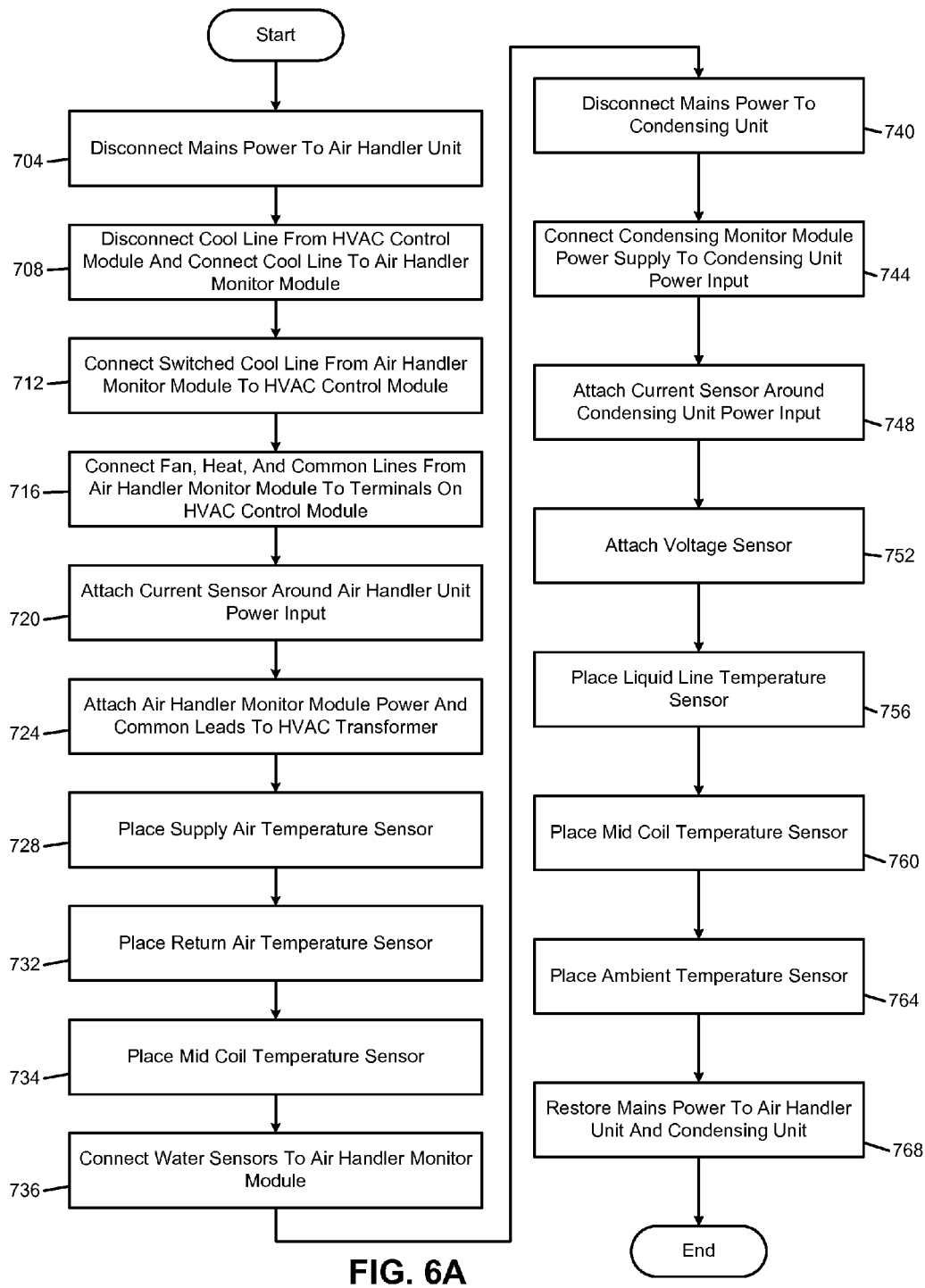
FIGS. 6A and 6B are flowcharts depicting brief overviews of example installation procedures in retrofit applications.

In FIG. 6A, a brief overview of an example monitoring system installation, such as in a retrofit application, is presented. Although FIGS. 6 and 7 are drawn with arrows indicating a specific order of operation, the present disclosure is not limited to this specific order. At 704, mains power to the air handler is disconnected. If there is no outside disconnect for the mains power to the compressor/condenser unit, mains power to the compressor/condenser unit should also be disconnected at this point. At 708, the cool line is disconnected from the HVAC control module and connected to the air handler monitor module. At 712, the switched cool line from the air handler monitor module is connected to the HVAC control module where the cool line was previously connected.

At 716, fan, heat, and common lines from the air handler monitor module are connected to terminals on the HVAC control module. In various implementations, the fan, heat, and common lines originally going to the HVAC control module may be disconnected and connected to the air handler monitor module. This may be done for HVAC control modules where additional lines cannot be connected in parallel with the original fan, heat, and common lines.

At 720, a current sensor such as a snap-around current transformer, is connected to mains power to the HVAC system. At 724, power and common leads are connected to the HVAC transformer, which may provide 24 volt power to the air handler monitor module. In various implementations, the common lead may be omitted, relying on the common lead discussed at 716. Continuing at 728, a temperature sensor is placed in the supply air duct work and connected to the air handler monitor module. At 732, a temperature sensor is placed in the return air duct work and connected to the air handler monitor module. At 734, a temperature sensor is placed in a predetermined location, such as a middle loop, of the evaporator coil. At 736, water sensors are installed and connected to the air handler monitor module.

At 740, mains power to the compressor/condenser unit is disconnected. At 744, the power supply of the condensing monitor module is connected to the compressor/condenser unit's input power. For example, the condensing monitor module may include a transformer that steps down the line voltage into a voltage usable by the condensing monitor module. At 748, a current sensor is attached around the compressor/condenser unit's power input. At 752, a voltage sensor is connected to the compressor/condenser unit's power input.

At 756, a temperature sensor is installed on the liquid line, such as at the outlet of the condenser. The temperature sensor may be wrapped with insulation to thermally couple the temperature sensor to the liquid in the liquid line and thermally isolate the temperature sensor from the environment. At 760, the temperature sensor is placed in a predetermined location of the condenser coil and insulated. At 764, the temperature sensor is placed to measure ambient air. The temperature sensor may be located outside of the condensing unit 308 or in a space of the condensing unit 308 in which outside air circulates. At 768, mains power to the air handler and the compressor/condenser unit is restored.

Figure 6B:
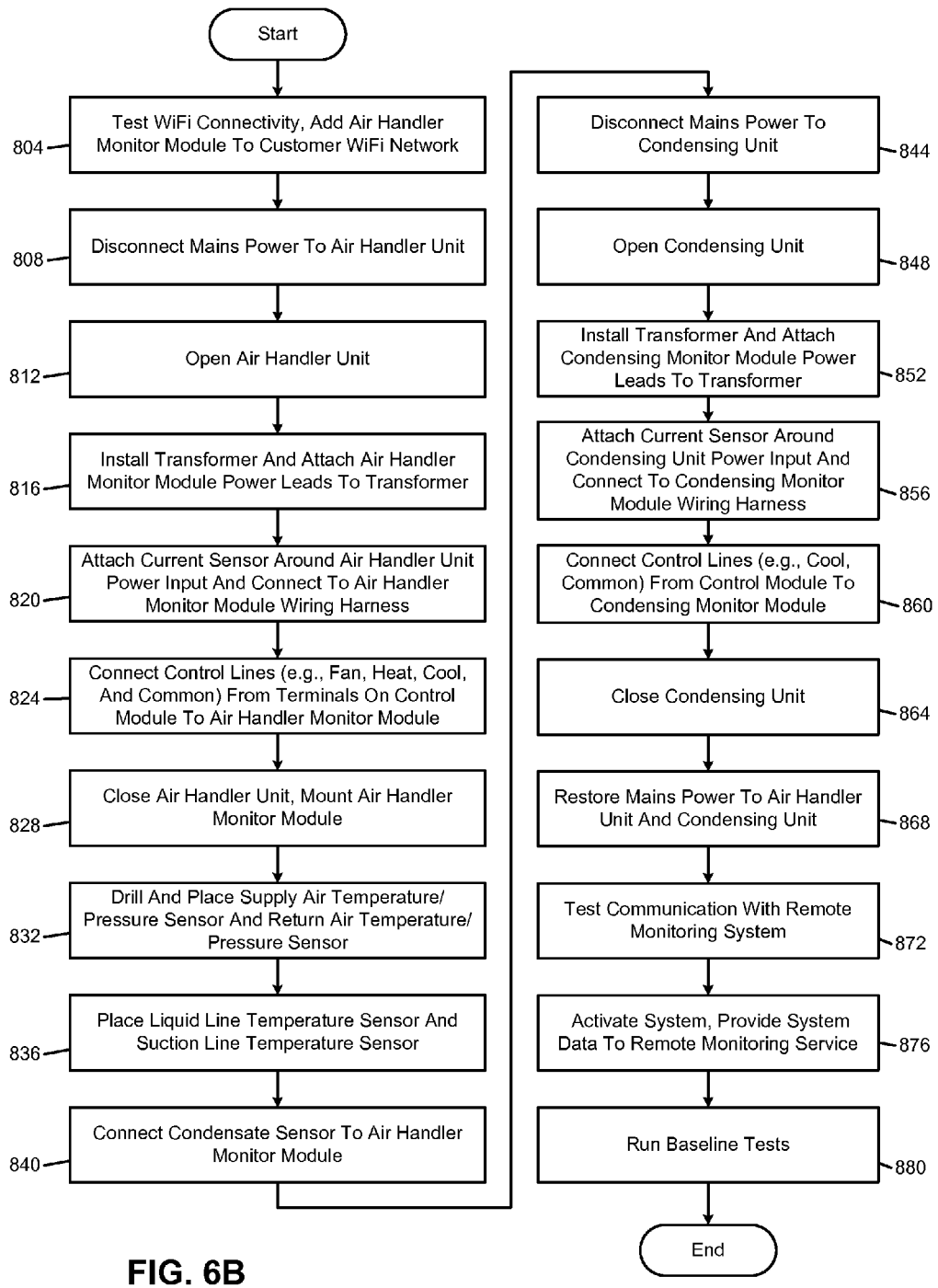
Figure 7:
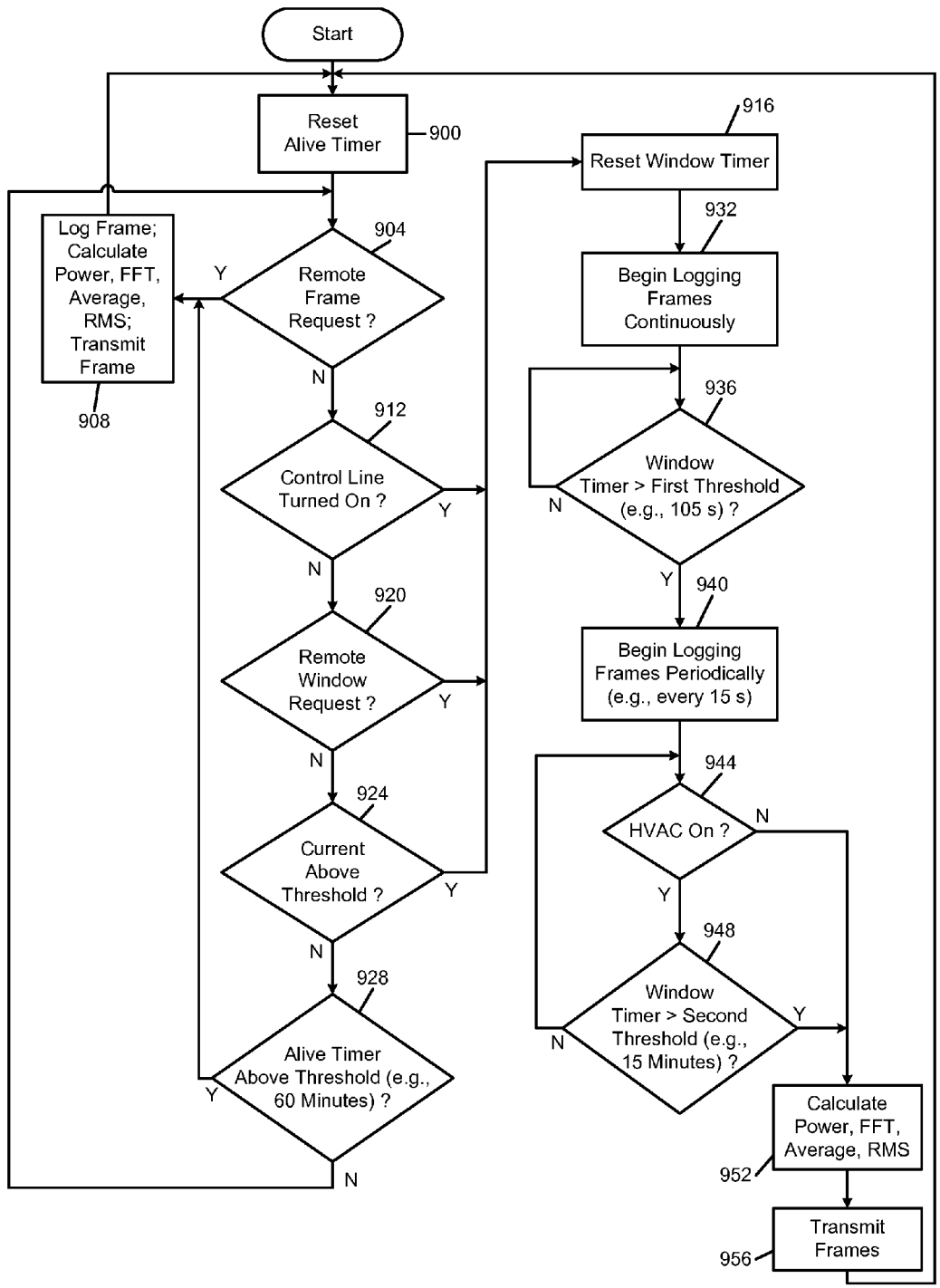
FIG. 7 is a flowchart of example operation in capturing frames of data.

In FIG. 6B, an overview of an example installation process for an air handler monitor module (e.g., the air handler monitor module 600 of FIG. 5A) and a condensing monitor module (e.g., the condensing monitor module 640 of FIG. 5B) begins at 804, where Wi-Fi connectivity is tested. For example only, a contractor may use a portable device, such as a laptop, tablet, or smartphone to assess the customers Wi-Fi. If necessary, firmware updates to the customer router may be necessary.

In addition, it may be necessary for the customer to upgrade their router and/or install a second router or wireless access point to allow for a strong signal to be received by the air handler monitor module. The remaining installation may be suspended until a viable Wi-Fi signal has been established or the installation may proceed and commissioning of the system and checking network connectivity can be tested remotely or in person once a strong Wi-Fi signal is available to the air handler monitor module. In various implementations, the air handler monitor module may include a wired network port, which may allow for a run of network cable to provide network access to the air handler monitor module for purposes of testing. The cable can be removed after the system has been commissioned with the expectation that a strong Wi-Fi signal will subsequently be provided.

For example only, power may be supplied to the air handler monitor module to ensure that Wi-Fi connectivity is not only present, but compatible with the air handler monitor module. The power may be temporary, such as a wall-wart transformer or a battery pack, which does not remain with the installed air handler monitor module. In various implementations, the air handler monitor module may be used to test Wi-Fi connectivity before attempting any signal detection or troubleshooting with another device, such as a portable computer.

Control continues at 808, where mains power is disconnected to the air handler unit. If access to an electrical panel possible, mains power to both the air handler unit and the condensing unit should be removed as soon as possible in the process. At 812, the installer opens the air handler unit and at 816, a voltage transformer is installed, connected to AC power, and connected to the air handler monitor module. At 820, a current sensor is attached around one lead of the AC power input to the air handler unit. At 824, control lines including fan, heat, cooling, and common are connected from the existing control module to the air handler monitor module.

In various implementations, the air handler monitor module may be connected in series with one of the control lines, such as the call for cool line. For these implementations, the call for cool line may be disconnected from the preexisting control module and connected to a lead on a wiring harness of the air handler monitor module. Then a second lead on the wiring harness of the air handler monitor module can be connected to the location on the preexisting control module where the call for cool line had previously been connected.

At 828, the air handler unit is closed and the air handler monitor module is mounted to the exterior of the air handler unit, such as with tape and/or magnets. At 832, a supply air sensor is installed in a hole drilled in a supply air plenum. The supply air sensor may be a single physical device that includes a pressure sensor and a temperature sensor. Similarly, a return air sensor is installed in a hole drilled in a return air plenum.

At 836, a liquid line temperature sensor is placed on the liquid refrigerant line leading to the evaporator, and a suction line temperature sensor is placed on a suction refrigerant line leading to the compressor. In various implementations, these sensors may be thermally coupled to the respective refrigerant lines using a thermal paste and may be wrapped in an insulating material to minimize the sensors' responsiveness to surrounding air temperature. At 840, a condensate sensor is installed proximate to the condensate pan and connected to the air handler monitor module.

At 844, the installer moves to the condensing unit and disconnects mains power to the condensing unit if not already disconnected. At 848, the installer opens the condensing unit and at 852, the installer installs a voltage transformer connected to AC power and attaches leads from the condensing monitor module to the transformer. At 856, a current sensor is attached around one of the power leads entering the condensing unit. At 860, control lines (including cool and common) from terminals on the existing control board are connected to the condensing monitor module. At 864, the condensing unit is closed and at 868, mains power to the air handler unit and condensing unit is restored.

At 872, communication with the remote monitoring system is tested. Then at 876, the air handler monitor module the condensing monitor module are activated. At this time, the installer can provide information to the remote monitoring system including identification of control lines that were connected to the air handler monitor module and condensing monitor module. In addition, information such as the HVAC system type, year installed, manufacturer, model number, BTU rating, filter type, filter size, tonnage, etc.

In addition, because the condensing unit may have been installed separately from the furnace, the installer may also record and provide to the remote monitoring system the manufacturer and model number of the condensing unit, the year installed, the refrigerant type, the tonnage, etc. At 880, baseline tests are run. For example, this may include running a heating cycle and a cooling cycle, which the remote monitoring system records and uses to identify initial efficiency metrics. Further, baseline profiles for current, power, and frequency domain current can be established. Installation may then be complete.

The installer may collect a device fee, an installation fee, and/or a subscription fee from the customer. In various implementations, the subscription fee, the installation fee, and the device fee may be rolled into a single system fee, which the customer pays upon installation. The system fee may include the subscription fee for a set number of years, such as 1, 2, 5, or 10, or may be a lifetime subscription, which may last for the life of the home or the ownership of the building by the customer.

In FIG. 7, a flowchart depicts example operation in capturing frames of data. Control begins upon startup of the air handler monitor module at 900, where an alive timer is reset. The alive timer ensures that a signal is periodically sent to the monitoring system so that the monitoring system knows that the air handler monitor module is still alive and functioning. In the absence of this signal, the monitoring system 330 will infer that the air handler monitor module is malfunctioning or that there is connectivity issue between the air handler monitor module and the monitoring system.

Control continues at 904, where control determines whether a request for a frame has been received from the monitoring system. If such a request has been received, control transfers to 908; otherwise, control transfers to 912. At 908, a frame is logged, which includes measuring voltage, current, temperatures, control lines, and water sensor signals. Calculations are performed, including averages, powers, RMS, and FFT. Then a frame is transmitted to the monitoring system. In various implementations, monitoring of one or more control signals may be continuous. Therefore, when a remote frame request is received, the most recent data is used for the purpose of calculation. Control then returns to 900.

Referring now to 912, control determines whether one of the control lines has turned on. If so, control transfers to 916; otherwise, control transfers to 920. Although 912 refers to the control line being turned on, in various other implementations, control may transfer to 916 when a state of a control line changes—i.e., when the control line either turns on or turns off. This change in status may be accompanied by signals of interest to the monitoring system. Control may also transfer to 916 in response to an aggregate current of either the air handler unit or the compressor/condenser unit.

At 920, control determines whether a remote window request has been received. If so, control transfers to 916; otherwise, control transfers to 924. The window request is for a series of frames, such as is described below. At 924, control determines whether current is above a threshold, and if so, control transfers to 916; otherwise, control transfers to 928. At 928, control determines whether the alive timer is above a threshold such as 60 minutes. If so, control transfers to 908; otherwise, control returns to 904.

At 916, a window timer is reset. A window of frames is a series of frames, as described in more detail here. At 932, control begins logging frames continuously. At 936, control determines whether the window timer has exceeded a first threshold, such as 105 seconds. If so, control continues at 940; otherwise, control remains at 936, logging frames continuously. At 940, control switches to logging frames periodically, such as every 15 seconds.

Control continues at 944, where control determines whether the HVAC system is still on. If so, control continues at 948; otherwise, control transfers to 952. Control may determine that the HVAC system is on when an aggregate current of the air handler unit and/or of the condensing unit exceeds a predetermined threshold. Alternatively, control may monitor control lines of the air handler unit and/or the condensing unit to determine when calls for heat or cool have ended. At 948, control determines whether the window timer now exceeds a second threshold, such as 15 minutes. If so, control transfers to 952; otherwise, control returns to 944 while control continues logging frames periodically.

At 952, control stops logging frames periodically and performs calculations such as power, average, RMS, and FFT. Control continues at 956 where the frames are transmitted. Control then returns to 900. Although shown at the end of frame capture, 952 and 956 may be performed at various times throughout logging of the frames instead of at the end. For example only, the frames logged continuously up until the first threshold may be sent as soon as the first threshold is reached. The remaining frames up until the second threshold is reached may each be sent out as it is captured.

In various implementations, the second threshold may be set to a high value, such as an out of range high, which effectively means that the second threshold will never be reached. In such implementations, the frames are logged periodically for as long as the HVAC system remains on.

A server of the monitoring system includes a processor and memory, where the memory stores application code that processes data received from the air handler monitor and condensing monitor modules and determines existing and/or impending failures, as described in more detail below. The processor executes this application code and stores received data either in the memory or in other forms of storage, including magnetic storage, optical storage, flash memory storage, etc. While the term server is used in this application, the application is not limited to a single server.

A collection of servers, which may together operate to receive and process data from the air handler monitor and condensing monitor modules of multiple buildings. A load balancing algorithm may be used between the servers to distribute processing and storage. The present application is not limited to servers that are owned, maintained, and housed by a monitoring company. Although the present disclosure describes diagnostics and processing and alerting occurring in the monitoring system 330, some or all of these functions may be performed locally using installed equipment and/or customer resources, such as a customer computer.

The servers may store baselines of frequency data for the HVAC system of a building. The baselines can be used to detect changes indicating impending or existing failures. For example only, frequency signatures of failures of various components may be pre-programmed, and may be updated based on observed evidence from contractors. For example, once a malfunctioning HVAC system has been diagnosed, the monitoring system may note the frequency data leading up to the malfunction and correlate that frequency signature with the diagnosed cause of the malfunction. For example only, a computer learning system, such as a neural network or a genetic algorithm, may be used to refine frequency signatures. The frequency signatures may be unique to different types of HVAC systems and/or may share common characteristics. These common characteristics may be adapted based on the specific type of HVAC system being monitored.

The monitoring system may also receive current data in each frame. For example, when 7.5 frames per seconds are received, current data having a 7.5 Hz resolution is available. The current and/or the derivative of this current may be analyzed to detect impending or existing failures. In addition, the current and/or the derivative may be used to determine when to monitor certain data, or points at which to analyze obtained data. For example, frequency data obtained at a predetermined window around a certain current event may be found to correspond to a particular HVAC system component, such as activation of a hot surface igniter.

Components of the present disclosure may be connected to metering systems, such as utility (including gas and electric) metering systems. Data may be uploaded to the monitoring system 330 using any suitable method, including communications over a telephone line. These communications may take the form of digital subscriber line (DSL) or may use a modem operating at least partially within vocal frequencies. Uploading to the monitoring system 330 may be confined to certain times of day, such as at night time or at times specified by the contractor or customer. Further, uploads may be batched so that connections can be opened and closed less frequently. Further, in various implementations, uploads may occur only when a fault or other anomaly has been detected.

Methods of notification are not restricted to those disclosed above. For example, notification of HVAC problems may take the form of push or pull updates to an application, which may be executed on a smart phone or other mobile device or on a standard computer. Notifications may also be viewed using web applications or on local displays, such as the thermostat 364 or other displays located throughout the building or on the air handler monitor module 322 or the condensing monitor module 316.

Figure 8:
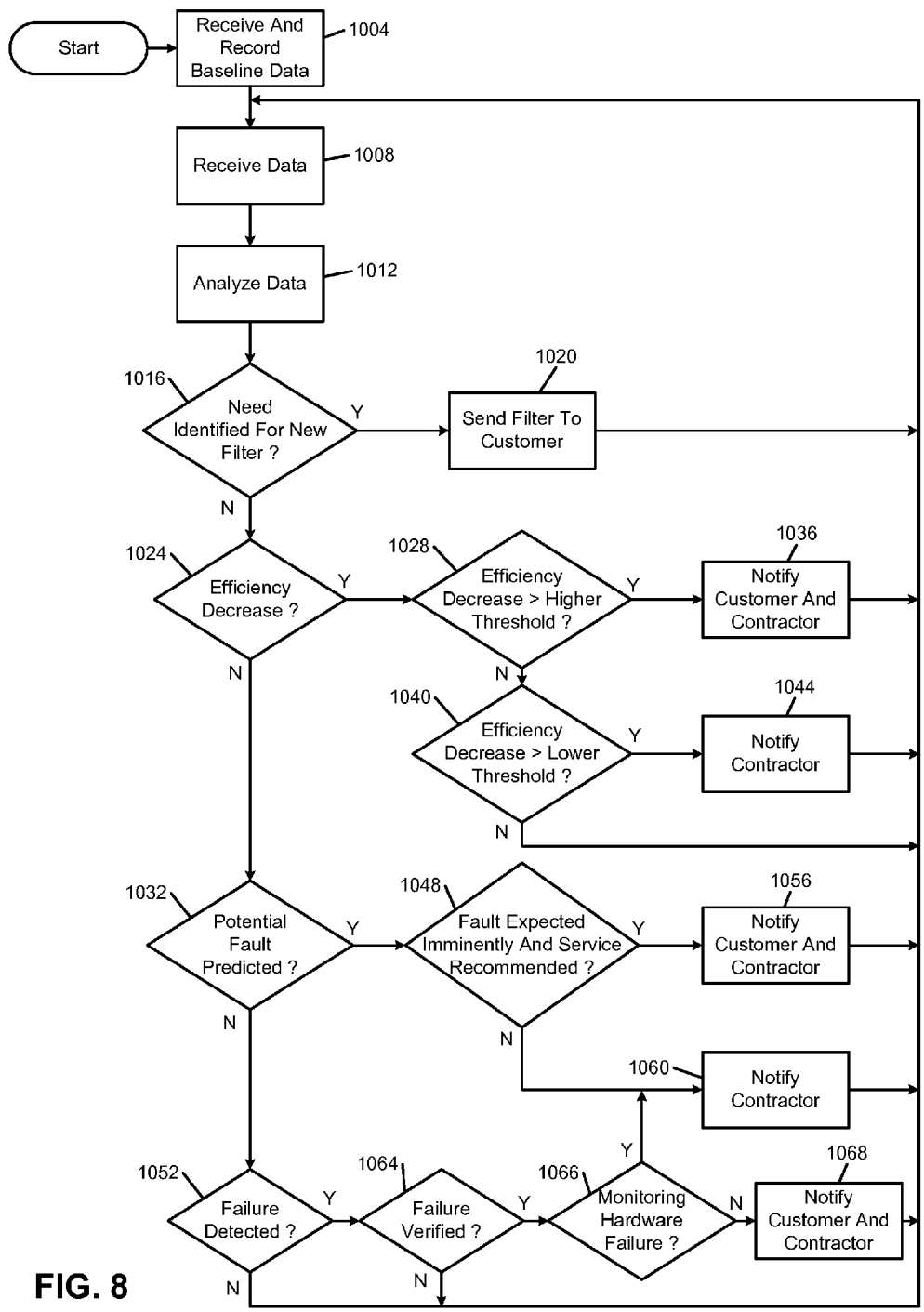
FIG. 8 is an example functional schematic of example HVAC components.

In FIG. 8, control begins at 1004, where data is received and baseline data is recorded. This may occur during the commissioning of a new monitoring system, which may be either in a new HVAC system or a retrofit installation. Control continues at 1008, where data is received from the local devices. At 1012, at the remote monitoring system, the data is analyzed.

At 1016, control determines whether there is a need for a new consumable, such as an air filter or humidifier element. If so, control transfers to 1020; otherwise, control transfers to 1024. At 1020, the consumable is sent to the customer. The air filter may be sent directly to the customer from the operator of the remote monitoring system or a partner company. Alternatively, a designated HVAC contractor may be instructed to send or personally deliver the consumable to the customer. In addition, the HVAC contractor may offer to install the consumable for the customer or may install the consumable as part of a service plan. In situations where the customer has not opted for consumable coverage, the remote monitoring system may instead send an alert to the customer and/or the contractor that a replacement consumable is needed. This alert may be sent out in advance of when the consumable should be replaced to give the customer or contractor sufficient time to acquire and install the consumable. Control then returns to 1008.

At 1024, control determines whether there has been an efficiency decrease. If so, control transfers to 1028; otherwise, control transfers to 1032. At 1028, control determines whether the efficiency decrease is greater than a first threshold. If so, control transfers to 1036; otherwise, control transfers to 1040. This first threshold may be a higher threshold indicating that the efficiency decrease is significant and should be addressed. This threshold may be set based on baseline performance of the customer's system, performance of similar systems in a surrounding area, performance of similar systems throughout a wide geographic area but normalized for environmental parameters, and/or based on manufacturer-supplied efficiency metrics.

At 1036, the customer and designated contractor are notified and control returns to 1008. At 1040, control determines whether the efficiency decrease is greater than a second threshold. This second threshold may be lower than the first threshold and may indicate gradual deterioration of the HVAC system. As a result, if the efficiency decrease is greater than this second threshold, control transfers to 1044; otherwise, control simply returns to 1008. At 1044, the decrease in efficiency may not be significant enough to notify the customer; however, the contractor is notified and control returns to 1008. The contractor may schedule an appointment with the customer and/or may note the decrease in efficiency for the next visit to the customer.

At 1032, control determines whether a potential fault is predicted based on data from the local devices at the customer building. If so, control transfers to 1048; otherwise, control transfers to 1052. At 1048, control determines whether the fault is expected imminently. If so, and if corresponding service is recommended, control transfers to 1056, where the customer and the designated contractor are notified. This may allow the customer to make arrangements with the contractor and/or make arrangements to secure a backup source of heating or cooling. For example only, an imminent fault predicted late at night may be too late for service by the contractor. The customer may therefore plan accordingly for a potentially cold or warm building in the morning and make appropriate arrangements. The prediction of the fault may allow for the contractor to schedule a visit as the contractor opens in the morning. Control then returns to 1008.

If the fault is not expected imminently, or if service is not recommended, at 1048, the contractor may be notified at 1060. The contractor may then schedule a visit to the customer to determine whether a part should be preemptively replaced and to discuss other service options with the customer. Control then returns to 1008. At 1052, if a failure is detected, control transfers to 1064; otherwise, control returns to 1008. At 1064, if the failure is verified, such as through automatic or manual mechanisms, control transfers to 1066; otherwise, control returns to 1008. At 1066, if the failure is determined to be with the monitoring hardware, control transfers to 1060 to notify the contractor; otherwise, the failure is with the HVAC system, and control transfers to 1068. At 1068, the contractor and customer are notified of the failure and control returns to 1008.

In various implementations, the customer may be given the option to receive all data and all alerts sent to the contractor. Although this may be more information than a regular customer needs, certain customers may appreciate the additional data and the more frequent contact. The determinations made in 1028, 1040, 1048, 1064, and 1066 may each be made partially or fully by a technician. This may reduce false positives and confirm correct diagnosis of failures and faults based on the technician's experience with the intricacies of HVAC systems and automated algorithms.

Figure 9:
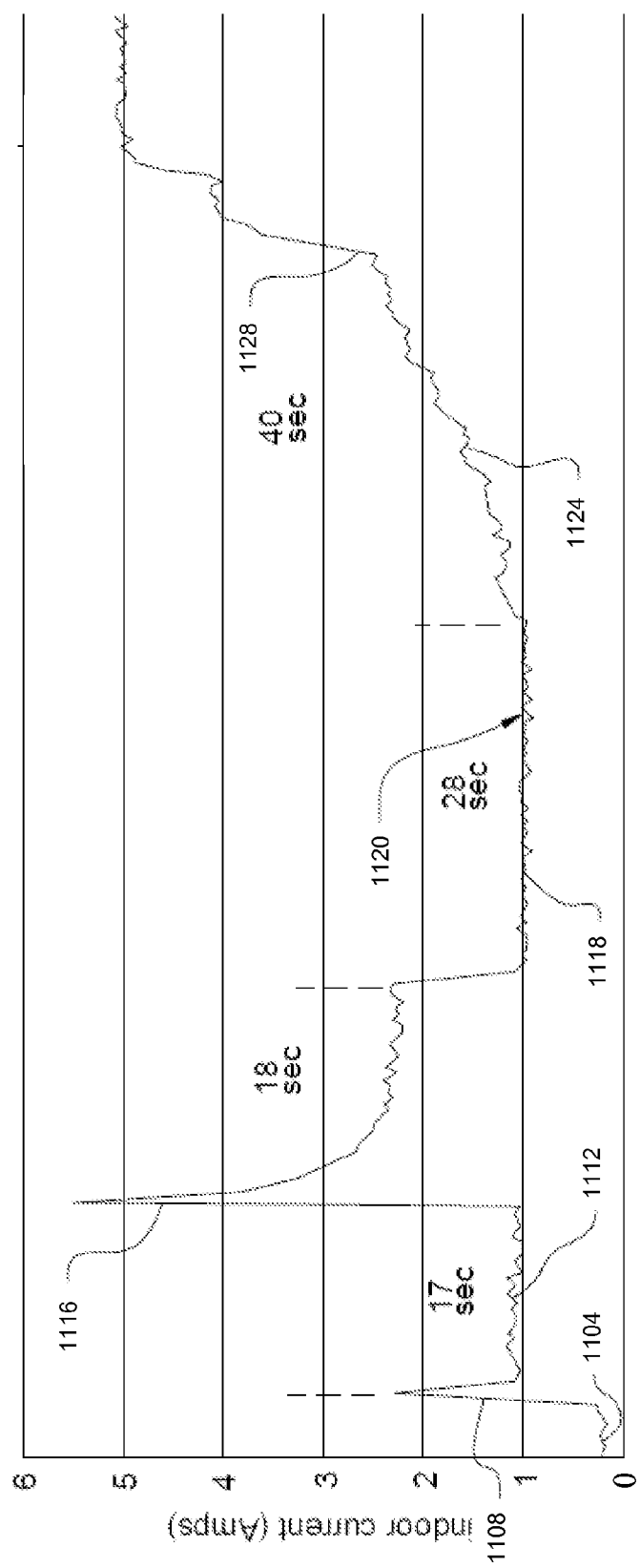
FIG. 9 is an example time domain trace of aggregate current for a beginning of a heat cycle.

In FIG. 9, an aggregate current level begins at a non-zero current 1104 indicating that at least one energy-consuming component is consuming energy. A spike in current 1108 may indicate that another component is turning on. Elevated current 1112 may correspond to operation of the inducer blower. This is followed by a spike 1116, which may indicate the beginning of operation of a hot surface igniter. After opening of a solenoid-operated gas valve, the hot surface igniter may turn off, which returns current to a level corresponding to the inducer blower at 1118. The current may remain approximately flat 1120 until a current ramp 1124 begins, indicating the beginning of circulator blower operation. A spike 1128 may indicate transition from starting to running of the circulator blower.

Figure 10:
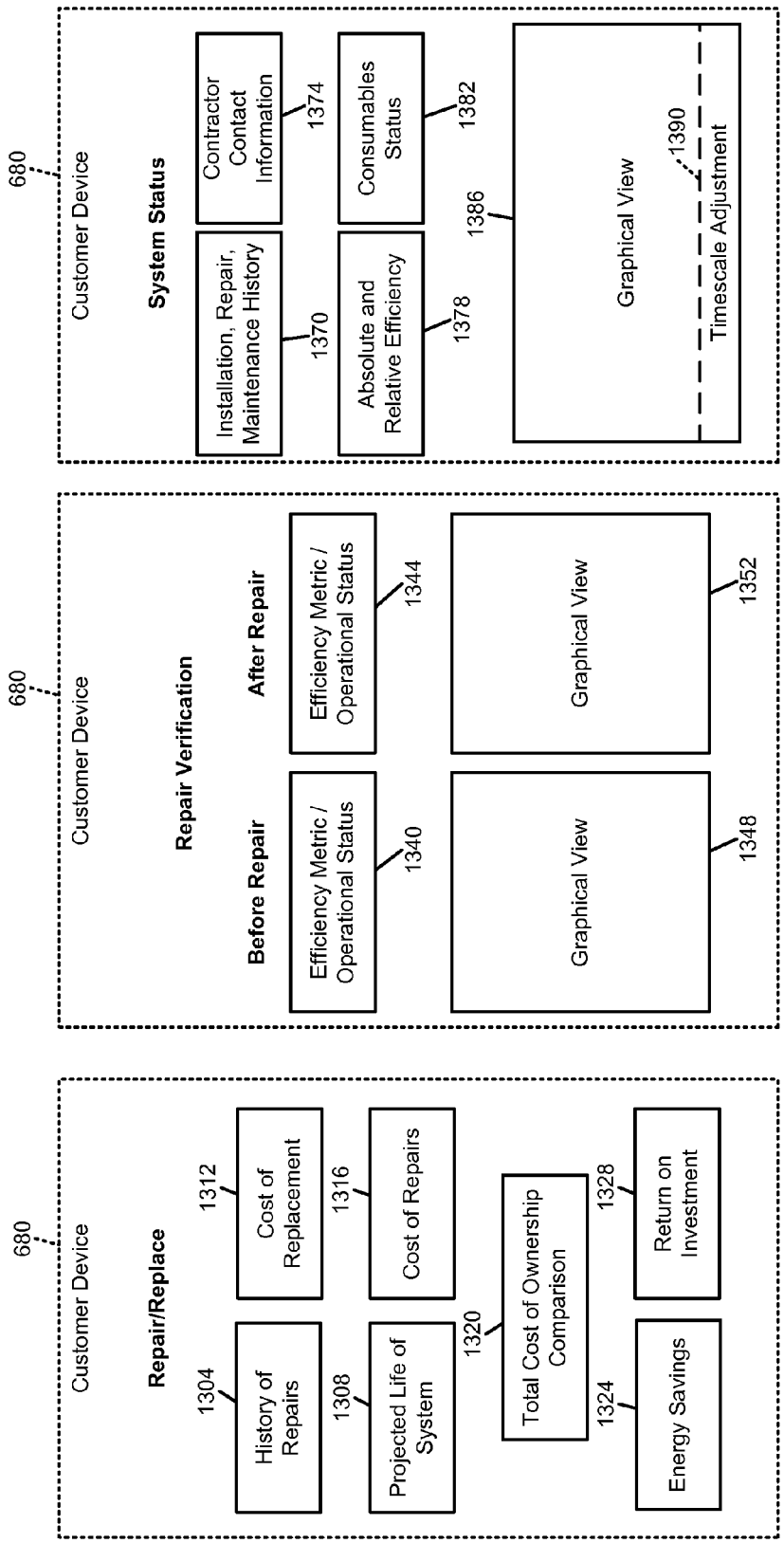
FIGS. 10A-10O are example illustrations of graphical displays presented to a customer.

In FIG. 10A, the customer device 680 is shown with an example repair/replace interface. This interface assists the customer in determining whether to repair or to replace subsystems of the HVAC system or the entire HVAC system. Some or all of the following information can be displayed to the customer based on monitored data. The following list is not exhaustive, however, and additional information can be displayed in various situations based on the data received from the customer's HVAC system as well as comparative data obtained from other systems, including repair history information, pricing information, and operating parameters, such as efficiency. A history of repairs 1304 shows the customer what repairs have been done, the corresponding dates, and the corresponding prices. This may include maintenance, such as filter replacements, tune-ups, etc. A projected life of the current system 1308 shows how long the current system is expected to last with regular maintenance and potential replacement of minor parts. A cost of replacement 1312 is calculated based on past history with previous installations and may include a number of options of systems for the customer. For example, a low, medium, and high efficiency system may each be presented. A cost of repairs 1316 depicts what an expected cost is for current repairs to the HVAC system to bring the HVAC system up to a reasonable level of performance. A total cost of ownership comparison 1320 shows the customer how much their current system will cost to repair and operate in comparison to the cost of a new system being installed and operated. An energy savings 1324 is shown based on expected savings from operating a newer, higher efficiency system. A return on investment 1328 may depict the break-even point, if there is one, that shows where the cost of a new system and its lower operating costs may fall below the total cost of the current system with increased operating costs.

In FIG. 10B, the customer device 680 is shown with a repair verification display. Data received from below the repair can be shown at 1340, and include efficiency metrics, such as the absolute efficiency of the system and a percentage of efficiency compared to install time, manufacturer guidance, and similar systems. In addition, operational status of components of the HVAC system is shown. For example, if it is determined that a flame probe (not shown) has failed, and therefore the HVAC controller cannot detect that a flame is present, the operational status of the flame probe may be shown as failed. Meanwhile, an after repair metric or status 1344 shows what the monitoring system determines subsequent to the repair being performed. A graphical view 1348 may show a graph of efficiency prior to the repair, while a graphical view 1352 shows an efficiency subsequent to the repair. Additionally or alternatively, other data may be displayed graphically. For example, a trace of current in a time domain or a frequency domain spectrum of current may be shown both before in 1348 and after in 1352 with corresponding notations to indicate the failure in 1348, and, assuming the repair was successful, the corresponding rectified data in 1352.

In FIG. 10C, the customer device 680 is shown displaying system status, which the customer may view at any time. In 1370, installation, repair, and maintenance history is shown. In addition, current alert status and previous alerts can be shown. In 1374, contact information for the designated or most recent contractor is shown. At 1378, absolute and relative efficiency of the customer's HVAC system is shown. Efficiency may be shown both for heating and for cooling, and may be shown in absolute numbers, and in relation to neighbors' systems, similar systems in a wider geographic area, manufacturer guidelines, and baseline values. In 1382, consumables status is shown. This may show an expected life of a consumable, such as a filter or humidifier pad. In addition, a timeline for when consumables have been previously replaced or installed is shown. A graphical indicator may depict how much expected life is remaining in the consumable with an estimated date of replacement. In 1386, a graphical view of various system parameters and system data is shown. For example, efficiency since the installation of the monitoring system may be shown. A timescale adjustment 1390 allows the customer to view different periods of time, such as the past one year. In addition, the timescale adjustment 1390 may allow the customer to view only certain windows of time within each year, such as times when the heating system is active or when the cooling system is active.

Figure 11:
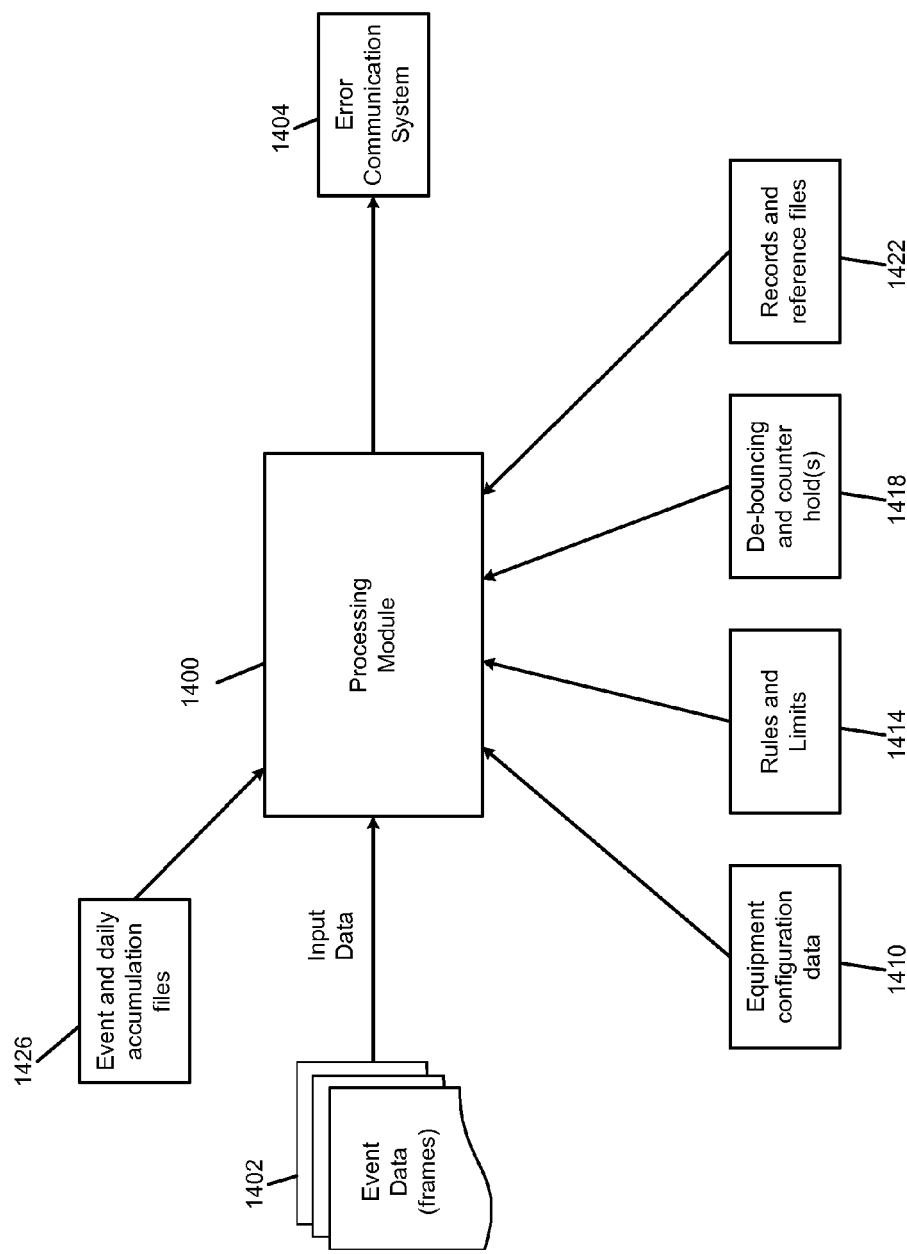
FIG. 11 is an example implementation of cloud processing of captured data.

In FIG. 11, an example representation of cloud processing is shown, where a processing module 1400 receives event data in the form of frames. The processing module 1400 uses various input data for detection and prediction of faults. Identified faults are passed to an error communication system 1404. The event data 1402 may be stored upon receipt from the air handler monitor module and the condensing monitor module.

The processing module 1400 may then perform each prediction or detection task with relevant data from the event data 1402. In various implementations, certain processing operations are common to more than one detection or prediction operation. This data may therefore be cached and reused. The processing module 1400 receives information about equipment configuration 1410, such as control signal mapping.

Rules and limits 1414 determine whether sensor values are out of bounds, which may indicate sensor failures. In addition, the rules and limits 1414 may indicate that sensor values cannot be trusted when parameters such as current and voltage are outside of predetermined limits. For example only, if the AC voltage sags, such as during a brownout, data taken during that time may be discarded as unreliable.

De-bouncing and counter holds 1418 may store counts of anomaly detection. For example only, detection of a single solenoid-operated gas valve malfunction may increment a counter, but not trigger a fault. Only if multiple solenoid-operated gas valve failures are detected is an error signaled. This can eliminate false positives. For example only, a single failure of an energy-consuming component may cause a corresponding counter to be incremented by one, while detection of proper operation may lead to the corresponding counter being decremented by one. In this way, if faulty operation is prevalent, the counter will eventually increase to a point where an error is signaled. Records and reference files 1422 may store frequency and time domain data establishing baselines for detection and prediction. De-bouncing encompasses an averaging process that may remove glitches and/or noise. For example, a moving or windowed average may be applied to input signals to avoid spurious detection of a transition when in fact only a spike (or, glitch) of noise was present.

A basic failure-to-function fault may be determined by comparing control line state against operational state based on current and/or power. Basic function may be verified by temperature, and improper operation may contribute to a counter being incremented. This analysis may rely on return air temperature, supply air temperature, liquid line in temperature, voltage, current, real power, control line status, compressor discharge temperature, liquid line out temperature, and ambient temperature.

Sensor error faults may be detected by checking sensor values for anomalous operation, such as may occur for open-circuit or short-circuit faults. The values for those determinations may be found in the rules and limits 1414. This analysis may rely on return air temperature, supply air temperature, liquid line in temperature (which may correspond to a temperature of the refrigerant line in the air handler, before or after the expansion valve), control line status, compressor discharge temperature, liquid line out temperature, and ambient temperature.

When the HVAC system is off, sensor error faults may also be diagnosed. For example, based on control lines indicating that the HVAC system has been off for an hour, processing module 1400 may check whether the compressor discharge temperature, liquid line out temperature, and ambient temperature are approximately equal. In addition, the processing module 1400 may also check that the return air temperature, the supply air temperature, and the liquid line in temperature are approximately equal.

The processing module 1400 may compare temperature readings and voltages against predetermined limits to determine voltage faults and temperature faults. These faults may cause the processing module 1400 to ignore various faults that could appear present when voltages or temperatures are outside of the predetermined limits.

The processing module 1400 may check the status of discrete sensors to determine whether specifically-detected fault conditions are present. For example only, the status of condensate, float switch, and floor sensor water sensors are checked. The water sensors may be cross-checked against operating states of the HVAC system. For example only, if the air conditioning system is not running, it would not be expected that the condensate tray would be filling with water. This may instead indicate that one of the water sensors is malfunctioning. Such a determination could initiate a service call to fix the sensor so that it can properly identify when an actual water problem is present.

The processing module 1400 may determine whether the proper sequence of furnace initiation is occurring. This may rely on event and daily accumulation files 1426. The processing module 1400 may perform state sequence decoding, such as by looking at transitions as shown in FIG. 10B and expected times during which those transitions are expected. Detected furnace sequences are compared against a reference case and errors are generated based on exceptions. The furnace sequence may be verified with temperature readings, such as observing whether, while the burner is on, the supply air temperature is increasing with respect to the return air temperature. The processing module 1400 may also use FFT processing to determine that the sparker or igniter operation and solenoid-operated gas valve operation are adequate.

The processing module 1400 may determine whether a flame probe or flame sensor is accurately detecting flame. State sequence decoding may be followed by determining whether a series of furnace initiations are performed. If so, this may indicate that the flame probe is not detecting flame and the burner is therefore being shut off. The frequency of retries may increase over time when the flame probe is not operating correctly.

The processing module 1400 may evaluate heat pump performance by comparing thermal performance against power consumption and unit history. This may rely on data concerning equipment configuration 1410, including compressor maps when available.

The processing module 1400 may determine refrigerant level of the air conditioning system. For example, the processing module 1400 may analyze the frequency content of the compressor current and extract frequencies at the third, fifth, and seventh harmonics of the power line frequencies. This data may be compared, based on ambient temperature, to historical data from when the air conditioning system was known to be fully charged. Generally, as charge is lost, the surge frequency may decrease. Additional data may be used for reinforcement of a low refrigerant level determination, such as supply air temperature, return air temperature, liquid line in temperature, voltage, real power, control line status, compressor discharge temperature, and liquid line out temperature.

The processing module 1400 may alternatively determine a low refrigerant charge by monitoring deactivation of the compressor motor by a protector switch, may indicate a low refrigerant charge condition. To prevent false positives, the processing module 1400 may ignore compressor motor deactivation that happens sooner than a predetermined delay after the compressor motor is started, as this may instead indicate another problem, such as a stuck rotor.

The processing module 1400 may determine the performance of a capacitor in the air handler unit, such as a run capacitor for the circulator blower. Based on return air temperature, supply air temperature, voltage, current, real power, control line status, and FFT data, the processing module 1400 determines the time and magnitude of the start current and checks the start current curve against a reference. In addition, steady state current may be compared over time to see whether an increase results in a corresponding increase in the difference between the return air temperature and the supply air temperature.

Similarly, the processing module 1400 determines whether the capacitor in the compressor/condenser unit is functioning properly. Based on compressor discharge temperature, liquid line out temperature, ambient temperature, voltage, current, real power, control line status, and FFT current data, control determines a time and magnitude of start current. This start current is checked against a reference in the time and/or frequency domains. The processing module 1400 may compensate for changes in ambient temperature and in liquid line in temperature. The processing module 1400 may also verify that increases in steady state current result in a corresponding increase in the difference between the compressor discharge temperature and the liquid line in temperature.

The processing module may calculate and accumulate energy consumption data over time. The processing module may also store temperatures on a periodic basis and at the end of heat and cool cycles. In addition, the processing module 1400 may record lengths of run times. An accumulation of run times may be used in determining the age of wear items, which may benefit from servicing, such as oiling, or preemptive replacing.

The processing module 1400 may also grade the customer's equipment. The processing module 1400 compares heat flux generated by the HVAC equipment against energy consumption. The heat flux may be indicated by return air temperature and/or indoor temperature, such as from a thermostat. The processing module 1400 may calculate the envelope of the building to determine the net flux. The processing module 1400 may compare the equipment's performance, when adjusted for building envelope, against other similar systems. Significant deviations may cause an error to be indicated.

The processing module 1400 uses a change in current or power and the type of circulator blower motor to determine the change in load. This change in load can be used to determine whether the filter is dirty. The processing module 1400 may also use power factor, which may be calculated based on the difference in phase between voltage and current. Temperatures may be used to verify reduced flow and eliminate other potential reasons for observed current or power changes in the circulator blower motor. The processing module 1400 may also determine when an evaporator coil is closed. The processing module 1400 uses a combination of loading and thermal data to identify the signature of a coil that is freezing or frozen. This can be performed even when there is no direct temperature measurement of the coil itself.

FFT analysis may show altered compressor load from high liquid fraction. Often, a frozen coil is caused by a fan failure, but the fan failure itself may be detected separately. The processing module 1400 may use return air temperature, supply air temperature, liquid line in temperature, voltage, current, real power, and FFT data from both the air handler unit and the compressor condenser unit. In addition, the processing module 1400 may monitor control line status, switch statuses, compressor discharge temperature, liquid line out temperature, and ambient temperature. When a change in loading occurs that might be indicative of a clogged filter, but the change happened suddenly, a different cause may be to blame.

The processing module 1400 identifies a condenser blockage by examining the approach temperature, which is the difference between the liquid line out temperature and the ambient temperature. When the refrigerant has not been sufficiently cooled from the condenser discharge temperature (the input to the condenser) to the liquid line out temperature (output of the condenser), adjusted based on ambient temperature, the condenser may be blocked. Other data can be used to exclude other possible causes of this problem. The other data may include supply air temperature, return air temperature, voltage, current, real power, FFT data, and control line status both of the air handler unit and the compressor condenser unit.

The processing module 1400 determines whether the installed equipment is oversized for the building. Based on event and daily accumulation files, the processing module evaluates temperature slopes at the end of the heating and/or cooling run. Using run time, duty cycle, temperature slopes, ambient temperature, and equipment heat flux versus building flux, appropriateness of equipment sizing can be determined. When equipment is oversized, there are comfort implications. For example, in air conditioning, short runs do not circulate air sufficiently, so moisture is not pulled out of the air. Further, the air conditioning system may never reach peak operating efficiency during a short cycle.

The processing module 1400 evaluates igniter positive temperature coefficient based on voltage, current, real power, control line status, and FFT data from the air handler unit. The processing module compares current level and slope during warm-up to look for increased resistance. Additionally, the processing module may use FFT data on warm-up to detect changes in the curve shape and internal arcing.

The processing module also evaluates igniter negative temperature coefficient based on voltage, current, real power, control line status, and FFT data from the air handler unit. The processing module 1400 compares current level and slope during warm-up to look for increased resistance. The processing module 1400 checks initial warm-up and trough currents. In addition, the processing module 1400 may use FFT data corresponding to warm-up to detect changes in the curve shape and internal arcing.

The processing module 1400 can also evaluate the positive temperature coefficient of a nitride igniter based on voltage, current, real power, control line status, and FFT data from the air handler unit. The processing module 1400 compares voltage level and current slope during warm-up to look for increased resistance. In addition, the processing module 1400 uses FFT data corresponding to warm-up to detect changes in the curve shape, drive voltage pattern, and internal arcing. Changes in drive voltage may indicate igniter aging, so those adjustments should be distinguished from changes to compensate for gas content and other furnace components.

In FIGS. 12A-12Q, examples of faults or performance issues that can be detected and/or predicted according to the principles of the present disclosure are listed, along with representative input signals that can be used in making those determinations. As described above, any faults detected or predicted by the following processes may be subjected to manual or automatic triage. During triage, a skilled technician or a specially programmed computer may analyze some or all of the data collected by the system to rule out false alarms and validate that the identified root cause is the most likely cause of the measured characteristics of the HVAC system.

Of the sensor inputs below, some sensor inputs are used for principle diagnosis while other sensor inputs are used to rule out alternative diagnoses and to verify a diagnosis. Some sensors may be suggestive but weakly correlated with a fault, while other sensors are more strongly indicative of the fault. Therefore, sensors may have varying contributions to detection of any given fault.

Indoor current is a measure of aggregate current supplied to the air handler unit, including components such as the inducer blower, the circulator blower, the control circuitry, and the air handler monitor module. The current may be sampled multiple times per second, allowing transients to be captured and various processing performed, such as derivatives and integrals.

The time domain current data may be transformed into frequency domain data, such as by using a fast Fourier transform (FFT). Indoor voltage may be measured, which corresponds to an AC voltage of power provided to the air handler unit. In various implementations, the indoor voltage may be sampled less frequently than the current and may be an average, RMS, or peak-to-peak value.

The indoor voltage may be used along with the indoor current to calculate power, and the indoor voltage may be used to adjust various limits. For example only, when the indoor voltage is sagging (less than the expected nominal value), various components of the HVAC system may be expected to consume additional current. The indoor voltage may therefore be used to normalize current readings. An indoor power factor may be determined based on phase shift between the indoor current and the indoor voltage. The indoor power may be measured directly and/or calculated based on one or more of indoor current, indoor voltage, and indoor power factor.

Inside module temperature corresponds to a temperature of the air handler monitor module. For example only, this temperature may be of a housing of the air handler monitor module, of an airspace enclosed by the housing, or of a circuit board of the air handler monitor module. A temperature sensor may be placed in a location close to a circuit board component that is expected to run hottest. In this way, as long as the hottest component is operating below a specified threshold, the entire air handler monitor module should be operating within acceptable temperature limits.

In various implementations, the temperature of the air handler monitor module may approach ambient temperature in the space where the HVAC system is installed when the air handler monitor module is not processing and transmitting data. In other words, once the HVAC system has been off for a period of time, the temperature measured by the air handler monitor module may be a reasonable estimate of conditioned space temperature where the air handler unit is located, with perhaps a known offset for heat generated by background operation of the air handler monitor module.

Outdoor current corresponds to an aggregate current consumed by the condenser unit, including the condenser fan, the compressor, and the condenser monitor module. Similar to the air handler monitor module, voltage, power factor, power, and FFT data may be measured, estimated, and/or calculated. In various implementations, current values may be measured and sent to a remote monitoring system where FFTs are performed. Alternatively, as discussed above, the FFTs may be calculated in a local device, such as the air handler monitor module and/or the condenser monitor module, and the FFT data can be uploaded. When the FFT data is uploaded, it may be unnecessary to upload full-resolution time-domain data, and therefore time-domain data that is uploaded may be passed through a decimation filter to decrease bandwidth and storage requirements.

Supply air temperature and return air temperature are measured. The difference between them is often referred to as a supply/return air temperature split. The return air temperature may be measured at any point prior to the evaporator coil and furnace element. The furnace element may be a gas burner and/or an electric element. In various implementations, such as in heat pump systems, the evaporator acts as a condenser in a heating mode and therefore a separate furnace element is not present. The return air temperature may be measured before or after the filter and may be before or after the circulator blower.

The supply air temperature is measured after the evaporator coil, and may be measured after any hard bends in the supply air plenum, which may prevent the supply air temperature sensor from measuring a temperature of a pocket of cool or warm air trapped by bends in the ductwork. Such a location may also allow for any other sensors installed along with the temperature sensor to be free of ductwork restrictions. For example only, a separate airflow sensor, or the temperature sensor being used in an airflow mode, may need to be in a straight section of ductwork to achieve an accurate reading. Turbulence created before and after bends in the ductwork may result in less accurate airflow data.

Pressures and temperatures of refrigerant in an air conditioning or heat pump refrigerant-cycle system may be measured. Pressure sensors may be expensive and therefore the faults listed below are detected using algorithms that do not require pressure data. Various temperatures of the refrigerant may be measured, and as shown, a liquid line temperature corresponds to temperature of the refrigerant traveling from the condenser to the evaporator but prior to the expansion valve. Suction line temperature is the temperature of refrigerant being sucked into the compressor from the output side of the evaporator. Temperature sensors (not shown) may also be located between the compressor and the condenser (compressor discharge temperature) and at various points along the condenser coil and the evaporator coil.

A differential pressure between supply and return air may be measured, and may be in units of inches of water column. Two sides of the differential pressure sensor may be installed alongside the supply air and return air temperature sensors and may be packaged together in a single housing. In various other implementations, separate absolute pressure sensors may be installed in the supply air and return air ductwork, and differential pressure could then be calculated by subtracting the values.

The condenser monitor module may also include a temperature sensor that measures a temperature of the condenser monitor module, such as on an exterior of the condenser monitor module, an interior of the condenser monitor module, or a location proximate to circuitry. When the condenser unit is not operating, the outside module temperature may approach outside ambient temperature.

Also measured is a call for cool (Y), which activates the compressor to provide cooling, and in a heat pump system, instructs a reversing valve to be in a cooling position. A call for heat (W) is measured and may actuate a furnace element and/or instruct a reversing valve of a heat pump to switch to a heating mode. Further a call for fan (G) signal may be monitored. In various implementations, multistage heating (W2), cooling (Y2), and/or fan (G2) signals may be monitored. In second stage heating, an additional element may be used and/or a current or gas consumption may be increased. In second stage cooling, a speed of the compressor may be increased. Meanwhile, for a second stage fan, a fan speed may be increased.

Internet-connected thermostats may allow the remote monitoring system to receive data from the thermostat, including programmed setpoints, thermostat-measured temperature and humidity, and command state (including whether calls are being made for cool, heat, or fan). A general purpose sensor input allows for current and future sensors to be interfaced to the local devices and then transmitted to the remote monitoring system.

Additional sensors that may be used with the monitoring system of the present disclosure include static pressure, refrigerant pressure, and refrigerant flow. Refrigerant flow sensors may include acoustic sensors, thermal sensors, Coriolis sensors, Impeller sensors, etc. An infrared temperature sensor may be used to measure temperatures including coil temperatures, burner temperatures, etc. Acoustic & vibration sensors may be used for bearing and balance monitoring, expansion valve operation, and general system noise.

Visual (image, including digital imaging) sensors may be used to analyze the air filter, coils (for particulate matter as well as freezing), flame size and quality, fan operation and condition, etc. Mass air flow sensors may enable true efficiency and Seasonal energy efficiency ratio (SEER) measurement. Optical sensors may asses air filter condition as well as coils (again, for particulate matter as well as freezing). Laser sensors may be used to assess the air filter or coils, fan speed, and particle count for indoor air quality.

Radar sensors may be used to measure fan speed. Capacitive moisture sensors can be used to detect moisture in a pan in which the air handler unit is installed, in a condensate tray, on the floor, in a pump basin, in a sump pump, etc. A float switch may measure water level either on a continuum or in a binary fashion for various locations, including a tray, a tray pump basin, and a sump pump. An ultraviolet (UV) light monitor measures the output of UV lights installed to kill viruses, mold, spores, fungi, and bacteria.

Further sensors include humidity, smoke, carbon monoxide, exhaust temperature, exhaust carbon monoxide level, and exhaust carbon dioxide level. Magnetic sensors measure fan speed. A frost sensor measures heat pump frost and evaporator freezing conditions. A compressor discharge temperature sensor measures superheat.

For an electric heater, current is converted to heat in an electrical element. A fault of the this element can be detected based on current measurements. For a given pattern of calls for heat and/or second stage heat, a certain current profile is expected. This expected current profile may be, as described above, specified by a manufacturer and/or a contractor, or may be determined over one or more system runs. For example, when commissioning a monitoring system, a baseline of current data may be established.

When measured current deviates from the baseline by more than a predefined amount (which may be expressed in absolute terms or as a percentage), a fault of the electric heater is determined. For example, if current does not increase as expected, the heater element will not be able to produce sufficient heat. If the current increases too fast, a short circuit condition may be present. Protection circuitry in the furnace will shut the furnace down, but the measured deviation may allow for determination of the source of the problem.

As the heater element deteriorates, the measured current may be delayed with respect to the baseline. As this delay increases, and as the frequency of observing this delay increases, a fault is predicted. This prediction indicates that the heater element may be reaching an end of lifetime and may cease to function in the near future.

For electric heating, a current measurement that tracks a baseline but then decreases below a threshold may indicate that tripping (which may be caused by overheating or overcurrent conditions) is occurring.

A heating fault may be identified when, for a given call for heat pattern, the supply/return air temperature split indicates insufficient heating. The threshold may be set at a predetermined percentage of the expected supply/return air temperature split.

A heating shutdown fault may be determined when a temperature split rises to within an expected range but then falls below the expected range. This may indicate that one or more of the pressure sensors has caused the heating to stop. As these shutdowns become more frequent, a more severe fault may be declared, indicating that the heater may soon fail to provide adequate heat for the conditioned space because the heater is repeatedly shutting down.

When a call for heat is made, the furnace will progress through a sequence of states. For example only, the sequence may begin with activating the inducer blower, opening the gas valve, igniting the gas, and turning on the circulator blower. Each of these states may be detectable in current data, although frequency-domain as well as time-domain data may be necessary to reliably determine certain states. When this sequence of states appears to indicate that the furnace is restarting, a fault may be declared. A furnace restart may be detected when the measured current matches a baseline current profile for a certain number of states and then diverges from the baseline current profile for the next state or states.

Furnace restarts may occur occasionally for various reasons, but as the number and frequency of furnace restart events increases, an eventual fault is predicted. For example only, if 50% of calls for heat involve one or more furnace restarts, a fault may be declared indicating that soon the furnace may fail to start altogether or may require so many restarts that sufficient heating will not be available.

An overheating fault may be declared when a temperature exceeds an expected value, such a baseline value, by more than a predetermined amount. For example, when the supply/return air temperature split is greater than a predetermined threshold, the heat exchanger may be operating at too high of a temperature.

A flame rollout switch is a safety device that detects overly high burner assembly temperatures, which may be caused by a reduction in airflow, such as a restricted flue. A fault in the flame rollout switch may be diagnosed based on states of the furnace sequence, as determined by measured current. For example, a trip of the flame rollout switch may generally occur during the same heating state for a given system. In various implementations, the flame rollout switch will be a single-use protection mechanism, and therefore a trip of the flame rollout switch is reported as a fault that will prevent further heating from occurring.

A blower fault is determined based on variation of measured current from a baseline. The measured current may be normalized according to measured voltage, and differential pressure may also be used to identify a blower fault. As the duration and magnitude of deviation between the measured current and the expected current increase, the severity of the fault increases. As the current drawn by the blower goes up, the risk of a circuit breaker or internal protection mechanism tripping increases, which may lead to loss of heating.

A permanent-split capacitor motor is a type of AC induction motor. A fault in this motor may be detected based on variation of power, power factor, and variation from a baseline. A fault in this motor, which may be used as a circulator blower, may be confirmed based on a differential air pressure. As the deviation increases, the severity of the fault increases.

A fault with spark ignition may be detected based on fault of the furnace to progress passed the state at which the spark ignition should ignite the air/fuel mixture. A baseline signature of the spark igniter may be determined in the frequency domain. Absence of this profile at the expected time may indicate that the spark igniter has failed to operate. Meanwhile, when a profile corresponding to the spark igniter is present but deviates from the baseline, this is an indication that the spark igniter may be failing. As the variation from the baseline increases, the risk of fault increases. In addition to current-based furnace state monitoring, the supply/return temperature split may verify that the heater has failed to commence heating.

A hot surface igniter fault is detected based on analyzing current to determine furnace states. When the current profile indicates that igniter retries have occurred, this may indicate an impending fault of the hot surface igniter. In addition, changes in the igniter profile compared to a baseline may indicate an impending fault. For example, an increase in drive level indicated in either time-domain or frequency-domain current data, an increase in effective resistance, or frequency domain indication of internal arcing may indicate an impending fault of the hot surface igniter.

A fault in the inducer fan or blower is detected based on heater states determined according to current. Faults may be predicted based on frequency domain analysis of inducer fan operation that indicate operational problems, such as fan blades striking the fan housing, water being present in the housing, bearing issues, etc. In various implementations, analysis of the inducer fan may be performed during a time window prior to the circulator blower beginning. The current drawn by the circulator blower may mask any current drawn by the inducer blower.

A fault in the fan pressure switch may be detected when the time-domain current indicates that the furnace restarted but blower fault does not appear to be present and ignition retries were not performed. In other words, the furnace may be operating as expected with the issue that the fan pressure switch does not recognize that the blower motor is not operating correctly. Service may be called to replace the fan pressure switch. In various implementations, the fan pressure switch may fail gradually, and therefore an increase in the number of furnace restarts attributed to the fan pressure switch may indicate an impending fault with the fan pressure switch.

A flame probe vault is detected when a flame has been properly created, but the flame probe does not detect the flame. This is determined when there are ignition retries but frequency-domain data indicates that the igniter appears to be operating properly. Frequency-domain data may also indicate that the gas valve is functioning properly, isolating the fault to the flame probe. A fault in the gas valve may be detected based on the sequence of states in the furnace as indicated by the current. Although the amount of current drawn by the gas valve may be small, a signature corresponding to the gas valve may still be present in the frequency domain. When the signature is not present, and the furnace does not run, the absence of the signature may indicate a fault with the gas valve.

A coil, such as an evaporator coil, may freeze, such as when inadequate airflow fails to deliver enough heat to refrigerant in the coil. Detecting a freezing coil may rely on a combination of inputs, and depends on directional shifts in sensors including temperatures, voltage, time domain current, frequency domain current, power factor, and power measurements. In addition, voltage, current, frequency domain current, and power data may allow other faults to be ruled out.

A dirty filter may be detected in light of changes in power, current, and power factor coupled with a decrease in temperature split and reduced pressure. The power, current, and power factor may be dependent on motor type. When a mass airflow sensor is available, the mass flow sensor may be able to directly indicate a flow restriction in systems using a permanent split capacitor motor.

Faults with compressor capacitors, including run and start capacitors, may be determined based on variations in power factor of the condenser monitor module. A rapid change in power factor may indicate an inoperative capacitor while a gradual change indicates a degrading capacitor. Because capacitance varies with air pressure, outside air temperature may be used to normalize power factor and current data. A fault related to the circulator blower or inducer blower resulting from an imbalanced bearing or a blade striking the respective housing may be determined based on a variation in frequency domain current signature.

A general failure to cool may be assessed after 15 minutes from the call for cool. A difference between a supply air temperature and return air temperature indicates that little or no cooling is taking place on the supply air. A similar failure to cool determination may be made after 30 minutes. If the system is unable to cool by 15 minutes but is able to cool by 30 minutes, this may be an indication that operation of the cooling system is degrading and a fault may occur soon.

Low refrigerant charge may be determined when, after a call for cool, supply and return temperature measurements exhibit lack of cooling and a temperature differential between refrigerant in the suction line and outside temperature varies from a baseline by more than a threshold. In addition, low charge may be indicated by decreasing power consumed by the condenser unit. An overcharge condition of the refrigerant can be determined when, after a call for cool, a difference between liquid line temperature and outside air temperature is smaller than expected. A difference between refrigerant temperature in the liquid line and outside temperature is low compared to a baseline when refrigerant is overcharged.

Low indoor airflow may be assessed when a call for cool and fan is present, and the differential between return and supply air increases above a baseline, suction line decreases below a baseline, pressure increases, and indoor current deviates from a baseline established according to the motor type. Low outdoor airflow through the condenser is determined when a call for cool is present, and a differential between refrigerant temperature in the liquid line and outside ambient temperature increases above a baseline and outdoor current also increases above a baseline.

A possible flow restriction is detected when the return/supply air temperature split and the liquid line temperature is low while a call for cool is present. An outdoor run capacitor fault may be declared when, while a call for cool is present, power factor decreases rapidly. A general increase in power fault may be declared when a call for cool is present and power increases above a baseline. The baseline may be normalized according to outside air temperature and may be established during initial runs of the system, and/or may be specified by a manufacturer. A general fault corresponding to a decrease in capacity may be declared when a call for cool is present and the return/supply air temperature split, air pressure, and indoor current indicate a decrease in capacity.

In a heat pump system, a general failure to heat fault may be declared after 15 minutes from when a call for heat occurred and the supply/return air temperature split is below a threshold. Similarly, a more severe fault is declared if the supply/return air temperature split is below the same or different threshold after 30 minutes. A low charge condition of the heat pump may be determined when a call for heat is present and a supply/return air temperature split indicates a lack of heating, a difference between supply air and liquid line temperatures is less than a baseline, and a difference between return air temperature and liquid line temperature is less than a baseline. A high charge condition of the heat pump may be determined when a call for heat is present, a difference between supply air temperature and liquid line temperature is high, a difference between a liquid line temperature and return air temperature is low, and outdoor power increases.

Low indoor airflow in a heat pump system, while a call for heat and fan are present, is detected when the supply/return air temperature split is high, pressure increases, and indoor current deviates from a baseline, where the baseline is based on motor type. Low outdoor airflow on a heat pump is detected when a call for heat is present, the supply/return air temperature split indicates a lack of heating as a function of outside air temperature, and outdoor power increases.

A flow restriction in a heat pump system is determined when a call for heat is present, supply/return air temperature split does not indicate heating is occurring, runtime is increasing, and a difference between supply air and liquid line temperature increases. A general increase in power consumption fault for heat pump system may indicate a loss of efficiency, and is detected when a call for heat is present and power increases above a baseline as a function of outside air temperature.

A capacity decrease in a heat pump system may be determined when a call for heat is present, a supply/return air temperature split indicates a lack of heating, and pressure split in indoor current indicate a decreased capacity. Outside air temperature affects capacity, and therefore the threshold to declare a low capacity fault is adjusted in response to outside air temperature.

A reversing valve fault is determined when a call for heat is present but supply/return air temperature split indicates that cooling is occurring. Similarly, a reversing valve fault is determined when a call for cool is present but supply/return air temperature split indicates that heating is occurring.

A defrost fault may be declared in response to outdoor current, voltage, power, and power factor data, and supply/return air temperature split, refrigerant supply line temperature, suction line temperature, and outside air temperature indicating that frost is occurring on the outdoor coil, and defrost has failed to activate. When a fault due to the reversing valve is ruled out, a general defrost fault may be declared.

Excessive compressor tripping in a heat pump system may be determined when a call for cool or heating is present, supply/return air temperature split lacks indication of the requested cooling or heating, and outdoor fan motor current rapidly decreases. A fault for compressor short cycling due to pressure limits being exceeded may be detected when a call for cool is present, supply/return air temperature split does not indicate cooling, and there is a rapid decrease in outdoor current and a short runtime. A compressor bearing fault may be declared when an FFT of outdoor current indicates changes in motor loading, support for this fault is provided by power factor measurement. A locked rotor of the compressor motor may be determined when excessive current is present at a time when the compressor is slow to start. A locked rotor is confirmed with power and power factor measurements.

Thermostat short cycling is identified when a call for cool is removed prior to a full cooling sequence being completed. For example, this may occur when a supply register is too close to the thermostat, and leads to the thermostat prematurely believing the house has reached a desired temperature.

When a call for heat and a call for cool are present at the same time, a fault with the thermostat or with the control signal wiring is present. When independent communication between a monitor module and a thermostat is possible, such as when a thermostat is Internet-enabled, thermostat commands can be compared to actual signals on control lines and discrepancies indicate faults in control signal wiring.

True efficiency, or true SEER, may be calculated using energy inputs and thermal output where mass flow is used to directly measure output. Envelope efficiency can be determined by comparing heat transfer during off cycles of the HVAC system against thermal input to measure envelope performance. The envelope refers to the conditioned space, such as a house or building, and its ability to retain heat and cool, which includes losses due to air leaks as well as effectiveness of insulation.

An over-temperature determination may be made for the air handler monitor module based on the indoor module temperature and the condenser monitor module based on the outside module temperature. When either of these temperatures exceeds a predetermined threshold, a fault is identified and service may be called to prevent damage to components, electrical or otherwise, of the air handler monitor module and the condenser monitor module.

A fault corresponding to disconnection of a current sensor can be generated when a measured current is zero or close to zero. Because the measured current is an aggregate current and includes at least current provided to the corresponding monitor module, measured current should always be non-zero. A fault may be signaled when current sensor readings are out of range, where the range may be defined by a design of the current sensor, and/or may be specified by operating parameters of the system.

Faults related to temperature sensors being opened or shorted may be directly measured. More subtle temperature sensor faults may be determined during an idle time of the HVAC system. As the HVAC system is not running, temperatures may converge. For example, supply air and return air temperatures should converge on a single temperature, while supply line and liquid line temperatures should also converge.

The indoor module temperature may approximately correspond to temperature in the supply and return air ductwork, potentially offset based on heat generated by the control board. This generated heat may be characterized during design and can therefore be subtracted out when estimating air temperature from the board temperature measurements.

Voltage alerts may signal a fault with the power supply to the air handler unit or the condensing unit, both high and low limits are applied to the air handler unit voltage as well as the condensing unit voltage.

Condensate sensor fault indicates that condensate water is backing up in the condensate tray which receives condensed water from the evaporator coil, and in various implementations, may also receive water produced by combustion in the furnace. When the condensate sensor indicates that the level has been high for a longer period of time, or when the condensate sensor detects that the condensate sensor is fully submerged in water, a more severe fault may be triggered indicating that action should be taken to avoid water overflow.

If current exceeding a predetermined idle value is detected but no call has been made for immediate cool or fan, a fault is declared. For example only, an electronically commutated motor (ECM) blower that is malfunctioning may start running even when not instructed to. This action would be detected and generate a fault.

When temperatures of the home fall outside of predefined limits a fault is declared. Temperatures of the home may be based on the average of temperature sensors, including supply air and return air. The indoor module temperature compensated by an offset may also be used to determine home temperature when the air handler unit is within the conditioned space.

A compressor fault is declared when a call for cool results in current sufficient to run the condenser fan, but not enough current to run the condenser fan and the compressor. A contactor fault may be declared when a call for cool has been made but no corresponding current increase is detected. However, if a current sensor fault has been detected, that is considered to be the cause and therefore the contactor fault is preempted.

A contactor failure to open fault, such as when contactor contacts weld, can be determined when the call for cool is removed but the current remains at the same level, indicating continued compressor operation. A fault may be declared when a general purpose sensor has been changed and that change was not expected. Similarly, when a general purpose sensor is disconnected and that disconnection was not expected, a fault may be declared.

In systems where ultraviolet (UV) lights are used to control growth of mold and bacteria on the evaporator, a UV light sensor may monitor output of the UV light and indicate when that light output falls below a threshold.

A sensor may detect a wet floor condition, and may be implemented as a conduction sensor where a decrease in resistance indicates a presence of water. A general purpose wet tray sensor indicates that a tray in which the air handler unit is located is retaining water.

A condensate pump water sensor generates a fault when a water level in the condensate pump is above a threshold. Condensate pumps may be used where a drain is not available, including in many attic mount systems. In some buildings, a sump pump is dug below grade and a pump is installed to pump out water before the water leaches into the foundation. For example, in a residence, a corner of the basement in areas that have a relatively high water table may have a sump pump. Although the sump pump may not be directly related to the HVAC system, a high level of water in the sump pump may indicate that the pump has failed or that it is not able to keep up with the water entering the sump.

Faults or performance issues that can be detected and/or predicted programmatically may be referred to as advisories. For example, advisories may be generated for faults or performance issues based on various sensor inputs as described above in FIGS. 12A-12Q. As discussed above, advisories may be reviewed by a technician to assess whether the advisory is a false positive and to provide additional information in any alert that is sent. For example, the technician may be able to narrow down likely causes of detected or predicted problems.

In FIGS. 13A-13F, examples of triaging procedures for a small sample of potential advisories are shown. The triaging procedures may be performed programmatically and/or with input from the technician. Which portions rely on input from the technician may vary over time. For example, as heuristics become more accurate and false positives in certain scenarios decrease, the technician may be bypassed for particular elements of the triage process. The computing system administering the triage process may guide the technician through the elements where technician input is required, and may automatically display data relevant to the element under consideration.

Figure 13A:
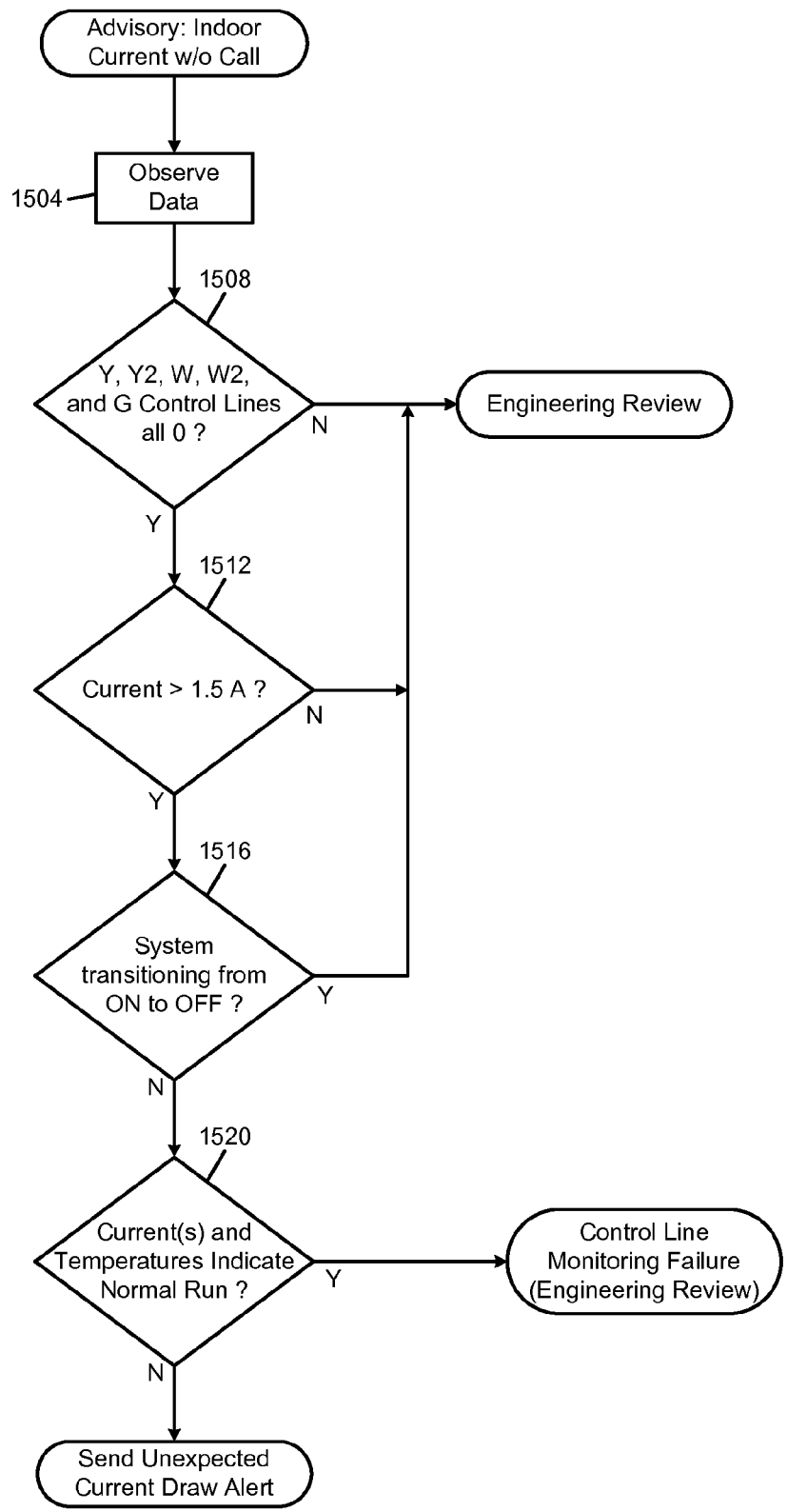
FIGS. 13A-13F are flowcharts of example operation of triage processes for selected advisories.

In FIG. 13A, control of an example triage process begins when an advisory is generated that indicates that indoor current is detected without a corresponding call for heating, cooling, or fan. At 1504, control of the triage process includes observing data related to the system that triggered the advisory. At 1508, control determines whether the heating, cooling, and fan control lines are zero (inactive). If so, the triage process begins at 1512; otherwise, a call appears to actually be present, and the advisory appears to be a false positive. Therefore, the triage process may submit the advisory to engineering review.

At 1512, if the triage process determines whether the current is greater than a threshold, such as 1.5 Amps, the triage process continues at 1516; otherwise, the current is not high enough to trigger an alert, and the advisory may be submitted for engineering review. The threshold for current may be set to avoid false positives, such as from sensor noise. At 1516, if the system is transitioning from on to off, the call may have been removed, but there may be some residual current draw, such as from the fan continuing to run for a predetermined period of time. If this transition is still in progress, the triage process may submit this advisory for engineering review; otherwise, the advisory appears to have been valid and the triage process continues at 1520.

At 1520, if current data, such as indoor and outdoor currents, and temperatures, including air and refrigerant temperatures, are indicative of a normal run of the system, the triage process determines that there is a control line monitoring failure. This may be submitted for engineering review to assess if there are any configuration issues with the installation of the monitoring system. Because of the wide variety in the industry of control lines and ways of actuating those control lines, an automatic alert may be undesirable when it appears that there is a control line monitoring failure. Upon engineering review, the engineer may determine that there is a loose connection to the control line and generate a corresponding alert manually. At 1520, if the triage process determines that the HVAC system is not experiencing a normal run, the triage process sends an alert indicating an unexpected current draw.

In each of these triage processes, the alert that is sent may be sent to the contractor and/or to the customer. There may be various settings determining which alerts are sent to whom, and at what time those alerts can be sent. Alerts occurring outside of those times may be buffered for later sending, or may be addressed differently. For example, an alert that would ordinarily be sent to both a contractor and a customer if occurring during the day may instead be sent only to the contractor if occurring late in evening.

Figure 13B:
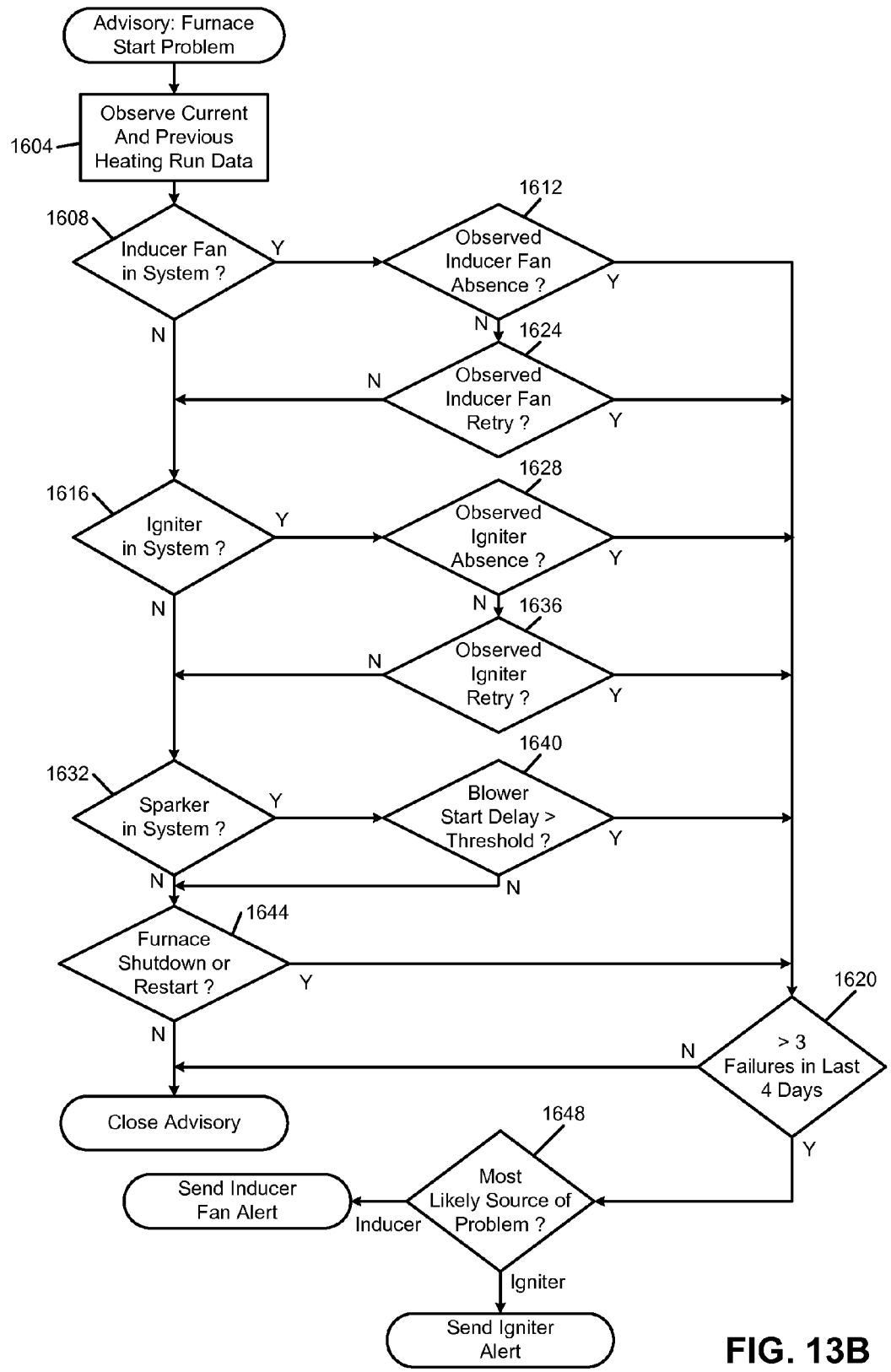

In FIG. 13B, control of an example triage process begins when an advisory is generated indicating a problem with the furnace starting. At 1604, the triage process involves observing current vs. time and previous heating run data. At 1608, if an inducer fan is present in the furnace system, control of the triage process transfers to 1612; otherwise, control transfers to 1616. At 1612, if an absence of the inducer fan is observed, control transfers to 1620; otherwise, control transfers to 1624. At 1624, if a retry of the inducer fan is observed, control transfers to 1620; otherwise, control returns to 1616.

At 1616, control determines whether there is an igniter, such as a hot surface igniter, in the furnace system. If so, control transfers to 1628; otherwise, control transfers to 1632. At 1628, if an absence of the igniter is observed (based on observing current vs. time), control transfers to 1620; otherwise, control transfers to 1636. At 1636, if a retry of the igniter is observed, control transfers to 1620; otherwise, control transfers to 1632. At 1632, if a sparker ignition system is present in the furnace system, control transfers to 1640; otherwise, control transfers to 1644.

At 1640, if the start of the circulator blower is delayed by more than a threshold period of time, control transfers to 1620; otherwise, control transfers to 1644. At 1644, if an abnormal furnace shutdown or restart is observed, control transfers to 1620; otherwise, the advisory is closed. When an advisory is closed, the advisory is logged and any notes or inputs received from the technician may be recorded for later analysis, either for the specific furnace system that triggered the advisory or for anonymized bulk analysis.

At 1620, if more than a certain number of failures have occurred within a predetermined period of time, such as three failures within the last four days, control transfers to 1648; otherwise, the advisory is closed. At 1648, the most likely source of the problem is determined. The triage process may identify the most likely source of the problem based on charts of current and temperatures and specifically a determination of at what point in the furnace startup sequence did the charts indicate that the furnace deviated from normal operation. If the most likely source is determined to be the inducer fan, control sends an alert indicating a problem with the inducer fan. If, instead, the most likely source of the problem is the igniter (or sparker), control sends an alert indicating a potential issue with the igniter (or sparker).

The determination of the most likely source of the problem may be based on the identity of the at least 3 failures from the past 4 days (or whatever other threshold and timeframe is used in 1620). For example, when 1620 is arrived at from either 1612 or 1624, the failure may be attributed to the inducer fan, while when 1620 is arrived at from 1628 or 1636, the failure may be attributed to the igniter. Similarly, when 1620 is arrived at from 1640, the failure may be attributed to the sparker. The most likely source of the problem may be determined based on whether one of these three sources was identified in a majority of the failures considered by 1620. In the implementation where 1620 is triggered by 3 failures, 2 failures attributed to, for example, the inducer fan may indicate that the inducer fan is the most likely source of the problem. In various implementations, failures occurring before the timeframe analyzed in 1620 may also inform the determination of the most likely source of the problem. For example, previously determined errors may be weighted, so that the earlier the error occurred, the lower weight it is assigned.

Figure 13C:
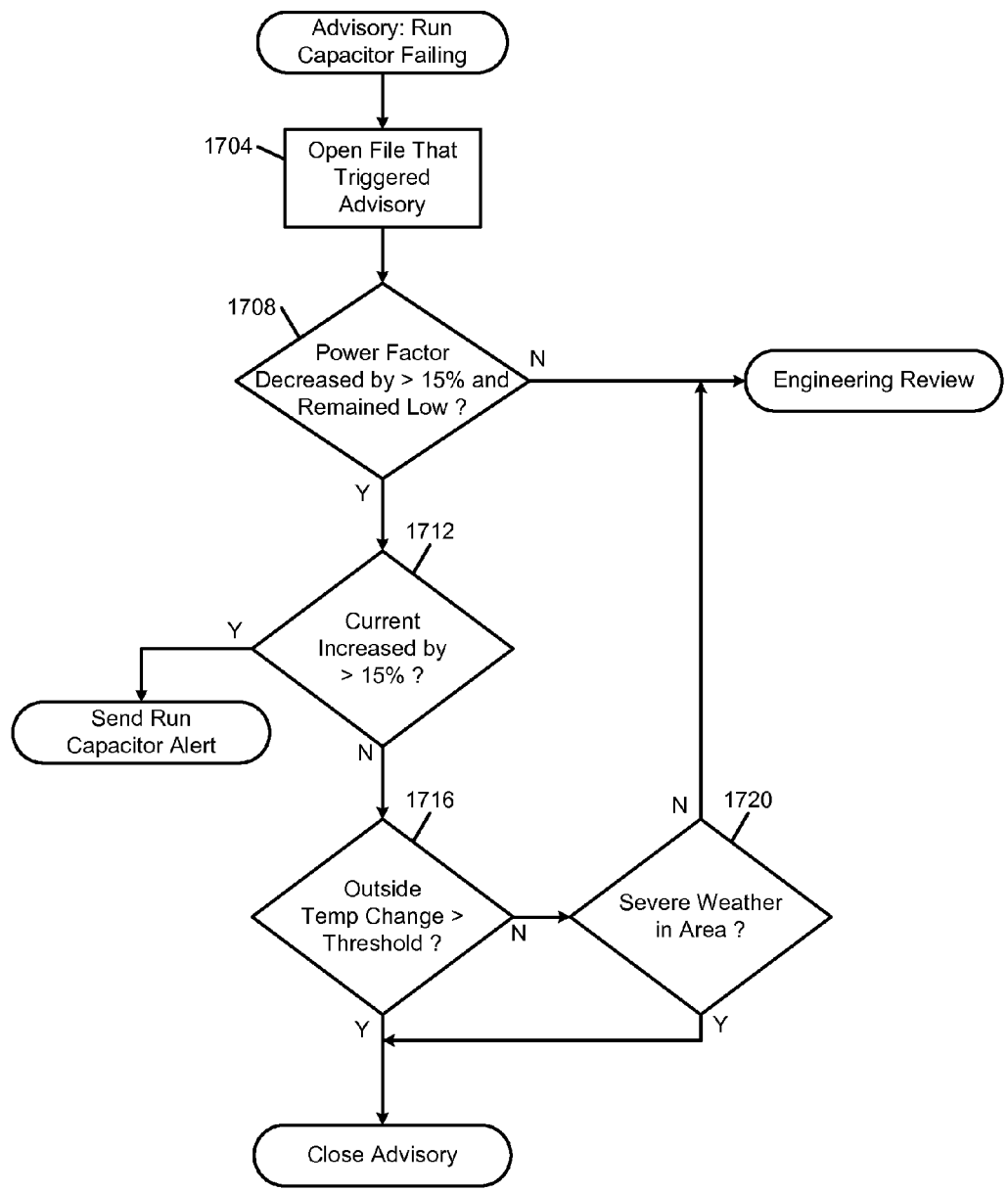

In FIG. 13C, control of an example triage process begins when an advisory is generated indicating that the run capacitor of a compressor is failing. At 1704, control of the triage process opens files corresponding to data that triggered the advisory. At 1708, control determines whether the power factor decreased by more than a predetermined threshold, such as 15%, and then remained low for the period during which the advisory was generated. If so, control transfers to 1712; otherwise, the advisory is submitted for engineering review.

At 1712, control determines whether the current increased by at least a predetermined amount, such as 15%. If so, an alert is sent indicating a problem with the compressor run capacitor; otherwise, control transfers to 1716. If an outside temperature change is greater than a threshold (alternatively, if an absolute value of an outside temperature change is greater than the threshold), the power factor decrease may be due to this temperature change and the advisory is closed; otherwise, control transfers to 1720. If there was severe weather in the area where the system that triggered the advisory was operating, this could also explain the decrease in power factor, and the advisory is closed; otherwise, the advisory is sent for engineering review.

Figure 13D:
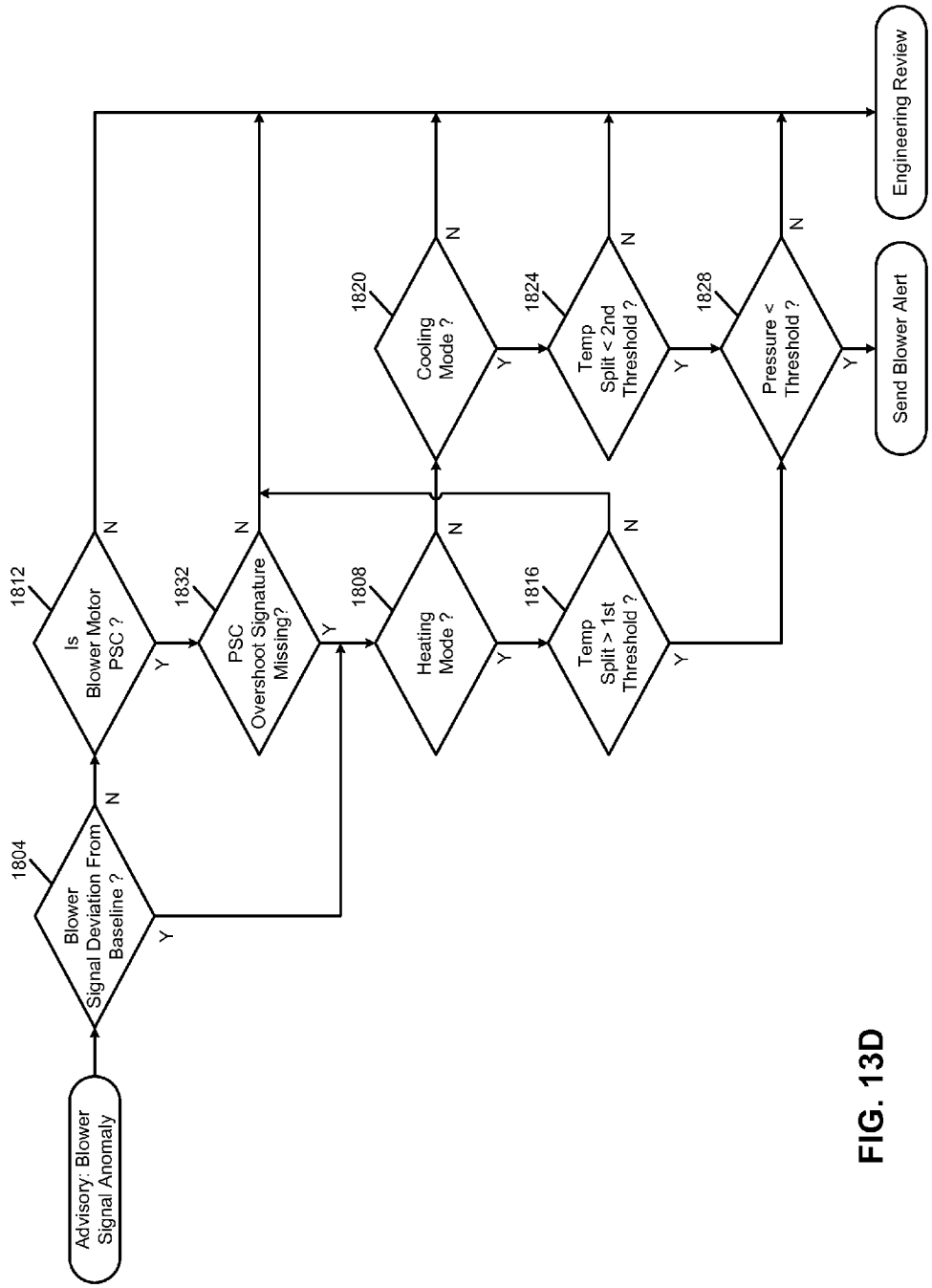

In FIG. 13D, control of an example triage process begins in response to an advisory indicating a circular blower signal anomaly. At 1804, control determines whether there is a deviation of the blower signal of a baseline. For example, this may refer to the current consumed by the circulator blower in either the time domain or frequency domain. If this deviation is observed, control transfers to 1808; otherwise, control transfers to 1812. The deviation may be evidenced as fluctuations from a steady state value, and may include a sudden drop to a lower-than-expected value. At 1808, if the system is in a heating mode, control transfers to 1816; otherwise, control transfers to 1820. At 1820, if the system is in a cooling mode, control transfers to 1824; otherwise, the advisory is sent for engineering review as the system apparently is neither the heating nor the cooling mode.

Returning to 1816, if the temperature split (supply air temperature minus return air temperature) is greater than a first threshold, corresponding to an unusually high temperature split, control transfers to 1828; otherwise, the advisory is submitted for engineering review. At 1824, if the temperature split is less than a second threshold, which may correspond to an abnormally low temperature split, control transfers to 1828; otherwise, the advisory is submitted for engineering review.

At 1828, control determines whether a pressure differential across the circulator blower is less than a predetermined threshold. If so, an alert is sent indicating a problem with the circulator blower; otherwise, the advisory is submitted for engineering review. In systems where a differential pressure sensor is omitted, 1828 may be omitted, and the blower alert may be sent without reference to pressure. Alternatively, additional checks may be put in place to compensate for the lack of pressure data.

Returning to 1812, if the blower motor is a permanent-split capacitor (PSC) motor, control transfers to 1832; otherwise, the advisory is submitted for engineering review. At 1832, control determines whether the signature corresponding to PSC overshoot is missing from the current trace of the system. If so, control transfers to 1808; otherwise, the advisory is submitted for engineering review. Absence of the PSC overshoot may be evidenced by the current staying at an overshoot peak level and not falling off after the peak.

Figure 13E:
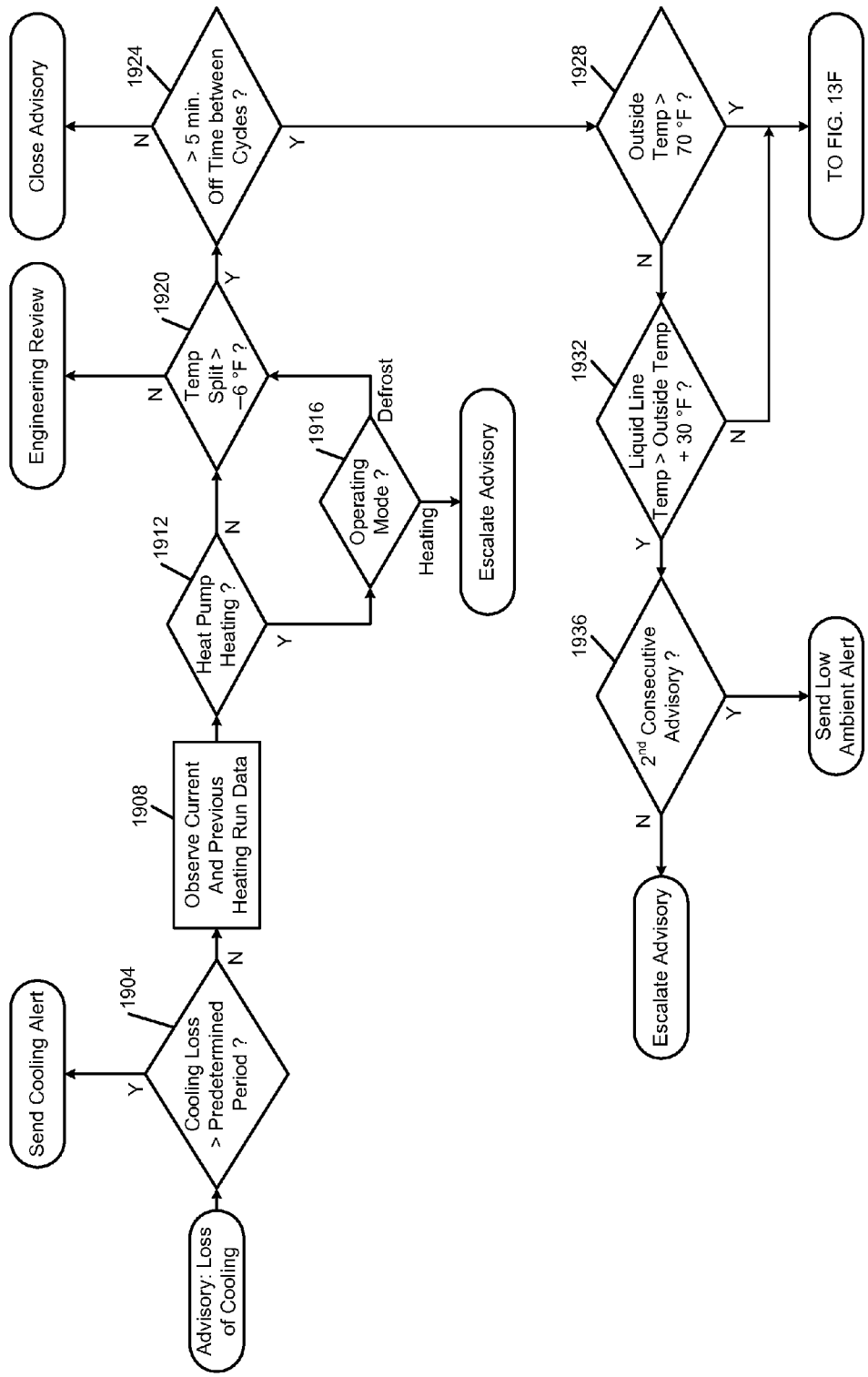

In FIG. 13E, control of an example triage process begins in response to an advisory indicating loss of cooling. At 1904, if the cooling loss has been present for longer than a predetermined period of time, such as 30 minutes, control may automatically send a cooling alert; otherwise, control continues at 1908. At 1908, current and previous heating run data is observed. At 1912, control determines whether the system is a heat pump that is currently heating. If so, control transfers to 1916; otherwise, if the heat pump is not currently heating or the system uses an air conditioner, control transfers to 1920.

At 1916, the triage process refers to temperature and pressure values to determine whether the heat pump is actually heating or simply defrosting. If defrosting, control transfers to 1920; otherwise, the advisory is escalated for further review, as the heat pump generally should not be heating when a call for cooling is present. The escalated advisory from 1916 may indicate a fault with a reversing valve of the heat pump, or control of the reversing valve. Control errors may result from improper configuration or installation of the thermostat, or errors in the indoor unit or outdoor unit control. At 1920, if the temperature split is greater than −6° F., control transfers to 1924; otherwise, the advisory is submitted for engineering review.

At 1924, control determines whether there is at least a predetermined amount of off time between cycles. If not, a short cycle timer in the system may be operating to prevent damage to the system. This operation may explain the loss of cooling advisory. The advisory may therefore be closed. If the minimum off time is being observed between cycles, control transfers to 1928.

Figure 13F:
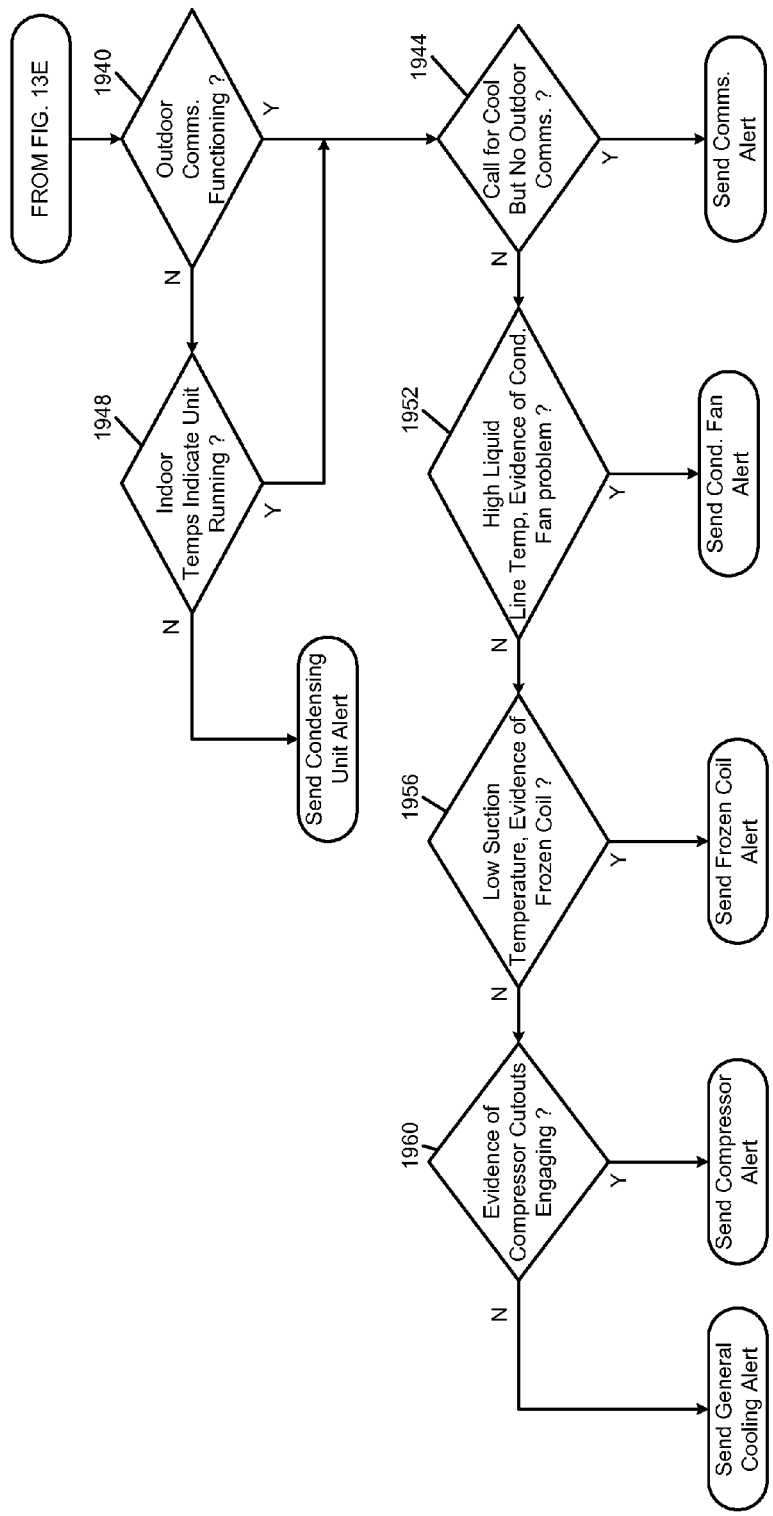

At 1928, if the outside temperature is greater than a predetermined threshold, such as 70° F., control transfers to FIG. 13F; otherwise, control transfers to 1932. At 1932, control determines whether the liquid line refrigerant temperature is greater than the outside air temperature plus an offset, such as 30° F. If so, control transfers to 1936; otherwise, control transfers to FIG. 13F. At 1936, control determines whether this advisory is the second consecutive advisory for loss of cooling. If so, control sends an alert indicating low ambient temperature, as HVAC systems may have difficulty cooling a home when the outside air temperature is low. Otherwise, the advisory may be escalated.

In FIG. 13F, control of the manual triage process enters at 1940, where if the communication between the indoor and outdoor monitor modules is functioning, control transfers to 1944; otherwise, control transfers to 1948. At 1944, control determines whether a call for cooling is observed, but there are no communications between the indoor and outdoor monitor modules. If so, an alert is sent indicating communication problems; otherwise, control transfers to 1952.

At 1948, control determines whether indoor temperatures indicate that the system is actually running. If so, control transfers to 1944; otherwise, it appears that the condensing unit is not operating and an alert is sent indicating a problem with the condensing unit. At 1952, control determines whether evidence of a condensing fan problem is present, which may include a higher-than-expected liquid line temperature. If so, an alert indicating a problem with the condensing fan is sent; otherwise, control transfers to 1956.

At 1956, control determines whether there is evidence of a frozen coil, such as low suction temperature. If so, an alert is sent indicating a problem with a frozen coil; otherwise, control transfers to 1960. At 1960, control determines whether there is evidence of compressor protections, such as thermal or pressure cutout switches, engaging. If so, an alert is sent indicating a problem with the compressor; otherwise, an alert is sent indicating a general unspecified cooling problem.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A monitoring system for a heating, ventilation, and air conditioning (HVAC) system of a building, the monitoring system comprising:
   a monitoring device installed at the building, wherein the monitoring device is configured to (i) measure an aggregate current supplied to a plurality of components of the HVAC system and (ii) transmit current data based on the measured aggregate current;
   a monitoring server, located remotely from the building, configured to receive the transmitted current data and, based on the received current data, (i) assess whether a failure has occurred in a first component of the plurality of components of the HVAC system and (ii) assess whether a failure has occurred in a second component of the plurality of components of the HVAC system, wherein the monitoring server generates a first advisory in response to determining that the failure has occurred in the first component; and
   a review server that is programmed to:
      provide the first advisory to a technician for review,
      in response to the technician verifying that the failure has occurred in the first component, transmit a first alert based on the first advisory,
      in response to the technician determining that a cause of the failure is not consistent with a description of the first advisory, (i) modify the first advisory and (ii) transmit the first alert based on the modified first advisory, and
      in response to the technician determining that the first alert is not warranted, (i) store the first advisory for future use or close the first advisory and (ii) prevent transmission of the first alert,
   wherein the first advisory is a programmatic assessment made by the monitoring server independent of action by the technician.

2. The monitoring system of claim 1 wherein the monitoring server (i) selectively predicts an impending failure of the first component based on the received current data and (ii) generates a second advisory in response to the prediction of impending failure of the first component.

3. The monitoring system of claim 2 wherein the monitoring server (i) selectively predicts an impending failure of the second component based on the received current data and (ii) generates a third advisory in response to the prediction of the impending failure of the second component.

4. The monitoring system of claim 1 wherein the review server transmits the first alert to at least one of a customer and a contractor.

5. The monitoring system of claim 4 wherein the review server transmits the first alert to the contractor regardless of a first piece of data and only selectively transmits the first alert to the customer based on the first piece of data.

6. The monitoring system of claim 4 wherein the review server is programmed to:
in response to an efficiency decrease associated with the failure being greater than a predetermined threshold, transmit the first alert to both the contactor and the customer, and
in response to the efficiency decrease associated with the failure being less than the predetermined threshold, transmit the first alert to only the contractor.

7. The monitoring system of claim 1 wherein:
a second advisory is generated in response to the monitoring server determining that the failure has occurred in the second component,
the review server provides the second advisory to one of a plurality of technicians for review,
the plurality of technicians includes the technician, and
the review server, in response to the technician verifying that the failure has occurred in the second component, transmits a second alert.

8. The monitoring system of claim 1 wherein the monitoring device samples the aggregate current over a time period, performs a frequency domain analysis on the sampled aggregate current over the time period, and transmits current data including a current value and frequency domain data to the monitoring server.

9. The monitoring system of claim 8 wherein the monitoring server identifies transition points in the current data and analyzes the frequency domain data around the identified transition points.

10. The monitoring system of claim 8 wherein the monitoring server determines whether the failure has occurred in the first component by comparing the frequency domain data to baseline data.

11. The monitoring system of claim 1 wherein the monitoring device records control signals from a thermostat and transmits information based on the control signals to the monitoring server.

12. The monitoring system of claim 1 further comprising a second monitoring device located in close proximity to a second enclosure of the HVAC system,
wherein the second enclosure includes at least one of a compressor and a heat pump heat exchanger,
wherein the second monitoring device (i) measures an aggregate current supplied to a plurality of components of the second enclosure and (ii) transmits second current data based on the measured aggregate current supplied to the plurality of components of the second enclosure to the monitoring device, and
wherein the monitoring device transmits the second current data to the monitoring server.

13. The monitoring system of claim 1 wherein the plurality of components of the HVAC system includes at least two components selected from: a flame sensor, a solenoid-operated gas valve, a hot surface igniter, a circulator blower motor, an inducer blower motor, a compressor, a pressure switch, a capacitor, an air filter, a condensing coil, an evaporating coil, and a contactor.

14. A method of monitoring a heating, ventilation, and air conditioning (HVAC) system of a building, the method comprising:
using a monitoring device installed at the building, measuring an aggregate current supplied to a plurality of components of the HVAC system;
transmitting current data based on the measured aggregate current to a monitoring server located remotely from the building;
at the monitoring server, assessing whether a failure has occurred in a first component of the plurality of components of the HVAC system based on current data received from the monitoring device;
at the monitoring server, assessing whether a failure has occurred in a second component of the plurality of components of the HVAC system;
generating a first advisory in response to determining that the failure has occurred in the first component;
providing the first advisory to a technician for review;
in response to the technician verifying that the failure has occurred in the first component, transmitting a first alert based on the first advisory;
in response to the technician determining that a cause of the failure is not consistent with a description of the first advisory, (i) modifying the first advisory and (ii) transmitting the first alert based on the modified first advisory; and
in response to the technician determining that the first alert is not warranted, (i) storing the first advisory for future use or closing the first advisory and (ii) preventing transmission of the first alert,
wherein the first advisory is a programmatic assessment made by the monitoring server independent of action by the technician.

15. The method of claim 14 further comprising:
selectively predicting an impending failure of the first component based on the received current data; and
generating a second advisory in response to the prediction of impending failure of the first component.

16. The method of claim 15 further comprising:
selectively predicting an impending failure of the second component based on the received current data; and
generating a third advisory in response to the prediction of impending failure of the second component.

17. The method of claim 14 wherein the first alert is transmitted to at least one of a customer and a contractor.

18. The method of claim 17 wherein the first alert is transmitted to the contractor regardless of a first piece of data and only selectively transmitted to the customer based on the first piece of data.

19. The method of claim 17 further comprising:
in response to an efficiency decrease associated with the failure being greater than a predetermined threshold, transmitting the first alert to both the contactor and the customer, and
in response to the efficiency decrease associated with the failure being less than the predetermined threshold, transmitting the first alert to only the contractor.

20. The method of claim 14 further comprising:
generating a second advisory in response to determining that the failure has occurred in the second component;
providing the second advisory to one of a plurality of technicians for review, wherein the plurality of technicians includes the technician; and in response to the technician verifying that the failure has occurred in the second component, transmitting a second alert.

21. The method of claim 14 further comprising:
sampling the aggregate current over a time period;
performing a frequency domain analysis on the sampled aggregate current over the time period; and
transmitting the current data including a current value and frequency domain data to the monitoring server.

22. The method of claim 21 further comprising:
identifying transition points in the current data; and
analyzing the frequency domain data around the identified transition points.

23. The method of claim 21 further comprising determining whether the failure has occurred in the first component by comparing the frequency domain data to baseline data.

24. The method of claim 14 further comprising:
recording control signals from a thermostat; and
transmitting information based on the control signals to the monitoring server.

25. The method of claim 14 further comprising:
at a second monitoring device located in close proximity to a second enclosure of the HVAC system, measuring an aggregate current supplied to a plurality of components of the second enclosure, wherein the second enclosure includes at least one of a compressor and a heat pump heat exchanger;
transmitting second current data based on the measured aggregate current from the second monitoring device to the monitoring device; and
transmitting the second current data to the monitoring server.

26. The method of claim 14 wherein the plurality of components of the HVAC system includes at least two components selected from: a flame sensor, a solenoid-operated gas valve, a hot surface igniter, a circulator blower motor, an inducer blower motor, a compressor, a pressure switch, a capacitor, an air filter, a condensing coil, an evaporating coil, and a contactor.

\* \* \* \* \*